(12) United States Patent
Kawahito

(10) Patent No.: US 12,687,620 B2
(45) Date of Patent: Jul. 21, 2026

(54) RANGE IMAGE ACQUISITION DEVICE

(71) Applicant: NATIONAL UNIVERSITY CORPORATION SHIZUOKA UNIVERSITY, Shizuoka (JP)

(72) Inventor: Shoji Kawahito, Hamamatsu (JP)

(73) Assignee: NATIONAL UNIVERSITY CORPORATION SHIZUOKA UNIVERSITY (JP)

( * ) Notice: Subject to any disclaimer, the term of this patent is extended or adjusted under 35 U.S.C. 154(b) by 975 days.

(21) Appl. No.: 17/913,070

(22) PCT Filed: Mar. 22, 2021

(86) PCT No.: PCT/JP2021/011713
§ 371 (c)(1),
(2) Date: Sep. 20, 2022

(87) PCT Pub. No.: WO2021/193532
PCT Pub. Date: Sep. 30, 2021

(65) Prior Publication Data
US 2023/0194678 A1 Jun. 22, 2023

(30) Foreign Application Priority Data

Mar. 23, 2020 (JP) ................................. 2020-050759

(51) Int. Cl.
*G01S 7/4863* (2020.01)
*G01S 17/894* (2020.01)
(52) U.S. Cl.
CPC .......... *G01S 7/4863* (2013.01); *G01S 17/894* (2020.01)
(58) Field of Classification Search
CPC ...... G01B 11/14; G01S 7/487; G01S 7/48–51
See application file for complete search history.

(56) References Cited

U.S. PATENT DOCUMENTS

2015/0285625 A1* 10/2015 Deane ................... G01S 7/4816
348/140
2017/0038866 A1* 2/2017 Akhavan Fomani .......................
G06F 3/0443
(Continued)

FOREIGN PATENT DOCUMENTS

CN 106165399 A 11/2016
CN 106461781 A 2/2017
(Continued)

OTHER PUBLICATIONS

English translation of the International Preliminary Report on Patentability (IPRP) (Chapter 1 or Chapter II of the PCT) mailed Sep. 29, 2022 with Notification from the International Bureau (Form PCT/IB/338) in corresponding International Application No. PCT/JP2021/011713.
(Continued)

*Primary Examiner* — Yuqing Xiao
*Assistant Examiner* — Chia-Ling Chen
(74) *Attorney, Agent, or Firm* — OSTROLENK FABER LLP

(57) ABSTRACT

A range image acquisition device includes: a light source; a light source control unit controlling the light source; a pixel array including a plurality of pixel circuits; and a peripheral circuit supplying control pulses for controlling an operation of the pixel array, a logic pulse and an inverted signal of the logic pulse to the pixel array. The light source control unit repeatedly performs an operation of generating the pulsed light so that the incident pulsed light based on the pulsed light is incident on a sensitive pixel region in the pixel array while moving in a sensitive pixel region. The peripheral circuit allows the pixel circuits to move the electric charges generated in the photoelectric conversion region to the charge discharging region for the pixel circuits constituting
(Continued)

an insensitive pixel region, not included in the sensitive pixel region.

10 Claims, 56 Drawing Sheets

(56) References Cited

U.S. PATENT DOCUMENTS

| | | | | |
|---|---|---|---|---|
| 2017/0115392 A1* | 4/2017 | Mase | .................... | G01S 7/4816 |
| 2020/0209355 A1* | 7/2020 | Pacala | ................... | G01S 7/4817 |

FOREIGN PATENT DOCUMENTS

| | | |
|---|---|---|
| CN | 110520996 A | 11/2019 |
| EP | 3301479 A1 | 4/2018 |
| JP | H08248133 A * | 9/1996 |
| JP | 2002-039716 A | 2/2002 |
| JP | 2002-368205 A | 12/2002 |
| JP | 2003-247809 A | 9/2003 |
| JP | 2010-040594 A | 2/2010 |
| JP | 2014-059301 A | 4/2014 |
| WO | WO-2019031510 A1 * | 2/2019 ............. G01S 17/10 |

OTHER PUBLICATIONS

International Search Report mailed Jun. 8, 2021 in corresponding International Application No. PCT/JP2021/011713.

Extended European Search Report dated Apr. 18, 2024 issued in corresponding European Patent Application No. 21776666.6.

\* cited by examiner (a)

(b)

(b)

(a)

(a)

(b)

RANGE IMAGE ACQUISITION DEVICE

CROSS-REFERENCE TO RELATED APPLICATIONS

The present application is a 35 U.S.C. §§ 371 national stage application of International Application No. PCT/JP2021/011713 filed Mar. 22, 2021, which claims priority to Japanese Patent Application No. 2020-050759, filed Mar. 23, 2020, the contents of which are incorporated herein by reference.

TECHNICAL FIELD

The present invention relates to a range image acquisition device that acquires a range image containing range information for each pixel.

BACKGROUND ART

In the related art, sensor devices generating image signals containing range information by using a time-of-flight of light have been used. A method of obtaining the range information by using the time-of-flight of light is called a TOF (Time Of Flight) method. Patent Literature 1 discloses a sensor device based on the TOF method. This sensor device adopts a method referred to as a charge distribution method. In the charge distribution method, electric charges generated in accordance with incidence of light are distributed to two charge accumulation units by turning on/off of a gate. Then, a range to the target is obtained based on a ratio of the electric charges accumulated in each charge accumulation unit.

CITATION LIST

Patent Literature

Patent Literature 1: Japanese Unexamined Patent Publication No. 2002-39716

SUMMARY OF INVENTION

Technical Problem

A range image acquisition device repeats an exposure operation and a read operation. The exposure operation irradiates the target with a light and accumulates electric charges caused by a returned light from the target. The read operation reads a voltage corresponding to the accumulated electric charges. Herein, as the time interval from one exposure operation to the next exposure operation becomes longer, a deviation occurs between a state of the measurement target obtained by the exposure operation and an actual state of the measurement target. The state of the measurement target is a range to the measurement target. In particular, when the measurement target moves at a high speed, this deviation becomes noticeable.

Accordingly, the present invention provides a range image acquisition device capable of satisfactorily measuring a state of a measurement target.

Solution to Problem

According to one embodiment of the present invention, there is provided a range image acquisition device including: a light source generating a pulsed light; a light source control unit controlling the light source to repeatedly generate the pulsed light within a periodic frame period; a pixel array including a plurality of pixel circuit units arranged in N rows and M columns (N and M are integers of 2 or more) and generating electric charges corresponding to a received light; and a peripheral circuit arranged in a peripheral portion of the pixel array and supplying a control signal controlling an operation of the pixel array to the pixel array. The pixel circuit unit has: a photoelectric conversion region converting a light into electric charges; first to X-th (X is an integer of 2 or more) charge reading regions provided to be close to the photoelectric conversion region and separated from each other; a charge discharging region for discharging the electric charges generated in the photoelectric conversion region; first to X-th control electrodes provided corresponding to the photoelectric conversion region and the first to X-th charge reading regions, respectively, and for applying a transfer control pulse for transfer of the electric charges between the photoelectric conversion region and the first to X-th charge reading regions; and an (X+1)-th control electrode for applying the transfer control pulse for the transfer of the electric charges between the photoelectric conversion region and the charge discharging region. The light source control unit repeatedly performs an operation of generating the pulsed light so that a returned light based on the pulsed light is incident on a sensitive region in the pixel array while moving in the sensitive region. The peripheral circuit supplies the control signal to the pixel array so that the transfer control pulse permitting the movement of the electric charges from the photoelectric conversion region to the charge discharging region is applied to the (X+1)-th control electrode of the pixel circuit units constituting the insensitive region, not included in the sensitive region.

When the light source control unit generates the pulsed light so that the returned light is incident on the sensitive region, the range image acquisition device supplies the transfer control pulse allowing the electric charges generated in the photoelectric conversion region to be transferred to the charge discharging region to the insensitive region. According to this operation, the accumulation of the electric charges that may cause noise is suppressed in the insensitive region where no returned light is incident. As a result, when the insensitive region is switched to the sensitive region, the state where the accumulation of the electric charges based on the returned light is prepared is formed. That is, it is possible to quickly switch from the insensitive region to the sensitive region. Therefore, the operation of irradiating with the pulsed light and the operation of receiving the returned light caused by the pulsed light can be repeated at a high speed while moving in the sensitive region. In other words, speeding up and repetition of the irradiation operation and the light reception operation is temporally synonymous with oversampling and integrating of photoelectric charges within a frame period in so-called range measurement. Therefore, due to the low-pass filter effect of oversampling and integrating, good measurement results can be obtained without being affected by aliasing even when the measurement target moves at a high speed.

In one aspect of the range image acquisition device the light source control unit may perform an operation of emitting the pulsed light from the light source so as to expose the sensitive regions of all the pixel circuit units included in a j-th row (j is an integer of 1 or more and N or less), and the peripheral circuit may perform: an operation of supplying the control signal to the pixel array so that the transfer control pulse permitting the movement of the electric charges from the photoelectric conversion region to the charge reading regions is applied to the first to X-th control electrodes of all the pixel circuit units included in the j-th row; and an operation of supplying the control signal to the pixel array so that the transfer control pulse permitting the movement of the electric charges from the photoelectric conversion region to the charge discharging region is applied to the (X+1)-th control electrode of all the pixel circuit units included in the insensitive region. According to this operation, the pixel circuit units included in the j-th row can be collectively set to the state where the movement of the electric charges from the photoelectric conversion region to the charge reading regions is permitted. Furthermore, the pixel circuit units not included in the j-th row can be collectively set to the state where the movement of the electric charges from the photoelectric conversion region to the charge discharging region is permitted.

In one aspect of the range image acquisition device, the light source control unit may perform an operation of emitting the pulsed light from the light source so as to expose the sensitive region of a portion of the pixel circuit units included in the j-th row (j is an integer of 1 or more and N or less), and the peripheral circuit may perform: an operation of supplying the control signal to the pixel array so that the transfer control pulse permitting the movement of the electric charges from the photoelectric conversion region to the charge reading regions is applied to the first to X-th control electrodes included in a portion of the pixel circuit units included in the j-th row; and an operation of supplying the control signal to the pixel array so that the transfer control pulse permitting the movement of the electric charges from the photoelectric conversion region to the charge discharging region is applied to all the (X+1)-th control electrodes of the pixel circuit units included in the insensitive region. According to this operation, a desired regions included in the pixel array can be set as the sensitive region. Therefore, the sensitive region in the pixel array can be set more accurately.

In one aspect of the range image acquisition device, the transfer control pulse may cause the electric charges generated in the photoelectric conversion region in the pixel circuit units constituting the sensitive region to be moved to the charge reading regions and causes the electric charges generated in the photoelectric conversion region in the pixel circuit units constituting the insensitive region to be moved to the charge discharging region, and the peripheral circuit and the light source control unit may perform a read operation of outputting a voltage based on the electric charges accumulated in the charge reading regions after performing an exposure operation on the plurality of sensitive regions several times. According to this operation, signals can be read from the entire pixel array after the exposure operation is performed on the entire pixel array several times.

In one aspect of the range image acquisition device, the transfer control pulse may cause the electric charges generated in the photoelectric conversion region in the pixel circuit units constituting the sensitive region to be moved to the charge reading regions and causes the electric charges generated in the photoelectric conversion region in the pixel circuit units constituting the insensitive region to be moved to the charge discharging region, and the peripheral circuit and the light source control unit may repeatedly perform an exposure operation on the selected sensitive region and a read operation outputting a voltage based on the electric charges accumulated in the charge reading regions for the pixel circuit units constituting the selected sensitive region while changing the sensitive region to be selected. According to this operation, the exposure operation and the read operation can be alternately performed for each selected sensitive region.

In one aspect of the range image acquisition device, the transfer control pulse may cause the electric charges generated in the photoelectric conversion region in the pixel circuit units constituting the sensitive region to be moved to the charge reading regions and causes the electric charges generated in the photoelectric conversion region in the pixel circuit units constituting the insensitive region to be moved to the charge discharging region, and the peripheral circuit and the light source control unit may concurrently perform an exposure operation on the sensitive region and a read operation outputting a voltage based on the electric charges accumulated in the charge reading regions. According to this operation, the exposure operation in a certain region and the read operation in another region are concurrently performed. Therefore, the speed of the operations of the range image sensor can be further increased.

In the exposure operations of one aspect of the range image acquisition device, the light source control unit may generate the pulsed light only once for the sensitive region. By this operation, the speed of the operations of the range image sensor can be further increased.

In the exposure operation of one aspect of the range image acquisition device, the light source control unit may generate the pulsed light several times for the sensitive region. By this operation, the speed of the operations of the range image sensor can be further increased.

the pixel circuit unit of one aspect of range image acquisition device may have the photoelectric conversion region having a function of converting an incident pulsed light into the electric charges and the read circuit receiving the electric charges from the photoelectric conversion region and outputting the voltage based on the electric charges. The pixel circuit unit is configured to include a plurality of n-type MOS transistors, and the pixel circuit unit does not include the p-type MOS transistors.

The light source control unit of one aspect of the range image acquisition device may perform an operation of emitting the pulsed light from the light source so as to expose the sensitive region of a portion of the pixel circuit units included in the j-th row (j is an integer of 1 or more and N/R or less (R is the array division number in the row direction)) in the divided pixel array regions obtained by dividing the pixel array into the plurality of regions. The light source may be divided in illumination so as to simultaneously expose the sensitive regions included in all the divided pixel array regions. The peripheral circuit may perform: an operation of supplying the control signal to the pixel array so that the transfer control pulse permitting the movement of the electric charges from the photoelectric conversion region to the charge reading regions is applied to the first to X-th control electrodes included in a portion of the pixel circuit units included in the j-th row of all the divided pixel array regions; and an operation of supplying the control signal to the pixel array so that the transfer control pulse permitting the movement of the electric charges from the photoelectric conversion region to the charge discharging region is applied to all the (X+1)-th control electrodes of the pixel circuit units included in the insensitive regions of all the divided pixel array regions.

Advantageous Effects of Invention

According to the present invention, there is provided a range image acquisition device capable of satisfactorily measuring a state of a measurement target.

BRIEF DESCRIPTION OF DRAWINGS

FIG. 54($b$) is a diagram illustrating a sensitive pixel regions and an insensitive pixel region in a second operation mode. FIG. 54($c$) is a diagram illustrating a sensitive pixel regions and an insensitive pixel region in a third operation mode.

DESCRIPTION OF EMBODIMENTS

Figure 1:
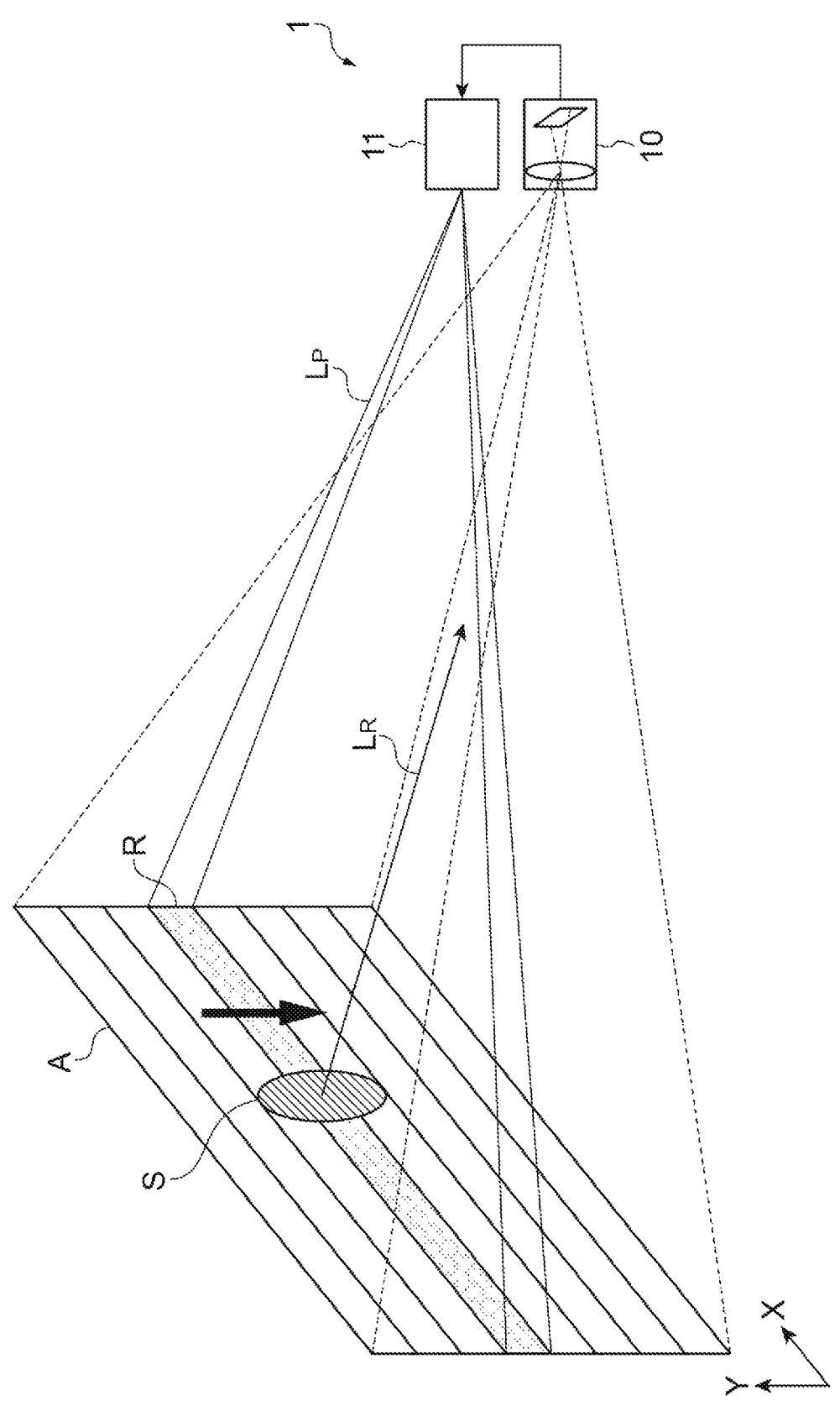
FIG. 1 is a diagram illustrating an irradiation region of a light source.

Hereinafter, embodiments for carrying out the present invention will be described in detail with reference to the accompanying drawings. In the description of the drawings, the same elements are denoted by the same reference numerals, and redundant descriptions are omitted.

First Embodiment

First, an outline of functions and configurations of a range image acquisition device 1 according to a first embodiment will be described with reference to FIG. 1. The range image acquisition device 1 has a line scan light source and performs a sensitive/insensitive pixel scanning function. With components and the functions, the range image acquisition device 1 generates a range image based on the time-of-flight method. The range image includes range information for each picture element (pixel).

The range image acquisition device 1 has a light source 11 and a range image sensor 10.

The light source 11 is a device that generates a pulsed light $L_P$ to irradiate a target S in order to perform range measurement by the Time Of Flight (TOF) method. The light source 11 is configured with, for example, a semiconductor light emitting element such as a light emitting diode or a laser diode and a drive circuit driving the semiconductor light emitting element. As the light source 11, an element generating a light in a wavelength range such as a near-infrared range and a visible light range can be used.

The light source 11 is a line scan light source. The light source 11 projects the strip-shaped pulsed light $L_P$ having periodicity and a line (linear shape) or width onto a measurement target region A. The pulsed light $L_P$ scans the measurement target region A one-dimensionally along the direction (Y direction) intersecting with direction (X direction) in which an irradiation region R extends.

More specifically, the light source 11 irradiates the measurement target region A including the target S with pulsed light $L_P$. The pulsed light $L_P$ emitted by the light source 11 has two-dimensional spreading. However, an aspect ratio thereof is relatively large. For example, the width (X direction) of the irradiation region R is significantly larger than the length (Y direction) of the irradiation region R. That is, the light source 11 may be a line light source irradiating with substantially one-dimensional (linear) light. Then, a portion of the measurement target region A is irradiated with pulsed light $L_P$. Therefore, the light source 11 changes an irradiation position of the pulsed light $L_P$ in the measurement target region A every time. The operation of irradiating with the pulsed light $L_P$ while changing the irradiation position in this manner is referred to as scanning. The pulsed light $L_P$ is reflected at the target S. The reflected light is incident on the range image sensor 10. That is, the reflected light is an incident pulsed light $L_R$ (returned light).

Figure 2:
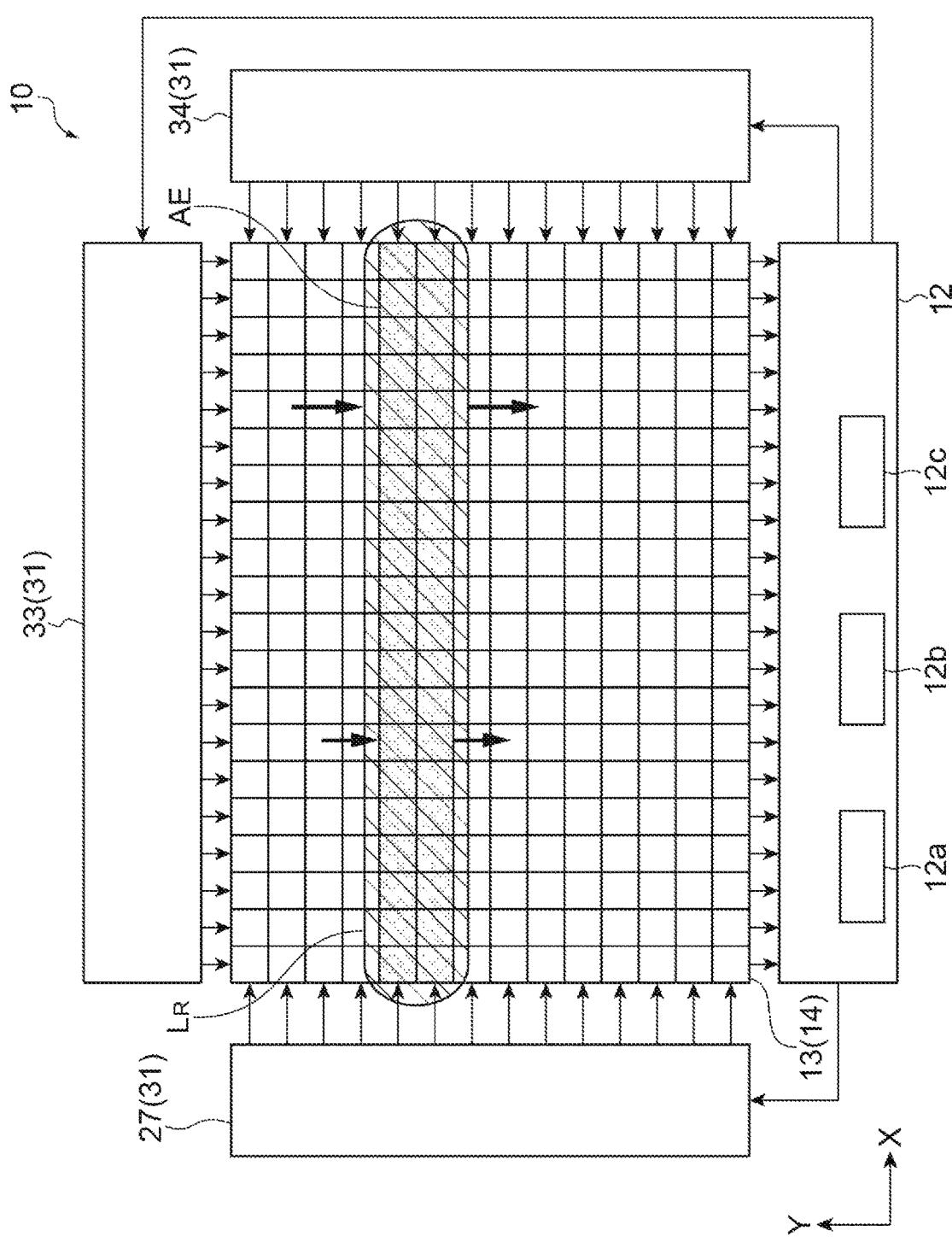
FIG. 2 is a diagram illustrating a connection configuration between a pixel array and a peripheral circuit.

As illustrated in FIG. 2, the range image sensor 10 is an image sensor having a two-dimensional pixel array 14 that receives a reflected light from the measurement target region A. The pixel array 14 has a plurality of pixel circuits 13 arranged two-dimensionally for receiving the incident pulsed light $L_R$. A detailed configuration of the pixel circuit 13 will be described in detail in the later paragraph.

That is, the range image sensor 10 includes a plurality of the pixel circuits (a plurality of the pixel circuit units) 13. The plurality of pixel circuits 13 are arranged in a shape of a two-dimensional array in two-dimensional directions (for example, column direction and row direction) to constitute an image sensor and generates a detection signal by photo-electrically converting the incident pulsed light $L_R$ generated due to the reflection of the pulsed light $L_P$ by the target S. In addition, the range image sensor 10 is used together with light source 11 and a calculation circuit 12 to generate the range image.

It is noted that, in the following description, reference numerals with subscripts such as "pixel circuits 13₁, 13₂, 13₃, 13₄, and 13₅" are used when there is a need to distinguished between individual components. On the other hand, when there is no need to distinguish between individual components, reference numerals without subscripts such as "the pixel circuits 13" are used.

The range image sensor 10 scans the pixel region on which the incident pulsed light $L_R$ caused by the pulsed light $L_P$ is incident in synchronization with scanning of the pulsed light $L_P$ from the light source 11. This operation is controlled by the control pulses provided from the calculation circuit 12 and a peripheral circuit 31.

The calculation circuit 12 may be configured with a dedicated integrated circuit such as a one-chip microcomputer including a CPU, a RAM, a ROM, an input/output device, and the like or may be configured with a general-purpose computer such as a personal computer.

The calculation circuit 12 is electrically connected to the range image sensor 10 and the light source 11, calculates the range information on the target S for each pixel by using the detection signals generated by a plurality of the pixel circuits 13, and generates and outputs the range image containing two-dimensional image information reflecting the range information. This function is performed by a signal processing unit 12$c$ of the calculation circuit 12. In addition, the calculation circuit 12 also has a light source control unit 12$a$ controlling the irradiation timing of the pulsed light $L_P$ by the light source 11. Further, the calculation circuit 12 also has a pixel control unit 12$b$ for driving the pixel circuit 13.

The calculation circuit 12 is connected to the peripheral circuit 31. The calculation circuit 12 supplies the control signal to the peripheral circuit 31.

The peripheral circuit 31 supplies the control signal to the pixel array 14. The control signals include at least one of control pulses $G_1$ to $G_4$ and $G_D$, a logic pulse $E_{SR(j)}$, and the inverted signals thereof. It is noted that the control signals include transfer control pulses $G_{1out}$ to $G_{4out}$ and $G_{Dout}$ generated by pulses selected from the control pulses $G_1$ to $G_4$ and $G_D$, the logic pulse $E_{SR(j)}$, and the inverted signals thereof. The peripheral circuit 31 has a distribution circuit 33, a pixel switching circuit 34, and a read control circuit 27. The distribution circuit 33 and the pixel switching circuit 34 set the sensitiveness of the pixel circuit 13 to be sensitive or insensitive in units of a plurality of rows (one or more rows). The read control circuit 27 is a scanning circuit that reads signals in units of several lines (one or more lines). It is noted that "sensitivity of pixel", "pixel is set to be sensitive", and "pixel is set to be insensitive" will be described in detail in the following description.

The distribution circuit 33 is electrically connected to the pixel array 14 and supplies the control pulses $G_1$ to $G_4$ and $G_D$ to a plurality of the pixel circuits 13. The pixel switching circuit 34 is electrically connected to the pixel array 14 and supplies the logic pulses to a plurality of the pixel circuits 13. The distribution circuit 33 and the pixel switching circuit 34 set the sensitiveness of the pixel circuit 13 to the sensitive or insensitive in units of a plurality of rows which are one or more rows. That is, the distribution circuit 33 and the pixel switching circuit 34 are sensitive/insensitive scanning circuits for pixels. The distribution circuit 33 and the pixel switching circuit 34 cooperate with light source control unit 12$a$ to positionally and temporally synchronize the irradiation region R with a sensitive pixel region AE (sensitive region) and an insensitive pixel region AN (insensitive region). This control is executed several times within one frame.

The read control circuit 27 is electrically connected to the pixel array 14 and supplies the control pulses for the read operation to a plurality of the pixel circuits 13. The read control circuit 27 supplies the control pulses for reading signals from the pixel circuits 13 in units of one or more rows equal to the range of the sensitive pixel region AE described later. That is, the read control circuit 27 is a read scanning circuit.

Figure 3:
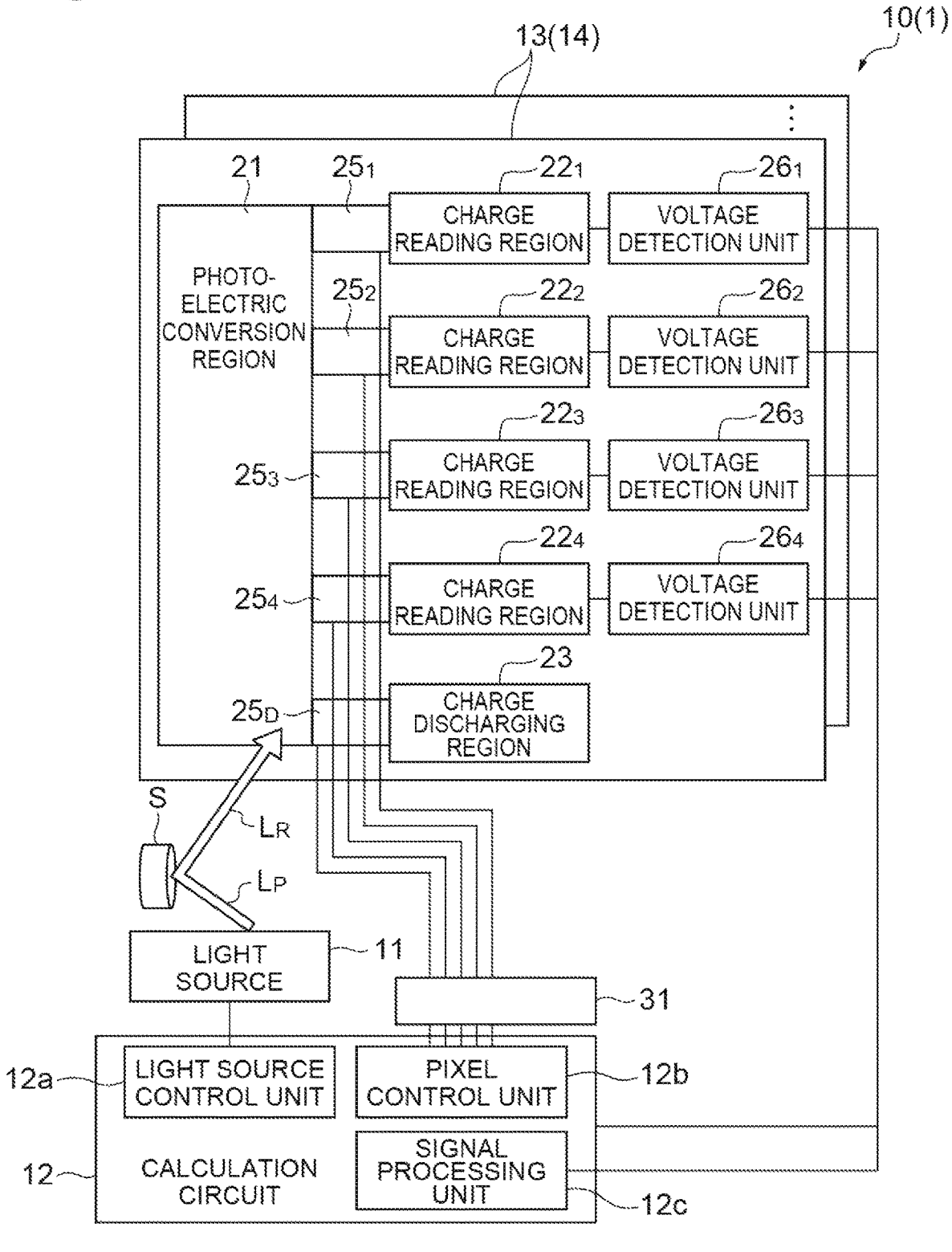
FIG. 3 is a block diagram illustrating a schematic configuration of a range image sensor 10 according to a first embodiment.

The configurations of the pixel circuit 13 and the calculation circuit 12 will be described in detail below with reference to FIG. 3.

First, the configuration of the pixel circuit 13 will be described. The pixel circuit 13 is configured with a semiconductor element and includes: a photoelectric conversion region 21 having a function of converting the incident pulsed light $L_R$ into the electric charges; first to fourth charge reading regions $22_1$ to $22_4$ and a charge discharging region 23 provided to be close to the photoelectric conversion region 21 and to be separated from each other; first to fourth control electrodes $25_1$ to $25_4$ and a fifth control electrode $25_D$ provided corresponding to the first to fourth charge reading regions $22_1$ to $22_4$ and the charge discharging region 23, respectively, and for applying transfer control pulses for the transfer of the electric charges between the respective regions from the photoelectric conversion region 21; and voltage detection units $26_1$ to $26_4$ for reading detection signals from the respective first to fourth charge reading regions $22_1$ to $22_4$. The voltage detection units $26_1$ to $26_4$ are, for example, amplifiers including source follower amplifiers. The voltage detection units $26_1$ to $26_4$ selectively detect and amplify voltages based on the reference potential of the respective charge reading regions $22_1$ to $22_4$ under the control of the calculation circuit 12. The voltage detection units $26_1$ to $26_4$ output the amplified voltages as the detection signals to the calculation circuit 12.

Herein, the pixel circuit 13 has a configuration in which the pixel circuit 13 is insensitive to light due to elimination of the sensitiveness of the pixel. The light mentioned herein includes, for example, the incident pulsed light $L_R$ caused by the pulsed light $L_P$ and the background light not caused by the pulsed light $L_P$. The "sensitiveness of the pixel is eliminated" and "is insensitive to the incident pulsed light $L_R$" denotes the state where electric charges generated in the photoelectric conversion region 21 are not read in the charge reading regions $22_1$ to $22_4$. In other words, the "sensitiveness of the pixel is eliminated" and "is insensitive to the incident pulsed light $L_R$" denotes the state where electric charges generated in the photoelectric conversion region 21 are transferred to the charge discharging region 23. The structure of the "sensitiveness of the pixel is eliminated" and "is insensitive to the incident pulsed light $L_R$" is the charge discharging region 23 as a drain and the control electrode $25_D$ as a drain gate.

The pixel circuit 13 is formed on, for example, the p-type semiconductor substrate such as a silicon substrate. That is, the photoelectric conversion region 21 is provided in a central portion of a pixel forming region configured with an active region forming layer made of a p-type semiconductor, an n-type surface-buried region, a p-type pinning layer, and an insulating film, which are sequentially formed on the p-type semiconductor substrate. Then, the n-type charge reading regions $22_1$ to $22_4$ and the charge discharging region 23 having a higher impurity concentration than the active region forming layer are formed at positions separated from each other to be close to the photoelectric conversion region 21. The control electrodes $25_1$ to $25_4$ and $25_D$ are provided on the respective charge transfer paths reaching from the photoelectric conversion region 21 on the insulating film to the charge reading regions $22_1$ to $22_4$ and the charge discharging region 23, respectively. Herein, each of the control electrodes $25_1$ to $25_4$ and $25_D$ may be provided on the charge transfer path. The control electrodes $25_1$ to $25_4$ and $25_D$ may be provided to be separated into the plurality of electrode portions to interpose the charge transfer path from both sides thereof.

In the pixel circuit 13 having the above-described configuration, the transfer control pulses having different phases are applied from the calculation circuit 12 described later to the control electrodes $25_1$ to $25_4$ and $25_D$. Accordingly, depletion potentials of the surface-buried region sequentially changes. As a result, potential gradients are sequentially formed so that the electric charges are transported to one of the charge transfer paths. As a result, majority carriers (electric charges) generated in the surface-buried region of the photoelectric conversion region 21 move to one of the charge reading regions $22_1$ to $22_4$ and the charge discharging region 23.

Next, a functional configuration of the calculation circuit 12 will be described.

The calculation circuit 12 controls a light emission timing of the pulsed light $L_P$ by the light source 11, an intensity of the pulsed light $L_P$, and a pulse width of the pulsed light $L_P$. Specifically, the calculation circuit 12 controls to repeatedly generate the pulsed light $L_P$ of a predetermined delay time $T_0$ within one frame period, which is a repetition period of range calculation set in advance (light source control unit $12a$). In addition, the calculation circuit 12 also has a function of applying the transfer control pulses having different phases to the control electrodes $25_1$ to $25_4$ and $25_D$ (pixel control unit $12b$). That is, the calculation circuit 12 applies the transfer control pulses having phases shifted sequentially to the control electrodes $25_1$ to $25_4$ through peripheral circuit 31 of the range image sensor 10, corresponding to the generation timing of each pulsed light $L_P$ within one frame period. Further, the calculation circuit 12 applies the transfer control pulse for discharging the electric charges generated in the photoelectric conversion region 21 to the charge discharging region 23 to the control electrode $25_D$ through peripheral circuit 31 of the range image sensor 10 before an application timing of the transfer control pulse.

The light source control unit $12a$ of the calculation circuit 12 controls the light source 11 to irradiate a portion of the measurement target region A with pulsed light $L_P$. That is, the entire measurement target region A is not collectively irradiated with pulsed light $L_P$. In this embodiment, the irradiation region R of the pulsed light $L_P$ is a rectangular region extending in the width direction X of the measurement target region A. A width of the irradiation region R may coincide with a width of the measurement target region A. The irradiation regions R are set to be aligned in a height direction (Y direction) of the measurement target region A.

The calculation circuit 12 controls the position of the irradiation region R of the pulsed light $L_P$ emitted from the light source 11. The calculation circuit 12 controls the light source 11 to set a certain region as the irradiation region R, and irradiates the region with pulsed light $L_P$. The calculation circuit 12 controls the light source 11 to irradiate with pulsed light $L_P$ so that the irradiation region R sequentially moves downward.

The order of irradiation with pulsed light $L_P$ is not limited to the above-mentioned mode. As described above, instead of the mode of irradiating sequentially from top to bottom, the order of irradiating sequentially from bottom to top may be used. In addition, in the mode of irradiating from top to bottom, the mode of irradiating every other may be used.

The calculation circuit 12 repeatedly calculates the range for each pixel circuit 13 for each of the plurality of frames and repeatedly generates the range image containing the obtained range information (signal processing unit $12c$). That is, the calculation circuit 12 calculates the range information based on the detection signals output from the voltage detection units $26_1$ to $26_4$ of the pixel circuit 13. Then, the calculation circuit 12 generates the range image containing the range information corresponding to each pixel circuit 13 and outputs the range image to an external device. As the external device that is an output destination, there may be exemplified output devices such as a display device and a communication interface device.

Figure 4:
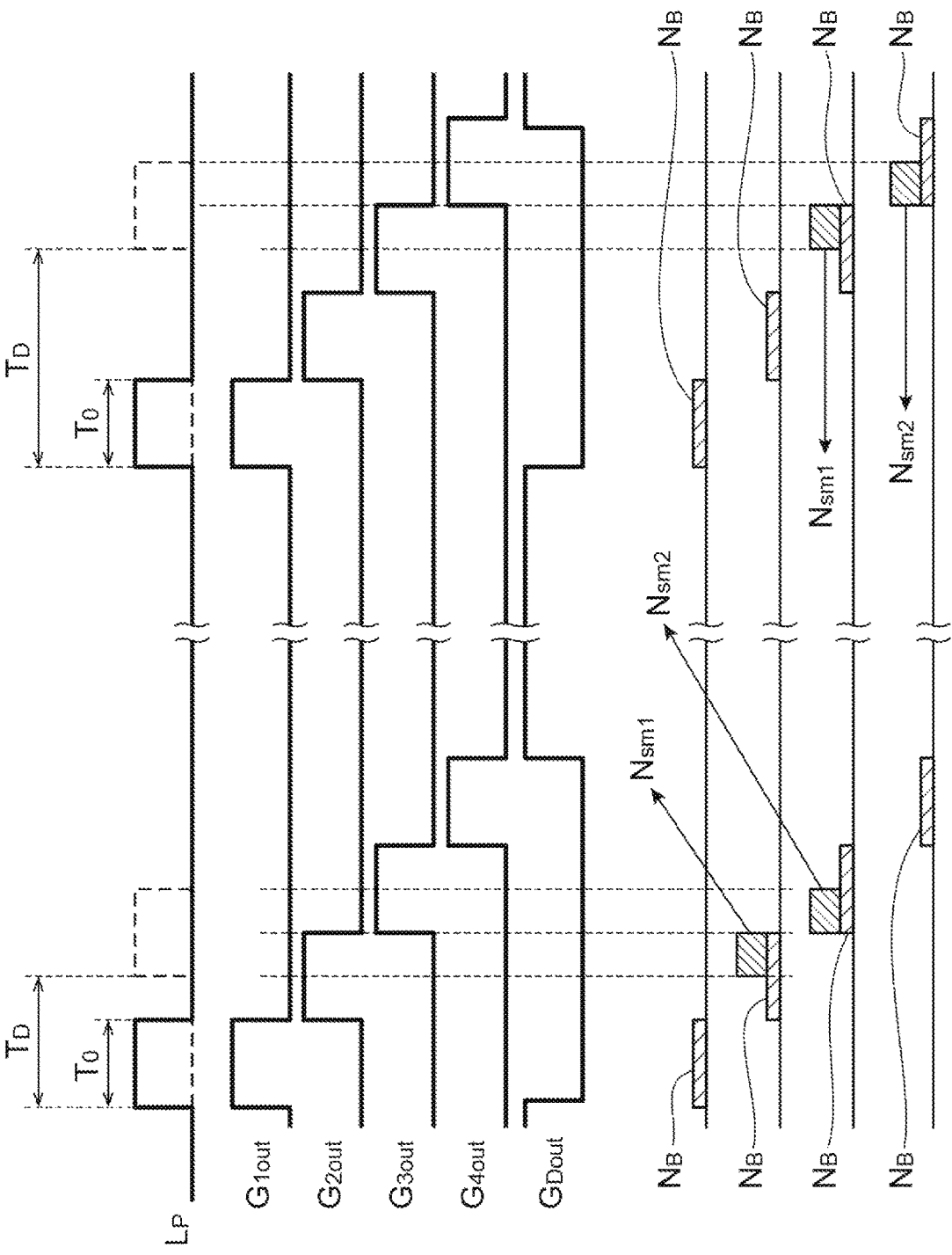
FIG. 4 is a timing chart illustrating a principle of range calculation using a range image sensor 10 of FIG. 1.

FIG. 4 is a timing chart illustrating the principle of the range calculation by the calculation circuit 12. FIG. 4 illustrates the timing of various signals controlled by the calculation circuit 12 and the timing of charge accumulation in each region of the pixel circuit 13. FIG. 4 illustrates, in order from the top, the light emission timing of the pulsed light $L_P$, the application timing of the transfer control pulse applied to the control electrodes $25_1$ to $25_4$ and $25_D$, and the charge accumulation timing in the first to fourth charge reading regions $22_1$ to $22_4$. In this manner, the transfer control pulses of the delay time $T_0$ are continuously applied to the control electrodes $25_1$ to $25_4$ and $25_D$ so as not to overlap each other, corresponding to the light emission timing of the pulsed light $L_P$ of the delay time $T_0$.

With such a function, the electric charges generated in the photoelectric conversion region 21 by photoelectrically converting the incident pulsed light $L_R$ are distributed to the two charge reading regions $22_2$ and $22_3$ or to the two charge reading regions $22_3$ and $22_4$ at a ratio corresponding to a delay time $T_D$ of the incident pulsed light $L_R$ with respect to the pulsed light $L_P$. Herein, a relationship between the light emission timing of the pulsed light $L_P$ of the delay time $T_0$ and the application timing of the transfer control pulse of the control electrode $25_1$ is set. As a result, in the charge reading region $22_1$, only the charge amount $N_B$ caused by noise such as background light and dark current is transported in a time window defined by the transfer control pulse of the control electrode $25_1$. On the other hand, when the arrival timing of the incident pulsed light $L_R$ straddles two time windows defined by two transfer control pulses of control electrodes $25_2$ and $25_3$, electric charges obtained by adding a charge amount $N_{sm1}$ distributed corresponding to the delay time $T_D$ to the charge amount $N_B$ are transported to the charge reading region $22_2$. On the other hand, the electric charges obtained by adding a charge amount $N_{sm2}$ distributed corresponding to the delay time $T_D$ to the charge amount $N_B$ are transported to the charge reading region $22_3$. On the other hand, when the arrival timing of the incident pulsed light $L_R$ straddles two time windows defined by the two transfer control pulses of the control electrodes $25_3$ and $25_4$, the electric charges obtained by adding the charge amount $M_{sm1}$ distributed corresponding to the delay time $T_D$ to the charge amount $N_B$ are transported to the charge reading region $22_3$. On the other hand, the electric charges obtained by adding the charge amount $N_{sm2}$ distributed corresponding to the delay time $T_D$ to the charge amount $N_B$ are transported to the charge reading region $22_4$.

By using the phenomenon described above, the calculation circuit 12 calculates a ratio of an accumulated amount of the charge amount $N_{sm1}$ excluding the charge amount $N_B$ and an accumulated amount of the charge amount $N_{sm2}$ excluding the charge amount $N_B$ corresponding to the plurality of frames. As a result, the range of the target S corresponding to the delay time $T_D$ can be calculated.

The details of the configuration of the range image sensor 10 will be further described below.

Figure 5:
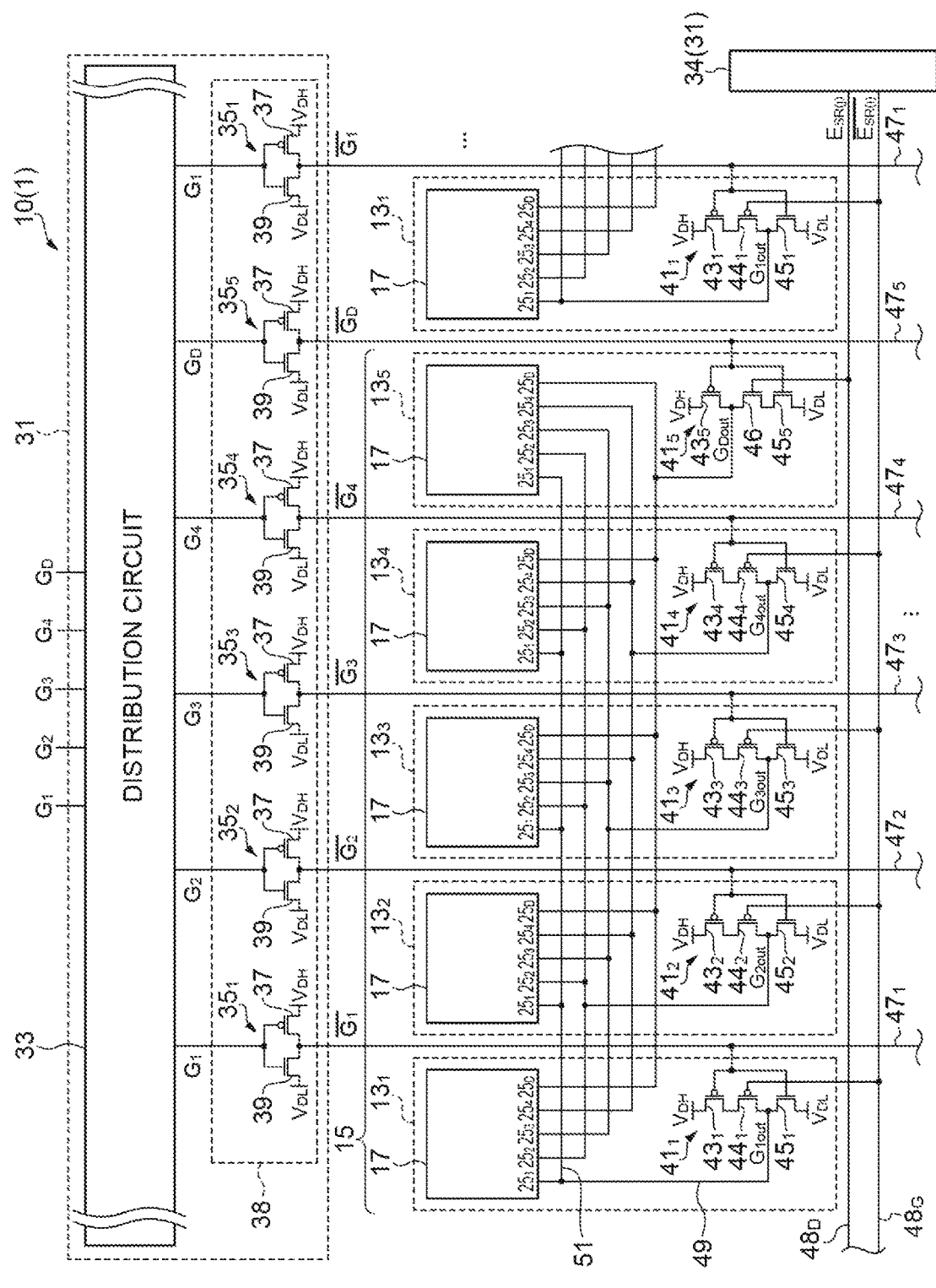
FIG. 5 is a block diagram illustrating a detailed configuration of the range image sensor 10 of FIG. 1.

FIG. 5 is a block diagram illustrating the detailed configuration of the range image sensor 10. It is noted that, FIG. 5 illustrates a portion of the pixel circuit 13 of the range image sensor 10 and illustrates circuit configurations of main portions. The range image sensor 10 includes the peripheral circuits 31 arranged in the peripheral portion of the pixel circuit 13 in addition to a plurality of the pixel circuits 13 arranged in a shape of the two-dimensional array. The peripheral circuit 31 is provided in the peripheral portion of the arrangement region of a plurality of the pixel circuits 13 on the same semiconductor substrate as the pixel circuit 13.

The peripheral circuit 31 includes: a distribution circuit 33 for distributing the control pulses $G_1$, $G_2$, $G_3$, $G_4$, and $G_D$ for the control electrodes $25_1$, $25_2$, $25_3$, $25_4$, and $25_D$ applied from the calculation circuit 12; and inverter circuits $35_1$, $35_2$, $35_3$, $35_4$, and $35_5$ for inverting and shaping the respective control pulses $G_1$, $G_2$, $G_3$, $G_4$, and $G_D$ and outputting the control pulses $G_1$, $G_2$, $G_3$, $G_4$, and $G_D$. The inverter circuits $35_1$, $35_2$, $35_3$, $35_4$, and $35_5$ constitute an inverter circuit unit 38. A set of the inverter circuits $35_1$, $35_2$, $35_3$, $35_4$, and $35_5$ are provided to be repeated in the row direction for each pixel circuit group 15 including the adjacent pixel circuits 13 in the row direction (lateral direction in FIG. 5) with number corresponding to the number of control electrodes $25_1$, $25_2$, $25_3$, $25_4$, and $25_D$ included in each pixel circuit 13. The inverter circuits $35_1$, $35_2$, $35_3$, $35_4$, and $35_5$ with number corresponding in the number of the control electrodes $25_1$, $25_2$, $25_3$, $25_4$, and $25_D$ are arranged side by side in the row direction (X direction) to be located in the peripheral portion between the two adjacent pixel circuits 13 in the pixel circuit group 15, respectively.

These the inverter circuits $35_1$, $35_2$, $35_3$, $35_4$, and $35_5$ are CMOS (Complementary MOS) inverter circuits configured by connecting the p-type MOS (Metal Oxide Semiconductor) transistor (p-type MOS transistor) 37 and the n-type MOS transistor (n-type MOS transistor) 39 which are a pair of complementarily operated transistors in series, respectively. Specifically, the drain of the p-type MOS transistor 37 and the drain of the n-type MOS transistor 39 are connected to each other. The source of the p-type MOS transistor 37 is connected to a high potential line $V_{DH}$. The source of the n-type MOS transistor 39 is connected to a low potential line $V_{DL}$. The gate of the p-type MOS transistor 37 and the gate of the n-type MOS transistor 39 are commonly connected as input terminals to the outputs of the control pulses $G_1$, $G_2$, $G_3$, $G_4$, and $G_D$ of the distribution circuit 33. A connection point between the drain of the p-type MOS transistor 37 and the drain of the n-type MOS transistor 39 is connected as the output terminals of the inverter circuits $35_1$, $35_2$, $35_3$, $35_4$, and $35_5$ to the pixel circuit group 15. Accordingly, the inverted signals of the control pulses $G_1$, $G_2$, $G_3$, $G_4$, and $G_D$ are output from the respective inverter circuits $35_1$, $35_2$, $35_3$, $35_4$ and $35_5$ to the pixel circuit group 15.

It is noted that the peripheral circuit 31 includes the pixel switching circuit 34. The pixel switching circuit 34 switches between the sensitiveness and insensitiveness of the pixel circuit 13. Herein, the fact that the pixel circuit 13 is sensitive denotes a state where electric charges can be accumulated in the charge reading regions $22_1$ to $22_4$. More specifically, the sensitiveness denotes a state where electric charges can be transferred from the photoelectric conversion region 21 to any of the charge reading regions $22_1$ to $22_4$. In other words, the sensitiveness denotes a state where electric charges are not transferred from the photoelectric conversion region 21 to the charge discharging region 23, which is a drain. The fact that the pixel circuit 13 is insensitive denotes that the charge reading regions $22_1$ to $22_4$ do not accumulate electric charges. More specifically, the insensitiveness denotes a state where electric charges are not transferred from the photoelectric conversion region 21 to any of charge reading regions 22. In other words, the insensitiveness is a state where electric charges are transferred from the photoelectric conversion region 21 to the charge discharging region 23, which is a drain.

The pixel switching circuit 34 outputs the logic pulse $E_{SR(j)}$ and the inverted signal of the logic pulse $E_{SR(j)}$. The inverted signal of the logic pulse $E_{SR(j)}$ switches permission or inhibition of the transfer of the electric charges from the photoelectric conversion region 21 to any of the charge reading regions $22_1$ to $22_4$. The logic pulse $E_{SR(j)}$ switches permission or inhibition of the transfer of the electric charges from the photoelectric conversion region 21 to the charge discharging region 23. Hereinafter, the inverted signal of the logic pulse $E_{SR(j)}$ for permitting the transfer of the electric charges from the photoelectric conversion region 21 to any of the charge reading regions $22_1$ to $22_4$ is referred to as an inverted signal <H> of the logic pulse $E_{SR(j)}$. The inverted signal of the logic pulse $E_{SR(j)}$ for inhibiting the transfer of the electric charges from the photoelectric conversion region 21 to the charge reading regions $22_1$ to $22_4$ is referred to as an inverted signal <L> of the logic pulse $E_{SR(j)}$.

Similarly, the logic pulse $E_{SR(j)}$ for permitting the transfer of the electric charges from the photoelectric conversion region 21 to the charge discharging region 23 is denoted as a logic pulse $E_{SR(j)}$<H>. The logic pulse $E_{SR(j)}$ for inhibiting the transfer of the electric charges from the photoelectric conversion region 21 to the charge discharging region 23 is denoted as a logic pulse $E_{SR(j)}$<L>. It is noted that the letters "H" and "L" in parentheses are merely for the convenience of description.

The pixel switching circuit 34 supplies the inverted signal of the logic pulse $E_{SR(j)}$, which are the pixel driving pulses, and the logic pulse $E_{SR(j)}$ from the horizontal direction (X direction) to the pixel circuits 13. That is, the pixel switching circuit 34 supplies the inverted signal of the logic pulse $E_{SR(j)}$ and the logic pulse $E_{SR(j)}$ to the pixel circuits 13 through wirings $48_G$ and $48_D$ extending in the horizontal direction. As a result, the pixel switching circuit 34 collectively sets the pixel circuits 13 to be sensitive for each row. In addition, the pixel switching circuit 34 collectively sets the pixel circuits 13 to be insensitive for each row. More specifically, when the pixel circuits 13 included in a predetermined row are collectively set to be sensitive, the pixel switching circuit 34 outputs the inverted signal <H> of the logic pulse $E_{SR(j)}$ to a wiring $48_G$ and outputs the logic pulse $E_{SR(j)}$<L> to a wiring $48_D$. In addition, when the pixel circuits 13 included in a predetermined row are collectively set to be insensitive, the pixel switching circuit 34 outputs the inverted signal <L> of the logic pulse $E_{SR(j)}$ to the wiring $48_G$ and outputs the logic pulse $E_{SR(j)}$<H> to the wiring $48_D$.

Now, the pixel array 14 have a plurality of the pixel circuits 13 two-dimensionally arranged in N rows and M columns. For example, the pixel switching circuit 34 sets all the pixel circuits 13 included in the j-th row and the (j+1)-th row to be sensitive. The region having the pixel circuits 13 that are set to be sensitive is referred to as a sensitive pixel region AE. That is, the sensitive pixel region AE is a sensitive region that receives the incident pulsed light $L_R$ which is the returned light. In concurrence with above-mentioned control, the pixel switching circuit 34 sets all the pixel circuit 13 included in the first to (j−1)-th rows and the (j+2)-th to N-th rows. The region having the pixel circuits 13 that are set to be insensitive is referred to as an insensitive pixel region AN. That is, the insensitive pixel region AN is an insensitive region where electric charges in accordance with an incident light are accumulated. The pixel switching circuit 34 sets the pixel circuits 13 included in two adjacent rows to be sensitive and sets the pixel circuits 13 included in the other rows to be insensitive. The number of rows constituting the sensitive pixel region AE is not limited to two. The number of rows constituting the sensitive pixel region AE may be one or may be three or more.

The sensitive pixel region AE corresponds to the irradiation region R. When the calculation circuit 12 irradiates the irradiation region R with pulsed light $L_P$, the calculation circuit 12 sets the region in the pixel array 14 associated with irradiation region R in advance as the sensitive pixel region AE.

Each pixel circuit 13 constituting the pixel circuit group 15 includes a signal charge processing region 17 including the photoelectric conversion region 21, the charge reading regions $22_1$ to $22_4$, the charge discharging region 23, the voltage detection units $26_1$ to $26_4$, and the control electrodes $25_1$ to $25_4$ and $25_D$ (FIG. 5) and NOR-type driver circuits $41_1$, $41_2$, $41_3$, and $41_4$ and a NAND-type driver circuit $41_5$ arranged in the vicinity of the signal charge processing region 17. The NOR-type driver circuits $41_1$, $41_2$, $41_3$, and $41_4$ included in other pixel circuits 13 constituting one pixel circuit group 15 are repeatedly provided in the row direction for each pixel circuit group 15 with number corresponding to the number of control electrodes 25₁, 25₂, 25₃, and 25₄ included in each pixel circuit 13. In other words, the NOR-type driver circuits 41₁, 41₂, 41₃, and 41₄ with number corresponding to the number of control electrodes 25₁, 25₂, 25₃, 25₄, and 25_D_ are arranged side by side in the row direction, corresponding to the inverter circuits 35₁, 35₂, 35₃, and 35₄ of the peripheral circuit 31, respectively. Similarly, NAND-type driver circuits 41₅ included in other pixel circuits 13 constituting one pixel circuit group 15 are provided repeatedly in the row direction with number corresponding to the number of control electrodes 25_D_ included in each pixel circuit 13. In other words, the NAND-type driver circuits 41₅ with number corresponding to the number of control electrodes 25_D_ are arranged, corresponding to the inverter circuits 35₅ of the peripheral circuit 31, respectively.

The NOR-type driver circuits 41₁, 41₂, 41₃, and 41₄ and the NAND-type driver circuit 41₅ are CMOS driver circuits. The pixel circuits 13₁ to 13₄ have the NOR-type driver circuits 41₁ to 41₄, respectively. The NOR-type driver circuits 41₁ to 41₄ have p-type MOS transistors 43₁, 43₂, 43₃, and 43₄, p-type MOS transistors 44₂, 44₃, and 44₄, and n-type MOS transistors 45₁, 45₂, 45₃, and 45₄, respectively. The pixel circuit 13₅ has the NAND-type driver circuit 41₅. The NAND-type driver circuit 41₅ has a p-type MOS transistor 43₅, an n-type MOS transistor 46, and an n-type MOS transistor 45₅. That is, the NAND-type driver circuit 41₅ is different from the NOR-type driver circuits 41₁ to 41₄ in that the NAND-type driver circuit 41₅ has the n-type MOS transistor 46 instead of the p-type MOS transistor 44₁ and the like.

Specifically, the NOR-type driver circuits 41₁ to 41₄ have the following configuration.

The sources of the p-type MOS transistors 43₁ to 43₄ are connected to the high potential line V_DH_. The gates of the p-type MOS transistors 43₁ to 43₄ are input terminals. The gates of the p-type MOS transistors 43₁ to 43₄ are connected to the outputs of the inverter circuits 35₁ to 35₄ through wirings 47₁ to 47₄. The drains of the p-type MOS transistors 43₁ to 43₄ are connected to the sources of the p-type MOS transistors 44₁ to 44₄.

The sources of the p-type MOS transistors 44₁ to 44₄ are connected to the drains of the p-type MOS transistors 43₁ to 43₄. The gates of the p-type MOS transistors 44₁ to 44₄ are input terminals. The gates of the p-type MOS transistors 44₁ to 44₄ are connected to the pixel switching circuit 34 through the wiring 48_G_. The drains of the p-type MOS transistors 44₁ to 44₄ and the drains of the n-type MOS transistors 45₁ to 45₄ are connected to each other. Further, the drains of the p-type MOS transistors 44₁ to 44₄ and the drains of the n-type MOS transistors 45₁ to 45₄ are connected to the control electrodes 25₁ to 25₄. The sources of the n-type MOS transistors 45₁ to 45₄ are connected to the drains of the p-type MOS transistors 44₁ to 44₄. The gates of the n-type MOS transistors 45₁ to 45₄ are input terminals. The gates of the n-type MOS transistors 45₁ to 45₄ are connected to the outputs of the inverter circuits 35₁ to 35₅ through the wirings 47₁ to 47₄. That is, the gates of the p-type MOS transistors 43₁ to 43₄ and the gates of the n-type MOS transistors 45₁ to 45₄ are common to each other. The sources of the n-type MOS transistors 45₁ to 45₄ are connected to the low potential line V_DL_.

Furthermore, the NAND-type driver circuit 41₅ has the following configuration.

The source of the p-type MOS transistor 43₅ is connected to the high potential line V_DH_. The gate of the p-type MOS transistor 43₅ is an input terminal. The gate of the p-type MOS transistor 43₅ is connected to the output of the inverter circuit 35₅ through a wiring 47₅. The drain of the p-type MOS transistor 43₅ and the drain of the n-type MOS transistor 46 are connected to each other. The source of the n-type MOS transistor 46 is connected to the drain of the p-type MOS transistor 43₅. The gate of the n-type MOS transistor 46 is an input terminal. The gate of the n-type MOS transistor 46 is connected to the pixel switching circuit 34 through the wiring 48_D_. The source of the n-type MOS transistor 46 is connected to the drain of the n-type MOS transistor 45₅. The source of the n-type MOS transistor 45₅ is connected to the drain of the n-type MOS transistor 46. The gate of the n-type MOS transistor 45₅ is an input terminal. The gate of the n-type MOS transistor 45₅ is connected to the output of the inverter circuit 35₅ through the wiring 47₅. That is, the gate of the p-type MOS transistor 43₅ and the gate of the n-type MOS transistor 45₅ are common to each other. The source of the n-type MOS transistor 45₅ is connected to the low potential line V_DL_.

With above-mentioned connection configuration, the transfer control pulses $G_{1out}$ to $G_{4out}$ and $G_{Dout}$ from the respective NOR-type driver circuits 41₁, 41₂, 41₃, and 41₄ and the NAND-type driver circuit 41₅ to the control electrodes 25₁, 25₂, 25₃, 25₄, and 25_D_ can be output. The transfer control pulses $G_{1out}$, $G_{2out}$, $G_{3out}$, $G_{4out}$, and $G_{Dout}$ are controlled by the inverted signal of the logic pulse $E_{SR(j)}$ and the logic pulse $E_{SR(j)}$ to allow the pixel circuits 13 to be sensitive or insensitive.

A connection configuration between the peripheral circuit 31 and the pixel circuits 13 will be described in detail. The input terminals of the NOR-type driver circuits 41₁, 41₂, 41₃, and 41₄ and the NAND-type driver circuit 41₅ included in the pixel circuit group 15 and the output terminals of the inverter circuits 35₁, 35₂, 35₃, 35₄, and 35₅ are connected between the two adjacent pixel circuits 13 in the pixel circuit group 15 through the wirings 47₁, 47₂, 47₃, 47₄, and 47₅ extending to be close to the pixel circuits 13. That is, the wirings 47₁, 47₂, 47₃, 47₄, and 47₅ connecting the inputs of the NOR-type driver circuits 41₁, 41₂, 41₃, and 41₄ and the NAND-type driver circuit 41₅ to the outputs of the inverter circuits 35₁, 35₂, 35₃, 35₄, and 35₅ are provided one by one in the gap between the two pixel circuits 13 adjacent to each other in the pixel circuit group 15. Further, the output terminal of the NOR-type driver circuit 41₁ provided for each pixel circuit group 15 is connected to the control electrodes 25₁ of all the pixel circuits 13 included in the pixel circuit group 15 through a wiring 49 in the pixel circuits 13 in which the NOR-type driver circuit 41₁ is provided and a wiring 51 extending across all the pixel circuits 13 included in the pixel circuit group 15. Similarly, the output terminals of the NOR-type driver circuits 41₂, 41₃, and 41₄ and the NAND-type driver circuit 41₅ are connected to the control electrodes 25₂, 25₃, 25₄, and 25_D_ of all the pixel circuits 13 included in the pixel circuit group 15, respectively, through two wirings.

The first the control electrode driver circuit for applying the transfer control pulse $G_{1out}$ to the control electrode 25₁ of the pixel circuits 13 constituting the pixel circuit group 15 is configured with inverter circuit 35₁ and the NOR-type driver circuit 41₁ having the above-mentioned configuration. Similarly, the second to fifth control electrode driver circuits for applying the transfer control pulses $G_{2out}$, $G_{3out}$, $G_{4out}$, and $G_{Dout}$ to the control electrodes 25₂, 25₃, 25₄, and 25_D_ of the pixel circuit 13 constituting the pixel circuit group 15 are configured with inverter circuits 35₂, 35₃, 35₄, and 35₅ and each of the NOR-type driver circuits $41_2$, $41_3$, and $41_4$ and the NAND-type driver circuit $41_5$.

Furthermore, the wirings $48_G$ and $48_D$ are connected to the pixel switching circuit 34 of the peripheral circuit 31. The wirings $48_G$ and $48_D$ extend in the row direction. In FIG. 5, the row direction unit denotes the lateral direction with respect to the paper surface. In other words, the wirings $48_G$ and $48_D$ extend along the direction in which the pixel circuits $13_1$ to $13_5$ are aligned. In addition, the wiring $48_G$ is connected to the pixel circuits $13_1$ to $13_4$ arranged in the row direction. In addition, the wiring $48_D$ is connected to the pixel circuit $13_5$.

Figure 6:
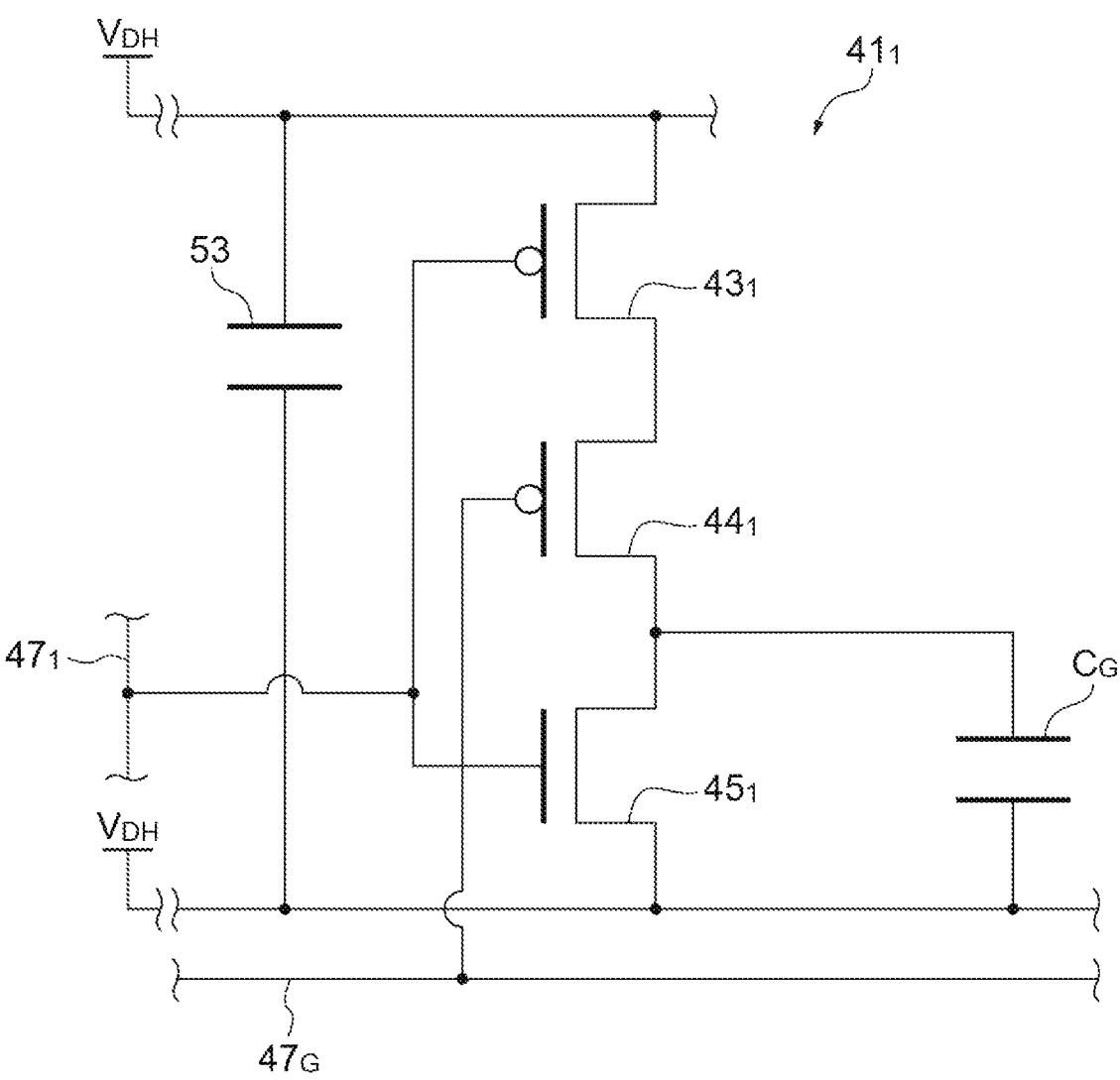
FIG. 6 is a diagram illustrating a detailed circuit configuration of a NOR-type driver circuit $41_1$ of FIG. 5.

FIG. 6 illustrates a detailed circuit configuration of the NOR-type driver circuit $41_1$. The NOR-type driver circuit $41_1$ includes a capacitance component 53 formed between the source of the p-type MOS transistor $43_1$ and the source of the n-type MOS transistor $45_1$. The capacitance component 53 can be realized by, for example, the MOS transistor formed on the same semiconductor substrate as the pixel circuit 13. The capacitance component 53 has one end connected to the substrate potential that is the low potential and the other end connected to the high potential. This the capacitance component 53 has a capacitance equal to or larger than a combined capacitance $C_G$ of the control electrode $25_1$ of the pixel circuit 13 connected to the output of the NOR-type driver circuit $41_1$. The capacitance component 53 preferably has a capacitance of four times or more. Similarly, the NOR-type driver circuits $41_2$, $41_3$, and $41_4$ and the NAND-type driver circuit $41_5$ also include the capacitance component 53. The capacitance components 53 of the NOR-type driver circuits $41_2$, $41_3$, and $41_4$ and the NAND-type driver circuit $41_5$ have a capacitance larger than the combined capacitance $C_G$ of the control electrodes $25_2$, $25_3$, $25_4$, and $25_D$ of the respective pixel circuits 13 connected to the outputs of the NOR-type driver circuits $41_2$, $41_3$, and $41_4$ and the NAND-type driver circuit $41_5$. The capacitance of the capacitance component 53 is preferably at least four times or more the combined capacitance $C_G$.

Figure 7:
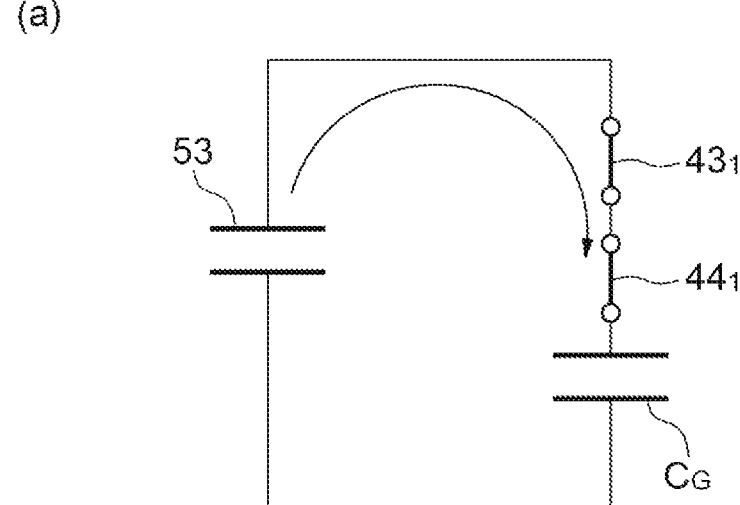
FIG. 7 is a circuit diagram illustrating a connection state between NOR-type driver circuits $41_1$, $41_2$, $41_3$, and, $41_4$ and a NAND-type driver circuit $41_5$ of FIG. 5 and a combined capacitance $C_G$ of pixel circuits 13.
Figure 7:
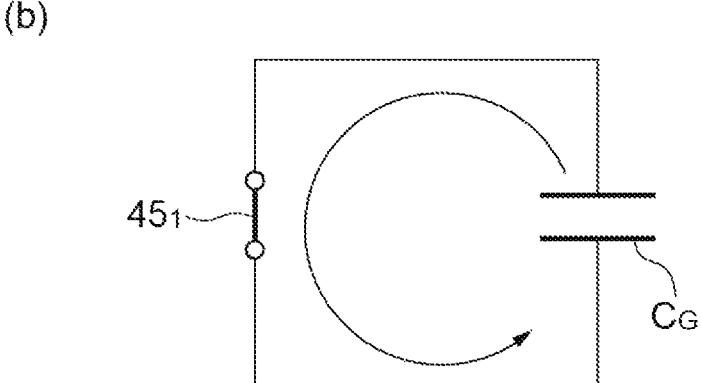

FIG. 7 illustrates a connection state between the NOR-type driver circuits $41_1$, $41_2$, $41_3$, and $41_4$ and the combined capacitance $C_G$ of the pixel circuit 13 when the NOR-type driver circuits $41_1$, $41_2$, $41_3$, and $41_4$ are operated. The portion (a) illustrates the connection state when the transfer control pulses $G_{1out}$, $G_{2out}$, $G_{3out}$, and $G_{4out}$ are in an ON state (high potential). The portion (b) illustrates the connection state when the transfer control pulses $G_{1out}$, $G_{2out}$, $G_{3out}$, and $G_{4out}$ are in an OFF state (low potential). The same applies to the NAND-type driver circuit $41_5$. Thus, when the transfer control pulses $G_{1out}$, $G_{2out}$, $G_{3out}$, $G_{4out}$ and $G_{Dout}$ are in the ON state, the capacitance component 53 is connected to the both ends of the combined capacitance $C_G$. As a result, the electric charges charged in the capacitance component 53 when the transfer control pulses $G_{1out}$, $G_{2out}$, $G_{3out}$, $G_{4out}$ and $G_{Dout}$ are In the OFF state are supplied to the control electrodes $25_1$, $25_2$, $25_3$, $25_4$, and $25_D$. Therefore, the potentials of the control electrodes $25_1$, $25_2$, $25_3$, $25_4$, and $25_D$ can be raised quickly. In particular, by setting the capacitance of the capacitance component 53 to be the combined capacitance $C_G$ or more, 50% of the electric charges required to raise the transfer control pulses $G_{1out}$, $G_{2out}$, $G_{3out}$, $G_{4out}$ and $G_{Dout}$ to the high potential can be supplied from the capacitance component 53. As a result, high-speed driving can be realized without exerting the burden on the power supply. Furthermore, when the capacitance of the capacitance component 53 is four times or more than the combined capacitance $C_G$, 80% of the electric charges required to raise the transfer control pulses $G_{1out}$, $G_{2out}$, $G_{3out}$, $G_{4out}$, and $G_{Dout}$ to the high potential can be supplied from the capacitance component 53. As a result, even higher speed driving can be realized without exerting the burden on the power supply. On the other hand, when the transfer control pulses $G_{1out}$, $G_{2out}$, $G_{3out}$, $G_{4out}$ and $G_{Dout}$ are in the OFF state, both ends of the combined capacitance $C_G$ are short-circuited. As a result, the potentials of the control electrodes $25_1$, $25_2$, $25_3$, $25_4$, and $25_D$ can be fallen quickly.

Figure 8:
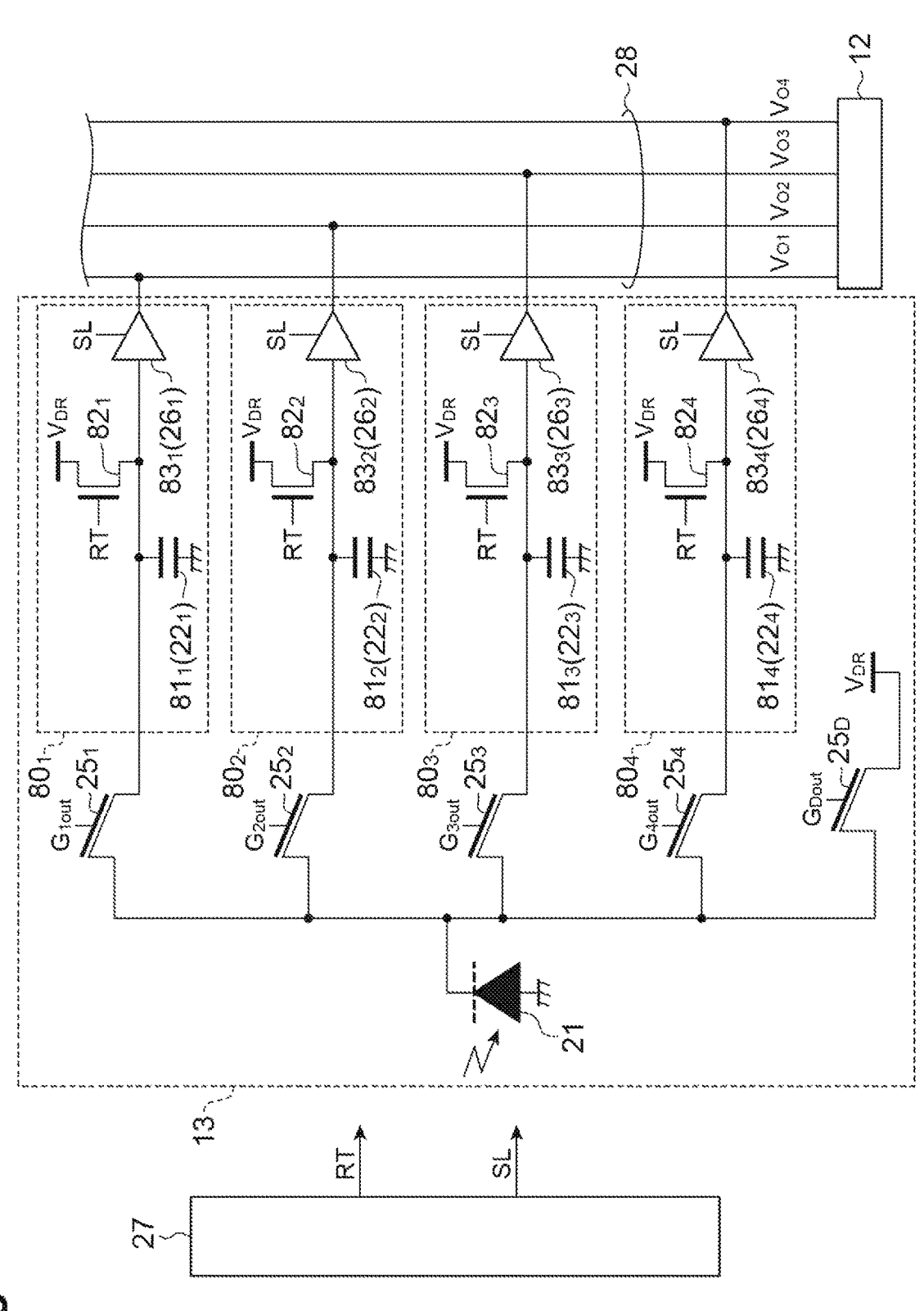
FIG. 8 is a circuit diagram illustrating A read circuit.

FIG. 8 illustrates a configuration of read circuits $80_1$, $80_2$, $80_3$, and $80_4$ included in the pixel circuits 13.

The read circuits $80_1$ to $80_4$ have capacitance components $81_1$ to $81_4$, MOS transistors $82_1$ to $82_4$, and amplifier circuits $83_1$ to $83_4$. The inputs of the read circuits $80_1$ to $80_4$ are connected to the photoelectric conversion regions 21, respectively. The outputs of the read circuits $80_1$ to $80_4$ are connected to the calculation circuit 12 through a wiring 28.

The capacitance components $81_1$ to $81_4$ accumulate the electric charges generated by photoelectric conversion region 21. The capacitance components $81_1$ to $81_4$ correspond to the charge reading regions $22_1$ to $22_4$ illustrated in FIG. 3. One ends of the capacitance components $81_1$ to $81_4$ are connected to the control electrodes $25_1$ to $25_4$, the MOS transistors $82_1$ to $82_4$, and the amplifier circuits $83_1$ to $83_4$. The other ends of the capacitance components $81_1$ to $81_4$ are connected to the reference potential.

The MOS transistors $82_1$ to $82_4$ discharge the electric charges remaining in the capacitance components $81_1$ to $81_4$. The sources of the MOS transistors $82_1$ to $82_4$ are connected to the one ends of the capacitance components $81_1$ to $81_4$. The gates of the MOS transistors $82_1$ to $82_4$ are connected to the read control circuit 27 and receive a reset pulse RT from the read control circuit 27. The drains of the MOS transistors $82_1$ to $82_4$ are connected to a reset potential line $V_{AR}$.

The amplifier circuits $83_1$ to $83_4$ generate voltages $V_{O1}$ to $V_{O4}$ in accordance with electric charges accumulated in the capacitance components $81_1$ to $81_4$ and output the voltages $V_{O1}$ to $V_{O4}$ to the wiring 28. The amplifier circuits $83_1$ to $83_4$ correspond to the voltage detection units $26_1$ to $26_4$ illustrated in FIG. 3. The inputs of the amplifier circuits $83_1$ to $83_4$ are connected to the one ends of the capacitance components $81_1$ to $81_4$. The outputs of the amplifier circuits $83_1$ to $83_4$ are connected to the wiring 28. Further, the amplifier circuits $83_1$ to $83_4$ are connected to the read control circuit 27 and receive a read control pulse SL from the read control circuit 27. The voltages $V_{O1}$ to $V_{O4}$ output by the amplifier circuits $83_1$ to $83_4$ are supplied to the calculation circuit 12 through the wiring 28.

First Embodiment/Operation

Next, operations of the range image sensor 10 will be described. The range image sensor 10 has driver circuits (NOR-type driver circuits $41_1$ to $41_4$ and NAND-type driver circuit $41_5$) inside the pixel circuit 13. The range image sensor 10 supplies the control pulses $G_1$ to $G_4$ and $G_D$ from the vertical direction. The range image sensor 10 supplies, in horizontal direction, the inverted signal of the logic pulse $E_{SR(j)}$ and the logic pulse $E_{SR(j)}$ for switching between sensitiveness and insensitiveness. The range image sensor 10 performs the logic operation on the control pulse $G_D$ and the logic pulse $E_{SR(j)}$ inside the pixel circuit 13 to generate the transfer control pulse $G_{Dout}$. Then, the range image sensor 10 performs gating of the control electrode $25_D$, which is a drain gate, by using the transfer control pulse $G_{Dout}$.

The relationship between the operation of the light source 11 and the sensitive operation/insensitive operation of the pixel circuit 13 will be described in detail below.

Figure 9:
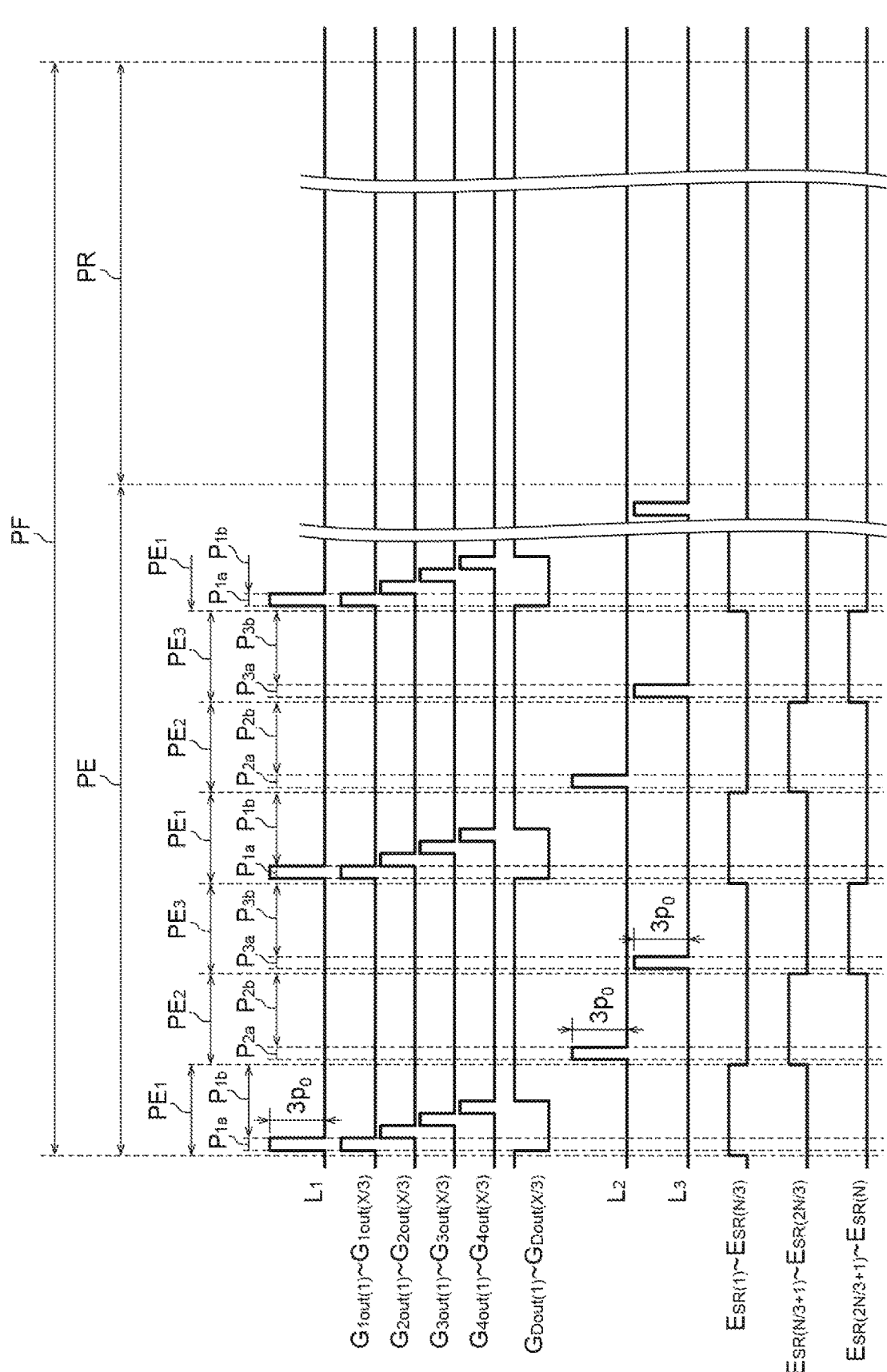
FIG. 9 is a timing chart illustrating operations of the light source and operations of the pixel array.
Figure 10:
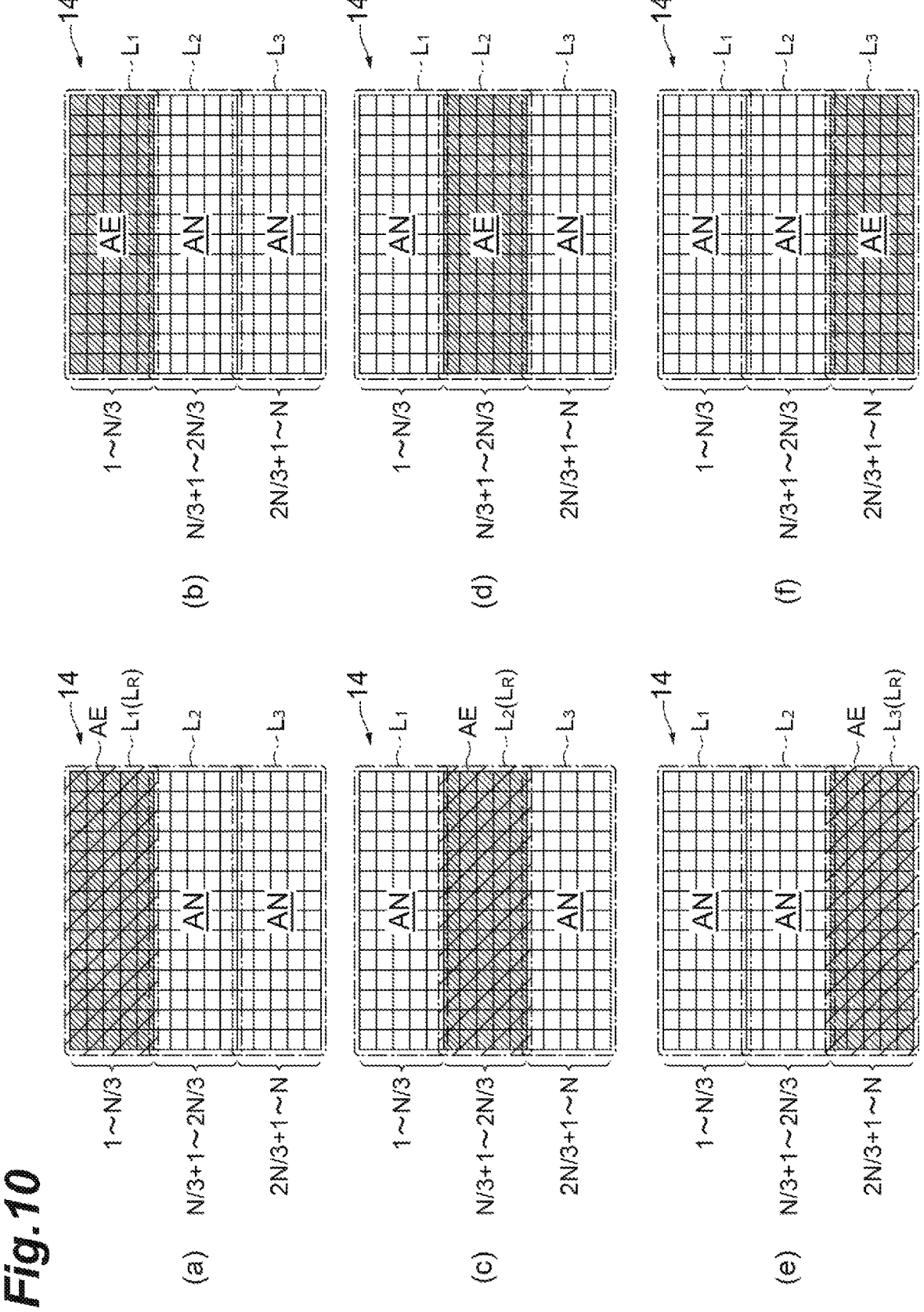
FIG. 10 is a diagram illustrating the operation of the light source and the operations of the pixel array.

FIG. 9 illustrates a timing chart illustrating the operation of the light source 11 and the timing chart of the logic pulse $E_{SR(j)}$. In addition, FIG. 10 schematically illustrates array division regions $L_1$, $L_2$, and $L_3$, the sensitive pixel region AE, and the insensitive pixel region AN. The array division regions $L_1$ to $L_3$ are regions which the incident pulsed light $L_R$ is expected to be incident on. The sensitive pixel region AE is a region in which the electric charges generated in accordance with the incident pulsed light $L_R$ can be accumulated in any of the charge reading regions $22_1$ to $22_4$. The insensitive pixel region AN is a region in which the electric charges generated in accordance with the incident pulsed light $L_R$ are discharged to the charge discharging region 23. That is, the light incident on the insensitive pixel region AN cannot be obtained as an output.

As illustrated in FIG. 10, in the first embodiment, the pixel array 14 is vertically divided into three regions. Now, it is assumed that the pixel array 14 has N rows. Then, the first array division region $L_1$ is a region in the first to (N/3)-th rows. The second array division region $L_2$ is a region in the (N/3+1)-th to (2N/3)-th rows. The third array division region $L_3$ is a region in the (2N/3+1)-th to N-th rows.

For example, in the portion (a) of FIG. 10, a plurality of squares indicate one pixel circuit 13. A thinly hatched region indicates the sensitive pixel region AE. A blank region indicates the insensitive pixel region AN. Three regions surrounded by dashed lines indicate the array division regions $L_1$ to $L_3$, respectively. A roughly hatched region in the region surrounded by the dashed line indicates that the incident pulsed light $L_R$ from the measurement target region A is incident on the region.

By using the irradiation region R as a portion of the measurement target region A in this manner, the range image sensor 10 can enhance noise resistance against the background light. Now, it is assumed that a light amount ($p_0$) of the pulsed light $L_P$ emitted by the light source 11 is constant. Then, when the limited irradiation region R, which is a portion of the measurement target region A, is irradiated with pulsed light $L_P$, the light amount per unit area appears to be increased. For example, when the measurement target region A is divided into three portions as illustrated in FIG. 10, the light amount in the irradiation region R becomes three times the light amount when the entire measurement target region A is irradiated (reference numeral $3p_0$ in FIG. 9). As a result, the light amount of the pulsed light $L_P$ can be increased in comparison with light amount of the background light. Therefore, the range image sensor 10 can enhance noise resistance against the background light.

It is noted that the relationship between the emission direction of the pulsed light $L_P$ directed from the light source 11 toward the measurement target region A and the region on which the incident pulsed light $L_R$ returning from the measurement target region A is incident may be associated by any method. For example, when the measurement target region A is vertically divided into three and the light source 11 irradiates the uppermost region with pulsed light $L_P$, the incident pulsed light $L_R$ may be incident on the array division region $L_1$ of the pixel array 14.

The range image sensor 10 has a period PE, which is one exposure period and a period PR, which is one read period for the period PF of one frame. In addition, the range image sensor 10 performs a plurality of exposure operations for the period PF of one frame. Furthermore, the range image sensor 10 performs one exposure operation during one sensitive period. The operations of the range image sensor 10 are not limited to the above-described operations. Other operation examples will be described later as Modified Examples 1 to 5.

During the exposure period (period PE), the exposure operation is repeated several times.

First, in a period $PE_1$, the pixel switching circuit 34 outputs the following the logic pulse $E_{SR(j)}$.

Logic pulses $E_{SR(1)}$ to $E_{SR(N/3)}$: HIGH.

Logic pulses $E_{SR(N/3+1)}$ to $E_{SR(2N/3)}$: LOW.

Logic pulses $E_{SR(2N/3+1)}$ to $E_{SR(N)}$: LOW.

The period $PE_1$ has a period $P_{1a}$ and a period $P_{1b}$ after the period $P_{1a}$. In the period $P_{1a}$ (refer to a portion (a) of FIG. 10), the light source 11 irradiates with pulsed light $L_P$ so that the incident pulsed light $L_R$ is incident on the array division region $L_1$. For example, a duty ratio of the pulsed light $L_P$ may be 50% or less. After that, in the period $P_{1b}$ (refer to a portion (b) of FIG. 10), the light source 11 stops irradiating with the pulsed light $L_P$.

Next, in a period $PE_2$, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: HIGH.

Logic pulses $E_{SR(2N/3+1)}$ to $E_{SR(N)}$: LOW.

The period $PE_2$ has a $P_{2a}$ and a period $P_{2b}$ after the period $P_{2a}$. In the period $P_{2a}$ (refer to a portion (c) of FIG. 10), the light source 11 irradiates with the pulsed light $L_P$ so that the incident pulsed light $L_R$ is incident on the array division region $L_2$. After that, in the period $P_{2b}$ (refer to a portion (d) of FIG. 10), the light source 11 stops irradiating with pulsed light $L_P$.

Next, in a period $PE_3$, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: LOW.

Logic pulses $E_{SR(2N/3+1)}$ to $E_{SR(N)}$: HIGH.

The period $PE_3$ has a period $P_{3a}$ and a period $P_{3b}$ after the period $P_{3a}$. In a period $PE_{3a}$ (refer to a portion (e) of FIG. 10), the light source 11 irradiates with pulsed light $L_P$ so that the incident pulsed light $L_R$ is incident on the array division region $L_3$. After that, in the period $P_{3b}$ (refer to a portion (f) of FIG. 10), the light source 11 stops irradiating with the pulsed light $L_P$.

Thereafter, the operations of periods $PE_1$ to $PE_3$ are repeated a predetermined number of times. The period when the operations of the periods $PE_1$ to $PE_3$ are repeated is a period PE as an exposure period. The period PR as a read period is set after the period PE. The periods PE and PR constitute one frame (or subframe). During the period PR, signals are read from all the rows. During the period PR, the light source 11 does not irradiate with the pulsed light $L_P$. In addition, during the period PR, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: LOW.

Logic pulses $E_{SR(2N/3+1)}$ to $E_{SR(N)}$: LOW.

First Embodiment/Functions and Effects

The range image sensor 10 has strong resistance to the background light and strong resistance to artifacts caused by the motion of the imaging target due to several effects described below.

When the light source control unit 12a generates the pulsed light $L_P$ so that the incident pulsed light $L_R$ is incident on the sensitive pixel region AE, the range image sensor 10 supplies the logic pulse $E_{SR(j)}$ for transferring the electric charges generated in the photoelectric conversion region 21 to the insensitive pixel region AN to the charge discharging region 23. According to this operation, in the insensitive pixel region AN on which the incident pulsed light $L_R$ is not incident, the accumulation of the electric charges that may become noise in the photoelectric conversion region 21 is suppressed. As a result, when the insensitive pixel region AN is switched to the sensitive pixel region AE, the state where the generation of the electric charges based on the incident pulsed light $L_R$ is prepared is formed. That is, it is possible to quickly switch from the insensitive pixel region AN to the sensitive pixel region AE. Therefore, the operations of irradiating with the pulsed light $L_P$ and receiving the incident pulsed light $L_R$ caused by the pulsed light $L_P$ can be repeated at a high speed while moving in the sensitive pixel region AE. In other words, speeding up and repetition of the irradiation operation and the light reception operation is temporally synonymous with oversampling and integrating of photoelectric charges within the frame period in so-called range measurement. Therefore, due to the low-pass filter effect by oversampling and integrating, good measurement results can be obtained even when the measurement target moves at a high speed.

That is, the range image sensor 10 performs scanning of the linear pulsed light $L_P$ emitted from the light source 11 and the exposure operation and the read operation synchronized in position and time to correspond to the scanning.

In the range image sensor 10 according to the first embodiment, the light source control unit 12a performs an operation of allowing the light source 11 to emit the pulsed light $L_P$ so that all the pixel circuits 13 included in the j-th row are included in the sensitive pixel region AE. The peripheral circuit 31 performs the operation of supplying the control pulses $G_1$ to $G_4$ and $G_D$, the inverted signal of the logic pulse $E_{SR(j)}$, and the logic pulse $E_{SR(j)}$ allowing the pixel circuits 13 to permit the transfer of the electric charges from the photoelectric conversion region 21 to the charge reading regions $22_1$ to $22_4$ to the pixel array 14, for all the pixel circuits 13 included in the j-th row and the operation of supplying the control pulses $G_1$ to $G_4$ and $G_D$, the inverted signal of the logic pulse $E_{SR(j)}$, and the logic pulse $E_{SR(j)}$ allowing the pixel circuits 13 to permit the movement of the electric charges from the photoelectric conversion region 21 to the charge discharging region 23 to the pixel array 14 for all the pixel circuits 13 not included in the sensitive pixel region AE. According to this operation, all the pixel circuits 13 included in the j-th row are collectively set to the state (sensitive state) in which the movement of the electric charges from the photoelectric conversion region 21 to the charge reading regions $22_1$ to $22_4$ can be permitted. Furthermore, the pixel circuits 13 not included in the j-th row can be collectively set to the state (insensitive state) in which the movement of the electric charges from the photoelectric conversion region 21 to the charge discharging region 23 is permitted. Therefore, the oversampling and integrating operations can be performed.

In the range image sensor 10 according to the first embodiment, the peripheral circuit 31 performs the exposure operation in which the light source control unit 12a generates the pulsed light $L_P$ and the read operation in which the peripheral circuit 31 outputs the voltage based on the electric charges generated in the photoelectric conversion region 21, in a state where the control pulses $G_1$ to $G_4$ and $G_D$, the inverted signal of the logic pulse $E_{SR(j)}$, and the logic pulse $E_{SR(j)}$ are output to the pixel array 14. The control pulses $G_1$ to $G_4$ and $G_D$, the inverted signal of the logic pulse $E_{SR(j)}$, and the logic pulse $E_{SR(j)}$ allow the electric charges generated in the photoelectric conversion regions 21 in the pixel circuits 13 constituting the sensitive pixel region AE to be transferred to the charge reading regions $22_1$ to $22_4$ and allows the electric charges generated in the photoelectric conversion region 21 in the pixel circuits 13 constituting the insensitive pixel region AN to be transferred to the charge discharging region 23. The peripheral circuit 31 and the light source control unit 12a perform the read operation after performing the exposure operation on the plurality of sensitive pixel region AE several times. That is, signals are collectively read from all the pixel circuits 13 after the exposure operations have been performed on all the pixel circuits 13. According to this operation, signals can be read from the entire pixel array 14 after the exposure operations have been performed on the entire pixel array 14 several times.

In the exposure operations of the range image sensor 10 according to the first embodiment, the light source control unit 12a generates the pulsed light $L_P$ only once in a state where the peripheral circuit 31 supplies the control pulses $G_1$ to $G_4$ and $G_D$ and the logic pulse $E_{SR(j)}$. By this operation, the speed of the operations of the range image sensor 10 can be further increased.

Furthermore, according to the range image sensor 10, the control pulses $G_1$, $G_2$, $G_3$, $G_4$, and $G_D$ are distributed by the distribution circuit 33 provided in the peripheral circuit 31. The transfer control pulses based on the control pulses $G_1$, $G_2$, $G_3$, $G_4$, and $G_D$ are applied to the control electrodes $25_1$, $25_2$, $25_3$, $25_4$, and $25_D$ of all the pixel circuits 13 constituting the pixel circuit group 15 by the first to fifth control electrode driver circuits configured with NOR-type driver circuits $41_1$, $41_2$, $41_3$, and $41_4$ provided in one pixel circuit 13 of the pixel circuit group 15 and the NAND-type driver circuits $41_5$. Accordingly, in each pixel circuit 13, the timing of the transfer of the electric charges between the photoelectric conversion region 21 and the charge reading regions $22_1$, $22_2$, $22_3$, and $22_4$ and the charge discharging region 23 is controlled. By such a configuration in which the control pulses $G_1$, $G_2$, $G_3$, $G_4$, and $G_D$ are relayed by the first to fifth control electrode driver circuits, the rounding of the waveform of the transfer control pulse even when the number of pixels increases can be reduced, and the range image with high range resolution can be generated by driving pixels at a high speed. In addition, by the configuration in which each of the first to fifth control electrode driver circuits is shared by the pixel circuit group 15 having the same number of pixel circuits 13 as the number of control electrodes, the rounding of the waveform of the transfer control pulse can be reduced while maintaining a small pixel size.

In particular, in this embodiment, the NOR-type driver circuits $41_1$, $41_2$, $41_3$, and $41_4$ and the NAND-type driver circuit $41_5$ are provided in the separate pixel circuits 13 of the pixel circuit group 15. The distribution circuit 33, the NOR-type driver circuits $41_1$, $41_2$, $41_3$, and $41_4$, and the NAND-type driver circuit $41_5$ are connected through the wirings $47_1$ to $47_5$ extending in the gap between the two separate pixel circuits 13, respectively. By such a configuration, it is possible to separate a plurality of the wirings $47_1$ to $47_5$ electrically connecting the distribution circuit 33 and the first to fifth control electrode driver circuits, respectively. As a result, crosstalk between the different the control pulses $G_1$, $G_2$, $G_3$, $G_4$, and $G_D$ can be prevented to achieve stable pixel driving. As a result, the range image with a high range resolution can be generated.

That is, the pixel circuit 13 has a driver circuit inside thereof. Therefore, gating for sensitiveness and insensitiveness is performed by logic operations within the pixel circuits 13.

In addition, in this embodiment, each of the NOR-type driver circuits $41_1$, $41_2$, $41_3$, and $41_4$ and the NAND-type driver circuit $41_5$ includes the capacitance component 53. By such a configuration, high-speed driving of pixels is realized. Due to the existence of the capacitance component 53, the current generated in the power supply due to charging and discharging of the capacitance components of the control electrodes $25_1$, $25_2$, $25_3$, $25_4$, and $25_D$ when driving the pixel circuits 13 can be reduced. As a result, the power supply voltage can be prevented from instantaneously dropping, and high-speed driving of the pixels (pixel circuits 13) can be performed.

Second Embodiment

Next, a configuration of a range image sensor 10A that constitutes a range image acquisition device 1A according to a second embodiment will be described, focusing on differences from the first embodiment.

Figure 11:
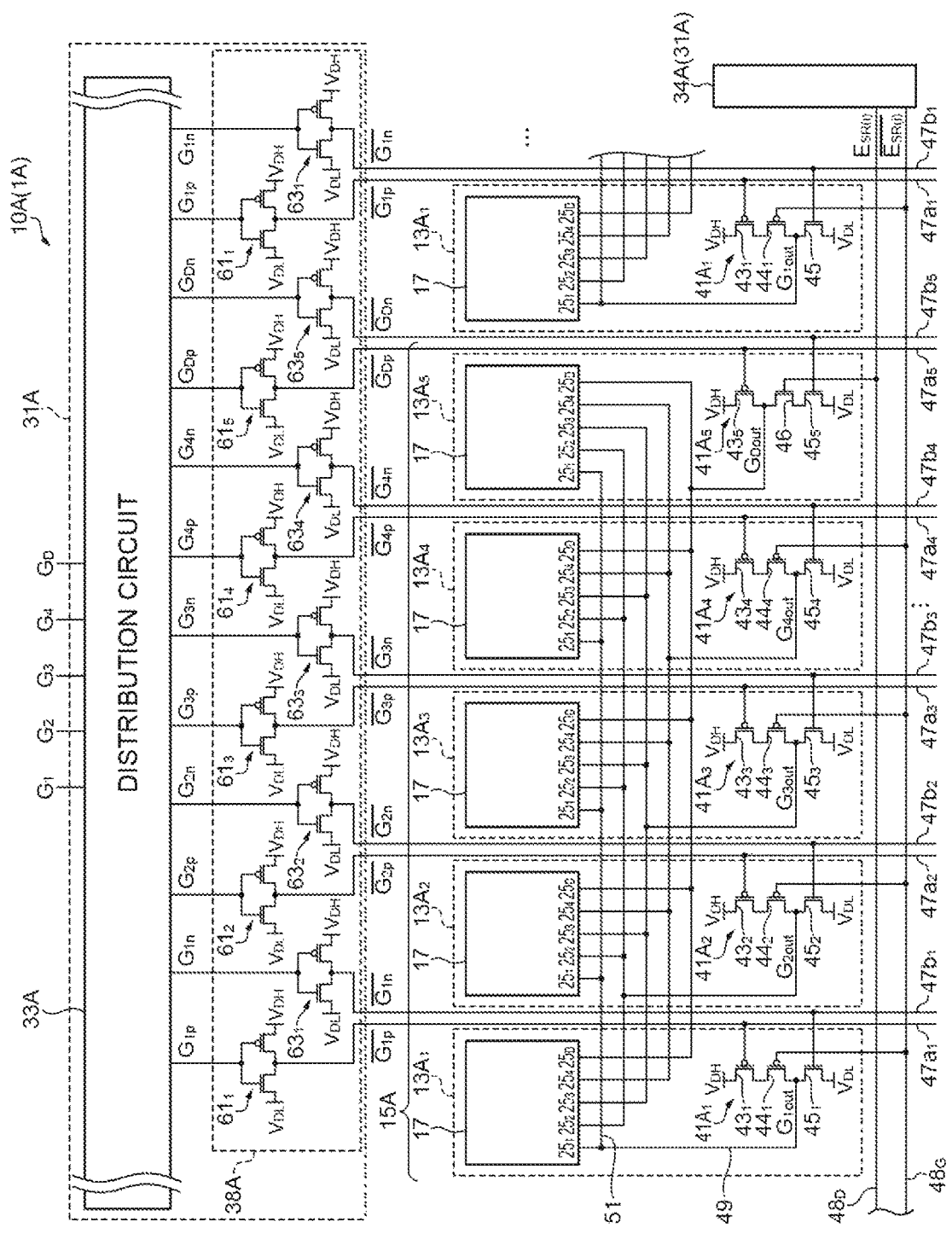
FIG. 11 is a block diagram of a detailed configuration of a range image sensor according to a second embodiment.

FIG. 11 is a block diagram illustrating a schematic configuration of the range image sensor 10A. The range image sensor 10A illustrated in FIG. 11 is different from the range image sensor 10 according to the first embodiment in terms of a function of a distribution circuit 33A, a configuration of an inverter circuit in a peripheral circuit 31A, and a connection configuration between the peripheral circuit 31A and pixel circuits 13A.

The peripheral circuit 31A has a distribution circuit 33A, an inverter circuit unit 38A, and a pixel switching circuit 34A. The pixel switching circuit 34A has the same configurations and functions as those of the pixel switching circuit 34 according to the first embodiment, so that the description thereof will be omitted.

That is, the distribution circuit 33A repeatedly generates the control pulse $G_1$ in the row direction by distributing the control pulse $G_1$ into two control pulses $G_{1p}$ and $G_{1n}$. Similarly, the distribution circuit 33A repeatedly generates two control pulses $G_{2p}$ and $G_{2n}$, two control pulses $G_{3p}$ and $G_{3n}$, two control pulses $G_{4p}$ and $G_{4n}$, and two control pulses $G_{Dp}$ and $G_{Dn}$ by distributing the control pulses $G_2$, $G_3$, $G_4$, and $G_D$. The two control pulses $G_{1p}$ and $G_{1n}$ are generated in synchronization with ON and OFF of the control pulse $G_1$ so that ON periods thereof do not coincide with each other. Specifically, the two control pulses $G_{1p}$ and $G_{1n}$ are generated so that the ON period of the control pulse $G_{1p}$ falls within the ON period of the control pulse $G_{1n}$. Similarly, the two control pulses $G_{2p}$ and $G_{2n}$, the two control pulses $G_{3p}$ and $G_{3n}$, the two control pulses $G_{4p}$ and $G_{4n}$, and the two control pulses $G_{Dp}$ and $G_{Dn}$ are generated in synchronization with ON and OFF of the control pulses $G_2$, $G_3$, $G_4$, and $G_D$ so that the ON periods thereof do not coincide with each other.

The peripheral circuit 31A includes inverter circuits $61_1$, $61_2$, $61_3$, $61_4$, and $61_5$ and inverter circuits $63_1$, $63_2$, $63_3$, $63_4$, and $63_5$ having the same configurations as the inverter circuits $35_1$, $35_2$, $35_3$, $35_4$, and $35_5$ in the first embodiment. The inverter circuits $61_1$, $61_2$, $61_3$, $61_4$, and $61_5$ and the inverter circuits $63_1$, $63_2$, $63_3$, $63_4$, and $63_5$ constitute the inverter circuit unit 38A. One set of the inverter circuits $61_1$, $61_2$, $61_3$, $61_4$, and $61_5$ and one set of the inverter circuits $63_1$, $63_2$, $63_3$, $63_4$, and $63_5$ are repeatedly provided for each pixel circuit group 15A with number thereof corresponding to the number of control electrodes $25_1$, $25_2$, $25_3$, $25_4$, and $25_D$, respectively. Then, the two inverter circuits $61_1$ and $63_1$ are arranged in a peripheral portion between the two adjacent pixel circuits 13A in the pixel circuit group 15A, corresponding to a NOR-type driver circuit $41A_1$ in a pixel circuit $13A_1$. Similarly, the two inverter circuits $61_2$ and $63_2$, the two inverter circuits $61_3$ and $63_3$, the two inverter circuits $61_4$ and $63_4$, and the two inverter circuits $61_5$ and $63_5$ are arranged in a peripheral portion between the two adjacent pixel circuits 13A, corresponding to NOR-type driver circuits $41A_2$, $41A_3$, and $41A_4$ and a NAND-type driver circuit $41A_5$ in pixel circuits $13A_2$, $13A_3$, $13A_4$, and $13A_5$, respectively. The control pulses $G_{1p}$, $G_{2p}$, $G_{3p}$, $G_{4p}$, and $G_{Dp}$ are input from the distribution circuit 33A to the input terminals of the inverter circuits $61_1$, $61_2$, $61_3$, $61_4$, and $61_5$, respectively. The control pulses $G_{1n}$, $G_{2n}$, $G_{3n}$, $G_{4n}$, and $G_{Dn}$ are input from the distribution circuit 33A to the input terminals of the inverter circuits $63_1$, $63_2$, $63_3$, $63_4$, and $63_5$.

A connection configuration between the peripheral circuit 31A and the pixel circuits 13A will be described in detail, in which the gates (control terminals) of the p-type MOS transistors $43_1$ to $43_5$ of the NOR-type driver circuits $41A_1$, $41A_2$, $41A_3$, and $41A_4$ and the NAND-type driver circuit $41A_5$ and the output terminals of the inverter circuits $61_1$, $61_2$, $61_3$, $61_4$, and $61_5$ are connected through wirings $47a_1$ to $47a_5$ extending between the two adjacent pixel circuits 13A. In addition, the gates (control terminals) of the n-type MOS transistors $45_1$ to $45_5$ of the NOR-type driver circuits $41A_1$, $41A_2$, $41A_3$, and $41A_4$ and the NAND-type driver circuit $41A_5$ and the output terminals of the inverter circuits $63_1$, $63_2$, $63_3$, $63_4$, and $63_5$ are, are connected through wirings $47b_1$ to $47b_5$ extending between the two adjacent pixel circuits 13A. That is, the two wirings connecting the peripheral circuit 31A and the pixel circuits 13A are provided in the gap between the two pixel circuits 13A included in the pixel circuit group 15A. By such a connection configuration, the inverted signals of the control pulses $G_{1p}$, $G_{2p}$, $G_{3p}$, $G_{4p}$, and $G_{Dp}$ or the inverted signals of the control pulses $G_{1n}$, $G_{2n}$, $G_{3n}$, $G_{4n}$, and $G_{Dn}$ are supplied to the two gates of the NOR-type driver circuits $41A_1$, $41A_2$, $41A_3$, and $41A_4$ and the NAND-type driver circuit $41A_5$ through different the wirings $47a_1$ to $47a_5$ and $47b_1$ to $47b_5$.

The first the control electrode driver circuit applying the transfer control pulse $G_{1out}$ to the control electrode $25_1$ of the pixel circuits 13A constituting the pixel circuit group 15A is configured with inverter circuits $61_1$ and $63_1$ and the NOR-type driver circuit $41A_1$ having the above-described configuration. Similarly, the second to fifth control electrode driver circuits applying the transfer control pulses $G_{2out}$ to $G_{4out}$ and $G_{Dout}$ to the control electrodes $25_2$ to $25_4$ and $25_D$ of the pixel circuit 13A are configured with inverter circuits $61_2$ to $61_5$ and $63_2$ to $63_5$, the NOR-type driver circuits $41A_2$ to $41A_4$, and the NAND-type driver circuit $41A_5$.

Figure 12:
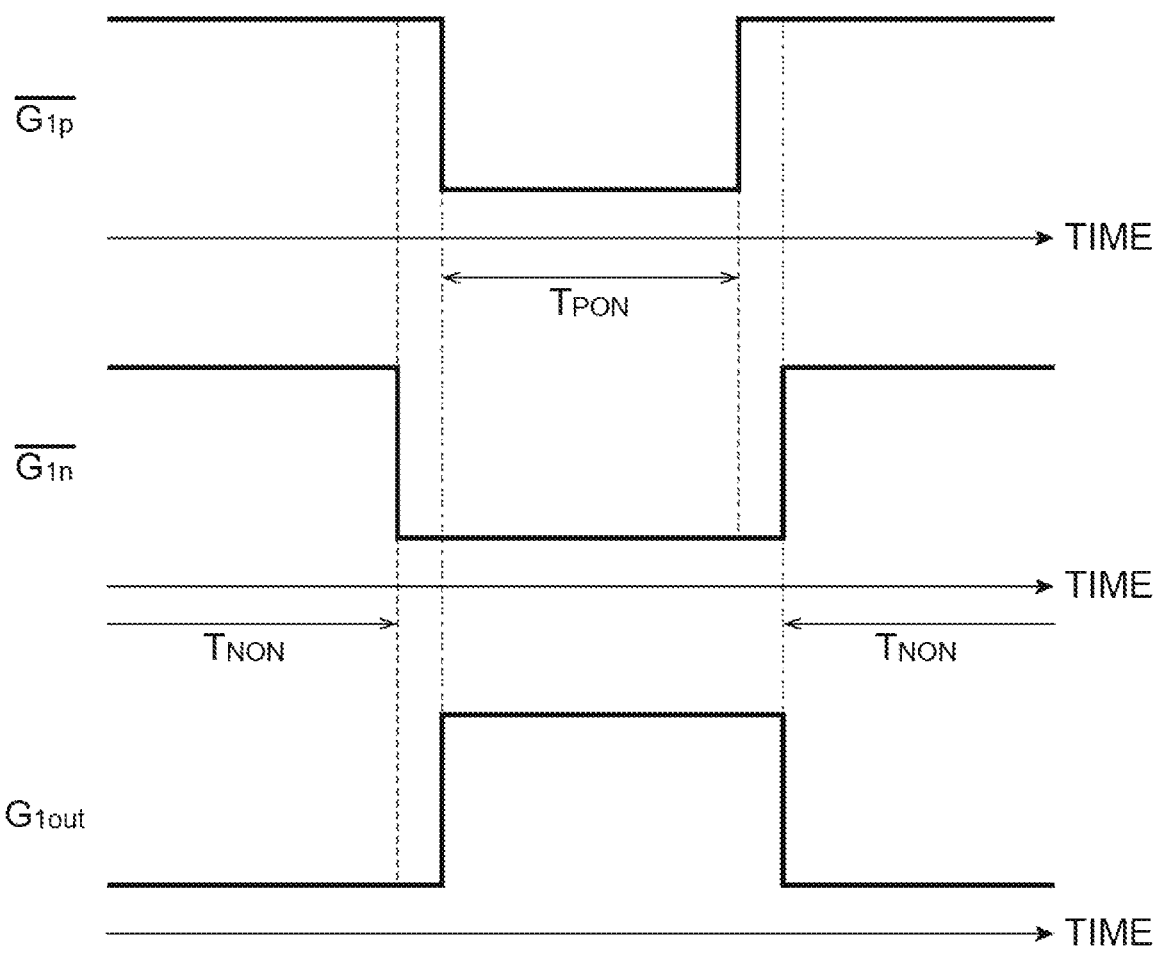
FIG. 12 is a diagram illustrating waveforms of inverted signals of control pulses $G_{1p}$ and $G_{1n}$ generated in a range image sensor 10A and a waveform of an output signal $G_{1out}$ from the NOR-type driver circuit $41_1$.

FIG. 12 illustrates an example of the waveforms of the inverted signals of the control pulses $G_{1p}$ and $G_{1n}$ generated in the range image sensor 10A of this embodiment and the waveform of the transfer control pulse $G_{1out}$ of the NOR-type driver circuit $41A_1$. In this manner, due to the function of the distribution circuit 33A, the control pulse $G_{1p}$ and the control pulse $G_{1n}$ are generated so that the low potential period of the inverted signal of the control pulse $G_{1p}$ output from the inverter circuit $61_1$, that is, the ON period $T_{PON}$ of the p-type MOS transistor $43_1$ does not overlap the high potential period of the inverted signal of the control pulse $G_{1n}$ output from the inverter circuit $63_1$, that is, the ON period $T_{NON}$ of the n-type MOS transistor $45_1$. Then, the NOR-type driver circuit $41A_1$ generates the transfer control pulse $G_{1out}$ transitioning to the high potential at the timing when the inverted signal of the control pulse $G_{1p}$ is turned off and transitioning to the low potential at the timing when the inverted signal of the control pulse $G_{1n}$ is turned on. Similarly, in the NOR-type driver circuits $41A_2$ to $41A_4$ and the NAND-type driver circuit $41A_5$ provided in each pixel circuit $13A$, the control pulses $G_{2p}$ to $G_{4p}$ and the control pulses $G_{2n}$ to $G_{4n}$ are generated so that an ON period of a p-type MOS transistor 43 does not overlap an ON period of an n-type MOS transistor 45.

Second Embodiment/Functions and Effects

A range image acquisition device 1A according to a second embodiment can achieve the same effects as the range image acquisition device 1 according to the first embodiment. That is, the range image acquisition device 1A can obtain good measurement results by oversampling and integrating even when the measurement target moves at a high speed.

Similarly to the range image acquisition device 1 according to the first embodiment, in the range image acquisition device 1A according to the second embodiment, the pixel circuits $13A_1$ to $13A_5$ included in a predetermined row can be collectively set as the sensitive pixel region AE. Furthermore, in the range image acquisition device 1A, the pixel circuits $13A_1$ to $13A_5$ that are not included in a predetermined row can be collectively set as the insensitive pixel region AN. Therefore, the range image acquisition device 1A according to the second embodiment can perform the oversampling and integrating operations.

Similarly to the range image acquisition device 1 according to the first embodiment, in the range image acquisition device 1A according to the second embodiment, with such a configuration in which the control pulses $G_{1p}$ to $G_{4p}$, $G_{1n}$ to $G_{4n}$, $G_{Dp}$, and $G_{Dn}$ are relayed by the first to fifth control electrode driver circuits and a configuration in which each of the first to fifth control electrode driver circuits is shared by the pixel circuit group 15A having the same number of pixel circuits $13A_1$ to $13A_5$ as the number of control electrodes $25_1$ to $25_4$ and $25_D$, the rounding of the waveforms of the transfer control pulses $G_{1out}$ to $G_{4out}$ and $G_{Dout}$ can be reduced while maintaining a small pixel size.

Similarly to the range image acquisition device 1 according to the first embodiment, in the range image acquisition device 1A according to the second embodiment, the distribution circuit 33A and a plurality of the wirings $47a_1$ to $47a_5$ and $47b_1$ to $47b_5$ electrically connecting each of the first to fifth control electrode driver circuits are arranged to be separated. As a result, crosstalk between the different the control pulses $G_{1p}$ to $G_{4p}$, $G_{1n}$ to $G_{4n}$, $G_{Dp}$, and $G_{Dn}$ can be prevented, and thus, stable pixel driving can be achieved. As a result, the range image with a high range resolution can be generated.

Furthermore, the range image sensor 10A according to the second embodiment can achieve the following effects, which are different from those of the range image sensor 10 according to the first embodiment.

In the range image sensor 10A according to this embodiment, the inverted signals of the control pulses $G_{1p}$ to $G_{4p}$, $G_{1n}$ to $G_{4n}$, $G_{Dp}$, and $G_{Dn}$ are supplied to the gates of the two transistors $43_1$ to $43_5$ and $45_1$ to $45_5$ in the NOR-type driver circuits $41A_1$ to $41A_4$ and the NAND-type driver circuit $41A_5$ through different the wirings $47a_1$ to $47a_5$ and $47b_1$ to $47b_5$. By such a configuration, even when the rounding occurs in the inverted signals of the control pulses $G_{1p}$ to $G_{4p}$, $G_{1n}$ to $G_{4n}$, $G_{Dp}$, and $G_{Dn}$ supplied to the pixel circuits $13A_1$ to $13A_5$, the generation of the pass-through current flowing through the NOR-type driver circuits $41A_1$ to $41A_4$ and the NAND-type driver circuit $41A_5$ can be prevented. The generation of the pass-through current in the NOR-type driver circuits $41A_1$ to $41A_4$ and the NAND-type driver circuit $41A_5$ causes an increase in current flowing through the power supply connected to the range image sensor 10A when the number of pixels increases. Therefore, in some cases, instantaneous drop in the power supply voltage may occur. As a result, the control electrode driver circuits in the pixel circuits $13A_1$ to $13A_5$ do not operate normally, and the response speed of the control electrode driver circuits becomes low, so that it is difficult to realize high-speed pixel driving.

Figure 13:
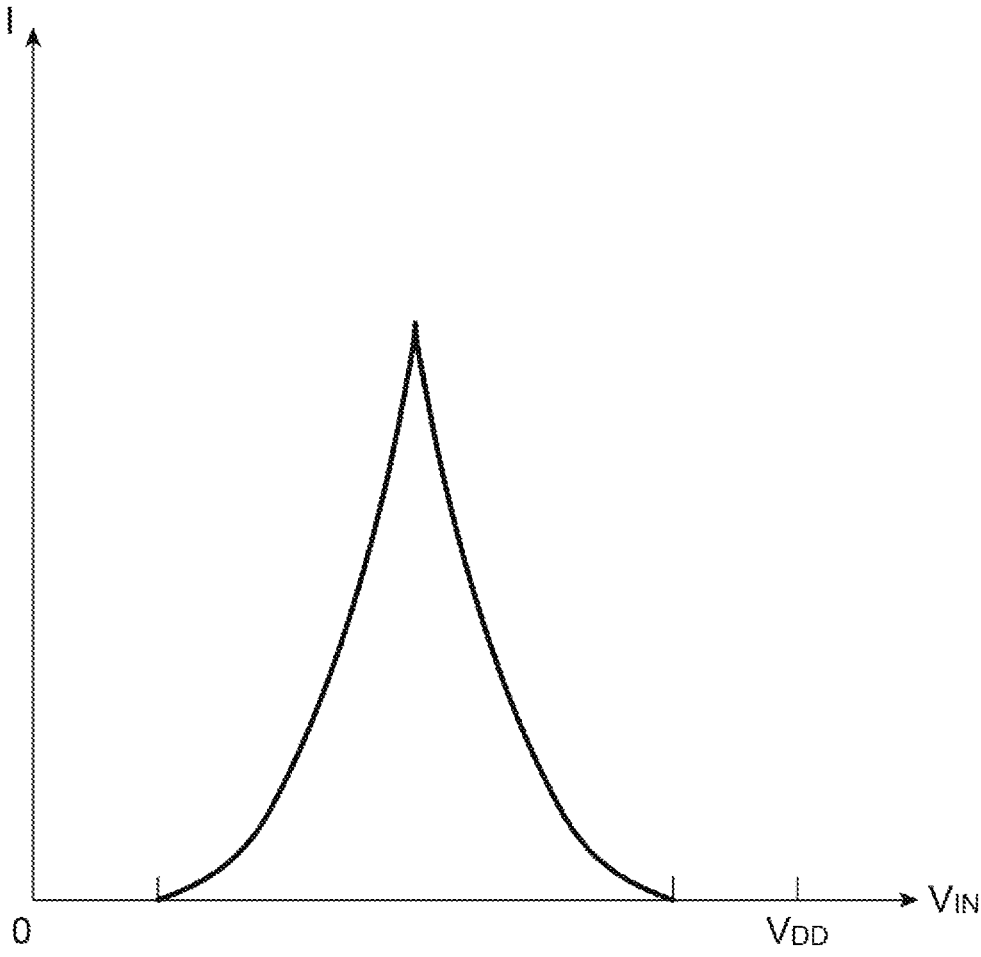
FIG. 13 is a diagram illustrating a time waveform of a pass-through current I with respect to an input control pulse $V_{IN}$ when a general CMOS inverter circuit is used.
Figure 14:
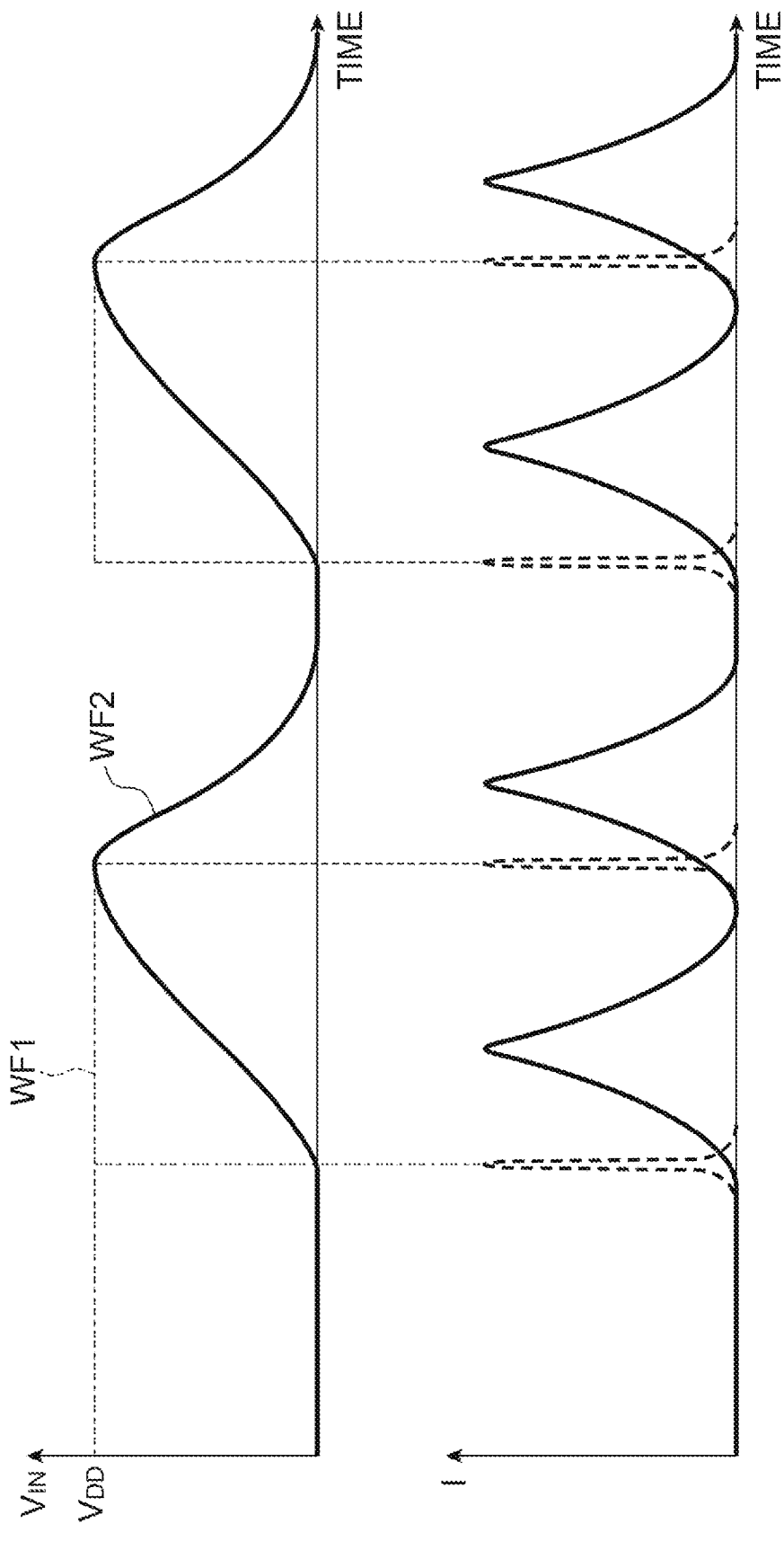
FIG. 14 is a graph illustrating a relationship between the input control pulse $V_{IN}$ and the pass-through current I in the general CMOS inverter circuit.

FIG. 13 is a graph illustrating a relationship between an input control pulse $V_{IN}$ and a pass-through current I in a general CMOS inverter circuit. FIG. 14 is a diagram illustrating a time waveform of the pass-through current I with respect to the input control pulse $V_{IN}$ when the general CMOS inverter circuit is used. Thus, in the general CMOS inverter, the pass-through current I greatly increases when the input control pulse $V_{IN}$ is at an intermediate potential between a high potential ($V_{DD}$) and a low potential (0 V). Therefore, when an ideal rectangular wave waveform WF1 is input as an input control pulse, the pass-through current I is generated only instantaneously at a transition timing of the level of the input control pulse. On the other hand, when a waveform WF2, which is of a dull rectangular wave, is input as an input control pulse, the period of time of the intermediate potential becomes longer, so that the pass-through current I continuously occurs for the longer period of time. For this reason, when the general CMOS inverter circuit is used as the control electrode driver circuit, an integration value of the pass-through current flowing through the control electrode driver circuit gradually increases as the rounding of the input control pulse becomes larger. On the other hand, according to the range image sensor 10A, the pass-through current in the control electrode driver circuit can be sufficiently reduced, and thus, high-speed pixel driving can be realized. As a result, the range image with a high range resolution can be generated.

In particular, in the present embodiment, the distribution circuit 33A has a function of supplying the inverted signals of the control pulses $G_{1p}$ to $G_{4p}$, $G_{1n}$ to $G_{4n}$, $G_{Dp}$, and $G_{Dn}$ to the gates of the two transistors $43_1$ to $43_5$ and $45_1$ to $45_5$ constituting each of the NOR-type driver circuits $41A_1$ to $41A_4$ and the NAND-type driver circuit $41A_5$ so that the ON periods do not overlap each other. Accordingly, the pass-through currents in the first to fifth control electrode driver circuits including the NOR-type driver circuits $41A_1$ to $41A_4$ and the NAND-type driver circuit $41A_5$ can be reliably prevented, and thus, high-speed pixel driving can be realized.

Third Embodiment

Next, a configuration of a range image sensor 10B included in a range image acquisition device 1B according to a third embodiment will be described, focusing on differences from the range image sensor 10A according to the second embodiment.

Figure 15:
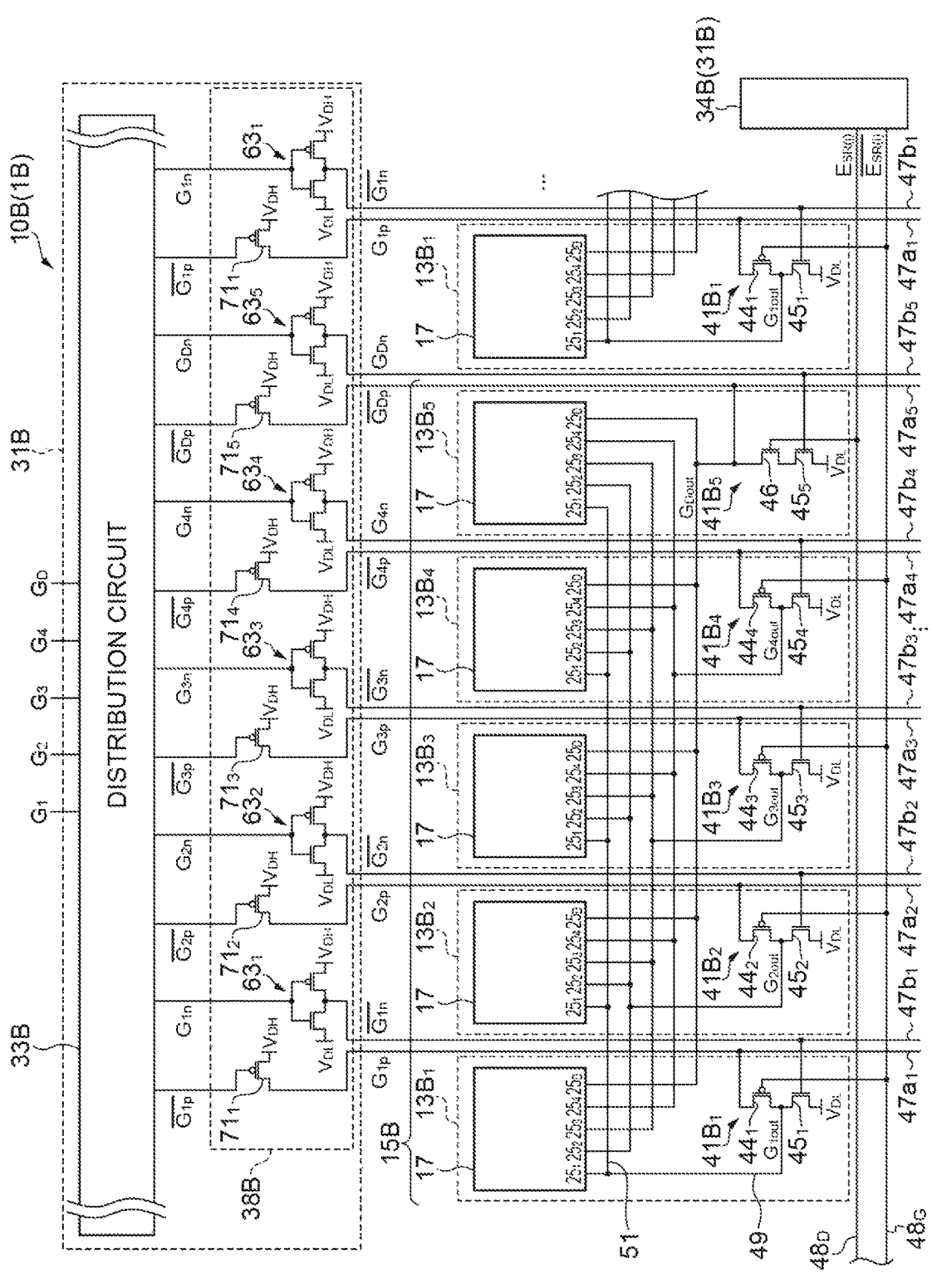
FIG. 15 is a block diagram of a detailed configuration of a range image sensor according to a third embodiment.

FIG. 15 is a block diagram illustrating a schematic configuration of the range image sensor 10B. The range image sensor 10B illustrated in FIG. 15 is different from the range image sensor 10A according to the second embodiment in terms of the functions of a distribution circuit 33B and the configurations of the inverter circuits and the driver circuits in a peripheral circuit 31B and pixel circuits 13B.

The peripheral circuit 31B has a distribution circuit 33B, an inverter circuit unit 38B, and a pixel switching circuit 34B. The pixel switching circuit 34B has the same configurations and functions as those of the pixel switching circuit 34 according to the first embodiment, so that the description thereof will be omitted.

The distribution circuit 33B repeatedly generates the inverted signals of the control pulses $G_{1p}$ to $G_{4p}$ and $G_{Dp}$ and the control pulses $G_{1n}$ to $G_{4n}$ and $G_{Dn}$ along the row direction by distributing the control pulses $G_1$, $G_2$, $G_3$, $G_4$, and $G_D$.

In addition, the inverter circuit unit 38B of the peripheral circuit 31B has the inverter circuits $63_1$, $63_2$, $63_3$, $63_4$, and $63_5$ and p-type MOS transistors $71_1$ to $71_5$. That is, the inverter circuit unit 38B has the p-type MOS transistors $71_1$ to $71_5$ instead of the inverter circuits $61_1$ to $61_5$. The inverted signals of the control pulses $G_{1p}$ to $G_{4p}$ and $G_{Dp}$ are input from the distribution circuit 33B to the gates of the p-type MOS transistors $71_1$ to $71_5$, respectively. The sources of the p-type MOS transistors $71_1$ to $71_5$ are connected to the high potential line $V_{DH}$.

Instead of the NOR-type driver circuits $41_1$ to $41_4$ and the NAND-type driver circuit $41_5$, NOR-type driver circuits $41B_1$ to $41B_4$ and a NAND-type driver circuit $41B_5$ are provided in each pixel circuit 13B constituting a pixel circuit group 15B. The NOR-type driver circuits $41B_1$ to $41B_4$ and the NAND-type driver circuit $41B_5$ are CMOS driver circuits. Specifically, the NOR-type driver circuits $41B_1$ to $41B_4$ have the p-type MOS transistors $44_1$ to $44_4$ and the n-type MOS transistors $45_1$ to $45_4$. On the other hand, the NAND-type driver circuit $41B_5$ has the n-type MOS transistor 46 and the n-type MOS transistor $45_5$. That is, the NAND-type driver circuit $41B_5$ is different from the NOR-type driver circuit $41B_1$ in that the NAND-type driver circuit $41B_5$ has the n-type MOS transistor 46 instead of the p-type MOS transistor $44_1$.

Specifically, the NOR-type driver circuits $41B_1$ to $41B_4$ have the following configuration.

The sources of the p-type MOS transistors $44_1$ to $44_4$ are connected to the drains of the p-type MOS transistors $71_1$ to $71_4$ through the wirings $47a_1$ to $47a_4$. The inverted signals of the control pulses $G_{1p}$ to $G_{4p}$ are input to the sources of the p-type MOS transistors $44_1$ to $44_4$. The gates of the p-type MOS transistors $44_1$ to $44_4$ are connected to the pixel switching circuit 34B through the wiring $48_G$. The gates of the p-type MOS transistors $44_1$ to $44_4$ receive the inverted signal of the logic pulse $E_{SR(j)}$. The drains of the p-type MOS transistors $44_1$ to $44_4$ and the drains of the n-type MOS transistors $45_1$ to $45_4$ are connected to each other. The gates of the n-type MOS transistors $45_1$ to $45_4$ are connected to the output ends of the inverter circuits $63_1$ to $63_4$ through the wirings $47b_1$ to $47b_4$. The inverted signals of the control pulses $G_{1n}$ to $G_{4n}$ are input to the gates of the n-type MOS transistors $45_1$ to $45_4$, respectively. The sources of the n-type MOS transistors $45_1$ to $45_4$ are connected to the low potential line $V_{DL}$.

Specifically, the NAND-type driver circuit $41B_5$ has the following configuration. The drain of the n-type MOS transistor 46 is connected to the drain of the p-type MOS transistor $71_5$ through the wiring $47a_5$. The inverted signal of the control pulse $G_{Dp}$ is input to the drain of the n-type MOS transistor 46. The gate of the n-type MOS transistor 46 is connected to the pixel switching circuit 34B through the wiring $48_D$. The logic pulse $E_{SR(j)}$ is input to the gate of the n-type MOS transistor 46. The source of the n-type MOS transistor 46 is connected to the drain of the n-type MOS transistor $45_5$. The gate of the n-type MOS transistor $45_5$ is connected to the output of the inverter circuit $63_5$ through the wiring $47b_5$. The inverted signal of the control pulse $G_{Dn}$ is input to the gate of the n-type MOS transistor $45_5$. The source of the n-type MOS transistor $45_5$ is connected to the low potential line $V_{DL}$.

As described above, the NOR-type driver circuit (control electrode driver circuit) that generates the transfer control pulse to be applied to the control electrodes $25_1$ to $25_4$ of pixel circuits $13B_1$ to $13B_5$ included in the pixel circuit group 15B is configured by the configuration in which the p-type MOS transistors $71_1$ to $71_4$ and the p-type MOS transistors $44_1$ to $44_4$ are connected in series. In addition, the NAND-type driver circuit (control electrode driver circuit) generating the transfer control pulse to be applied to the control electrode $25_D$ in the pixel circuit group 15B is configured by the configuration in which the p-type MOS transistor $71_5$ and the n-type MOS transistor 46 are connected in series.

Third Embodiment/Functions and Effects

The range image acquisition device 1B according to the third embodiment can achieve the same effects as the range image acquisition device 1A according to the second embodiment. That is, the range image acquisition device 1B can obtain good measurement results by oversampling and integrating even when the measurement target moves at a high speed.

Similarly to the range image acquisition device 1A according to the second embodiment, in the range image acquisition device 1B according to the third embodiment, the pixel circuits $13B_1$ to $13B_5$ included in a predetermined row can be collectively set as the sensitive pixel region AE. Furthermore, the pixel circuits $13B_1$ to $13B_5$ not included in a predetermined row can be collectively set as the insensitive pixel region AN. Therefore, the range image acquisition device 1B according to the third embodiment can perform the oversampling and integrating operations.

Similarly to the range image acquisition device 1A according to the second embodiment, in the range image acquisition device 1B according to the third embodiment, with such a configuration in which the control pulses $G_{1p}$ to $G_{4p}$, $G_{1n}$ to $G_{4n}$, $G_{Dp}$, and $S_{Dn}$ are relayed by the first to fifth control electrode driver circuits and a configuration in which each of the first to fifth control electrode driver circuits is shared by the pixel circuit group 15B having the same number of pixel circuits $13B_1$ to $13B_5$ as the number of control electrodes $25_1$ to $25_4$ and $25_D$, the rounding of the waveforms of the transfer control pulses $G_{1out}$ to $G_{4out}$ and $G_{Dout}$ can be reduced while maintaining a small pixel size.

Similarly to the range image acquisition device 1A according to the second embodiment, in the range image acquisition device 1B according to the third embodiment, by the configuration in which a plurality of the wirings $47a_1$ to $47a_5$ and $47b_1$ to $47b_5$ electrically connecting each of the distribution circuit 33B and the first to fifth control electrode driver circuits are arranged to be separated, crosstalk between the different the control pulses $G_{1p}$ to $G_{4p}$, $G_{1n}$ to $G_{4n}$, $G_{Dp}$, and $G_{Dn}$ can be prevented, and thus, stable pixel driving can be realized. As a result, the range image with a high range resolution can be generated.

Similarly to the range image acquisition device 1A according to the second embodiment, the range image acquisition device 1B according to the third embodiment has circuit configurations in which the control pulses are supplied to each of the NOR-type driver circuits $41B_1$ to $41B_4$ and the NAND-type driver circuit $41B_5$ so that the ON periods do not overlap each other. That is, the range image acquisition device 1B has the wirings $47a_1$ to $47a_5$ and $47b_1$ to $47b_5$. With this configuration, the pass-through currents in the first to fifth control electrode driver circuits having the NOR-type driver circuits $41B_1$ to $41B_4$ and the NAND-type driver circuit $41B_5$ can be reliably prevented, thus, high-speed pixel driving can be realized.

Furthermore, the range image sensor 10B according to the third embodiment can achieve the following effects, which are different from those of the range image sensor 10A according to the second embodiment.

By the configuration of the control electrode driver circuit of this embodiment, the drains of the p-type MOS transistors $71_1$ to $71_4$, which are one of the transistors constituting the NOR-type driver circuit, are connected to the sources of the p-type MOS transistors $44_1$ to $44_4$ through the wirings $47a_1$ to $47a_4$, and the drains of the p-type MOS transistors $44_1$ to $44_4$ are connected to the control electrodes $25_1$ to $25_4$ through p-channels between the sources and drains of the p-type MOS transistors $44_1$ to $44_4$. On the other hand, the drains of the n-type MOS transistors $45_1$ to $45_4$ are the other transistors constituting the NOR-type driver circuit are connected to the control electrodes $25_1$ to $25_4$ in each pixel circuit 13B. For this reason, in the transfer control pulses $G_{1out}$ to $G_{2out}$ applied to the control electrodes $25_1$ to $25_4$, the state where the rising is gentle but the falling is sharp can occur.

Figure 16:
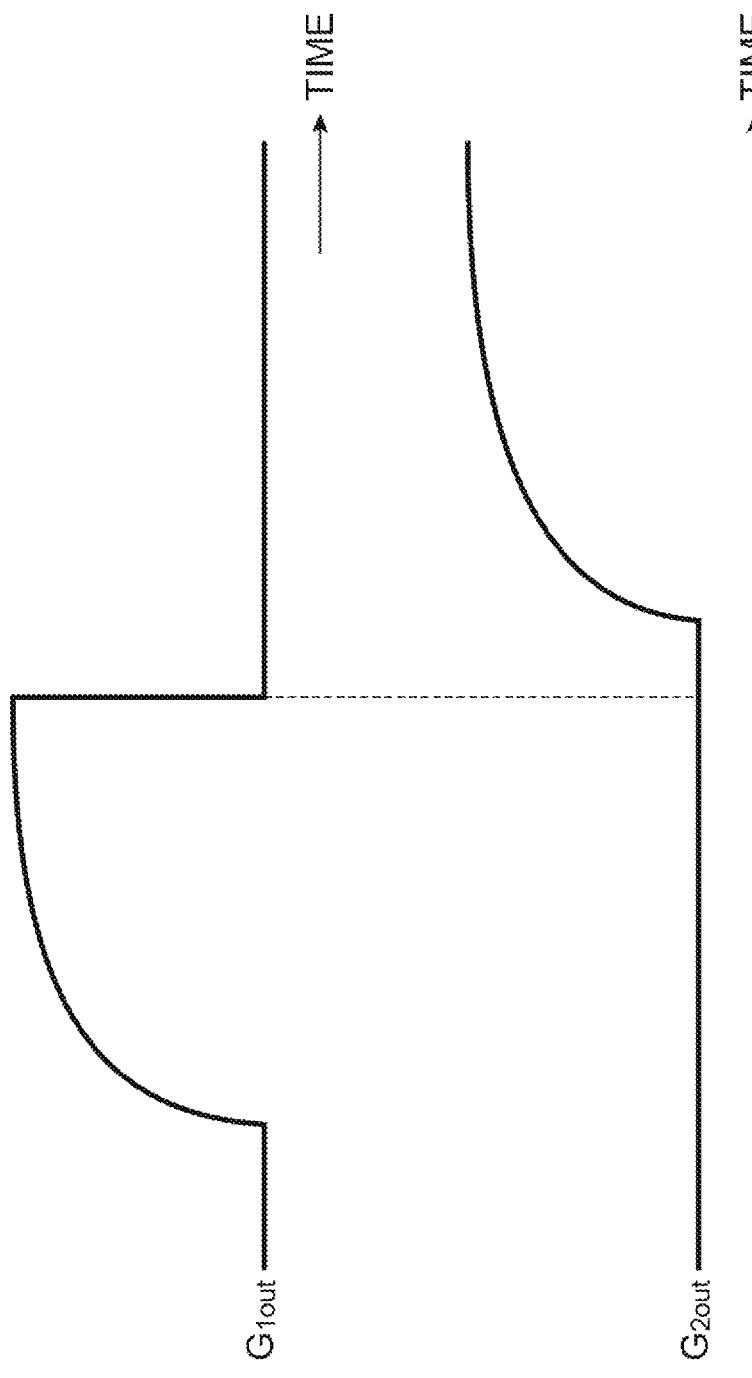
FIG. 16 is a diagram illustrating an example of waveforms of transfer control pulses $G_{1out}$ and $G_{2out}$ generated by a range image sensor 10B.
Figure 17:
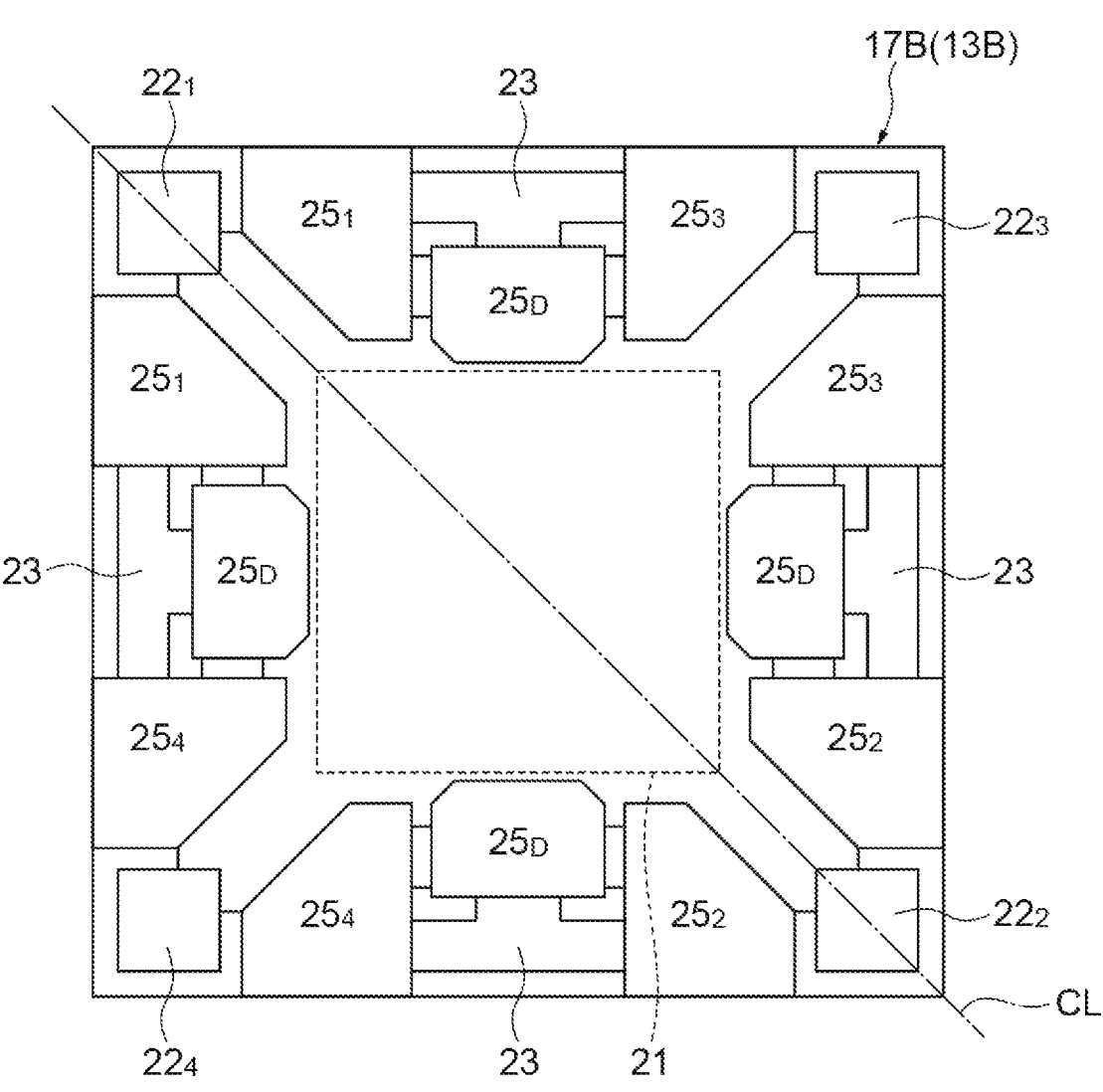
FIG. 17 is a plan view illustrating an arrangement example of each region in a signal charge processing region 17 of a pixel circuit 13.
Figure 18:
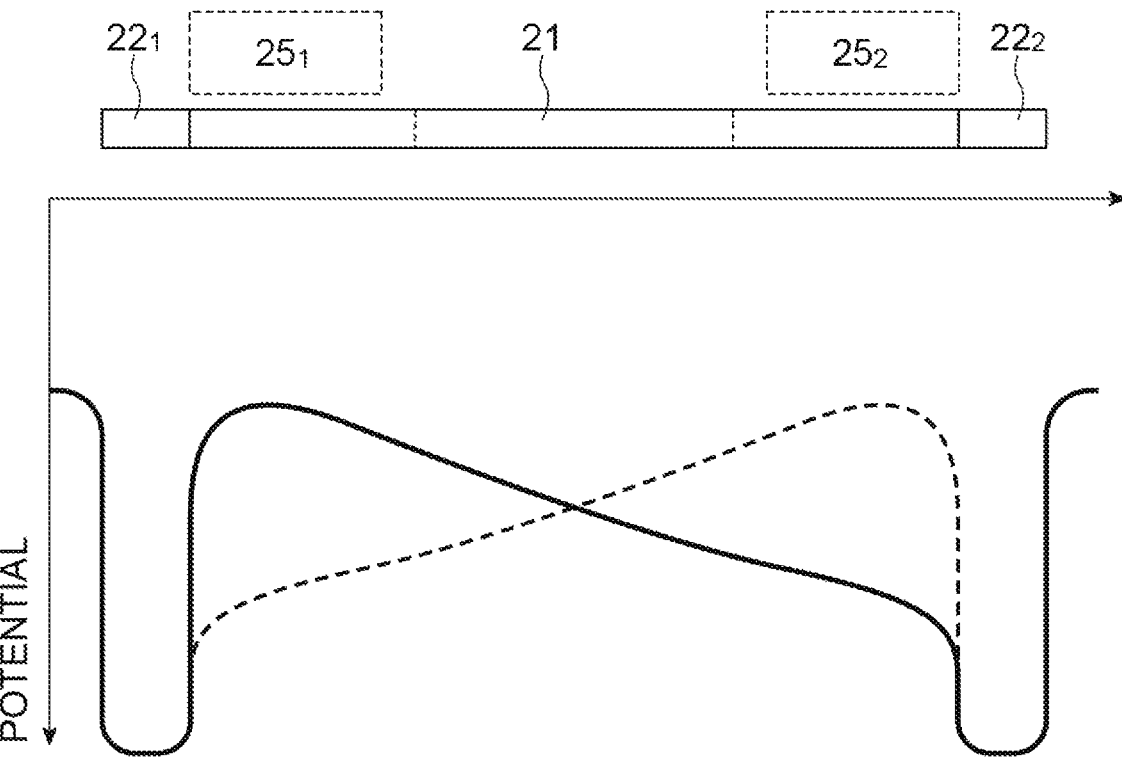
FIG. 18 is a diagram illustrating a potential distribution in the signal charge processing region 17 of the pixel circuit 13.

FIG. 16 illustrates an example of waveforms of the transfer control pulses $G_{1out}$ and $G_{2out}$ generated by the range image sensor 10B of this embodiment. FIG. 17 is a plan view illustrating an arrangement example of each region in a signal charge processing region 17B of the pixel circuit 13B. FIG. 18 is a diagram illustrating a potential distribution in the signal charge processing region 17B of the pixel circuit 13B. FIG. 18 illustrates potential distribution along the dashed-dotted line CL illustrated in FIG. 17.

In the signal charge processing region 17B illustrated in FIG. 17, the photoelectric conversion region 21 is provided in the center, and the charge reading regions $22_1$ to $22_4$ are arranged at the four corners of the signal charge processing region 17B around the photoelectric conversion region 21, and the charge discharging region 23 is arranged between two regions of the charge reading regions $22_1$ to $22_4$. Furthermore, the control electrodes $25_1$ to $25_4$ are provided to interpose the charge transfer path between the photoelectric conversion region 21 and each of the charge reading regions $22_1$ to $22_4$ from both sides, and the control electrodes $25_D$ are provided to interpose the charge transfer path between the photoelectric conversion region 21 and the charge discharging region 23 from both sides. In FIG. 18, a solid line illustrates the potential distribution in the charge transfer path when the low potential is applied to the control electrode $25_1$ and the high potential is applied to the control electrode $25_2$. In addition, a dotted line indicates the potential distribution in the charge transfer path when the high potential is applied to the control electrode $25_1$ and the low potential is applied to the control electrode $25_2$. Due to such potential formation characteristics, the transfer control pulse $G_{1out}$ can be sharply fallen as illustrated in FIG. 16, the movement of the electric charges to the charge reading region $22_1$ can be instantaneously stopped, and after that, although the transfer control pulse $G_{2out}$ is gently raised, the electric charges generated in the photoelectric conversion region 21 can be moved to the charge reading region $22_2$ without leakage in the period of time until the transfer control pulse $G_{2out}$ is fallen.

According to the range image sensor 10B of the present embodiment, one p-type MOS transistor constituting the inverter circuit is provided to the peripheral circuit 31B, and other n-type MOS transistors constituting the NOR-type driver circuit or the NAND-type driver circuit are provided to the pixel circuit 13B. By such a configuration, a small pixel size can be maintained by reducing the number of transistors in the pixel circuit 13B. Furthermore, high-speed pixel driving can be realized.

In particular, in the present embodiment, by providing the n-type MOS transistors in the pixel circuit 13B, the transfer control pulses $G_{1out}$ to $G_{4out}$ and $G_{Dout}$ applied to the control electrodes $25_1$ to $25_4$ and $25_D$ can be sharply fallen, and thus, even when the pulse widths of the transfer control pulses $G_{1out}$ to $G_{4out}$ and $G_{Dout}$ are shortened, the electric charges can be stably transferred to the charge reading regions $22_1$ to $22_4$. As a result, high-speed pixel driving can be realized.

Fourth Embodiment

Next, a configuration of a range image sensor 10C included in a range image acquisition device 1C according to a fourth embodiment will be described, focusing on differences from the first embodiment.

Figure 19:
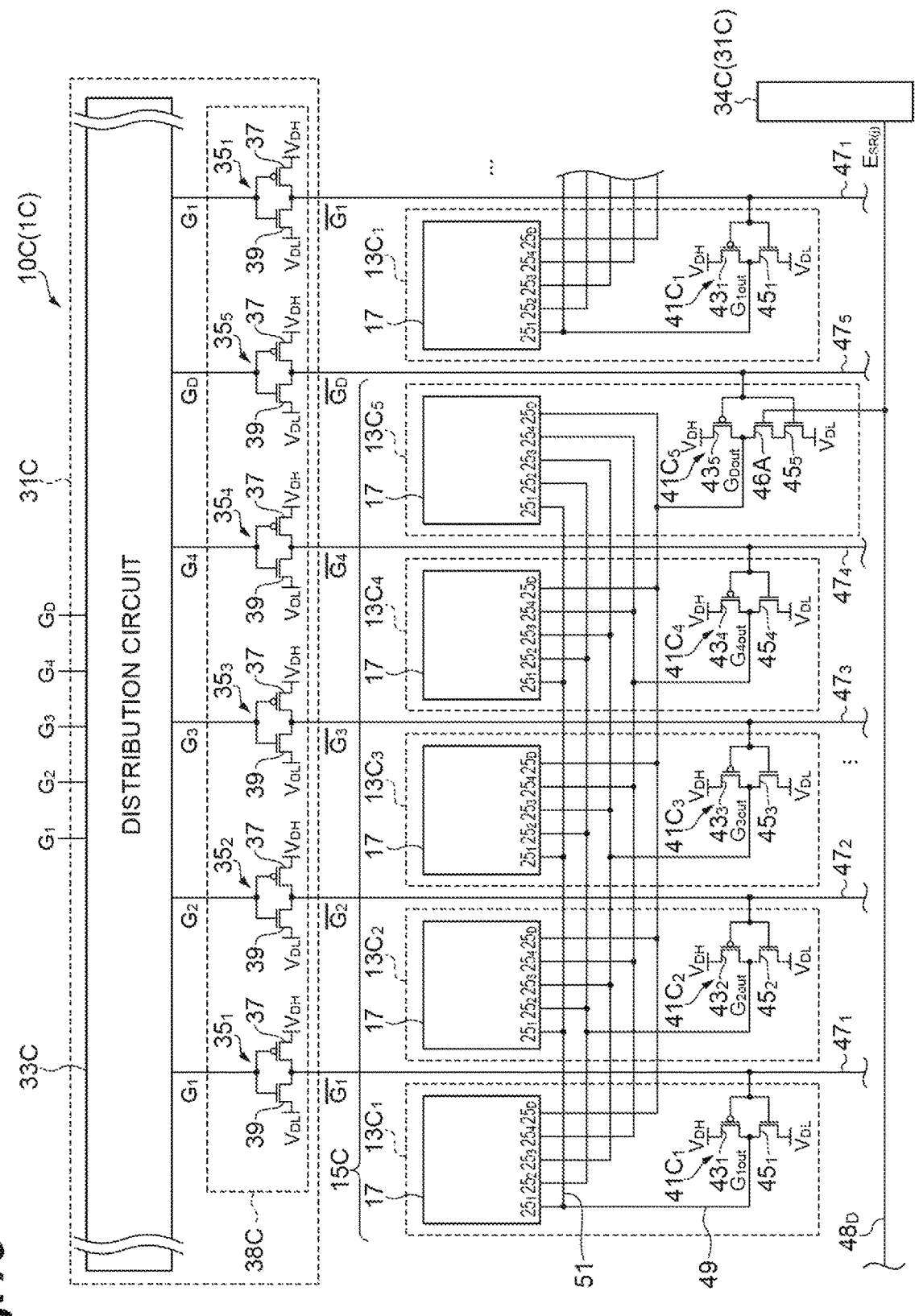
FIG. 19 is a block diagram of a detailed configuration of a range image sensor according to a fourth embodiment.

FIG. 19 is a block diagram illustrating a schematic configuration of the range image sensor 10C. A range image sensor 10C illustrated in FIG. 19 is different from the range image sensor 10 according to the first embodiment in terms of configuration of inverter circuits $41C_1$ to $41C_4$ included in a pixel circuit 13C.

A peripheral circuit 31C has a distribution circuit 33C, an inverter circuit unit 38C, and a pixel switching circuit 34C. The configurations and functions of the distribution circuit 33C are the same as the configurations and functions of the distribution circuit 33 according to the first embodiment. Similarly, the configurations and functions of the inverter circuit unit 38C are the same as the configurations and functions of the inverter circuit unit 38 according to the first embodiment. On the other hand, the pixel switching circuit 34C is different from the pixel switching circuit 34 according to the first embodiment in that the pixel switching circuit 34C outputs only the logic pulse $E_{SR(j)}$ and does not output the inverted signal of the logic pulse $E_{SR(j)}$.

The inverter circuits $41C_1$ to $41C_4$ are provided, respectively, instead of the NOR-type driver circuits $41_1$ to $41_4$ in each pixel circuit 13C constituting a pixel circuit group 15C. The inverter circuits $41C_1$ to $41C_4$ are CMOS inverter circuits. Specifically, the inverter circuits $41C_1$ to $41C_4$ have the p-type MOS transistors $43_1$ to $43_4$ and the n-type MOS transistors $45_1$ to $45_4$. On the other hand, a NAND-type driver circuit $41C_5$ has the p-type MOS transistor $43_5$, an n-type MOS transistor 46A, and the n-type MOS transistor $45_5$. That is, the NAND-type driver circuit $41C_5$ is different from the inverter circuit $41C_1$ in that the NAND-type driver circuit $41C_5$ has the n-type MOS transistor 46A.

Specifically, the inverter circuits $41C_1$ to $41C_4$ have the following configuration.

The sources of the p-type MOS transistors $43_1$ to $43_4$ are connected to the high potential line $V_{DH}$. The gates of the p-type MOS transistors $43_1$ to $43_4$ are connected to the outputs of the inverter circuits $35_1$ to $35_4$ through the wirings $47_1$ to $47_4$. In addition, the gates of the p-type MOS transistors $43_1$ to $43_4$ are also connected to the gates of the n-type MOS transistors $45_1$ to $45_4$. The gates of the p-type MOS transistors $43_1$ to $43_4$ are supplied with inverted signals of the control pulses $G_1$ to $G_4$. The drains of the p-type MOS transistors $43_1$ to $43_4$ and the drains of the n-type MOS transistors $45_1$ to $45_4$ are connected to each other. The gates of the n-type MOS transistors $45_1$ to $45_4$ are connected to the outputs of the inverter circuits $35_1$ to $35_4$ through the wirings $47_1$ to $47_4$. The gates of the n-type MOS transistors $45_1$ to $45_4$ are input with inverted signals of the control pulses $G_1$ to $G_4$. The sources of the n-type MOS transistors $45_1$ to $45_4$ are connected to the low potential line $V_{DL}$.

Further, the NAND-type driver circuit $41C_5$ has the following configuration.

The source of the p-type MOS transistor $43_5$ is connected to the high potential line $V_{DH}$. The gate of the p-type MOS transistor $43_5$ is an input terminal. The gate of the p-type MOS transistor $43_5$ is connected to the output of the inverter circuit $35_5$ through the wiring $47_5$. The drain of the p-type MOS transistor $43_5$ and the drain of the n-type MOS transistor 46A are connected to each other. The gate of the n-type MOS transistor 46A is an input terminal. The gate of the n-type MOS transistor 46A is connected to the pixel switching circuit 34C through the wiring $48_D$. The source of the n-type MOS transistor 46A is connected to the drain of the n-type MOS transistor $45_5$. The source of the n-type MOS transistor $45_5$ is connected to the drain of the n-type MOS transistor 46. The gate of the n-type MOS transistor $45_5$ is an input terminal. The gate of the n-type MOS transistor $45_5$ is connected to the output of the inverter circuit $35_5$ through the wiring $47_5$. The source of the n-type MOS transistor $45_5$ is connected to the low potential line $V_{DL}$.

Fourth Embodiment/Functions and Effects

A range image acquisition device 1C according to a fourth embodiment can achieve the same effects as the range image acquisition device 1 according to the first embodiment. That is, the range image acquisition device 1C can obtain good measurement results by oversampling and integrating even when the measurement target moves at a high speed.

Similarly to the range image acquisition device 1 according to the first embodiment, in the range image acquisition device 1C according to the fourth embodiment, pixel circuits $13C_1$ to $13C_5$ included in a predetermined row can be collectively set as the sensitive pixel region AE. Furthermore, the pixel circuits $13C_1$ to $13C_5$ not included in a predetermined row can be collectively set as the insensitive pixel region AN. Therefore, the range image acquisition device 1C according to the fourth embodiment can perform the oversampling and integrating operations.

Similarly to the range image acquisition device 1 according to the first embodiment, in the range image acquisition device 1C according to the fourth embodiment, with a configuration in which the control pulses $G_1$ to $G_4$ and $G_D$ are relayed by the first to fifth control electrode driver circuits and a configuration in which each of the first to fifth control electrode driver circuits is shared by the pixel circuit group 15C having the same number of pixel circuits $13C_1$ to $13C_5$ as the number of control electrodes $25_1$ to $25_4$ and $25_D$, the rounding of the waveforms of the transfer control pulses $G_{1out}$ to $G_{4out}$ and $G_{Dout}$ can be reduced while maintaining a small pixel size.

Similarly to the range image acquisition device 1 according to the first embodiment, in the range image acquisition device 1C according to the fourth embodiment, by the configuration in which a plurality of the wirings $47_1$ to $47_5$ allowing the distribution circuit 33C and the first to fifth control electrode driver circuits to be electrically connected to each other are arranged to be separated, crosstalk between the different the control pulses $G_1$ to $G_4$ and the inverted signals of the $G_D$ can be prevented, and thus, stable pixel driving can be achieved. As a result, the range image with a high range resolution can be generated.

Furthermore, the range image acquisition device 1C according to the fourth embodiment can achieve the following effects, which are different from those of the range image acquisition device 1 according to the first embodiment.

The range image sensor 10C has the wiring $48_D$ for the logic pulse $E_{SR(j)}$ that controls the charge discharging region 23 sensitively or insensitively. That is, similarly to the range image sensor 10 according to the first embodiment, the range image sensor 10C does not have the wiring for the inverted signal of the logic pulse $E_{SR(j)}$ that controls the charge reading regions $22_1$ to $22_4$ sensitively or insensitively. Therefore, the circuit configuration can be simplified.

Fifth Embodiment

Next, a configuration of a range image sensor 10D included in a range image acquisition device 1D according to a fifth embodiment will be described, focusing on differences from the second embodiment.

Figure 20:
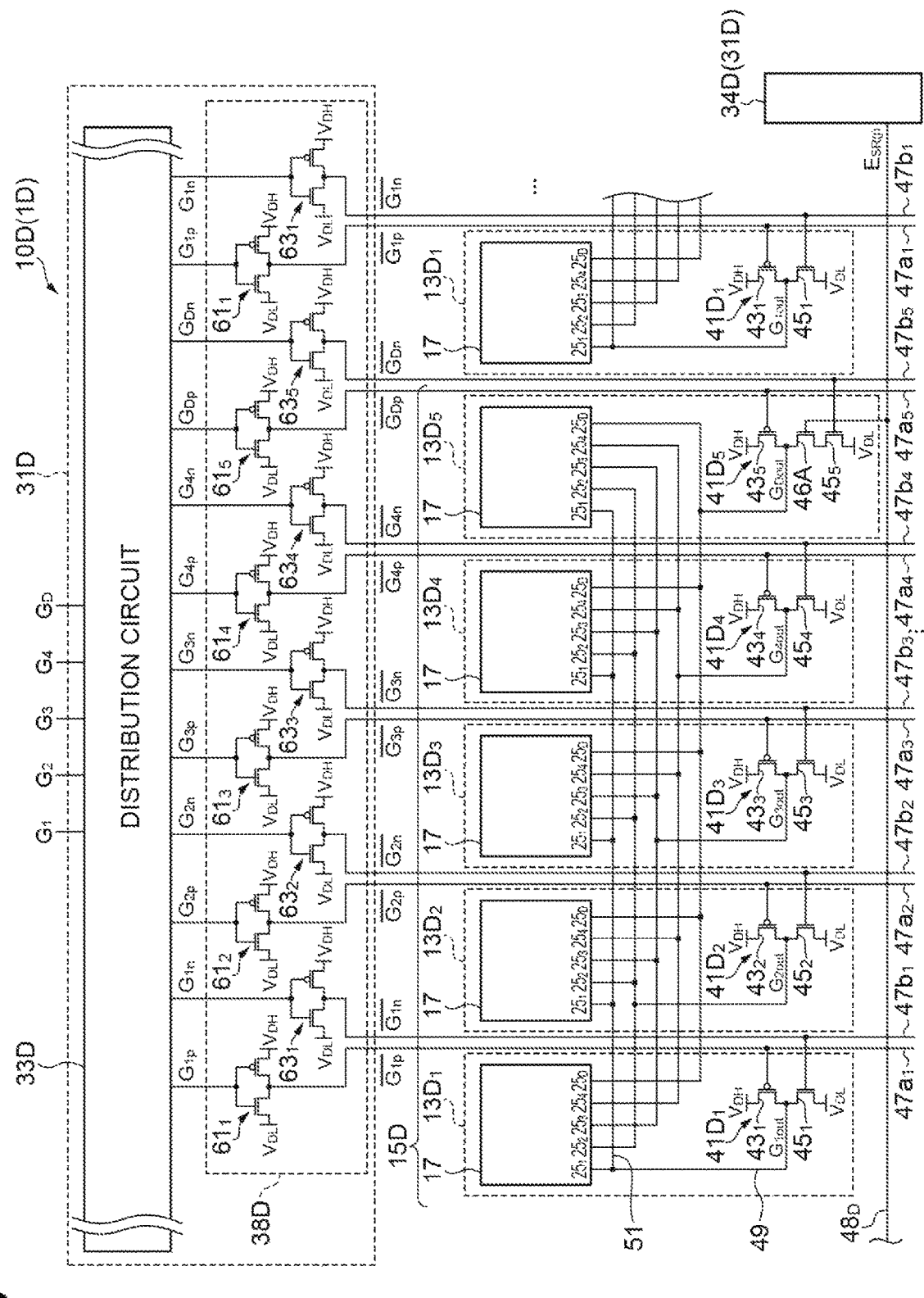
FIG. 20 is a block diagram of a detailed configuration of a range image sensor according to a fifth embodiment.

FIG. 20 is a block diagram illustrating a schematic configuration of the range image sensor 10D. The range image sensor 10D illustrated in FIG. 20 is different from the range image sensor 10A according to the second embodiment in terms of configuration of inverter circuits $41D_1$ to $41D_4$ included in a pixel circuit 13D.

A peripheral circuit 31D has a distribution circuit 33D, an inverter circuit unit 38D, and a pixel switching circuit 34D. The configurations and functions of the distribution circuit 33D are the same as the configurations and functions of the distribution circuit 33A according to the second embodiment. Similarly, the configurations and functions of the inverter circuit unit 38D are the same as the configurations and functions of the inverter circuit unit 38A according to the second embodiment. On the other hand, the pixel switching circuit 34D is different from the pixel switching circuit 34A according to the second embodiment in that the pixel switching circuit 34D outputs only the logic pulse $E_{SR(j)}$ and does not output the inverted signal of the logic pulse $\bar{E}_{SR(j)}$.

Instead of the NOR-type driver circuits $41A_1$ to $41A_4$, the inverter circuits $41D_1$ to $41D_4$ are provided in pixel circuits $13D_1$ to $13D_5$ constituting a pixel circuit group 15D, respectively. The configurations and functions of the inverter circuits $41D_1$ to $41D_4$ are the same as those of the inverter circuits $41C_1$ to $41C_4$ according to the fourth embodiment. On the other hand, the inverter circuits $41D_1$ to $41D_4$ are different from those of the inverter circuits $41C_1$ to $41C_4$ according to the fourth embodiment in terms of the connection configurations between the gates of the p-type MOS transistors $43_1$ to $43_4$ and the n-type MOS transistors $45_1$ to $45_4$ constituting the inverter circuits $41D_1$ to $41D_4$.

Specifically, the gates of the p-type MOS transistors $43_1$ to $43_5$ are connected to the outputs of the inverter circuits $61_1$ to $61_5$ through the wirings $47a_1$ to $47a_5$. The inverted signals of the control pulses $G_{1p}$ to $G_{4p}$ and $G_{Dp}$ are input to the gates of the p-type MOS transistors $43_1$ to $43_5$. The gates of the n-type MOS transistors $45_1$ to $45_5$ are connected to the outputs of the inverter circuits $63_1$ to $63_5$ through the wirings $47b_1$ to $47b_5$. The inverted signals of the control pulses $G_{in}$ to $G_{4n}$ and $G_{Dn}$ are input to the gates of the n-type MOS transistors $45_1$ to $45_5$.

Fifth Embodiment/Functions and Effects

A range image acquisition device 1D according to a fifth embodiment can have the same effects as the range image acquisition device 1A according to the second embodiment. That is, the range image acquisition device 1D can obtain good measurement results by oversampling and integrating even when the measurement target moves at a high speed.

Similarly to the range image acquisition device 1A according to the second embodiment, in the range image acquisition device 1D according to the fifth embodiment, the pixel circuits $13D_1$ to $13D_5$ included in a predetermined row can be collectively set as the sensitive pixel region AE. Furthermore, the pixel circuits $13D_1$ to $13D_5$ not included in a predetermined row can be collectively set as the insensitive pixel region AN. Therefore, the range image acquisition device 1D according to the fifth embodiment can perform the oversampling and integrating operations.

Similarly to the range image acquisition device 1A according to the second embodiment, in the range image acquisition device 1D according to the fifth embodiment, with such a configuration in which the control pulses $G_{1p}$ to $G_{4p}$, $G_{1n}$ to $G_{4n}$, $G_{Dp}$, and $G_{Dn}$ are relayed by the first to fifth control electrode driver circuits and a configuration in which each of the first to fifth control electrode driver circuits is shared by the pixel circuit group 15D having the same number of pixel circuits $13D_1$ to $13D_5$ as the number of control electrodes $25_1$ to $25_4$ and $25_D$, the rounding of the waveforms of the transfer control pulses $G_{1out}$ to $G_{4out}$ and $G_{Dout}$ can be reduced while maintaining a small pixel size.

Similarly to the range image acquisition device 1A according to the second embodiment, in the range image acquisition device 1D according to the fifth embodiment, by the configuration in which a plurality of the wirings $47a_1$ to $47a_5$ and $47b_1$ to $47b_5$ allowing the distribution circuit 33D and the first to fifth control electrode driver circuits to be electrically connected to each other are arranged to be separated, crosstalk between the different the control pulses $G_{1p}$ to $G_{4p}$, $G_{1n}$ to $G_{4n}$, $G_{Dp}$, and $G_{Dn}$ can be prevented, and thus, stable pixel driving can be realized. As a result, the range image with a high range resolution can be generated.

Similarly to the range image acquisition device 1A according to the second embodiment, the range image acquisition device 1D according to the fifth embodiment has circuit configurations in which the control pulses are supplied to the gates of the two transistors $43_1$ to $43_5$ and $45_1$ to $45_5$ constituting each of the inverter circuits $41D_1$ to $41D_4$ and a NAND-type driver circuit $41D_5$ so that the ON periods do not overlap each other. That is, the range image acquisition device 1D has the wirings $47a_1$ to $47a_5$ and $47b_1$ to $47b_5$. With this configuration, the pass-through currents in the first to fifth control electrode driver circuits having the inverter circuits $41D_1$ to $41D_4$ and the NAND-type driver circuit $41D_5$ can be reliably prevented. As a result, high-speed pixel driving can be realized.

Furthermore, the range image acquisition device 1D according to the fifth embodiment can achieve the following effects, which are different from those the range image acquisition device 1A according to the second embodiment.

Similarly to the range image acquisition device 1A according to the second embodiment, in the range image acquisition device 1D according to the fifth embodiment, the pass-through current in the control electrode driver circuit can be sufficiently reduced, and thus, high-speed pixel driving can be realized. As a result, the range image with a high range resolution can be generated.

The range image acquisition device 1D has the wiring $48_D$ for the logic pulse $E_{SR(j)}$ that controls the charge discharging region 23 sensitively or insensitively. That is, similarly to the range image acquisition device 1A according to the second embodiment, there is no the wiring for the inverted signal of the logic pulse $E_{SR(j)}$ that controls the charge reading regions $22_1$ to $22_4$. Therefore, the circuit configuration can be simplified.

Sixth Embodiment

Next, a configuration of a range image sensor 10E included in a range image acquisition device 1E according to a sixth embodiment will be described, focusing on differences from the third embodiment.

Figure 21:
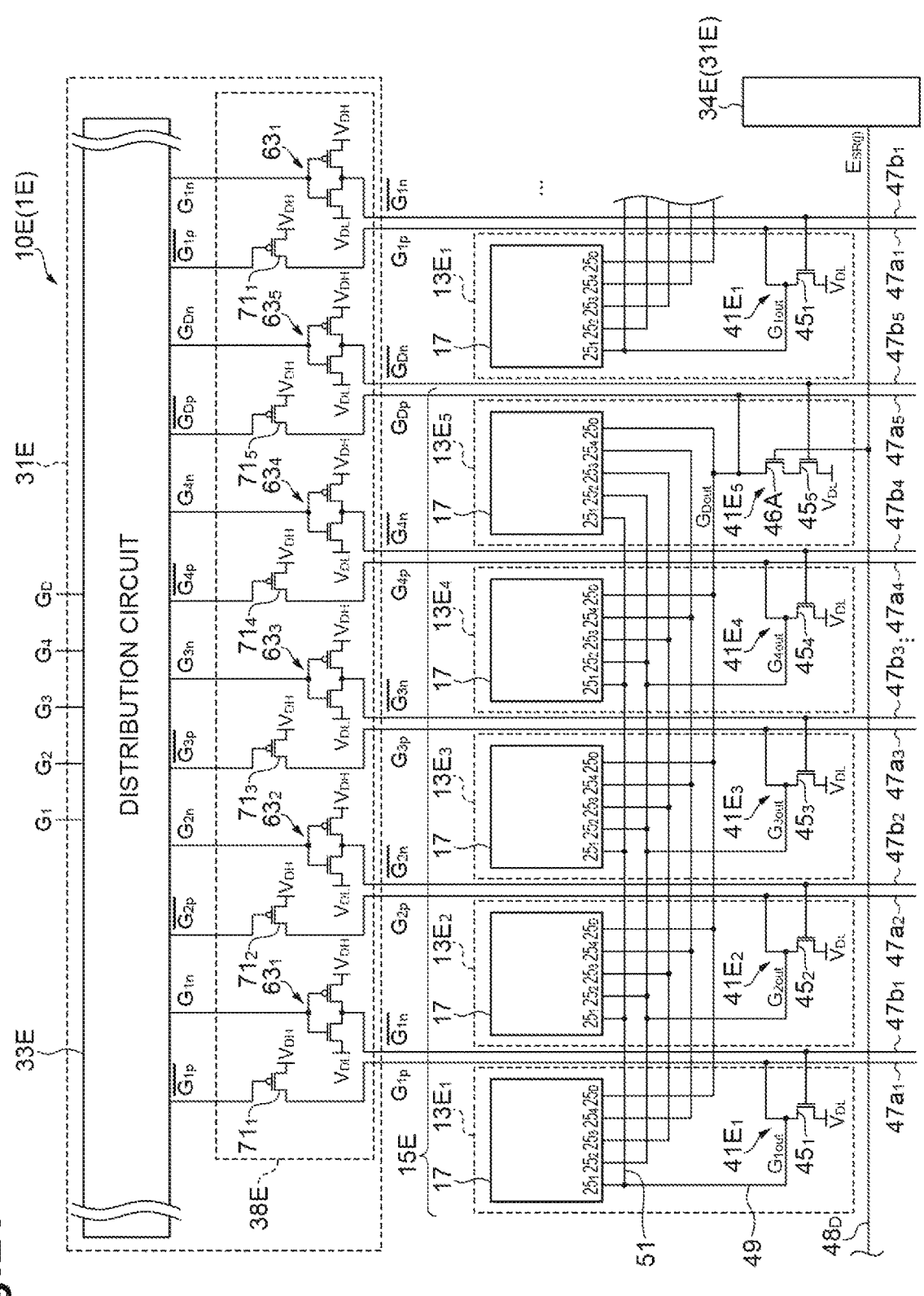
FIG. 21 is a block diagram of a detailed configuration of a range image sensor according to a sixth embodiment.

FIG. 21 is a block diagram illustrating a schematic configuration of the range image sensor 10E. The range image sensor 10E has an element structure for reducing the so-called pass-through current. The range image sensor 10E illustrated in FIG. 21 is different from the range image sensor 10B according to the third embodiment in terms of configurations of control circuits included in a pixel circuit 13E.

A peripheral circuit 31E has a distribution circuit 33E, an inverter circuit unit 38E, and a pixel switching circuit 34E. The configurations and functions of the distribution circuit 33E are the same as the configurations and functions of the distribution circuit 33B according to the third embodiment. Similarly, the configurations and functions of the inverter circuit unit 38E are the same as the configurations and functions of the inverter circuit unit 38B according to the third embodiment. On the other hand, the pixel switching circuit 34E is different from the pixel switching circuit 34B according to the third embodiment in that the pixel switching circuit 34E outputs only the logic pulse $E_{SR(j)}$ and does not output the inverted signal of the logic pulse $E_{SR(j)}$.

Instead of the NAND-type driver circuits $41B_1$ to $41B_4$, NAND-type driver circuits $41E_1$ to $41E_4$ are provided in pixel circuits $13E_1$ to $13E_4$ constituting a pixel circuit group 15E. The NAND-type driver circuits $41E_1$ to $41E_4$ include the n-type MOS transistors $45_1$ to $45_4$, respectively. That is, the control circuits provided in the pixel circuits $13E_1$ to $13E_4$ are different from the NAND-type driver circuits $41B_1$ to $41B_4$ in that the p-type MOS transistors $43_1$ to $43_4$ are not provided. On the other hand, configurations and functions of a NAND-type driver circuit $41E_5$ provided in a pixel circuit $13E_5$ are the same as those of the NAND-type driver circuit $41B_5$.

Sixth Embodiment/Functions and Effects

A range image acquisition device 1E according to a sixth embodiment can achieve the same effects as the range image acquisition device 1B according to the third embodiment. That is, the range image sensor 10E can obtain good measurement results by oversampling and integrating even when the measurement target moves at a high speed.

Similarly to the range image acquisition device 1B according to the third embodiment, in the range image acquisition device 1E according to the sixth embodiment, the pixel circuits $13E_1$ to $13E_5$ included in a predetermined row can be collectively set as the sensitive pixel region AE. Furthermore, the pixel circuits $13E_1$ to $13E_5$ not included in a predetermined row can be collectively set as the insensitive pixel region AN. Therefore, the range image acquisition device 1E according to the sixth embodiment can perform the oversampling and integrating operations.

Similarly to the range image acquisition device 1B according to the third embodiment, in the range image acquisition device 1E according to the sixth embodiment, with such a configuration in which the control pulses $G_{1p}$ to $G_{4p}$, $G_{1n}$ to $G_{4n}$, $G_{Dp}$, and $G_{Dn}$ are relayed by the first to fifth control electrode driver circuits and a configuration in which each of the first to fifth control electrode driver circuits is shared by the pixel circuit group $15E$ having the same number of pixel circuits $13E_1$ to $13E_5$ as the number of control electrodes $25_1$ to $25_4$ and $25_D$, the rounding of the waveforms of the transfer control pulses $G_{1out}$ to $G_{4out}$ and $G_{Dout}$ can be reduced while maintaining a small pixel size.

Similarly to the range image acquisition device $1B$ according to the third embodiment, in the range image acquisition device $1E$ according to the sixth embodiment, by the configuration in which a plurality of the wirings $47a_1$ to $47a_5$ and $47b_1$ to $47b_5$ electrically connecting the distribution circuit $33E$ and the first to fifth control electrode driver circuits are arranged to be separated, crosstalk between the different the control pulses $G_{1p}$ to $G_{4p}$, $G_{1n}$ to $G_{4n}$, $G_{Dp}$, and $G_{Dn}$ can be prevented, and thus, stable pixel driving can be realized. As a result, the range image with a high range resolution can be generated.

Similarly to the range image acquisition device $1A$ according to the second embodiment, the range image acquisition device $1E$ according to the sixth embodiment has circuit configurations in which the control pulses are supplied to the inverter circuits $41E_1$ to $41E_4$ and the NAND-type driver circuit $41E_5$ so that the ON periods do not overlap. That is, the range image acquisition device $1E$ has the wirings $47a_1$ to $47a_5$ and $47b_1$ to $47b_5$. The pass-through currents in the first to fifth control electrode driver circuits having the inverter circuits $41E_1$ to $41E_4$ and the NAND-type driver circuit $41E_5$ can be reliably prevented, and thus, high-speed pixel driving can be realized.

Furthermore, the range image acquisition device $1E$ according to the sixth embodiment can achieve the following effects, which are different from those of the range image acquisition device $1A$ according to the second embodiment.

According to the range image acquisition device $1E$ according to the sixth embodiment, the same effects as the range image acquisition device $1B$ according to the third embodiment can be achieved. In short, the range image acquisition device $1E$ according to the sixth embodiment has one p-type MOS transistor constituting the inverter circuit or the NAND-type driver circuit in the peripheral circuit $31E$. Furthermore, the range image acquisition device $1E$ has other n-type MOS transistors constituting the inverter circuits or the NAND-type driver circuits in the pixel circuits $13E_1$ to $13E_5$. By such a configuration, the number of transistors in a pixel circuit $13E$ can be reduced. As a result, a small pixel size can be maintained, and high-speed pixel driving can be realized.

Seventh Embodiment

Figure 22:
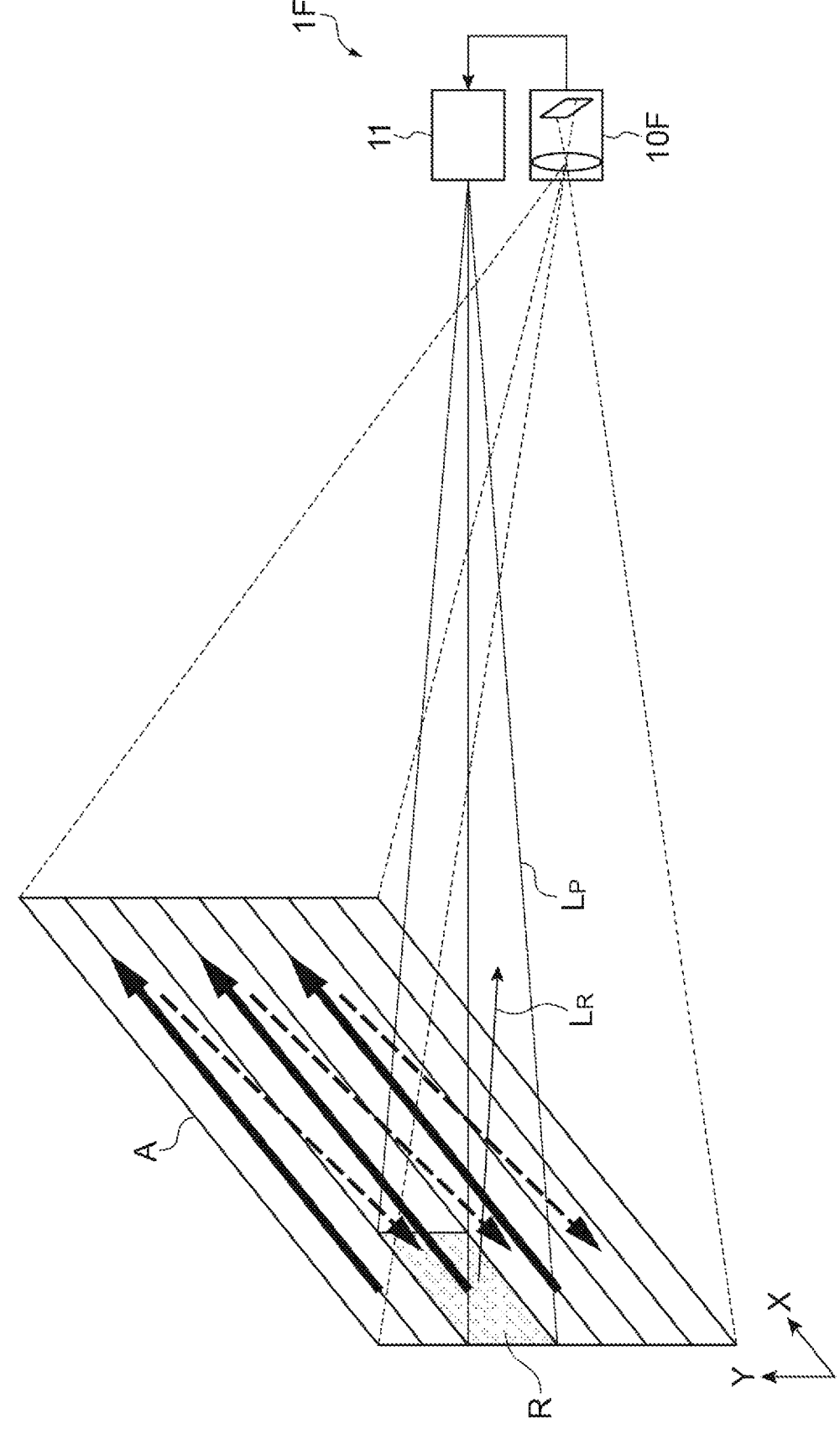
FIG. 22 is a diagram illustrating an irradiation region of a light source according to a seventh embodiment.

Next, a range image acquisition device $1F$ according to a seventh embodiment will be described. The range image acquisition device $1$ according to the first embodiment irradiates with a pulsed light $L_P$ to cover the entire width of the measurement target region A. On the other hand, as illustrated in FIG. 22, the range image acquisition device $1F$ according to the seventh embodiment irradiates a portion of the measurement target region A in the width direction with pulsed light $L_P$.

Figure 23:
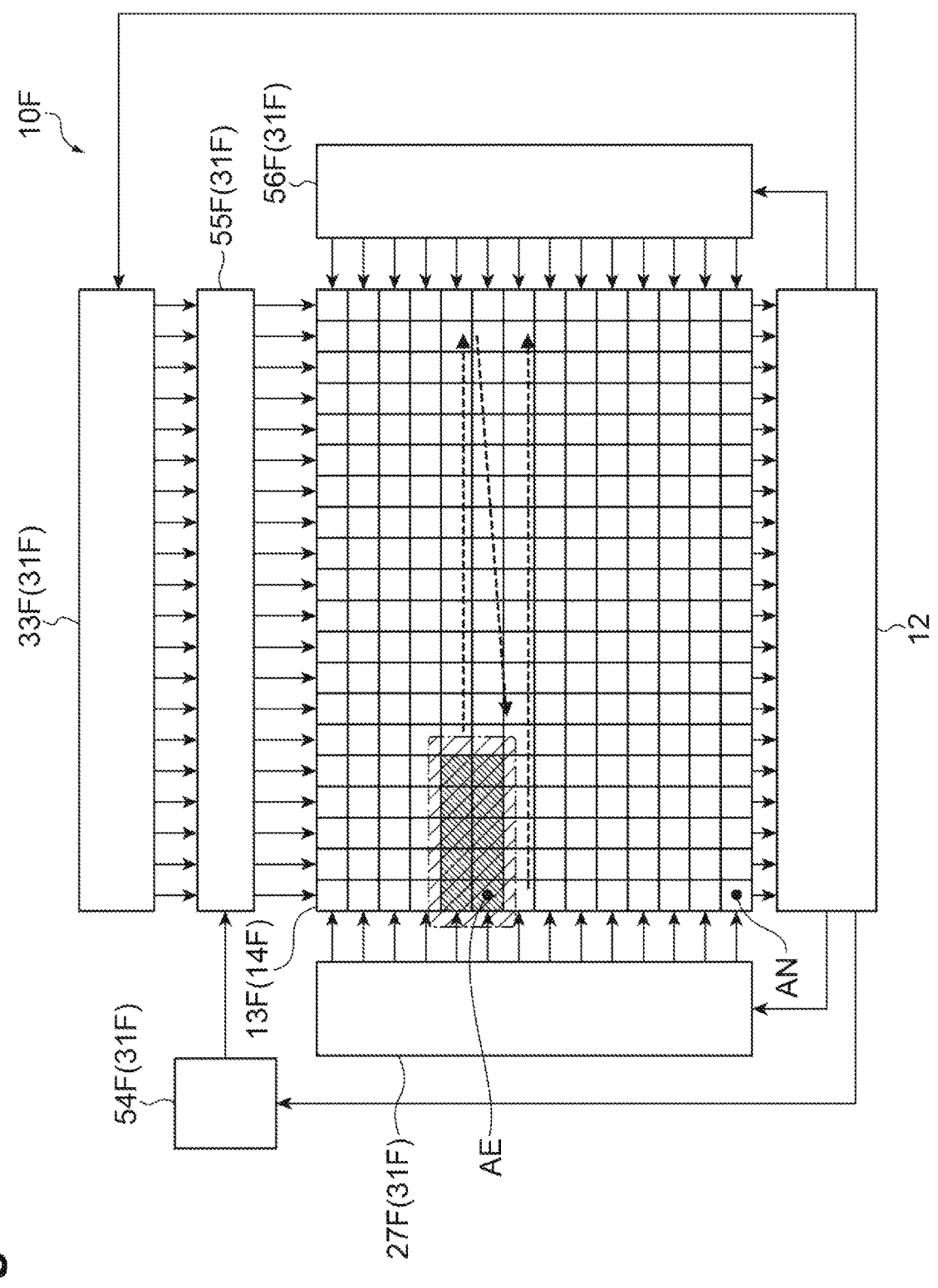
FIG. 23 is a diagram illustrating a connection configuration between a pixel array and a peripheral circuit according to the seventh embodiment.

The range image acquisition device $1$ according to the first embodiment described above switches between the sensitive pixel region AE and the insensitive pixel region AN for each row as illustrated in FIG. 10 and the like. The range image acquisition device $1F$ according to the seventh embodiment performs the operation of setting an operation of a pixel circuit $13F$ to sensitive or insensitive for each column block in addition to the operation of setting the operation of the pixel circuit $13F$ to sensitive or insensitive for each row. According to the operations, as illustrated in FIG. 23, specific regions in a pixel array $14F$ can be set as a sensitive pixel region AE, and other regions can be set as an insensitive pixel region AN. Then, the sensitive pixel region AE moves sequentially from left to right in FIG. 23 for each column block, and after that, moves to the next row.

A range image sensor $10F$ has the pixel array $14F$, the calculation circuit $12$, and a peripheral circuit $31F$. The peripheral circuit $31F$ has a distribution circuit $33F$, a pixel switching circuit (column) $54F$, a logic calculation circuit $55F$, and a pixel switching circuit (row) $56F$.

Figure 24:
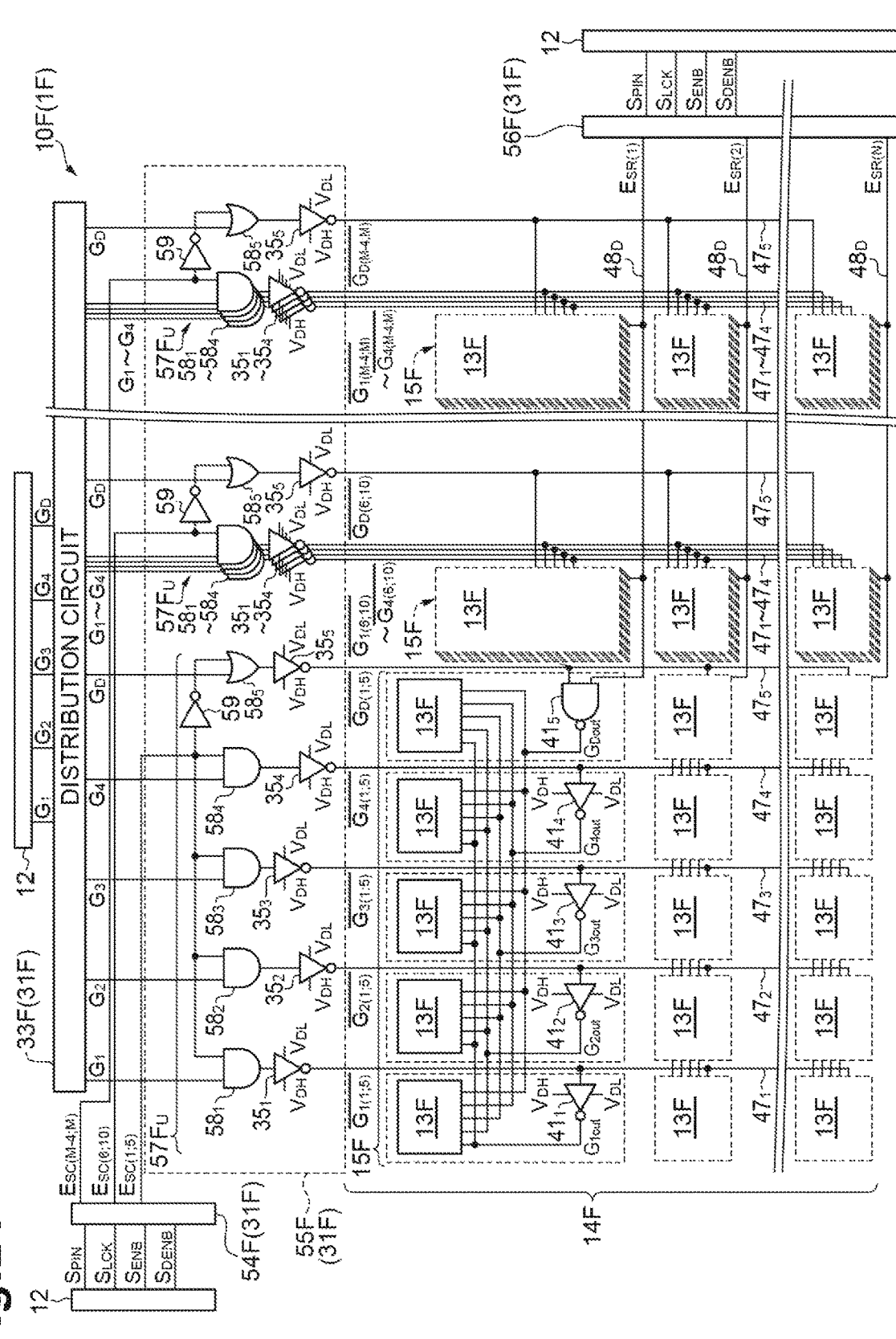
FIG. 24 is a block diagram of a detailed configuration of a range image sensor according to the seventh embodiment.

FIG. 24 is a diagram illustrating a specific circuit configuration of the range image sensor $10F$. The range image sensor $10F$ has the pixel circuits $13F$ having four charge reading regions $22_1$ to $22_4$, and the peripheral circuit $31F$ for switching between the sensitiveness and the insensitiveness of the pixel circuit $13F$. In particular, the peripheral circuit $31F$ switches the sensitiveness or insensitiveness of the pixel circuit $13F$ not for each row but for each block.

The distribution circuit $33F$ has the same configurations and functions as the distribution circuit $33$ according to the first embodiment. The distribution circuit $33$ F receives the control pulses $G_1$ to $G_4$ and $G_D$ from the calculation circuit $12$. The distribution circuit $33F$ supplies the control pulses $G_1$ to $G_4$ and $G_D$ for each logic calculation unit $57F_U$ of the logic calculation circuit $55F$.

The input of the pixel switching circuit (column) $54F$ is connected to the calculation circuit $12$. The pixel switching circuit (column) $54F$ receives the control pulses $S_{PIN}$, $S_{LCK}$, $S_{ENB}$, and $S_{DENB}$ from the calculation circuit $12$. The output of the pixel switching circuit (column) $54F$ is connected to the logic calculation circuit $55F$. The pixel switching circuit (column) $54F$ supplies a logic pulse (column) $E_{SC(i-4:i)}$ to the logic calculation circuit $55F$.

The inputs of the logic calculation circuit $55F$ are connected to the distribution circuit $33F$ and the pixel switching circuit (column) $54F$. The logic calculation circuit $55F$ receives the control pulses $G_1$ to $G_4$ and $G_D$ from the distribution circuit $33F$ for each logic calculation unit $57F_U$. The logic calculation circuit $55F$ receives the logic pulse (column) $E_{SC(i-4:i)}$ from the pixel switching circuit (column) $54F$ for each logic calculation unit $57F_U$. The logic calculation circuit $55F$ performs a logic operation on, for example, the control pulses $G_1$ to $G_4$ and $G_D$ and the logic pulse (column) $E_{SC(i-4:i)}$. As a result of the logic operation, the logic calculation circuit $55F$ outputs the inverted signals of control pulses (column) $G_{1(i-4:i)}$ to $G_{4(i-4:i)}$ and $G_{D(i-4:i)}$. The output of the logic calculation circuit $55F$ is connected to the pixel array $14F$. The logic calculation circuit $55F$ supplies the inverted signals of the control pulses $G_{1(i-4:i)}$ to $G_{4(i-4:i)}$ and $G_{D(i-4:i)}$ for each column of the pixel array $14F$.

The circuit configuration of the logic calculation circuit $55F$ will be described more in detail.

The logic calculation circuit $55F$ has inverter circuits $35_1$ to $35_5$, AND gates $58_1$ to $58_4$, an inverter circuit $59$, and an OR gate $58_5$. The five inverter circuits $35_1$ to $35_5$, the four AND gates $58_1$ to $58_4$, one inverter circuit $59$ and one OR gate $58_5$ constitute a set of the logic calculation units $57F_U$. One logic calculation unit $57F_U$ corresponds to one pixel circuit group $15F$.

Inputs of the AND gates $58_1$ to $58_4$ are connected to the distribution circuit $33F$ and the pixel switching circuit (column) $54F$. The first inputs of the AND gates $58_1$ to $58_4$ receive the control pulses $G_1$ to $G_4$ from the distribution circuit $33F$. The second inputs of the AND gates $58_1$ to $58_4$ receives the logic pulse (column) $E_{SC(i-4:i)}$ from the pixel switching circuit (column) 54F. That is, the second inputs of the AND gates 58₁ to 58₄ are connected to each other. The outputs of the AND gates 58₁ to 58₄ are connected to the inverter circuits 35₁ to 35₄. The AND gates 58₁ to 58₄ supply the control pulses $G_{1(i-4:i)}$ to $G_{4(i-4:i)}$ to the inverter circuits 35₁ to 35₄.

The input of the inverter circuit 59 is connected to the pixel switching circuit (column) 54F. That is, the input of the inverter circuit 59 is common to the second inputs of the AND gates 58₁ to 58₄. The inverter circuit 59 receives the logic pulse (column) $E_{SC(i-4:i)}$ from the pixel switching circuit (column) 54F. The output of the inverter circuit 59 is connected to the OR gate 58₅. The inverter circuit 59 supplies the inverted signal of the logic pulse (column) $E_{SC(i-4:i)}$ to the OR gate 58₅.

The inputs of the OR gate 58₅ are connected to the distribution circuit 33F and the inverter circuit 59. The first input of the OR gate 58₅ receives the control pulse $G_D$ from the distribution circuit 33F. The second input of the OR gate 58₅ receives the inverted signal of the logic pulse (column) $E_{SC(i-4:i)}$ from the inverter circuit 59. The output of the OR gate 58₅ is connected to the inverter circuit 35₅. The OR gate 58₅ supplies the control pulse $G_{D(i-4:i)}$, which is an OR signal of the control pulse $G_D$ and the inverted signal of the logic pulse (column) $E_{SC(i-4:i)}$ to the inverter circuit 35₅.

According to the distribution circuit 33F, the pixel switching circuit (column) 54F, and the logic calculation circuit 55F, the different the logic pulses $E_{SC(i-4:i)}$ can be supplied for each logic calculation unit 57F$_U$.

The input of the pixel switching circuit (row) 56F is connected to the calculation circuit 12. The pixel switching circuit (row) 56F receives the control pulses $S_{PIN}$, $S_{LCK}$, $S_{ENB}$, and $S_{DENB}$ from the calculation circuit 12. The pixel switching circuit (row) 56F generates the logic pulse (row) $E_{SR(j)}$ by using the control pulses $S_{PIN}$, $S_{LCK}$, $S_{ENB}$, and $S_{DENB}$. The output of the pixel switching circuit (row) 56F is connected to the pixel array 14F. The pixel switching circuit (row) 56F supplies the logic pulse (row) $E_{SR(j)}$ to the j-th row of the pixel array 14F.

According to the pixel switching circuit (row) 56F described above, different the logic pulses (row) $E_{SR(j)}$ can be supplied for each row or for each of the plurality of rows.

As a result, the sensitiveness and insensitiveness of the pixel circuit 13F are basically switched by the logic pulses (row) $E_{SR(j)}$ of the pixel switching circuit (row) 56F. For example, even when the control pulse $G_{1(i-4:i)}$ that allows the pixel circuit 13F to be sensitive is input to a certain pixel circuit 13F, if the logic pulse (row) $E_{SR(j)}$ that allows the pixel circuit 13F to be insensitive is input, the pixel circuit 13F is insensitive. According to this relationship, as illustrated in FIG. 23, only a portion of the pixel array 14F can be set to be a sensitive pixel region AE, and the other region can be set to be an insensitive pixel region AN. That is, only the pixel circuit 13F to which the control pulses $G_{1(i-4:i)}$ to $G_{4(i-4:i)}$ (that is, the logic pulses (column) $E_{SC(i-4:i)}$) for setting the pixel circuit 13F to be sensitive and the logic pulse (row) $E_{SR(j)}$ for setting the pixel circuit 13F to be sensitive are input becomes sensitive.

Seventh Embodiment/Functions and Effects

A range image acquisition device 1F according to a seventh embodiment can achieve the same effects as the range image acquisition device 1 according to the first embodiment. That is, the range image acquisition device 1F can obtain good measurement results by oversampling and integrating even when the measurement target moves at a high speed.

Similarly to the range image acquisition device 1 according to the first embodiment, in the range image acquisition device 1F according to the seventh embodiment, the pixel circuits 13F included in a predetermined row can be collectively set as the sensitive pixel region AE. Furthermore, the pixel circuits 13F not included in a predetermined row can be collectively set as the insensitive pixel region AN. Therefore, the range image acquisition device 1F according to the seventh embodiment can perform the oversampling and integrating operations.

Similarly to the range image acquisition device 1 according to the first embodiment, in the range image acquisition device 1F according to the seventh embodiment, with such a configuration in which the control pulses $G_1$ to $G_4$ and $G_D$ are relayed by the first to fifth control electrode driver circuits and a configuration in which each of the first to fifth control electrode driver circuits is shared by the pixel circuit group 15F having the same number of pixel circuits 13F as the number of control electrodes 25₁ to 25₄ and 25$_D$, the rounding of the waveform of the inverted signals of the transfer control pulses $G_{1out(i-4:i)}$ to $G_{4out(i-4:i)}$ and $G_{Dout(i-4:i)}$ can be reduced while maintaining a small pixel size.

Furthermore, the range image acquisition device 1F according to the seventh embodiment can achieve the following effects, which are different from those of the range image acquisition device 1 according to the first embodiment.

In the range image acquisition device 1F according to the seventh embodiment, the light source control unit 12a performs the operation of emitting the pulsed light $L_P$ from the light source 11 so that a portion of the pixel circuits 13F included in the j-th row are included in the sensitive pixel region AE, the operation of supplying the control pulse for operating the pixel circuits 13F so that the movement of the electric charges from the photoelectric conversion region 21 to the charge reading regions 22₁ to 22₄ is permitted to the pixel array 14F for a portion of the pixel circuits 13F included in the j-th row, and the operation of supplying the control pulse for operating the pixel circuits 13F so that the movement of the electric charges from the photoelectric conversion region 21 to the charge discharging region 23 is permitted to the pixel array 14F for all the pixel circuits 13F included in the insensitive pixel region AN not included in the sensitive pixel region AE. This operation allows a desired region included in the pixel array 14F to be used as the sensitive pixel region AE. Therefore, the sensitive pixel region AE in the pixel array 14F can be set to be more condensed.

Eighth Embodiment

Next, a configuration of a range image sensor 10G included in a range image acquisition device 1G according to an eighth embodiment will be described, focusing on differences from the first embodiment.

The range image sensor 10G adopts the pixel configuration and the pixel control that controls the sensitiveness and insensitiveness of a pixel circuit 13G by controlling the drain. The range image sensor 10G adopts the method of supplying transfer control pulses $G_{1out(j)}$ to $G_{3out(j)}$ and $G_{Dout(j)}$ from the horizontal direction. The range image sensor 10G operates by signal-based gating for manipulating the sensitiveness and insensitiveness performed by a row selection unit arranged in a peripheral portion thereof.

Figure 25:
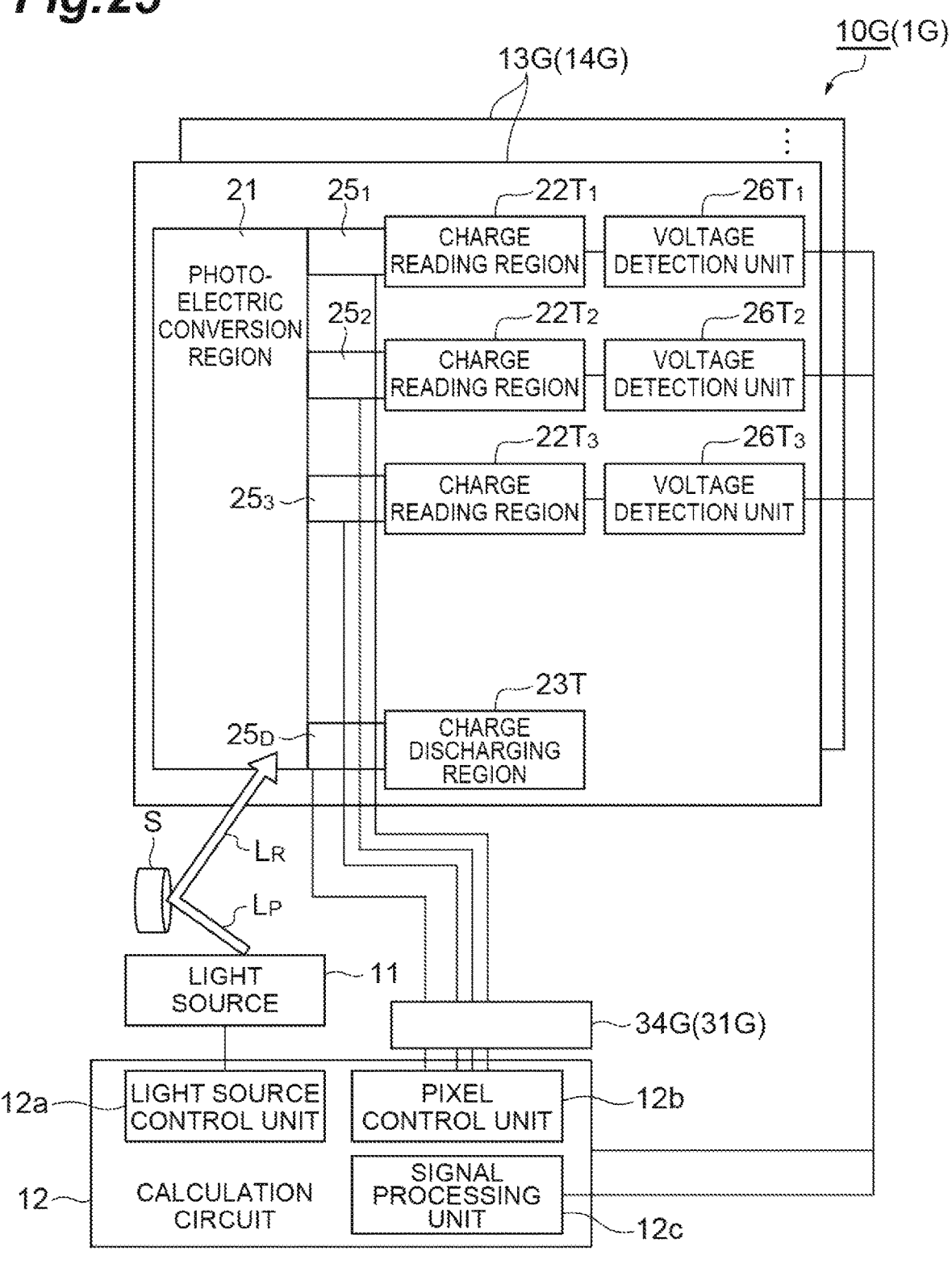
FIG. 25 is a block diagram illustrating a schematic configuration of a range image sensor according to an eighth embodiment.

FIG. 25 is a block diagram illustrating a schematic configuration of the range image sensor 10G. The range image sensor 10G is different from range image sensor 10 according to the first embodiment in terms of a configuration of a peripheral circuit 31G. In addition, the range image sensor 10G is different from the range image sensor 10 in terms of the element configuration and the circuit configuration of the pixel circuit 13G. For example, the pixel circuit 13 has the four control electrodes $25_1$ to $25_4$ and the four charge reading regions $22_1$ to $22_4$. That is, the pixel circuit 13 has a so-called four-tap configuration. On the other hand, the pixel circuit 13G has the three control electrodes $25_1$ to $25_3$ and three charge reading regions $22T_1$ to $22T_3$. That is, the pixel circuit 13G has a so-called 3-tap configuration.

The pixel circuit 13G has the photoelectric conversion region 21, the charge reading regions $22T_1$ to $22T_3$, a charge discharging region 23T, voltage detection units $26T_1$ to $26T_3$, and the control electrodes $25_1$ to $25_3$ and $25_D$.

Figure 26:
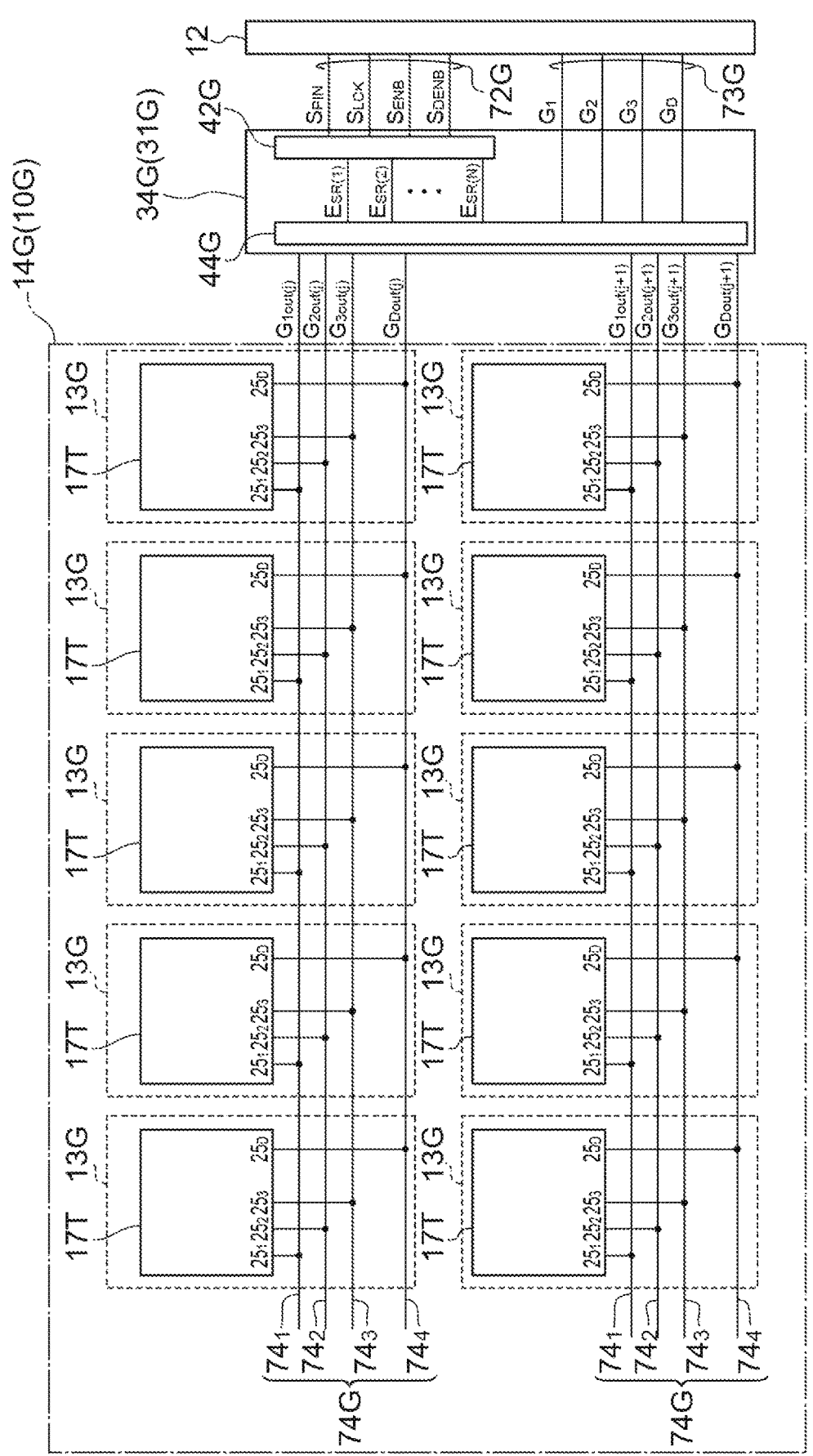
FIG. 26 is a block diagram of a detailed configuration of the range image sensor according to the eighth embodiment.

FIG. 26 is a diagram illustrating a connection configuration between the pixel circuits 13G and the peripheral circuit 31G. The range image sensor 10G has a plurality of the pixel circuits 13G, the peripheral circuit 31G, and a wiring portion 74G. The pixel circuit 13G has a signal charge processing region 17T. The pixel circuit 13G does not have the configuration corresponding to the NOR-type driver circuits $41_1$ to $41_4$ included in the pixel circuits 13. In addition, the pixel circuit 13G does not have the component corresponding to the NAND-type driver circuit $41_5$ included in the pixel circuits 13.

The wiring portion 74G connects the peripheral circuit 31G to the pixel circuits 13G. The wiring portion 74G has a plurality of wirings $74_1$ to $74_4$ extending in the lateral direction. The wiring $74_1$ connects the peripheral circuit 31G to the control electrode $25_1$ of the pixel circuit 13G. The wiring $74_2$ connects the peripheral circuit 31G to the control electrode $25_2$ of the pixel circuit 13G. The wiring $74_3$ connects the peripheral circuit 31G to the control electrode $25_3$ of the pixel circuit 13G. The wiring $74_4$ connects the peripheral circuit 31G to the control electrode $25_D$ of the pixel circuit 13G.

The wirings $74_1$ to $74_4$ extend over the entire width of a pixel array 14G. Each of the wirings $74_1$ to $74_4$ is connected to the plurality of branch lines. For example, when the pixel array 14G has Y pixel circuits 13G in the width direction, Y branch lines are connected to the wiring $74_1$. One ends of the branch lines are connected to the wirings $74_1$ to $74_4$. The other ends of the branch lines are connected to the control electrodes $25_1$ to $25_3$ and $25_D$.

According to this configuration, all the pixel circuits 13G included in the j-th row can be collectively controlled. The control referred to here is control of switching between the sensitiveness and insensitiveness of the pixel circuit 13G. For example, when all the pixel circuits 13G in the j-th row are set to be sensitive, a transfer control pulse $G_{Dout(j)}<L>$ is supplied to the control electrode $25_D$ through the wiring $74_4$. In addition, when all the pixel circuits 13G in the j-th row are set to be insensitive, a transfer control pulse $G_{Dout(j)}<H>$ is supplied to the control electrode $25_D$ through the wiring $74_4$.

Figure 27:
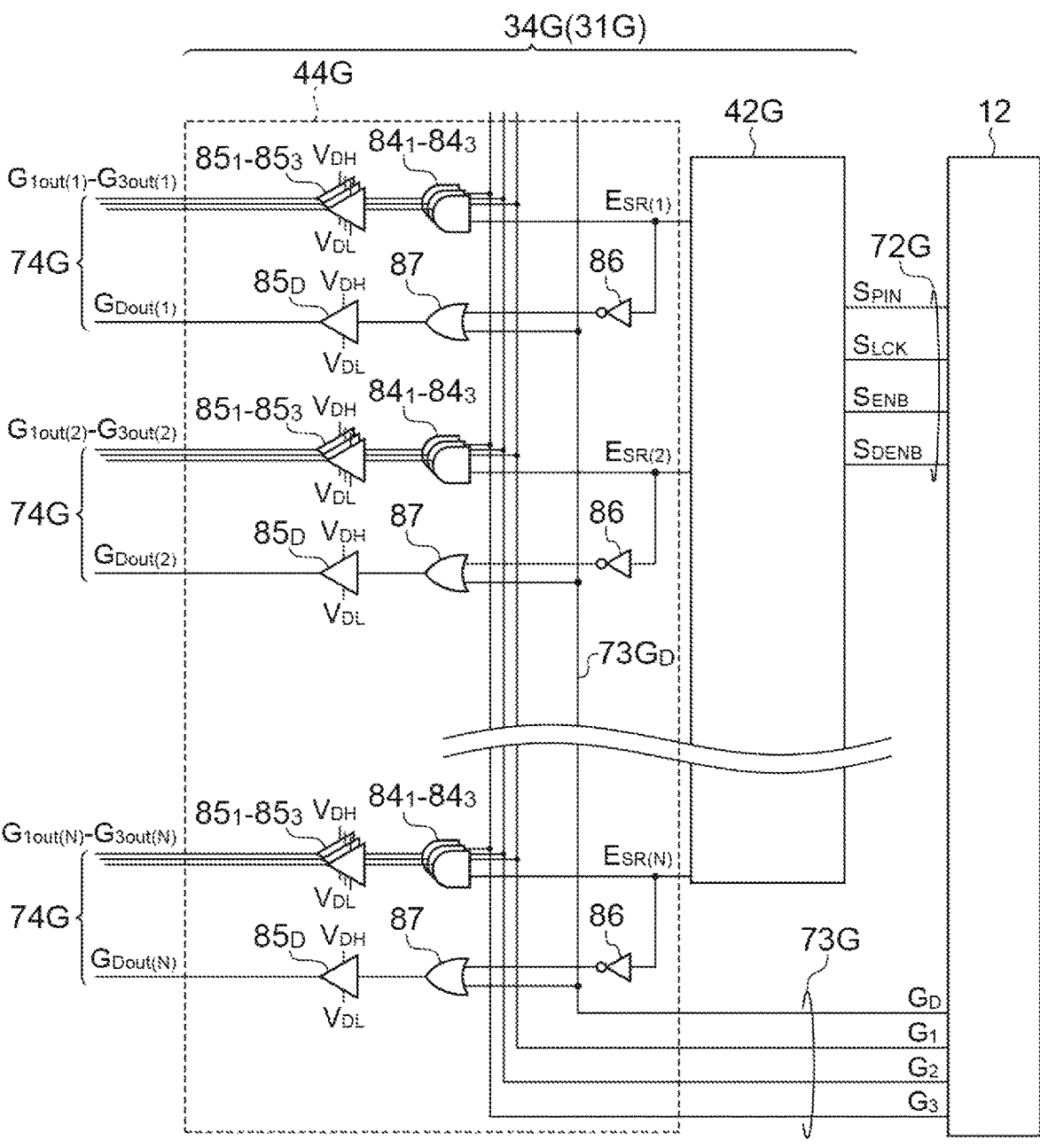
FIG. 27 is a circuit diagram illustrating a detailed configuration of a drive circuit included in the range image sensor according to the eighth embodiment.

FIG. 27 is a diagram illustrating circuit configurations of the peripheral circuit 31G. The peripheral circuit 31G includes a drive circuit 34G. The input of the drive circuit 34G is connected to the calculation circuit 12. The input of the drive circuit 34G receives the control pulses $S_{PIN}$, $S_{LCK}$, $S_{ENB}$, and $S_{DENB}$ and the control pulses $G_1$, $G_2$, $G_3$, and $G_D$ from the calculation circuit 12. The drive circuit 34G generates the transfer control pulses $G_{1out(j)}$ to $G_{3out(j)}$ and $G_{Dout(j)}$ based on the control pulses $S_{PIN}$, $S_{LCK}$, $S_{ENB}$, and $S_{DENB}$ and the control pulses $G_1$, $G_2$, $G_3$, and $G_D$. The output of the drive circuit 34G is connected to the pixel circuits 13G through the wiring portion 74G. The output of the drive circuit 34G supplies the transfer control pulses $G_{1out(j)}$ to $G_{3out(j)}$ and the transfer control pulse $G_{Dout(j)}$ to the pixel circuits 13G.

The drive circuit 34G has a row scan pattern generation circuit 42G and a logic calculation circuit 44G. The row scan pattern generation circuit 42G is connected to the calculation circuit 12 through a wiring portion 72G. The row scan pattern generation circuit 42G receives the control pulses $S_{PIN}$, $S_{LCK}$, $S_{ENB}$, and $S_{DENB}$ from the calculation circuit 12. The row scan pattern generation circuit 42G generates the logic pulse $E_{SR(j)}$ based on the control pulses $S_{PIN}$, $S_{LCK}$, $S_{ENB}$, and $S_{DENB}$.

Figure 28:
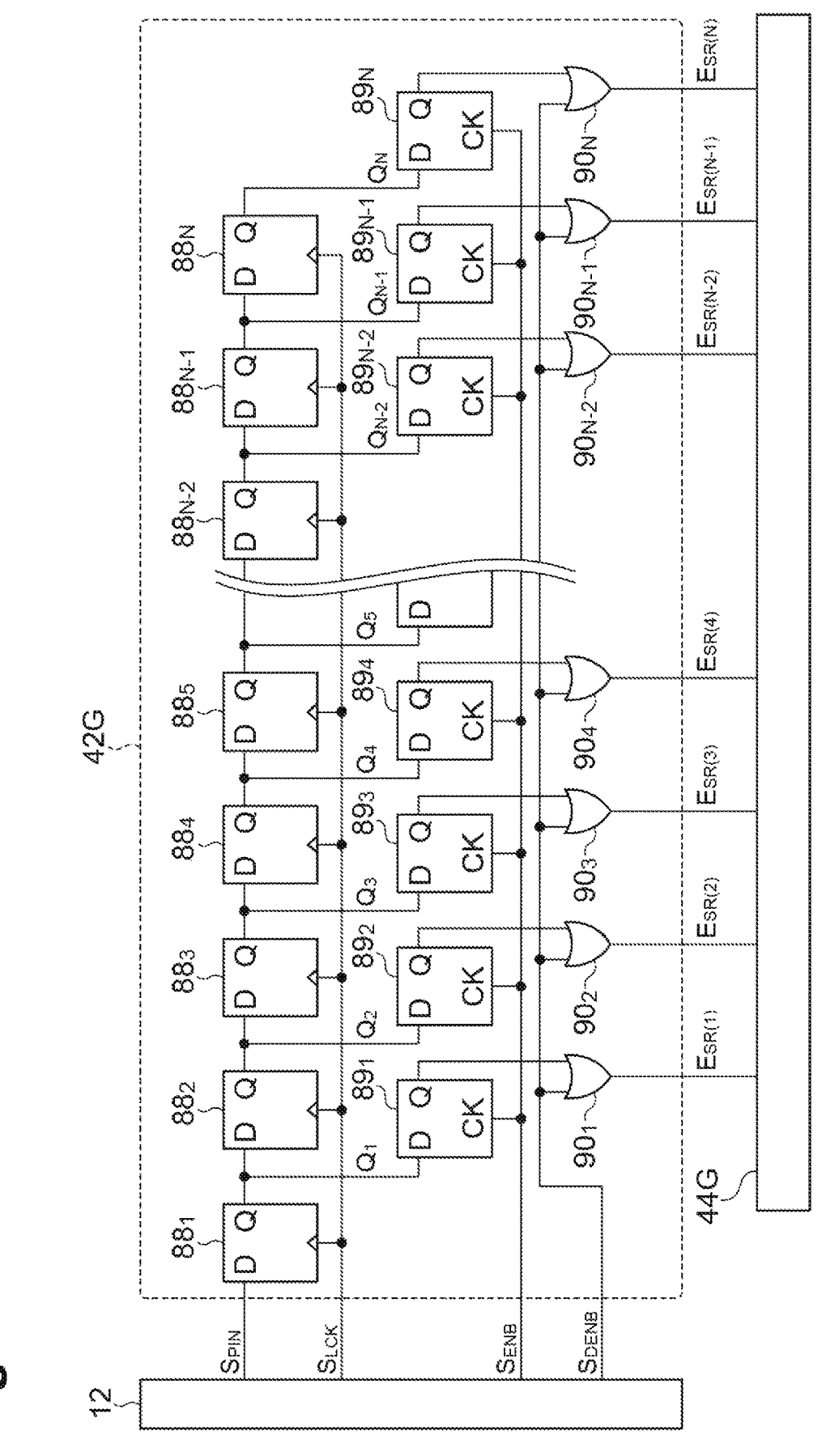
FIG. 28 is a circuit diagram illustrating a detailed configuration of a row scan pattern generation circuit.

FIG. 28 is a circuit diagram of the row scan pattern generation circuit 42G. The row scan pattern generation circuit 42G generates a logic pulse E based on the control pulses $S_{PIN}$, $S_{LCK}$, $S_{ENB}$, and $S_{DENB}$. The row scan pattern generation circuit 42G may have any circuit configuration capable of generating the logic pulses $E_{SR(1)}$ to $E_{SR(N)}$ and is not limited to the circuit configuration illustrated in FIG. 28.

The row scan pattern generation circuit 42G has a plurality of D flip-flops $88_1$ to $88_N$ and $89_1$ to $89_N$ and QR gates $90_1$ to $90_N$. The input (D) of the D flip-flop $88_1$ is connected to the calculation circuit 12. The input (D) of the D flip-flop $88_1$ receives the control pulse $S_{PIN}$. The inputs (D) of the D flip-flops $88_2$ to $88_N$ are connected to the outputs (Q) of the D flip-flops $88_1$ to $88_{N-1}$. Other inputs of the D flip-flops $88_1$ to $88_N$ receive the control pulse $S_{LCK}$. The outputs (Q) of the D flip-flops $88_1$ to $88_N$ output control pulses $Q_1$ to $Q_N$. The outputs (Q) of the D flip-flops $88_1$ to $88_{N-1}$ are connected to the inputs (D) of the D flip-flops $88_2$ to $88_N$. In addition, the outputs (Q) of the D flip-flops $88_1$ to $88_N$ are connected to the inputs (D) of the D flip-flops $89_1$ to $89_N$. The inputs (D) of the D flip-flops $89_1$ to $89_N$ are connected to the outputs (Q) of the D flip-flops $88_1$ to $88_N$. The inputs (D) of the D flip-flops $89_1$ to $89_N$ receive the control pulses $Q_1$ to $Q_N$. The inputs (CK) of the D flip-flops $89_1$ to $89_N$ receive the control pulse $S_{ENB}$. The outputs (Q) of the D flip-flops $89_1$ to $89_N$ are connected to the inputs of the OR gates $90_1$ to $90_N$. The inputs of the OR gates $90_1$ to $90_N$ receive the control pulses $Q_1$ to $Q_N$ and $S_{DENB}$. The outputs of the OR gates $90_1$ to $90_N$ output the logic pulses $E_{SR(1)}$ to $E_{SR(N)}$.

Figure 29:
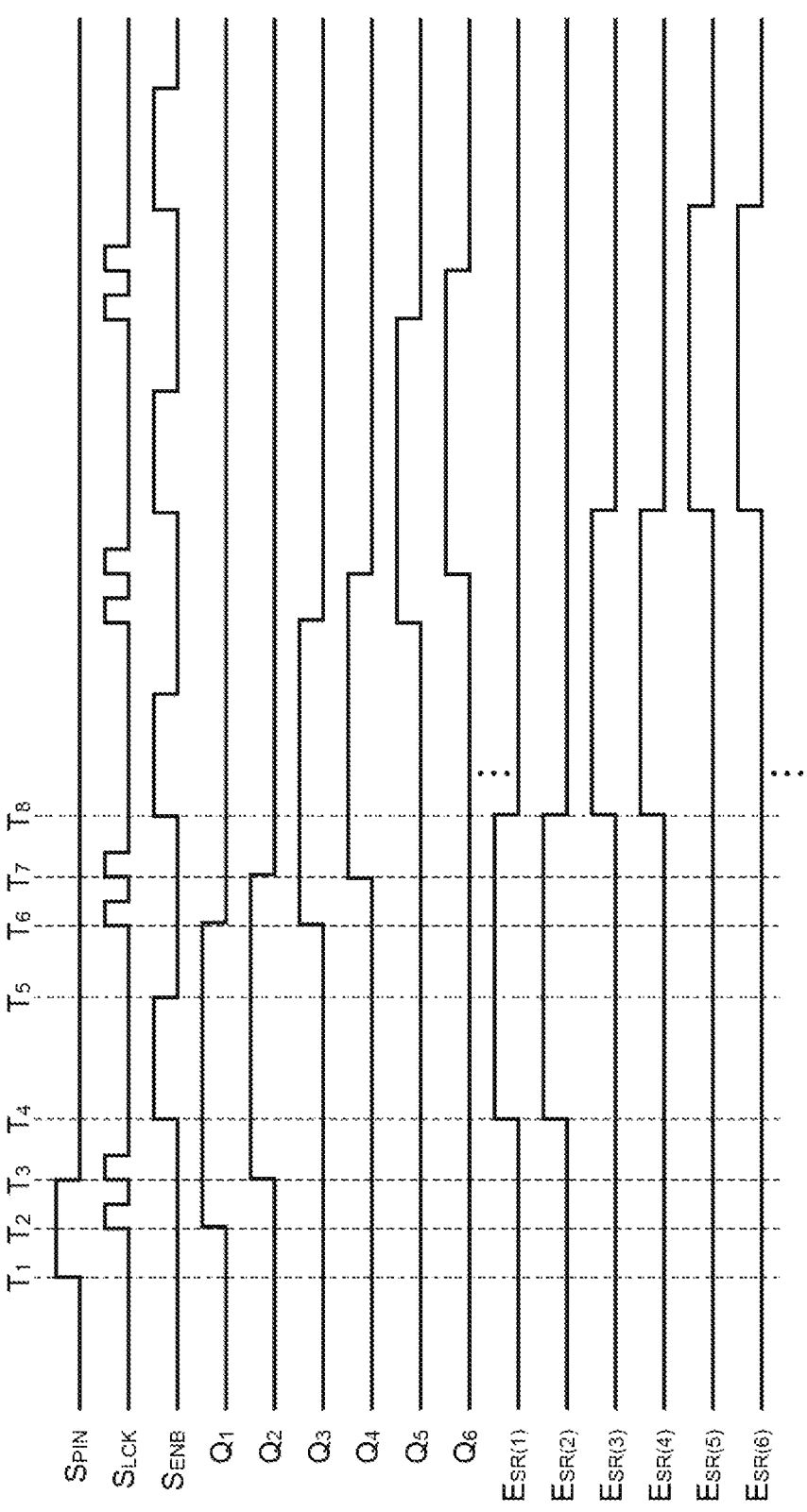
FIG. 29 is a timing chart related to the row scan pattern generation circuit illustrated in FIG. 28.

FIG. 29 is a timing chart illustrating an operation example of the row scan pattern generation circuit 42G. The timing chart illustrated in FIG. 29 illustrates an example of the operations of the row scan pattern generation circuit 42G. The timing chart illustrated in FIG. 29 outputs the logic pulse $E_{SR(j)}$ for scanning by two rows. FIG. 29 illustrates a chart corresponding to the pixel array 14G up to the sixth row.

First, at a timing $T_1$, the D flip-flop $88_1$ receives a control pulse $S_{PIN}<H>$.

Next, at a timing T2, the D flip-flops $88_1$ to $88_N$ receive a control pulse $S_{LCK}<H>$. As a result, the D flip-flop $88_1$ outputs a control pulse $Q_1<H>$. The D flip-flops $88_2$ to $88_N$ output control pulses $Q_2<L>$ to $Q_N<L>$. After that, the D flip-flops $88_1$ to $88_N$ receive a control pulse $S_{LCK}<L>$.

Next, at a timing T3, the D flip-flop $88_1$ receives a control pulse $S_{PIN}<L>$. In addition, the D flip-flops $88_1$ to $88_N$ receive the control pulse $S_{LCK}<H>$ again. As a result, the D flip-flops $88_1$ and $88_2$ output the control pulses $Q_1<H>$ and $Q_2<H>$. The D flip-flops $88_3$ to $88_N$ output control pulses $Q_3<L>$ to $Q_N<L>$. After a predetermined period of time has elapsed, the D flip-flops $88_1$ to $88_N$ receive the control pulse $S_{LCK}<L>$.

Next, at a timing T4, the D flip-flops $89_1$ to $89_N$ receive a control pulse $S_{ENB}<H>$. As a result, the OR gates $90_1$ and $90_2$ output the logic pulses $E_{SR(1)}<H>$ and $E_{SR(2)}<H>$. The OR gates $90_3$ to $90_N$ output the logic pulses $E_{SR(3)}<L>$ to $E_{SR(N)}<L>$. When the logic pulses $E_{SR(1)}$ to $E_{SR(N)}$ are output, the pixel circuits 13G in the first row (j=1) and the second row (j=2) are in the sensitive state. On the other hand, the pixel circuits 13G in other rows (j=3 to N) are in the insensitive state. After the predetermined period of time, the D flip-flops $89_1$ to $89_N$ receive a control pulse $S_{ENB}<L>$.

Next, at a timing T5, the D flip-flops $88_1$ to $88_N$ receive the control pulse $S_{ENB}<L>$. The D flip-flops $88_1$ and $88_2$ continuously output the control pulses $Q_1<H>$ and $Q_2<H>$. On the other hand, the D flip-flops $88_3$ to $88_N$ continuously output the control pulses $Q_3<L>$ to $Q_N<L>$.

Next, at a timing T6, the D flip-flops $88_1$ to $88_N$ receive the control pulse $S_{LCK}<H>$ again. As a result, the D flip-flops $88_2$ and $88_3$ output the control pulses $Q_2<H>$ and $Q_3<H>$. On the other hand, the D flip-flops $88_1$, $88_4$ to $88_N$ output control pulses $Q_1<L>$ and $Q_4<L>$ to $Q_N<L>$. After a predetermined period of time has elapsed, the D flip-flops $88_1$ to $88_N$ receive the control pulse $S_{LCK}<L>$.

Next, at a timing T7, the D flip-flops $88_1$ to $88_N$ receive the control pulse $S_{LCK}<H>$ again. As a result, the D flip-flops $88_3$ and $88_4$ output the control pulses $Q_3<H>$ and $Q_4<H>$. On the other hand, the D flip-flops $88_1$, $88_2$, $88_5$ to $88_N$ output the control pulses $Q_1<L>$, $Q_2<L>$, and $Q_5<L>$ to $Q_N<L>$. After a predetermined period of time has elapsed, the D flip-flops $88_1$ to $88_N$ receive the control pulse $S_{LCK}<L>$.

Next, at a timing T8, the D flip-flops $89_1$ to $89_N$ receive the control pulse $S_{ENB}<H>$. As a result, OR gates $90_3$ and $90_4$ output the logic pulses $E_{SR(3)}<H>$ and $E_{SR(4)}<H>$. OR gates $90_1$, $90_2$, and $90_5$ to $90_N$ output the logic pulses $E_{SR(1)}<L>$, $E_{SR(2)}<L>$, and $E_{SR(5)}<L>$ to $E_{SR(N)}<L>$. When the logic pulses $E_{SR(1)}$ to $E_{SR(N)}$ are output, the pixel circuits 13G in the first row (j=1) and the second row (j=2) are switched from the sensitive state to the insensitive state. The pixel circuits 13G in the third row (j=3) and the fourth row (j=4) are switched from the insensitive state to the sensitive state. The pixel circuits 13G in other rows (j=1, 2, and 5 to N) remain in the insensitive state. After the predetermined period of time, the D flip-flops $89_1$ to $89_N$ receive the control pulse $S_{ENB}<L>$.

After that, the same operation is repeated. Then, the row scan pattern generation circuit 42G outputs the logic pulse $E_{SR(j)}<H>$ and $E_{SR(j+1)}<H>$ that set the pixel circuits 13G included in the j-th and (j+1)-th rows to be sensitive. In addition, the row scan pattern generation circuit 42G output the logic pulses $E_{SR(1)}$ to $E_{SR(j-1)}$, $E_{SR(j+2)}$ to $E_{SR(N)}$ that set other rows (1 to (j−1) and (j+2) to N) to be insensitive.

The above-mentioned timing chart is an example of scanning by two rows. The row scan pattern generation circuit 42G can output the logic pulse $E_{SR(j)}$ for scanning every desired number of rows by changing the control pulses $S_{PIN}$, $S_{LCK}$, and $S_{ENB}$. Specifically, when scanning n rows at a time, the control pulse $S_{LCK}$ having by n clock pulses and the control pulse $S_{PIN}$ having a pulse width of n clock pulses may be input to the row scan pattern generation circuit 42G.

FIG. 27 is referred to, again. The input of the logic calculation circuit 44G is connected to the calculation circuit 12 through a wiring portion 73G. Another input of the logic calculation circuit 44G is also connected to the row scan pattern generation circuit 42G. The output of the logic calculation circuit 44G is connected to a plurality of the pixel circuits 13G through the wiring portion 74G. The logic calculation circuit 44G receives the control pulses $G_1$ to $G_3$ and $G_D$ from the calculation circuit 12 and receives the logic pulse $E_{SR(j)}$ from the row scan pattern generation circuit 42G. The logic calculation circuit 44G generates the transfer control pulses $G_{1out(j)}$ to $G_{3out(j)}$ and $G_{Dout(j)}$ based on the control pulses $G_1$ to $G_3$ and $G_D$ and the logic pulse $E_{SR(j)}$. The logic calculation circuit 44G supplies the transfer control pulses $G_{1out(j)}$ to $G_{3out(j)}$ and $G_{Dout(j)}$ to the pixel circuits 13G.

The logic calculation circuit 44G performs the logic operation on the control pulses $G_1$ to $G_3$ and $G_D$ and the logic pulse $E_{SR(j)}$. As a result of the logic operation, the transfer control pulses $G_{1out(j)}$ to $G_{3out(j)}$ and $G_{Dout(j)}$ are generated.

The logic calculation circuit 44G has AND gates $84_1$ to $84_3$, buffer circuits $85_1$ to $85_3$ and $85_D$, an inverter circuit 86, and an OR gate 87. The buffer circuits $85_1$ to $85_3$ and $85_D$ output the transfer control pulses $G_{1out(j)}$ to $G_{3out(j)}$ and $G_{Dout(j)}$ to the pixel circuits 13G included in the j-th row. The logic calculation circuit 44G has sets of the AND gates $84_1$ to $84_3$ and $84_D$, the buffer circuits $85_1$ to $85_3$ and $85_D$, the inverter circuit 86, and the OR gate 87 as many as the number of rows of the pixel circuit 13G.

The calculation circuit 12 and the row scan pattern generation circuit 42G are connected to the inputs of the AND gates $84_1$ to $84_3$. The AND gates $84_1$ to $84_3$ receive the control pulses $G_1$ to $G_3$ from the wiring portion 73G and receive the logic pulse $E_{SR(j)}$ from the row scan pattern generation circuit 42G.

The outputs of the AND gates $84_1$ to $84_3$ are connected to the buffer circuits $85_1$ to $85_3$. The AND gates $84_1$ to $84_3$ output the control pulses $G_{1(j)}$ to $G_{3(j)}$ generated based on the control pulses $G_1$ to $G_3$ and the logic pulse $E_{SR(j)}$.

The inputs of the buffer circuits $85_1$ to $85_3$ are connected to the outputs of the AND gates $84_1$ to $84_3$. The outputs of the buffer circuits $85_1$ to $85_3$ are connected to wirings $74_1$ to $74_3$. The buffer circuits $85_1$ to $85_3$ shape the control pulses $G_{1(j)}$ to $G_{3(j)}$ and output the control pulses $G_{1(j)}$ to $G_{3(j)}$ to the wirings $74_1$ to $74_3$ as the transfer control pulses $G_{1out(i)}$ to $G_{3out(i)}$.

The input of the inverter circuit 86 is connected to the row scan pattern generation circuit 42G. The inverter circuit 86 receives the logic pulse $E_{SR(j)}$ from the row scan pattern generation circuit 42G. The output of the inverter circuit 86 is connected to the input of the OR gate 87. The inverter circuit 86 supplies the inverted signal of the logic pulse $E_{SR(j)}$ to the input of the OR gate 87. The output of the inverter circuit 86 and a wiring $73G_D$ are connected to the input of the OR gate 87. The OR gate 87 receives the inverted signal of the logic pulse $E_{SR(j)}$ from the inverter circuit 86 and receives the control pulse $G_D$ from the wiring $73G_D$. The output of the OR gate 87 is connected to the buffer circuit $85_D$.

The OR gate 87 supplies a control pulse $G_{D(j)}$ to the buffer circuit $85_D$. The output of the OR gate 87 is connected to the input of the buffer circuit $85_D$. The buffer circuit $85_D$ receives the control pulse $G_{D(j)}$ from the OR gate 87. The output of the buffer circuit $85_D$ is connected to the wiring $74_4$. The buffer circuit $85_D$ shapes the control pulse $G_{D(j)}$ and outputs the control pulse $G_{D(j)}$ to the wiring $74_4$ as a transfer control pulse $G_{Dout(j)}$.

Eighth Embodiment/Element Configuration

Figure 30:
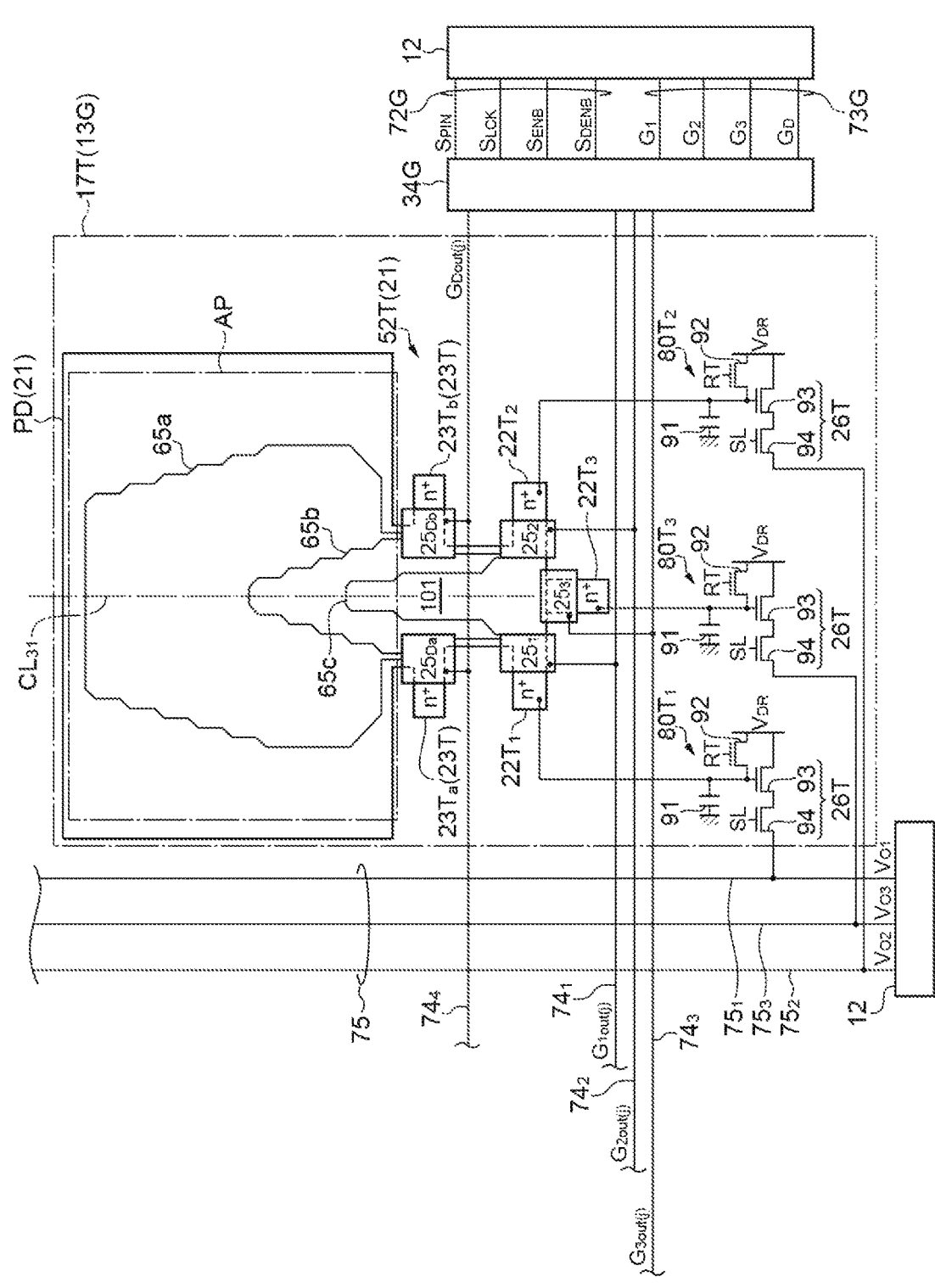
FIG. 30 is a diagram illustrating a detailed configuration of a pixel circuit included in a range image sensor according to the eighth embodiment.

FIG. 30 illustrates a configuration of the pixel circuit 13G. The pixel circuit 13G has the photoelectric conversion region 21 and read circuits 80$T_1$ to 80$T_3$. The photoelectric conversion region 21 receives a light and generates electric charges. The read circuits 80$T_1$ to 80$T_3$ output voltages $V_{O1}$ to $V_{O3}$ corresponding to the electric charges to the calculation circuit 12 through a wiring portion 75.

The photoelectric conversion region 21 has a photodiode PD and a charge transfer unit 52T. The photoelectric conversion region 21 has a structure based on the principle of a lateral electric field control charge modulator (LEFM) developed by the inventors of the present invention. The lateral electric field control charge modulator controls an electric field of a charge transport path by the lateral electric field generated by the plurality of gates provided on the sides thereof, so that high-speed electron transport control is performed.

The photodiode PD generates the electric charges in accordance with light received through an opening AP. The electric charges are supplied to the charge transfer unit 52T. The photodiode PD generates the electric charges in accordance with light having a wavelength of, for example, 870 nanometers. It is noted that the photodiode PD may generate the electric charges corresponding to the light of the wavelength that is a detection target.

The charge transfer unit 52T receives electric charges supplied from the photodiode PD. The charge transfer unit 52T selectively supplies the electric charges to any one of the read circuits 80$T_1$ to 80$T_3$. The charge transfer unit 52T has semiconductor regions 65$a$, 65$b$, and 65$c$, a charge discharging region 23T, the charge reading regions 22$T_1$ to 22$T_3$, and control electrodes 25$_1$ to 25$_3$, 25$_{Da}$, and 25$_{Db}$.

The semiconductor regions 65$a$, 65$b$, and 65$c$ collect electric charges generated in the photodiode PD. The semiconductor regions 65$a$, 65$b$, and 65$c$ form a charge transfer path 101 that transfers electric charges to any one of the charge discharging region 23T and the charge reading regions 22$T_1$ to 22$T_3$.

The charge discharging region 23T is arranged on the charge transfer path 101 of the electric charges from the photoelectric conversion region 21 towards the charge reading regions 22$T_1$ to 22$T_3$. The charge discharging region 23T has the control electrode 25$_{Da}$ and a charge discharging region 23$T_a$ and the control electrode 25$_{Db}$ and a charge discharging region 23$T_b$. A pair of the control electrodes 25$_{Da}$ and 25$_{Db}$ are arranged to interpose the charge transfer path 101 therebetween. In other words, the charge transfer path 101 exists between the control electrode 25$_{Da}$ and the control electrode 25$_{Db}$. The charge discharging region 23$T_a$ is arranged to be in contact with control electrode 25$_{Da}$. The charge discharging region 23$T_b$ is arranged to be in contact with control electrode 25$_{Db}$. With such an arrangement of the control electrodes 25$_{Da}$ and 25$_{Db}$, the potential distribution in the charge transfer path 101 can be controlled in accordance with voltage (transfer control pulse $G_{Dout(j)}$) applied to the control electrodes 25$_{Da}$ and 25$_{Db}$.

Figure 31:
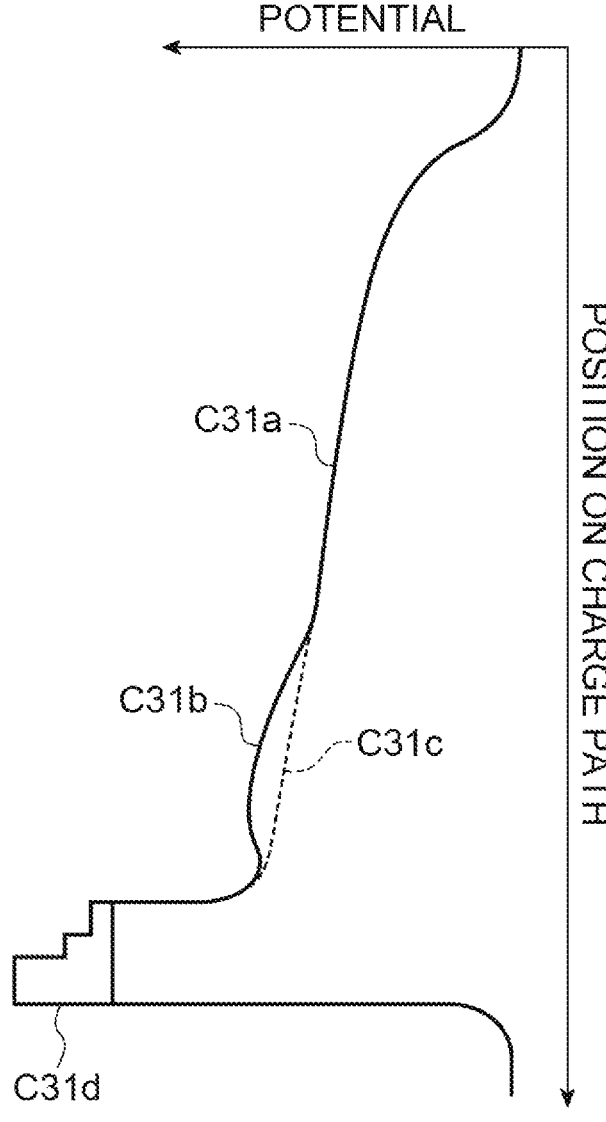
FIG. 31 is a diagram illustrating a potential distribution for a pixel circuit of FIG. 30.

FIG. 31 illustrates a potential distribution in a dashed-dotted line $CL_{31}$ including the charge transfer path 101 illustrated in FIG. 30. The vertical axis indicates a position on the charge transfer path 101. The horizontal axis indicates a potential. Further, a graph C31$a$ corresponds to a region of photodiode PD in FIG. 30. Graphs C31$b$ and C31$c$ correspond to a region interposed between the control electrodes 25$_{Da}$ and 25$_{Db}$ in FIG. 30 and a region of a downstream side thereof. A graph C31$d$ corresponds to the control electrode 25$_2$ and a charge reading region 22$T_2$.

As illustrated in FIG. 30, the region interposed between the drain regions (control electrodes 25$_{Da}$ and 25$_{Db}$) exists on the charge transfer path reaching from the photodiode PD generating the electric charges to the charge reading regions 22$T_1$ to 22$T_3$. The potential in the region interposed between the drain regions is controlled by the transfer control pulse $G_{Dout(j)}$ supplied to the control electrodes 25$_{Da}$ and 25$_{Db}$.

For example, when the transfer control pulse $G_{Dout(j)}$<H> is supplied to the control electrodes 25$_{Da}$ and 25$_{Db}$, the potential is as illustrated in the graph C31$b$. In this case, the electric charges are caught in the region (graph C31$b$) interposed between the drain regions during the moving from the photodiode PD (graph C31$a$) toward the charge reading regions 22$T_1$ to 22$T_3$, and the electric charges are discharged to the charge discharging regions 23$T_a$ and 23$T_b$. That is, the electric charges cannot reach charge reading regions 22$T_1$ to 22$T_3$ from the photodiodes PD. The potential distribution illustrated in a graph C33$b$ is also referred to as potential depression. When the pixel circuit 13G has such a potential distribution, the pixel circuit 13G is insensitive.

On the other hand, when the transfer control pulse $G_{Dout(j)}$<L> is supplied to the control electrodes 25$_{Da}$ and 25$_{Db}$, the potential is as illustrated in the graph C31$c$. In this case, the electric charges are not caught in the region (graph C31$b$) interposed between the drain regions during the moving from the photodiode PD (graph C31$a$) toward the charge reading regions 22$T_1$ to 22$T_3$. That is, the electric charges can reach charge reading regions 22$T_1$ to 22$T_3$ from the photodiodes PD. When the pixel circuit 13G has such a potential distribution, it can be said that the pixel circuit 13G is sensitive.

That is, the sensitiveness or insensitiveness of the pixel circuit 13G is not controlled by the transfer control pulses $G_{1out(j)}$ to $G_{3out(j)}$ supplied to the control electrodes 25$_1$ to 25$_3$. The sensitiveness or insensitiveness of the pixel circuit 13G is determined by the transfer control pulse $G_{Dout(j)}$ supplied to the control electrodes 25$_{Da}$ and 25$_{Db}$. For example, even when the transfer control pulse $G_{Dout(j)}$<H> for transferring the electric charges to the control electrode 25$_1$ is supplied, in a case where the transfer control pulse $G_{Dout(j)}$<H> for transferring the electric charges to the control electrodes 25$_{Da}$ and 25$_{Db}$ is supplied, the pixel circuit 13G becomes insensitive. This is because the charge discharging region 23T is provided between the photoelectric conversion region 21 and the charge reading region 22$T_1$. According to the arrangements, when the transfer control pulse $G_{Dout(j)}$<H> for transferring the electric charges to the control electrodes 25$_{Da}$ and 25$_{Db}$ is supplied, the electric charges generated in the photoelectric conversion region 21 are captured by the charge discharging region 23T before the electric charges reach charge reading region 22$T_1$.

The wiring 74$_4$ is connected to the control electrodes 25$_{Da}$ and 25$_{Db}$. The control electrodes 25$_{Da}$ and 25$_{Db}$ receive the transfer control pulse $G_{Dout(j)}$ from the wiring 74$_4$. The control electrodes 25$_{Da}$ and 25$_{Db}$ are switched between permission and inhibition of the transfer of the electric charges from the semiconductor regions 65$b$ and 65$c$ to the charge discharging region 23T in accordance with transfer control pulse $G_{Dout(j)}$. When the control electrodes 25$_{Da}$ and 25$_{Db}$ receive the transfer control pulse $G_{Dout(j)}$<H>, the transfer of the electric charges from the semiconductor regions 65$b$ and 65$c$ to the charge discharging regions 23$T_a$ and 23$T_b$ is permitted. When the control electrodes 25$_{Da}$ and 25$_{Db}$ receive the transfer control pulse $G_{Dout(j)}$<L>, the transfer of the electric charges from the semiconductor regions 65$b$ and 65$c$ to the charge discharging regions 23$T_a$ and 23$T_b$ is inhibited.

The charge discharging region 23T is connected to the high potential line $V_{DH}$. During the period when the photodiode PD receives a light, the electric charges are continuously generated. On the other hand, when a predetermined process is performed on the electric charges in the charge reading regions $22T_1$ to $22T_3$, the transfer of the electric charges to the charge reading regions $22T_1$ to $22T_3$ is inhibited. Therefore, the charge discharging region $23T$ receives the electric charges generated during the period when the transfer of the electric charges to the charge reading regions $22T_1$ to $22T_3$ is inhibited. In other words, no electric charges are accumulated in the charge reading regions $22T_1$ to $22T_3$ during the period when the charge discharging region $23T$ receives the electric charges.

The charge reading regions $22T_1$ to $22T_3$ are connected to the semiconductor region $65c$ through control electrodes $25_1$ to $25_3$. The control electrodes $25_1$ to $25_3$ are connected to the wirings $74_1$ to $74_3$, respectively. The control electrodes $25_1$ to $25_3$ receive the transfer control pulses $G_{1out(j)}$ to $G_{3out(j)}$ from the wirings $74_1$ to $74_3$. The control electrodes $25_1$ to $25_3$ transfer the electric charges from the semiconductor region $65c$ to any one of the charge reading regions $22T_1$ to $22T_3$ in accordance with transfer control pulses $G_{1out(j)}$ to $G_{3out(j)}$.

For example, when the control electrode $25_1$ receives the transfer control pulse $G_{1out(j)}$<H> and the control electrodes $25_2$ and $25_3$ receive the transfer control pulses $G_{2out(j)}$<L> and $G_{3out(j)}$<L>, the electric charges are transferred from the semiconductor region $65c$ to the charge reading region $22T_1$. When the control electrode $25_2$ receives the transfer control pulse $G_{2out(j)}$<H> and the control electrodes $25_1$ and $25_3$ receive the transfer control pulses $G_{1out(j)}$<L> and $G_{3out(j)}$ <L>, the electric charges are transferred from the semiconductor region $65c$ to the charge reading region $22T_2$. When the control electrode $25_3$ receives the transfer control pulse $G_{3out(j)}$<H> and the control electrodes $25_1$ and $25_2$ receive the transfer control pulses $G_{1out(j)}$<L> and $G_{2out(j)}$<L>, the electric charges are transferred from the semiconductor region $65c$ to the charge reading region $22T_3$.

The charge reading regions $22T_1$ to $22T_3$ are connected to the read circuits $80T_1$ to $80T_3$, respectively. The inputs of the read circuits $80T_1$ to $80T_3$ are connected to the charge reading regions $22T_1$ to $22T_3$, respectively. The outputs of the read circuits $80T_1$ to $80T_3$ are connected to wirings $75_1$ to $75_3$, respectively. On the other hand, the read circuits $80T_1$ to $80T_3$ have a common circuit configuration. Hereinafter, circuit configurations of the read circuit $80T_1$ will be described in detail, and the description of the read circuits $80T_2$ and $80T_3$ will be omitted.

The read circuit $80T_1$ has a capacitor $91$, a MOS transistor $92$, and a voltage detection unit $26T$.

One end of the capacitor $91$ is connected to the charge reading region $22T_1$. The other end of the capacitor $91$ is connected to the reference potential line.

The MOS transistor $92$ discharges the electric charges remaining in the charge reading region $22T_1$ after the read operation. The MOS transistor $92$ is for resetting the so-called the charge reading region $22T_1$. The source of the MOS transistor $92$ is connected to the charge reading region $22T_1$. The gate of the MOS transistor $92$ receives the reset pulse RT through a wiring (not illustrated). The drain of the MOS transistor $92$ is connected to the reset potential line $V_{DR}$.

The voltage detection unit $26T$ has the MOS transistors $93$ and $94$. The MOS transistors $93$ and $94$ constitute a so-called source follower amplifier. The MOS transistor $93$ outputs the voltage corresponding to the electric charges accumulated in the charge reading region $22T_1$. The source of the MOS transistor $93$ is connected to the drain of the MOS transistor $94$. The gate of the MOS transistor $93$ is connected to the charge reading region $22T_1$. The drain of the MOS transistor $93$ is connected to the reset potential line $V_{DR}$. The MOS transistor $94$ switches between supplying and stopping of the MOS voltage to a wiring $75_1$ in accordance with read control pulse SL. The source of the MOS transistor $94$ is connected to the wiring $75_1$. The gate of the MOS transistor $94$ receives the read control pulse SL through a wiring (not illustrated). The drain of the MOS transistor $94$ is connected to the source of the MOS transistor $93$.

Eighth Embodiment/Functions and Effects

A range image acquisition device $1G$ according to an eighth embodiment can achieve the same effects as the range image acquisition device $1$ according to the first embodiment. That is, the range image acquisition device $1G$ can obtain good measurement results by oversampling and integrating even when the measurement target moves at a high speed.

Similarly to the range image acquisition device $1$ according to the first embodiment, in the range image acquisition device $1G$ according to the eighth embodiment, the pixel circuit $13G$ included in a predetermined row can be collectively set as the sensitive pixel region AE. Furthermore, the pixel circuit $13G$ not included in a predetermined row can be collectively set as the insensitive pixel region AN. Therefore, the range image acquisition device $1G$ according to the eighth embodiment can perform the oversampling and integrating operations.

Ninth Embodiment

Next, a configuration of a range image sensor $10H$ included in a range image acquisition device $1H$ (refer to FIG. 32) of a ninth embodiment will be described, focusing on differences from the first embodiment. Similarly to the range image sensor $10G$ according to the eighth embodiment, the range image sensor $10H$ adopts a pixel configuration and a pixel control for controlling the sensitiveness and insensitiveness of a pixel circuit $13H$ by controlling the drain thereof. That is, the range image sensor $10H$ can control the sensitiveness and insensitiveness only by driving the drain gates (control electrodes $25_{Da}$ and $25_{Db}$). In addition, the range image sensor $10H$ does not include a driver circuit inside the pixel circuit $13H$. However, the range image sensor $10H$ adopts the pixel configuration different from that of the range image sensor $10G$. The range image sensor $10H$ supplies only the transfer control pulse $G_{Dout(j)}$) from the horizontal direction.

Figure 32:
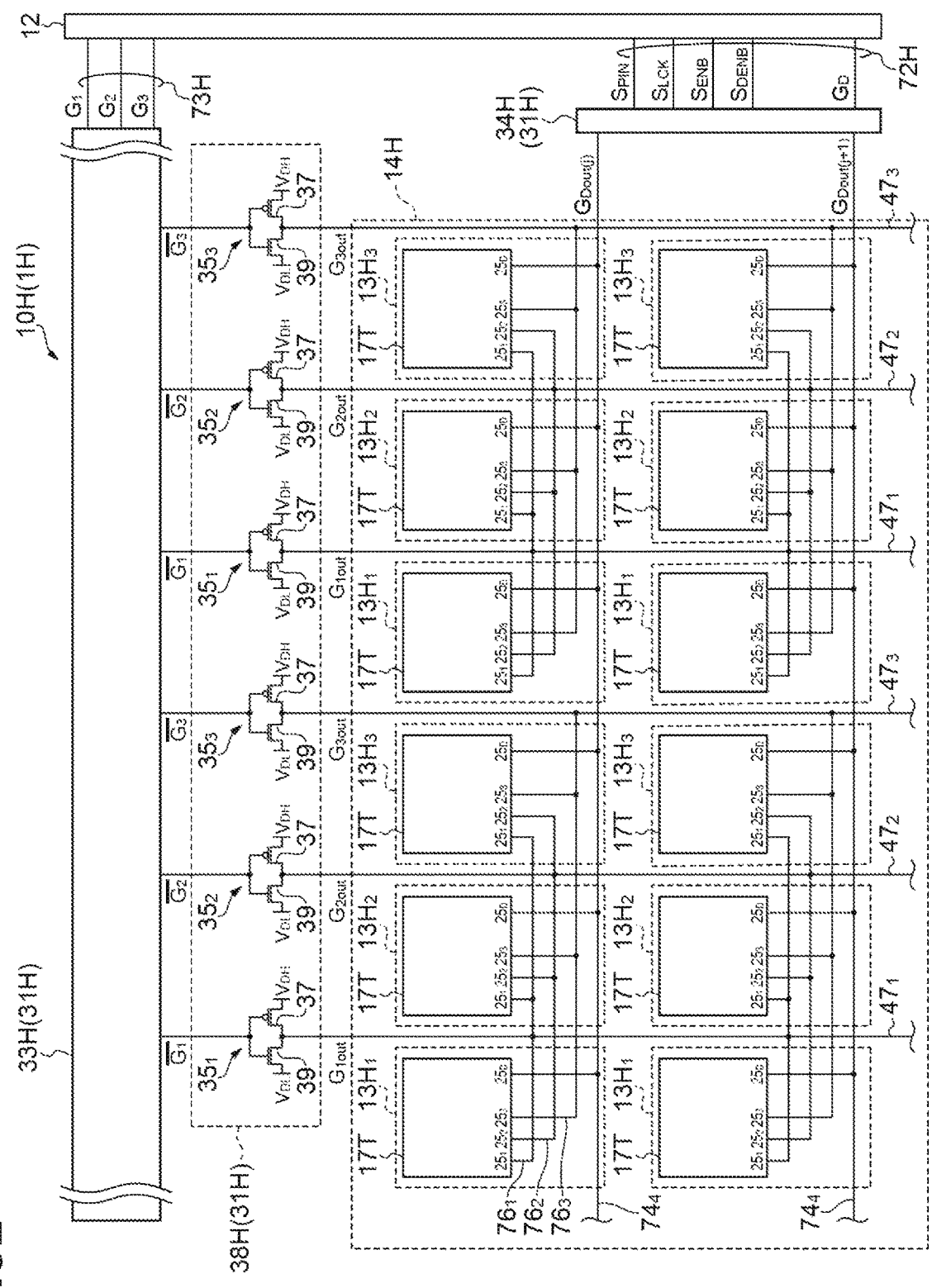
FIG. 32 is a block diagram of a detailed configuration of a range image sensor according to a ninth embodiment.

FIG. 32 is a diagram illustrating a connection configuration between the pixel circuits $13H$ and a peripheral circuit $31H$. The range image sensor $10H$ is different from range image sensor $10$ according to the first embodiment in terms of the configuration of the peripheral circuit $31H$. In addition, the range image sensor $10H$ is different from the range image sensor $10$ in terms of the element configuration and the circuit configuration of the pixel circuit $13H$. The pixel circuit $13H$ has a so-called 3-tap configuration similar to the pixel circuit $13G$ of the eighth embodiment.

The range image sensor $10H$ has a plurality of the pixel circuits $13H$, the peripheral circuit $31H$, and the wiring $74_4$. The pixel circuit $13H$ has the signal charge processing region $17T$. Similarly to the pixel circuit $13G$, the pixel circuit $13H$ does not have components corresponding to the NOR-type driver circuits $41_1$ to $41_4$ that the pixel circuit $13$ has. In addition, the pixel circuit $13H$ does not have a component corresponding to the NAND-type driver circuit $41_5$ that the pixel circuit 13 has. The wiring $74_4$ connects the peripheral circuit 31H to the control electrode $25_D$ of the pixel circuit 13H.

The peripheral circuit 31H has a distribution circuit 33H, an inverter circuit unit 38H, and an pixel switching circuit 34H.

The input of the distribution circuit 33H is connected to the calculation circuit 12 through a wiring portion 73H. The distribution circuit 33H receives the control pulses $G_1$, $G_2$, and $G_3$ from the calculation circuit 12. The output of the distribution circuit 33H is connected to the inverter circuit unit 38H. The distribution circuit 33H supplies the inverted signals of the distributed the control pulses $G_1$, $G_2$, and $G_3$ to the inverter circuit unit 38H.

The inverter circuit unit 38H has the same circuit configurations and functions as those of the inverter circuit unit 38 of the first embodiment. That is, the inverter circuit unit 38H receives the inverted signals of the control pulses $G_1$, $G_2$, and $G_3$ from the distribution circuit 33H and supplies the inverted, shaped the transfer control pulses $G_{1out}$, $G_{2out}$, and $G_{3out}$ to the pixel circuits 13H.

A connection configuration between the inverter circuit unit 38H and a pixel array 14H is the same as the connection configuration between the inverter circuit unit 38 and the pixel array 14 of the first embodiment. That is, the pixel array 14H is treated as one set of three pixel circuits $13H_1$ to $13H_3$ arranged in the lateral direction.

The control electrodes $25_1$ in the pixel circuits $13H_1$ to $13H_3$ are connected to each other by a wiring $76_1$, and a wiring $47_1$ extending from the inverter circuit unit 38H is connected to the wiring $76_1$. The wiring $47_1$ is provided between a pixel circuit $13H_1$ and a pixel circuit $13H_2$. A connection point between the wiring $47_1$ and the wiring $76_1$ is provided for each row. Similarly, the control electrodes $25_2$ of the pixel circuits $13H_1$ to $13H_3$ are connected to each other by a wiring $76_2$. The control electrodes $25_3$ of the pixel circuits $13H_1$ to $13H_3$ are connected to each other by a wiring $76_3$. The wirings $76_2$ and $76_3$ are connected to the wirings $47_2$ and $47_3$ extending from the inverter circuit unit 38H. A wiring $47_2$ is provided between the pixel circuit $13H_2$ and the pixel circuit $13H_3$. A wiring $47_3$ is provided between the pixel circuit $13H_3$ and the pixel circuit $13H_1$.

The circuit configuration for supplying the transfer control pulse $G_{Dout(j)}$ to the control electrode $25_D$ is the same as that of the eighth embodiment. That is, the plurality of branch lines are connected to the wiring $74_4$ extending in the lateral direction. Each of the branch lines is connected to each of the pixel circuits $13H_1$ to $13H_3$ included in the j-th row. Therefore, similarly to the range image sensor 10G according to the eighth embodiment, in the range image sensor 10H according to the ninth embodiment, the pixel circuits $13H_1$ to $13H_3$ of the entire row can be collectively switched from sensitive to insensitive. In addition, in the range image sensor 10H, the pixel circuits $13H_1$ to $13H_3$ of the entire row can be collectively switched from insensitive to sensitive.

The input of the pixel switching circuit 34H is connected to the calculation circuit 12 through a wiring portion 72H. The pixel switching circuit 34H receives the control pulses $S_{PIN}$, $S_{LCK}$, $S_{ENB}$, and $S_{DENB}$ and the control pulse $G_D$ from the calculation circuit 12. The pixel switching circuit 34H generates the transfer control pulse $G_{Dout(j)}$ based on the control pulses $S_{PIN}$, $S_{LCK}$, $S_{ENB}$, and $S_{DENB}$ and the control pulse $G_D$. In addition, the pixel switching circuit 34H is connected to the pixel circuits 13H through the wiring $74_4$.

The pixel switching circuit 34H supplies the transfer control pulse $G_{Dout(j)}$ to the pixel circuits 13H.

That is, the pixel switching circuit 34H is different from the drive circuit 34G of the eighth embodiment in that the pixel switching circuit 34H outputs only the transfer control pulse $G_{Dout(j)}$ and does not output the transfer control pulses $G_{1out(j)}$ to $G_{3out(j)}$.

Figure 33:
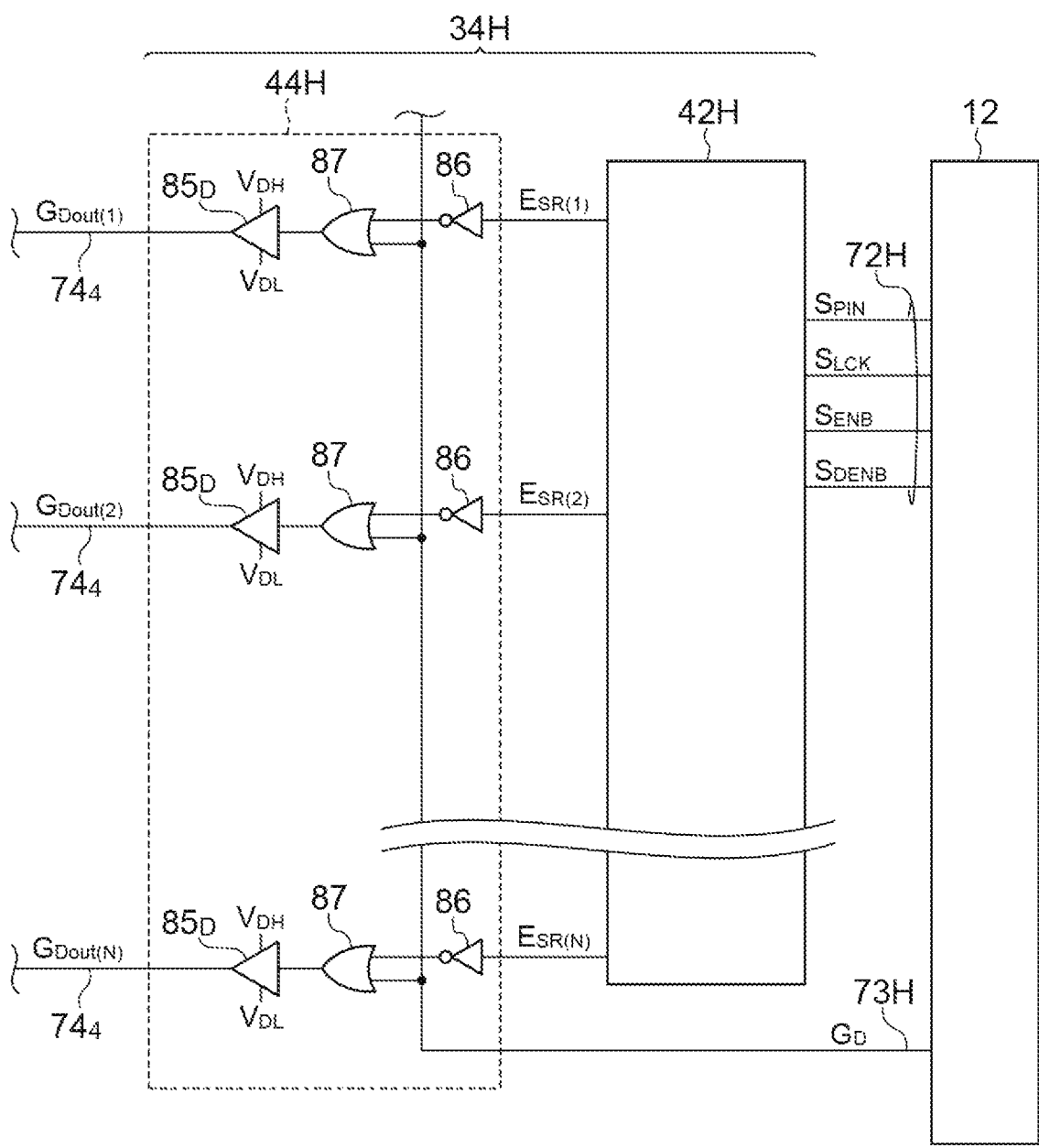
FIG. 33 is a circuit diagram illustrating a detailed configuration of a pixel switching circuit included in the range image sensor according to the ninth embodiment.

As illustrated in FIG. 33, the pixel switching circuit 34H has a row scan pattern generation circuit 42H and a logic calculation circuit 44H. The configurations and functions of the row scan pattern generation circuit 42H are the same as those of the row scan pattern generation circuit 42G of the eighth embodiment. Accordingly, a detailed description of the row scan pattern generation circuit 42H is omitted.

The input of the logic calculation circuit 44H is connected to the calculation circuit 12 and the row scan pattern generation circuit 42H. In addition, the output of the logic calculation circuit 44H is connected to the plurality of the pixel circuits 13H through the wiring $74_4$. The logic calculation circuit 44H receives the control pulse $G_D$ from the calculation circuit 12 and receives the logic pulse $E_{SR(j)}$ from the row scan pattern generation circuit 42H. The logic calculation circuit 44H performs the logic operation on the control pulse $G_D$ and the logic pulse $E_{SR(j)}$. As a result of the logic operation, the logic calculation circuit 44H generates the transfer control pulse $G_{Dout(j)}$. The logic calculation circuit 44H supplies the transfer control pulse $G_{Dout(j)}$ to the pixel circuits 13H.

The logic calculation circuit 44H has the buffer circuit $85_D$, the inverter circuit 86, and the OR gate 87. A connection configuration of the buffer circuit $85_D$, the inverter circuit 86, and the OR gate 87 is the same as that of the eighth embodiment. In addition, the operations of the buffer circuit $85_D$, the inverter circuit 86, and the OR gate 87 are the same as those of the eighth embodiment.

Ninth Embodiment/Element Configuration

Figure 34:
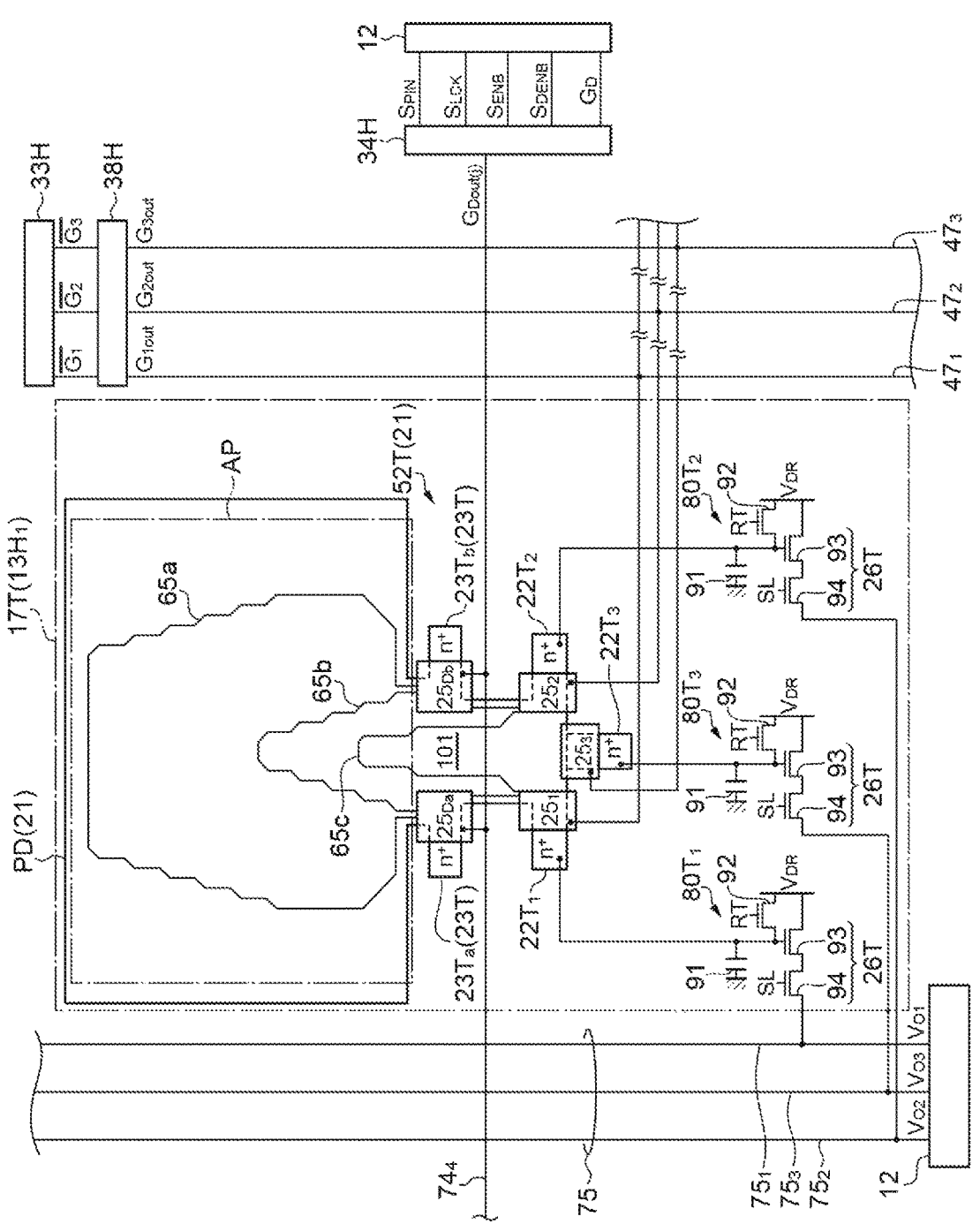
FIG. 34 is a diagram illustrating a detailed configuration of the pixel circuit included in the range image sensor according to the ninth embodiment.

FIG. 34 illustrates the configuration of the pixel circuit $13H_1$. The configuration of the pixel circuit $13H_1$ is substantially the same as that of the pixel circuit 13G. The pixel circuit 13G receives the transfer control pulses $G_{1out(j)}$ to $G_{3out(j)}$. On the other hand, the pixel circuit $13H_1$ receives the transfer control pulses $G_{1out}$ to $G_{3out}$. Further, in the pixel circuit 13G, the control electrodes $25_1$ to $25_3$ receive the transfer control pulses $G_{1out(j)}$ to $G_{3out(j)}$ from the drive circuit 34G. On the other hand, in the pixel circuit 13H, the control electrodes $25_1$ to $25_3$ receive the transfer control pulses $G_{1out(j)}$ to $G_{3out(j)}$ from the inverter circuit unit 38H. That is, the pixel circuit 13H receives the transfer control pulses $G_{1out}$ to $G_{3out}$ from the wirings $47_1$ to $47_3$ along which the control electrodes $25_1$ to $25_3$ extend in the vertical direction. In addition, the pixel circuit 13H also receives the transfer control pulse $G_{Dout(j)}$ from the wiring $74_4$ along which the control electrodes $25_{Da}$ and $25_{Db}$ extend in the lateral direction.

Except for the connection configuration described above, the configurations and functions of the photoelectric conversion region 21 and the read circuits $80T_1$ to $80T_3$ of the pixel circuit 13H are the same as those of the pixel circuit 13G.

Ninth Embodiment/Functions and Effects

A range image acquisition device 1H according to a ninth embodiment can achieve the same effects as the range image acquisition device 1 according to the first embodiment. That is, the range image sensor 10H can obtain good measurement results by oversampling and integrating even when the measurement target moves at a high speed.

Similarly to the range image acquisition device 1 according to the first embodiment, in the range image acquisition device 1H according to the ninth embodiment, the pixel circuits 13H included in a predetermined row can be collectively set as the sensitive pixel region AE. Furthermore, the pixel circuits 13H not included in a predetermined row can be collectively set as the insensitive pixel region AN. Therefore, the range image acquisition device 1H according to the ninth embodiment can perform the oversampling and integrating operations.

Similarly to the range image acquisition device 1 according to the first embodiment, in the range image acquisition device 1H according to the ninth embodiment, by the configuration in which a plurality of the wirings $47_1$ to $47_3$ electrically connecting the distribution circuit 33H and the pixel circuits 13H are arranged to be separated, crosstalk between the different the transfer control pulses $G_{1out}$ to $G_{3out}$ can be prevented, and thus, stable pixel driving can be realized. As a result, the range images with a high range resolution can be generated.

Tenth Embodiment

Next, a configuration of a range image sensor 10J included in a range image acquisition device 1J (refer to FIG. 35) according to a tenth embodiment will be described, focusing on differences from the first embodiment. Similarly to the range image sensor 10G of the eighth embodiment, the range image sensor 10J also adopts a pixel configuration and pixel control for controlling the sensitiveness and insensitiveness of a pixel circuit 13J by controlling the drains. However, the range image sensor 10J adopts a pixel configuration different from that of the range image sensor 10G. Specifically, a pixel circuit $13J_3$ of the range image sensor 10J has a driver (NAND-type driver circuit $41_5$) for the control electrodes $25_{Da}$ and $25_{Db}$ in the pixel.

Figure 35:
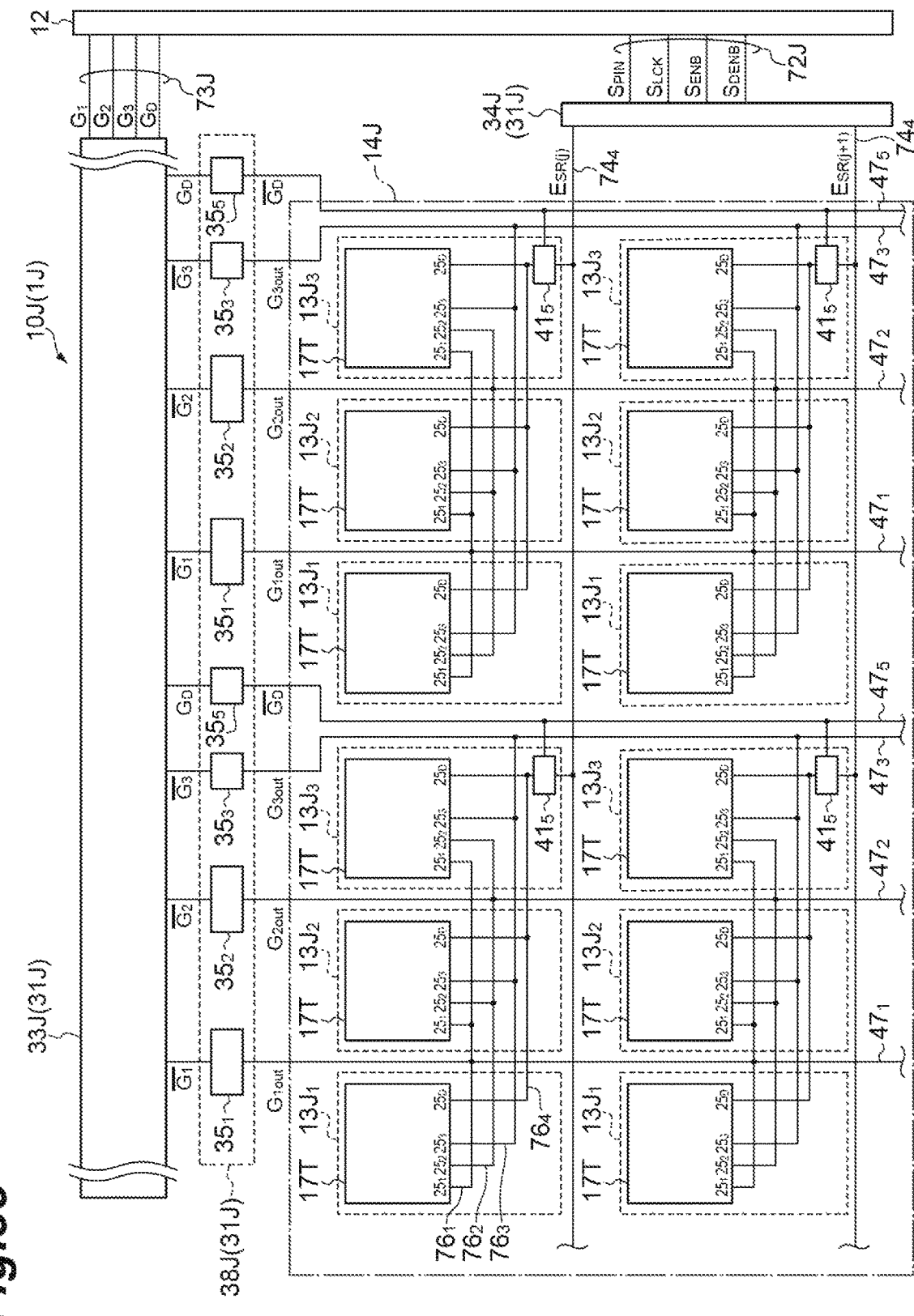
FIG. 35 is a block diagram illustrating a detailed configuration of a range image sensor according to a tenth embodiment.

FIG. 35 is a diagram illustrating a connection configuration between pixel circuits $13J_1$ to $13J_3$ and a peripheral circuit 31J. The range image sensor 10J is different from the range image sensor 10 according to the first embodiment in terms of the configuration of the peripheral circuit 31J. In addition, the range image sensor 10J is different from the range image sensor 10 in terms of the element configuration and the circuit configuration of the pixel circuits $13J_1$ to $13J_3$. The pixel circuits $13J_1$ to $13J_3$ have a so-called three-tap configuration similar to the pixel circuit 13G of the eighth embodiment.

The range image sensor 10J has a plurality of the pixel circuits $13J_1$ to $13J_3$, the peripheral circuit 31J, and the wiring $74_4$. The pixel circuits $13J_1$ to $13J_3$ have the signal charge processing region 17T. Similarly to the pixel circuit 13G, the pixel circuits $13J_1$ and $13J_2$ do not have components corresponding to the NOR-type driver circuits $41_1$ and $41_2$ included in the pixel circuits 13. On the other hand, the pixel circuit $13J_3$ has the NAND-type driver circuit $41_5$. The NAND-type driver circuit $41_5$ has the same configurations and functions as those of the NAND-type driver circuit $41_5$ included in the pixel circuit 135 according to the first embodiment. In other words, the pixel circuit $13J_3$ of the tenth embodiment is different from the pixel circuit 13G of the eighth embodiment in that the pixel circuit $13J_3$ has the NAND-type driver circuit $41_5$.

The peripheral circuit 31J has a distribution circuit 33J, an inverter circuit unit 38J, and a pixel switching circuit 34J.

The input of the distribution circuit 33J is connected to the calculation circuit 12 through a wiring portion 73J. The distribution circuit 33J receives the control pulses $G_1$ to $G_3$ and $G_D$ from the calculation circuit 12. The output of the distribution circuit 33J is connected to the inverter circuit unit 38J. The distribution circuit 33J supplies the inverted signals of the distributed the control pulses $G_1$ to $G_3$ and the control pulse $G_D$ to the inverter circuit unit 38J.

The inverter circuit unit 38J further has the inverter circuit $35_5$ in addition to the inverter circuits $35_1$ to $35_3$ included in the inverter circuit unit 38H of the ninth embodiment. That is, the inverter circuit unit 38J receives the inverted signals of the control pulses $G_1$ to $G_3$ and the control pulse $G_D$ from the distribution circuit 33J. Then, the inverter circuit unit 38J supplies the shaped the transfer control pulses $G_{1out}$ to $G_{3out}$ and the inverted signal of the control pulse $G_D$ to the pixel circuits $13J_1$ to $13J_3$.

A connection configuration between the inverter circuit unit 38J and a pixel array 14J is the same as the connection configuration between the inverter circuit unit 38H and the pixel array 14H of the ninth embodiment. On the other hand, the circuit configuration for supplying the transfer control pulse $G_{Dout(j)}$ to the control electrode $25_D$ is different from those of the eighth and ninth embodiments. Specifically, the NAND-type driver circuit $41_5$ provided in the pixel circuit $13J_3$ receives the inverted signal of the control pulse $G_D$ and the logic pulse $E_{SR(j)}$. Then, the NAND-type driver circuit $41_5$ outputs the transfer control pulse $G_{Dout(j)}$.

The control electrodes $25_D$ in the pixel circuits $13J_1$ to $13J_3$ are connected to each other by a wiring $76_4$. The output of the NAND-type driver circuit $41_5$ is connected to the wiring $76_4$. Therefore, one NAND-type driver circuit $41_5$ supplies the transfer control pulse $G_{Dout(j)}$ to the three pixel circuits $13J_1$ to $13J_3$. The inputs of the NAND-type driver circuit $41_5$ are connected to the branch line connected to the wiring $47_5$ and the branch line connected to the wiring $74_4$. The wiring $47_5$ is provided between the pixel circuit $13J_3$ and the pixel circuit $13J_1$. The wiring $74_4$ is provided between the j-th row pixel circuits $13J_1$ to $13J_3$ and the (j+1)-th row pixel circuits $13J_1$ to $13J_3$. The NAND-type driver circuit $41_5$ receives the inverted signal of the control pulse $G_D$ from the wiring $47_5$. The NAND-type driver circuit $41_5$ receives the logic pulse $E_{SR(j)}$ from the wiring $74_4$.

According to this connection configuration, whether or not the inverted signal of the control pulse $G_D$ supplied from the wiring $47_5$ is supplied to the control electrode $25_D$ can be controlled by the logic pulse $E_{SR(j)}$. That is, supplying and stopping of the transfer control pulse to the control electrode $25_D$ is controlled by the logic pulse $E_{SR(j)}$ applied from the lateral direction. As a result, similarly to the range image sensor 10G of the eighth embodiment, in the range image sensor 10J of the tenth embodiment, the pixel circuits $13J_1$ to $13J_3$ of the entire row can be collectively switched from sensitive to insensitive with logic pulse $E_{SR(j)}$. In addition, the range image sensor 10J can collectively switch the pixel circuits $13J_1$ to $13J_3$ of the entire row from insensitive to sensitive with logic pulse $E_{SR(j)}$.

The pixel switching circuit 34J is connected to the calculation circuit 12 through a wiring portion 72J. The pixel switching circuit 34J receives control pulses $S_{PIN}$, $S_{LCK}$, $S_{ENB}$, and $S_{DENB}$ from the calculation circuit 12. The pixel switching circuit 34J generates the logic pulse $E_{SR(j)}$ based on the control pulses $S_{PIN}$, $S_{LCK}$, $S_{ENB}$, and $S_{DENB}$. The pixel switching circuit 34J is connected to pixel circuits $13J_1$ to $13J_3$ through the wiring $74_4$. The pixel switching circuit 34J supplies the logic pulse $E_{SR(j)}$ to the pixel circuits $13J_1$ to $13J_3$.

That is, the pixel switching circuit 34J is different from the drive circuit 34G in that the pixel switching circuit 34J outputs only the logic pulse $E_{SR(j)}$ and does not output the transfer control pulses $G_{1out(j)}$ to $G_{3out(j)}$ and $G_{Dout(j)}$. In addition, the pixel switching circuit 34J is different from the pixel switching circuit 34H of the ninth embodiment in that the pixel switching circuit 34J outputs the logic pulse $E_{SR(j)}$ instead of the transfer control pulse $G_{Dout(j)}$.

Figure 36:
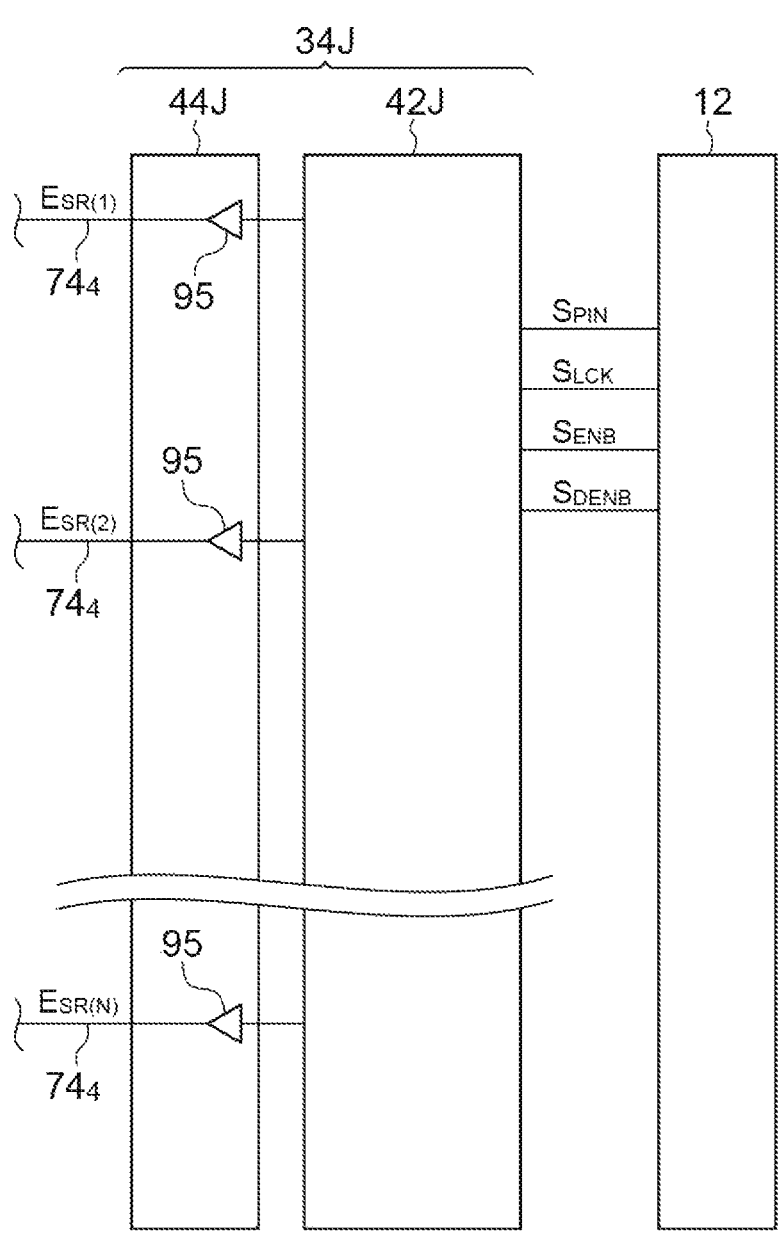
FIG. 36 is a circuit diagram illustrating a detailed configuration of a drive circuit included in the range image sensor according to the tenth embodiment.

As illustrated in FIG. 36, the pixel switching circuit 34J has a row scan pattern generation circuit 42J and a logic calculation circuit 44J. The configurations and functions of the row scan pattern generation circuit 42J are the same as those of the row scan pattern generation circuit 42G of the eighth embodiment. Accordingly, the detailed description of the row scan pattern generation circuit 42J will be omitted.

The logic calculation circuit 44J has a buffer circuit 95. The logic calculation circuit 44J supplies the logic pulse $E_{SR(j)}$ received from the row scan pattern generation circuit 42G, to the wiring $74_4$.

Tenth Embodiment/Element Configuration

Figure 37:
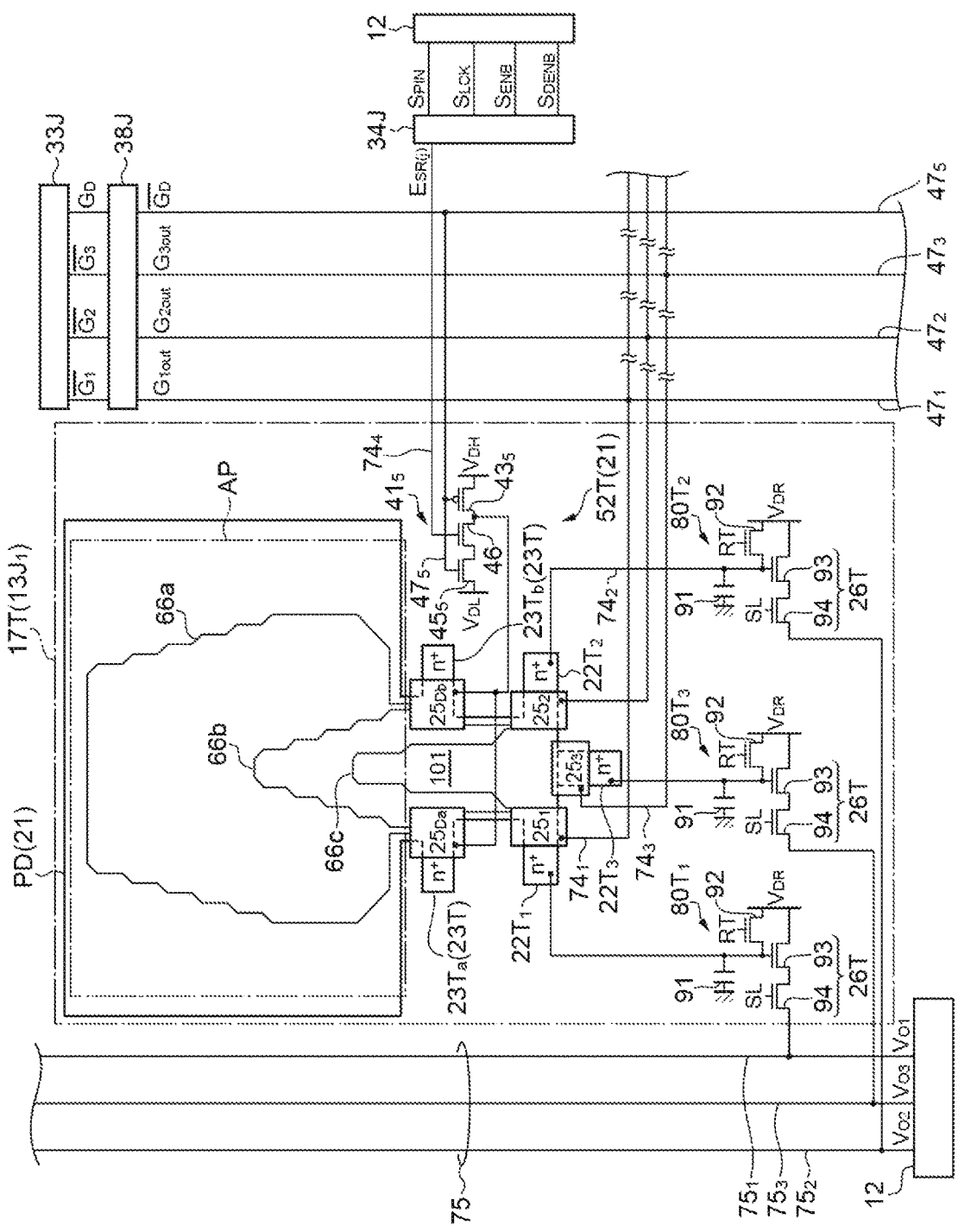
FIG. 37 is a diagram illustrating a detailed configuration of a pixel circuit included in the range image sensor according to the tenth embodiment.

Circuit configurations of the pixel circuits $13J_1$ to $13J_3$ will be described. Herein, the pixel circuit $13J_1$ will be described in detail, and detailed description of the pixel circuits $13J_2$ and $13J_3$ will be omitted. FIG. 37 illustrates a configuration of the pixel circuit $13J_1$. The pixel circuit $13J_1$ is different from the pixel circuit 13G of the eighth embodiment in that the pixel circuit $13J_1$ includes the NAND-type driver circuit $41_5$. Accordingly, in the pixel circuit $13J_1$, the transfer control pulse $G_{Dout(j)}$ supplied to the control electrodes $25_{Da}$ and $25_{Db}$ is controlled based on the logic pulse $E_{SR(j)}$ supplied from the lateral direction. Other circuit configurations of the pixel circuit $13J_1$ are the same as those of the pixel circuit 13G of the eighth embodiment.

Tenth Embodiment/Effects

A range image acquisition device 1J according to a tenth embodiment can achieve the same effects as the range image acquisition device 1 according to the first embodiment. That is, the range image sensor 10J can obtain good measurement results by oversampling and integrating even when the measurement target moves at a high speed.

Similarly to the range image acquisition device 1 according to the first embodiment, the range image acquisition device 1J according to the tenth embodiment can collectively set the pixel circuits $13J_1$ to $13J_3$ included in a predetermined row as the sensitive pixel region AE. Furthermore, the pixel circuits $13J_1$ to $13J_3$ not included in a predetermined row can be collectively set as the insensitive pixel region AN. Therefore, the range image acquisition device 1J according to the tenth embodiment can perform the oversampling and accumulation operations.

Similarly to the range image acquisition device 1 according to the first embodiment, in the range image acquisition device 1J according to the tenth embodiment, by the configuration in which a plurality of the wirings $47_1$ to $47_3$ and $47_5$ electrically connecting the distribution circuit 33J and the pixel circuits 13J are arranged to be separated, crosstalk between the inverted signals of the different the transfer control pulses $G_{1out}$ to $G_{3out}$ and the control pulse $G_D$ can be prevented, and thus, stable pixel driving can be realized. As a result, the range image with a high range resolution can be generated.

It is noted that the present invention is not limited to the aspect of the embodiment described above.

In Modified Examples of the operations of the range image acquisition device, four examples will be described below. The timing charts illustrated in FIGS. 38 to 41 can be applied to any of the range image sensors 10 to 10J of the first to tenth embodiments described above. In addition, in the operation according to the first embodiment and the operations of following Modified Examples 1 to 4, an operation of dividing the pixel array 14 into three regions has been exemplified. The number of divisions is not limited to three. For example, the number of divisions may be 2 or may be 4 or more.

Modified Example 1

Figure 38:
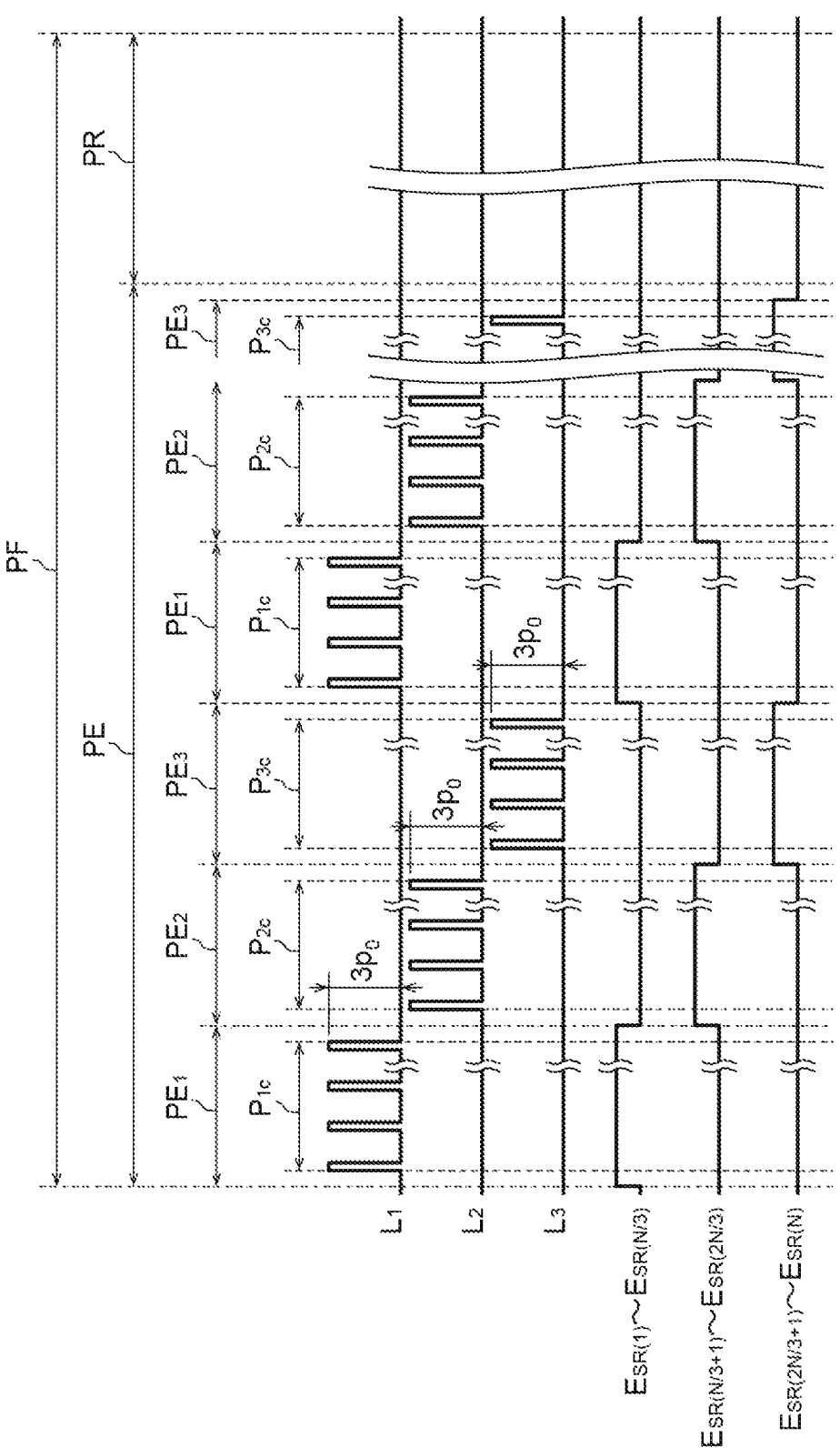
FIG. 38 is a timing chart illustrating operations of a light source and operations of a pixel array as Modified Example 1.

FIG. 38 illustrates a timing chart illustrating operations of a light source 11 of Modified Example 1 and a timing chart of the logic pulse $E_{SR(j)}$. The operations of the first embodiment include one period PE and one period PR during one period PF. In addition, the periods PE and PR are alternately executed without temporally overlapping each other. The operations of Modified Example 1 are also the same as the operations of the first embodiment in terms of the above-mentioned points. On the other hand, in the first embodiment, the light source 11 emits light only once during one sensitive operation. In Modified Example 1, the light source 11 performs light irradiation several times during one sensitive operation.

First, during the period $PE_1$, the pixel switching circuit 34 outputs the following the logic pulse $E_{SR(j)}$.

Logic pulses $E_{SR(1)}$ to $E_{SR(N/3)}$: HIGH.

Logic pulses $E_{SR(N/3+1)}$ to $E_{SR(2N/3)}$: LOW

Logic pulses $E_{SR(2N/3+1)}$ to $E_{SR(N)}$: LOW.

The period $PE_1$ has a period $P_{1c}$ that is shorter than the period $PE_1$. During the period $P_{1c}$, the light source 11 irradiates with pulsed light $L_P$ several times so that the incident pulsed light $L_R$ is incident on the array division region $L_1$. In Modified Example 1, the light source 11 irradiates with pulsed light $L_P$ four times during the period $P_{1c}$.

Next, in the period $PE_2$, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: HIGH.

Logic pulses $E_{SR(2N/3+1)}$ to $E_{SR(N)}$: LOW.

The period $PE_2$ has a period $P_{2c}$ that is shorter than the period $PE_2$. During the period $P_{2c}$, the light source 11 irradiates with pulsed light $L_P$ several times so that the incident pulsed light $L_R$ is incident on the array division region $L_2$. In Modified Example 1, the light source 11 irradiates with pulsed light $L_P$ four times during the period $P_{2c}$.

Next, during the period $PE_3$, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: LOW

Logic pulses $E_{SR(2N/3+1)}$ to $E_{SR(N)}$: HIGH.

The period $PE_3$ has a period $P_{3c}$ that is shorter than the period $PE_3$. During the period $P_{3c}$, the light source 11 irradiates with pulsed light $L_P$ several times so that the incident pulsed light $L_R$ is incident on the array division region $L_3$. In Modified Example 1, the light source 11 performs the irradiation with pulsed light $L_P$ four times during the period $P_{1c}$.

Hereinafter, the operations of the periods $PE_1$ to $PE_3$ are repeated a predetermined number of times. The period when the operations of the periods $PE_1$ to $PE_3$ are repeated is a period PE. Then, a period PR is set after the period PE.

During the period PR, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: LOW.

Logic pulses $E_{SR(2N/3+1)}$ to $E_{SR(N)}$: LOW.

Similarly to the operation according to the first embodiment, according to the operations of Modified Example 1, signals can be read from the entire pixel array 14 after performing the exposure operations on the entire pixel array 14 several times.

In the operations of Modified Example 1, in a state where the pixel switching circuit 34 of the peripheral circuit 31 supplies the logic pulse $E_{SR(j)}$ for setting the sensitive state to the pixel array 14, the light source control unit 12a generates the pulsed light $L_P$ several times. That is, in the operations of Modified Example 1, the exposure operation is performed several times for one frame. In addition, in the first embodiment, one of the exposure operation is performed several times during one sensitive period. By this operation, the speed of the operations of the range image sensor 10 can be further increased.

Modified Example 2

Figure 39:
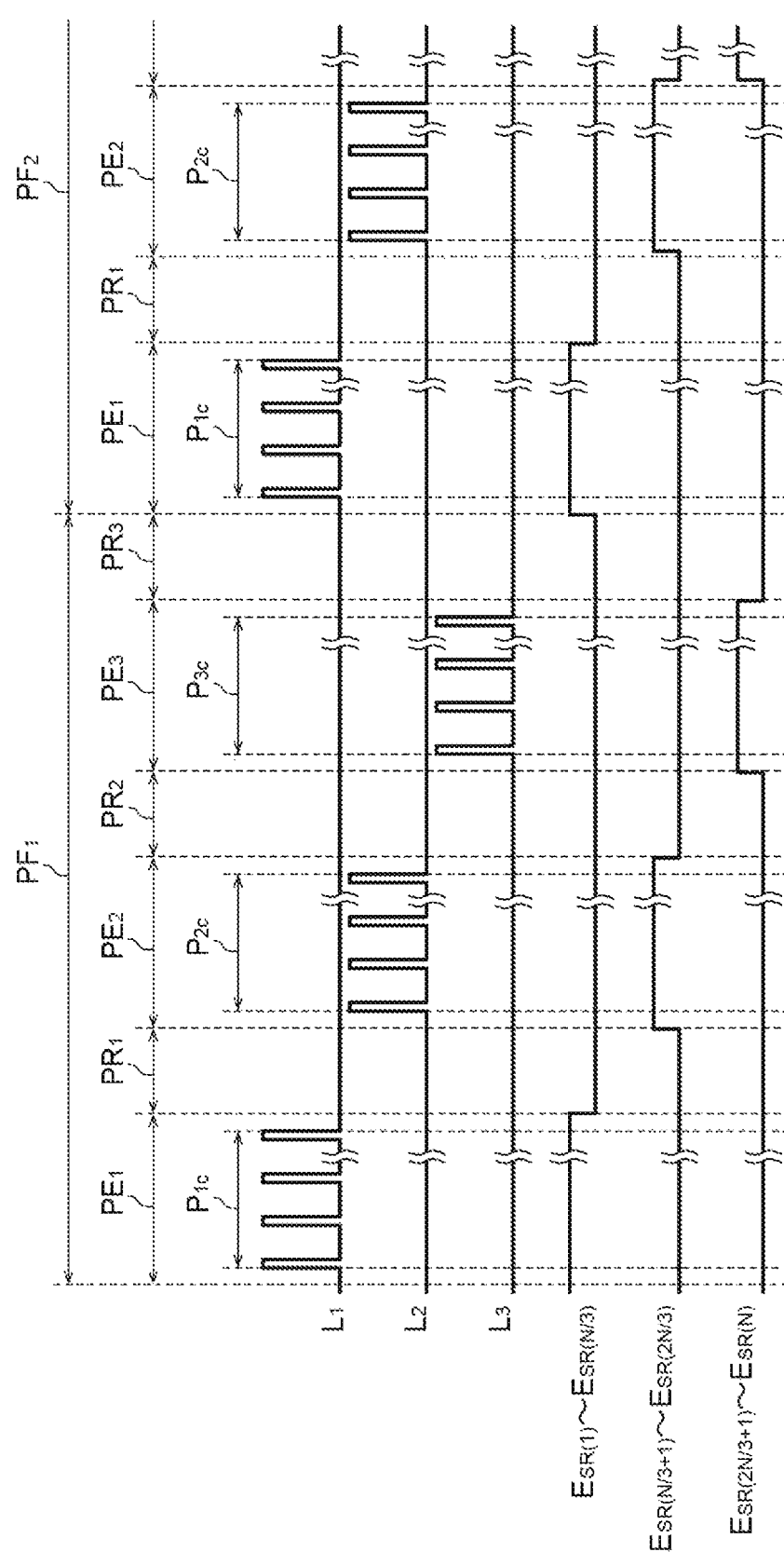
FIG. 39 is a timing chart illustrating operations of a light source and operations of a pixel array as Modified Example 2.

FIG. 39 illustrates a timing chart illustrating an operation of the light source 11 of Modified Example 2 and a timing chart of the logic pulse $E_{SR(j)}$. In the operation according to the first embodiment, the periods PE and PR are alternately performed without overlapping each other. The operation in Modified Example 2 is also the same as the operation in the first embodiment in terms of the above-described points. On the other hand, the operation in the first embodiment includes one period PE and one period PR during one period PF. On the other hand, the operation in Modified Example 2 has several times of the $PE_1$ to $PE_3$ and several times of $PR_1$ to $PR_3$ during one period PF.

First, in the period $PE_1$, the pixel switching circuit 34 outputs the following the logic pulse $E_{SR(j)}$.

Logic pulses $E_{SR(1)}$ to $E_{SR(N/3)}$: HIGH.

Logic pulses $E_{SR(N/3+1)}$ to $E_{SR(2N/3)}$: LOW

Logic pulses $E_{SR(2N/3+1)}$ to $E_{SR(N)}$: LOW.

The period $PE_1$ has the period $P_{1c}$ that is shorter than the period $PE_1$. In the period $P_{1c}$, the light source 11 irradiates with pulsed light $L_P$ several times so that the incident light $L_R$ is incident on the array division region $L_1$. In Modified Example 2, the light source 11 irradiates with pulsed light $L_P$ four times during the period $P_{1c}$. As a result, the accumulation of the electric charges occurs in the pixel circuits 13 included in the first to N/3-th rows in the pixel array 14.

Next, in the period $PR_1$, the pixel switching circuit 34 outputs the logic pulse $E_{SR(j)}$ that sets all the pixel circuits 13 to be insensitive. Then, signals are read from the pixel circuits 13 included in the first to N/3-th rows in the pixel array 14. It is noted that the period $PR_1$ may overlap a portion of the next period $PE_2$. Specifically, the period $PR_1$ is allowed to overlap the period $PE_2$ as long as the period $PR_1$ is a period after the logic pulse $E_{SR(j)}$ is output and before light irradiation from the light source 11 is started.

Next, in the period $PE_2$, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: HIGH.

Logic pulses $E_{SR(2N/3+1)}$ to $E_{SR(N)}$: LOW.

The period $PE_2$ has the period $P_{2c}$ that is shorter than the period $PE_2$. In the period $P_{2c}$, the light source 11 irradiates with pulsed light $L_P$ several times so that the incident pulsed light $L_R$ is incident on the array division region $L_2$. In Modified Example 2, the light source 11 irradiates with pulsed light $L_P$ four times during the period $P_{2c}$. As a result, the accumulation of the electric charges occurs in the pixel circuits 13 included in the (N/3+1)-th to 2N/3-th rows in the pixel array 14.

Next, in a period $PR_2$, the pixel switching circuit 34 outputs the logic pulse $E_{SR(j)}$ that sets all the pixel circuits 13 to be insensitive. Then, signals are read from the pixel circuits 13 included in the (N/3+1)-th to 2N/3-th rows in the pixel array 14.

Next, in the period $PE_3$, the pixel switching circuit 34 outputs the following the logic pulse $E_{SR(j)}$.

Logic pulses $E_{SR(1)}$ to $E_{SR(N/3)}$: LOW.

Logic pulses $E_{SR(N/3+1)}$ to $E_{SR(2N/3)}$: LOW.

Logic pulses $E_{SR(2N/3+1)}$ to $E_{SR(N)}$: HIGH.

The period $PE_3$ has the period $P_{3c}$ that is shorter than the period $PE_3$. In the period $P_{3c}$, the light source 11 irradiates with pulsed light $L_P$ several times so that the incident pulsed light $L_R$ is incident on the array division region $L_3$. In Modified Example 2, the light source 11 irradiates with pulsed light $L_P$ four times during the period $P_{3c}$. As a result, the accumulation of the electric charges occurs in the pixel circuits 13 included in the (2N/3+1)-th to N-th rows in the pixel array 14.

Next, in the period $PR_3$, the pixel switching circuit 34 outputs the logic pulse $E_{SR(j)}$ that sets all the pixel circuits 13 to be insensitive. Then, signals are read from the pixel circuits 13 included in the (2N/3+1)-th to N-th rows in the pixel array 14.

The periods $PE_1$ to $PE_3$ and the periods $PR_1$ to $PR_3$ constitute one period $PF_1$. Then, a period $PF_2$, which is the next frame, is performed.

In the operations of Modified Example 2, the peripheral circuit 31 performs the exposure operation of allowing the light source control unit 12a to generate the pulsed light $L_P$ in a state of outputting the control pulses $G_1$ to $G_4$ and $G_D$ and the logic pulse $E_{SR(j)}$ to the pixel array 14, and, the peripheral circuit 31 performs the read operation of allowing the voltage based on the electric charges generated in the photoelectric conversion region 21 to be output. The control pulses $G_1$ to $G_4$ and $G_D$ and the logic pulse $E_{SR(j)}$ move the electric charges generated in the photoelectric conversion region 21 to the charge reading regions $22_1$ to $22_4$ in the pixel circuits 13 constituting the sensitive pixel region AE and move the electric charges generated in the photoelectric conversion region 21 to the charge discharging region 23 in the pixel circuits 13 constituting the insensitive pixel region AN. The peripheral circuit 31 and the light source control unit 12a repeatedly perform the sensitive pixel region AE selecting the exposure operation for the selected sensitive pixel region AE and the read operation for the pixel circuits 13 constituting the selected sensitive pixel region AE while changing. According to this operation, the exposure operation and the read operation can be alternately performed for each selected sensitive pixel region AE.

That is, unlike the operations of Modified Example 1, in the operations of Modified Example 2, the exposure operation and the read operation are alternately performed in one frame. In other words, in the operations of Modified Example 2, after the exposure operation is performed on the region of one or more rows, the read operation is performed on the rows on which the exposure operation is performed. Subsequently, the transition proceeds to another region of one or more rows, and the exposure operation and the read operation are repeated in the same manner.

It is noted that, in the read operation, by using the period when gating of the pixel circuit 13 is not performed in a cycle of the pulsed light $L_P$, the read operation may be performed on the pixel circuits 13 included in at least one row. More specifically, when the duty ratio of the pulsed light $L_P$ is small, by using the period when the gating of the pixel circuits 13 is not performed in one cycle, signals may be read from the pixel circuits 13 included in one row or the plurality of rows. Alternatively, signals may be read from the pixel circuits 13 included in one row by using the plurality of cycles of projection of the pulsed light $L_P$. That is, in the background of the exposure operation, signals may be read from the pixel circuits 13 that do not perform the exposure operation.

Modified Example 3

Figure 40:
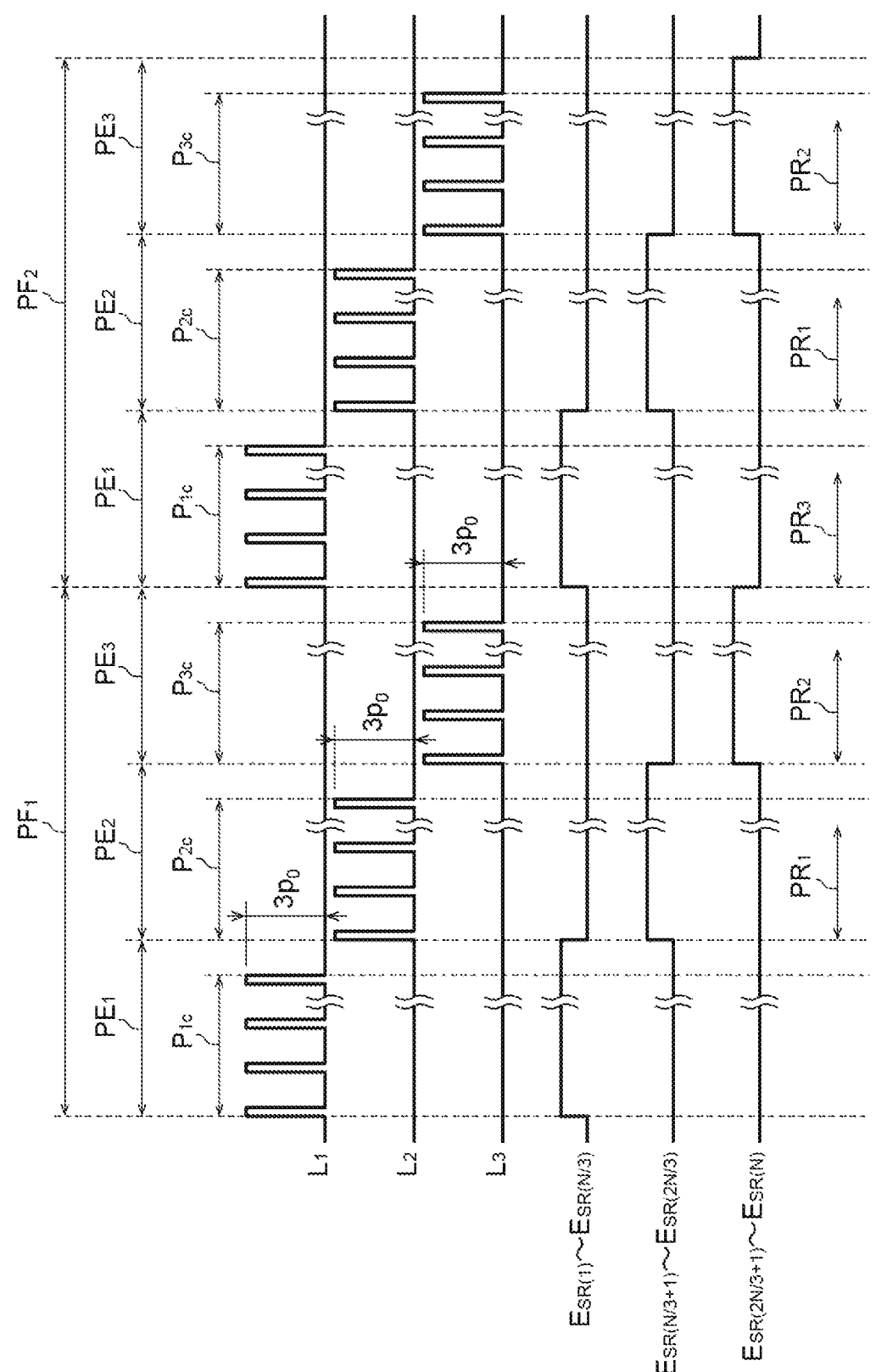
FIG. 40 is a timing chart illustrating operations of a light source and operations of a pixel array as Modified Example 3.

FIG. 40 illustrates a timing chart illustrating the operation of the light source 11 of Modified Example 3 and a timing chart of the logic pulse $E_{SR(j)}$. In the operation in the first embodiment, the periods PE and PR are alternately performed temporally without overlapping the periods PE and PR. In contrast, in the operations of Modified Example 3, the period PE and the period PR temporally overlap each other. First, the exposure operation is performed in the period $PE_1$. This exposure operation is the same as the exposure operation in the period $PE_1$ of Modified Example 2. As a result of the exposure operation, the accumulation of the electric charges occurs in the pixel circuits 13 included in the first to N/3-th rows in the pixel array 14.

Next, the exposure operation is performed in the period $PE_2$. This exposure operation is the same as the exposure operation in the period $PE_2$ of Modified Example 2. As a result of the exposure operation, the accumulation of the electric charges occurs in the pixel circuits 13 included in the (N/3+1)-th to 2N/3-th rows in the pixel array 14.

The period $PR_1$ is set to overlap the period $PE_2$. In the period $PR_1$, signals are read from the pixel circuits 13 included in the first to N/3-th rows in the pixel array 14. The timing at which the period $PR_1$ starts may be the same as the timing at which the period $PE_2$ starts. That is, the timing at which the period $PR_1$ starts may be the same as the timing at which the output of the logic pulse $E_{SR(j)}$ for the period $PE_2$ starts. In addition, the timing at which the period $PR_1$ starts may be the same as the timing at which the light irradiation to the position where the incident pulsed light $L_R$ is incident on the array division region $L_2$ starts. On the other hand, the timing at which the period $PR_1$ ends is earlier than the timing at which the period $PE_2$ ends. In other words, the period $PR_1$ is shorter than the period $PE_2$.

Next, the exposure operation is performed in the period $PE_3$. This exposure operation is the same as the exposure operation in the period $PE_3$ of Modified Example 2. As a result of the exposure operation, the accumulation of the electric charges occurs in the pixel circuits 13 included in the 2(N/3+1)-th to N-th rows in the pixel array 14.

A period $PR_2$ is set to overlap the period $PE_3$. In the period $PR_2$, signals are read from the pixel circuits 13 included in the (N/3+1)-th to 2N/3-th rows in the pixel array 14.

As described above, the period $PF_1$ including the periods $PE_1$, $PE_2$, and $PE_3$ constitutes one frame or subframe.

Then, the exposure operation is performed again in the period $PE_1$. The period $PR_3$ is set to overlap this period $PE_1$. In the period $PR_3$, signals are read from the pixel circuits 13 included in the (2N/3+1)-th to N-th rows in the pixel array 14.

In the operations of Modified Example 3, the peripheral circuit 31 and the light source control unit 12a concurrently perform the exposure operation for the sensitive pixel region AE and the read operation for the insensitive pixel region AN. According to this operation, the exposure operation in a certain region and the read operation in another region are concurrently performed. Therefore, the speed of the operations of the range image sensor 10 can be further increased.

Modified Example 4

Figure 41:
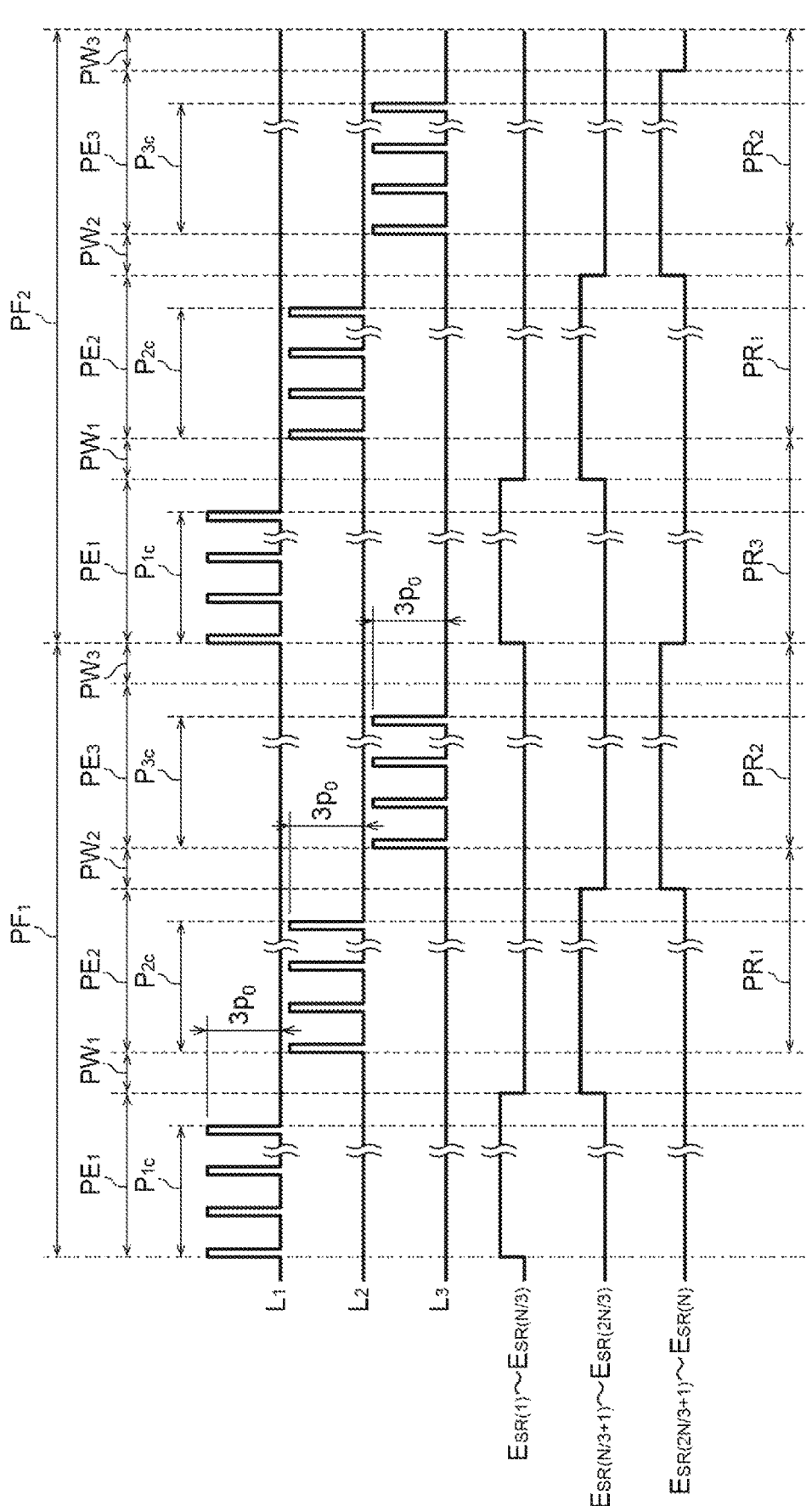
FIG. 41 is a timing chart illustrating operations of a light source and operations of a pixel array as Modified Example 4.

FIG. 41 illustrates a timing chart illustrating the operation of the light source 11 of Modified Example 4 and a timing chart of the logic pulse $E_{SR(j)}$. Similarly to Modified Example 3, in the operations of Modified Example 4, the period PE and the period PR overlap each other. On the other hand, in the operations of Modified Example 3, the length of the periods $PR_1$ to $PR_3$ is smaller than the length of the periods $PE_1$ to $PE_3$. On the other hand, the operations of Modified Example 4 are different in that the length of the periods $PR_1$ to $PR_3$ is larger than the length of the periods $PE_1$ to $PE_3$.

First, the exposure operation is performed in the period $PE_1$. This exposure operation is the same as the exposure operation in the period $PE_1$ of Modified Example 2. As a result of the exposure operation, the accumulation of the electric charges occurs in the pixel circuits 13 included in the first to N/3-th rows in the pixel array 14.

Next, the standby operation is performed in a standby period $PW_1$. In the standby operation, the pixel switching circuit 34 supplies the logic pulse $E_{SR(j)}$ to set all the pixel circuits 13 to be insensitive. Furthermore, the light source 11 does not irradiate with pulsed light $L_P$ during the standby period $PW_1$.

Next, the exposure operation is performed in the period $PE_2$. This exposure operation is the same as the exposure operation in the period $PE_2$ of Modified Example 2. As a result of the exposure operation, the accumulation of the electric charges occurs in the pixel circuits 13 included in the (N/3+1)-th to 2N/3-th rows in the pixel array 14.

Next, the standby operation is performed in a standby period $PW_2$. The period $PR_1$ is set to overlap the period $PE_2$ and the standby period $PW_2$. In the period $PR_1$, signals are read from the pixel circuits 13 included in the first to N/3-th rows in the pixel array 14. The timing at which the period $PR_1$ starts may be the same as the timing at which the period $PE_2$ starts. On the other hand, the timing at which the period $PR_1$ ends is later than the timing at which the period $PE_2$ ends. In other words, the period $PR_1$ is longer than the period $PE_2$.

The period from the end of the period $PE_2$ to the end of the period $PR_1$ is set as the standby period $PW_2$. That is, in the operations of Modified Example 4, the periods $PE_1$ to $PE_3$ and the standby periods $PW_1$ to $PW_3$ are set alternately. Then, for example, a total length of one period $PE_2$ and one standby period $PW_2$ is the same as the length of the period $PR_1$.

Next, the exposure operation is performed in the period $PE_3$. This exposure operation is the same as the exposure operation in the period $PE_3$ of Modified Example 2. As a result of the exposure operation, the accumulation of the electric charges occurs in the pixel circuits 13 included in the 2(N/3+1)-th to N-th rows in the pixel array 14.

Next, the standby operation is performed in the standby period $PW_3$. The period $PR_2$ is set to overlap the period $PE_3$ and the standby period $PW_3$. In the period $PR_2$, signals are read from the pixel circuits 13 included in the (N/3+1)-th to 2N/3-th rows in the pixel array 14.

As described above, the period $PF_1$ including the periods $PE_1$, $PW_1$, $PE_2$, $PW_2$, $PE_3$, and $PW_3$ constitutes one frame or subframe.

Next, the exposure operation is performed again in the period $PE_1$. As a result of the exposure operation, the accumulation of the electric charges occurs in the pixel circuits 13 included in the first to N/3-th rows in the pixel array 14.

Next, the standby operation is performed in the standby period $PW_1$. The period $PR_3$ is set to overlap the period $PE_1$ and the standby period $PW_1$. In the period $PR_3$, signals are read from the pixel circuits 13 included in the (2N/3+1)-th to N-th rows in the pixel array 14.

By the operations of Modified Example 4 as well, the same effects as those of Modified Example 3 can be obtained. That is, according to the operations of Modified Example 4, the exposure operation in one region and the read operation in another region are concurrently performed. Therefore, the speed of the operations of the range image sensor 10 can be further increased.

Modified Example 5

In the pixel circuit 13G of the eighth embodiment, an element structure of lateral electric field control charge modulation is adopted. The element structure adopted for the range image sensor is not limited to this element structure. A pixel circuit 13K of Modified Example 5 illustrated in FIG. 42 adopts the element structure of the MOS-type transfer gate. The pixel circuit 13K having such an element structure can be suitably adopted, for example, to the range image sensor 10H according to the ninth embodiment.

A range image sensor 10K according to Modified Example 5 has the pixel circuits 13K. The pixel circuit 13K of Modified Example 5 is different from the pixel circuit 13G of the eighth embodiment in terms of a structure of a control electrode $25_{DS}$ for drain control. The control electrodes $25_{Da}$ and $25_{Db}$ of the pixel circuit 13G are arranged to interpose the charge transfer path 101 therebetween. The control electrode $25_{DS}$ of the pixel circuit 13K of Modified Example 5 is arranged to straddle the charge transfer path 101. In other words, the control electrodes $25_{Da}$ and $25_{Db}$ of the pixel circuit 13G are not arranged directly above the charge transfer path 101 and control the potential in the charge transfer path 101 by the electric field leaking in the lateral direction the control electrodes $25_{Da}$ and $25_{Db}$. On the other hand, the control electrode $25_{DS}$ of the pixel circuit 13K of Modified Example 5 is arranged directly above the charge transfer path 101. That is, similarly to the control electrodes $25_1$ to $25_3$, the control electrode $25_{DS}$ directly controls the potential in the charge transfer path 101 by the electric field generated beneath the charge transfer path 101.

The pixel circuit 13K has a photodiode PD, a charge transfer unit 52S, charge reading regions $22S_1$, $23S_2$, and $23S_3$, and semiconductor regions 66a, 66b, 66c, and 66d. The semiconductor region 66a is provided in a region overlapping the opening AP and constitutes the photodiode PD. The semiconductor region 66b has a portion constituting the photodiode PD and a portion constituting the charge transfer unit 52S. In addition, the semiconductor region 65b is formed directly below the control electrode $25_{DS}$. The semiconductor region 66c has the portion constituting the charge transfer unit 52S. The semiconductor region 66c has a portion overlapping the semiconductor region 65b and the control electrode $25_{DS}$, and a portion overlapping charge discharging regions 23Sa and 23Sb. The semiconductor region 66d has the portion constituting the charge transfer unit 52S. The semiconductor region 66d has a portion overlapping the semiconductor region 66c, a portion overlapping the control electrodes $25_1$ to $25_3$, and a portion overlapping the charge reading regions $22S_1$, $22S_2$, and $22S_3$.

Figure 42:
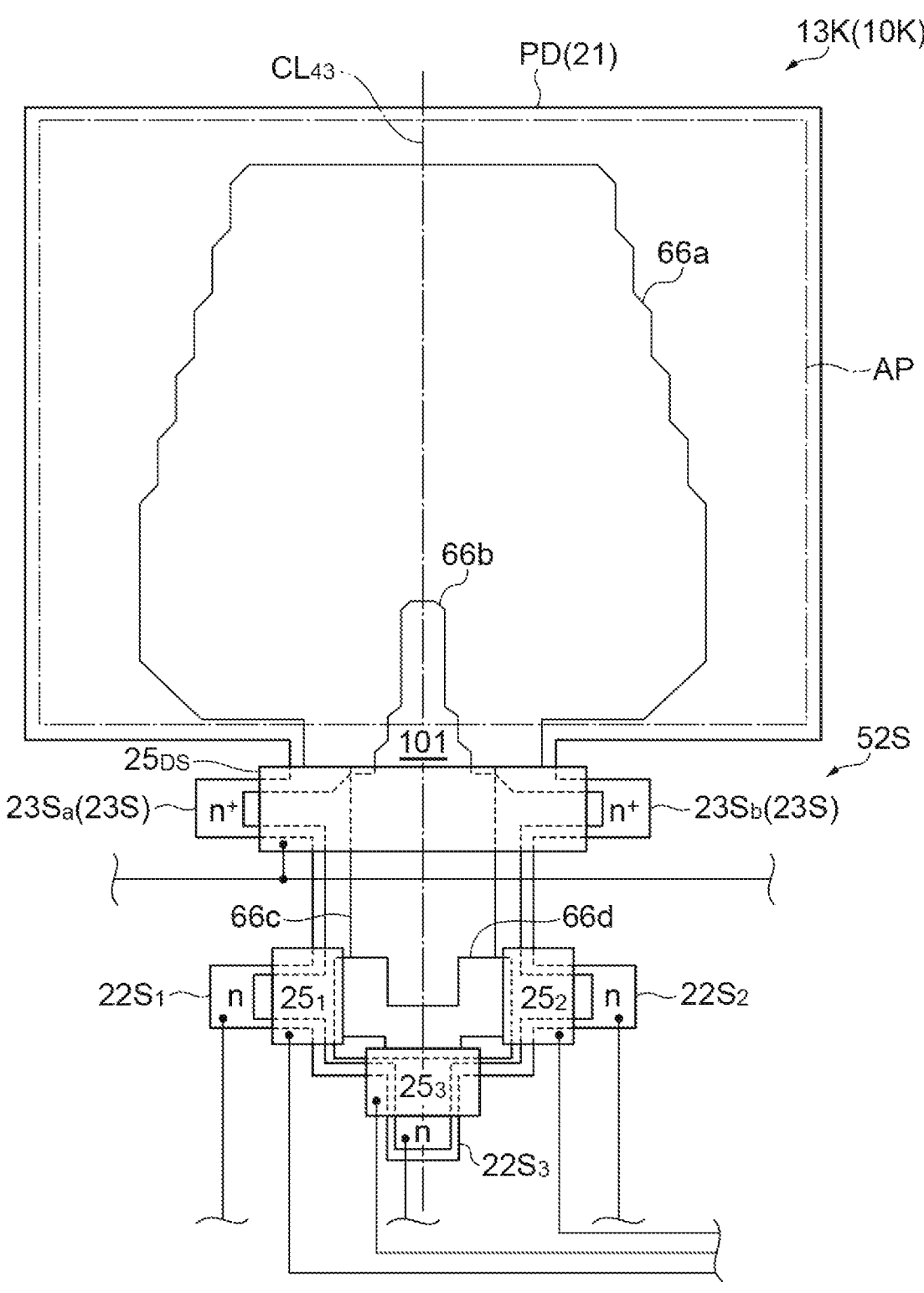
FIG. 42 is a diagram illustrating a detailed configuration of a pixel circuit included in a range image sensor according to Modified Example 5.
Figure 43:
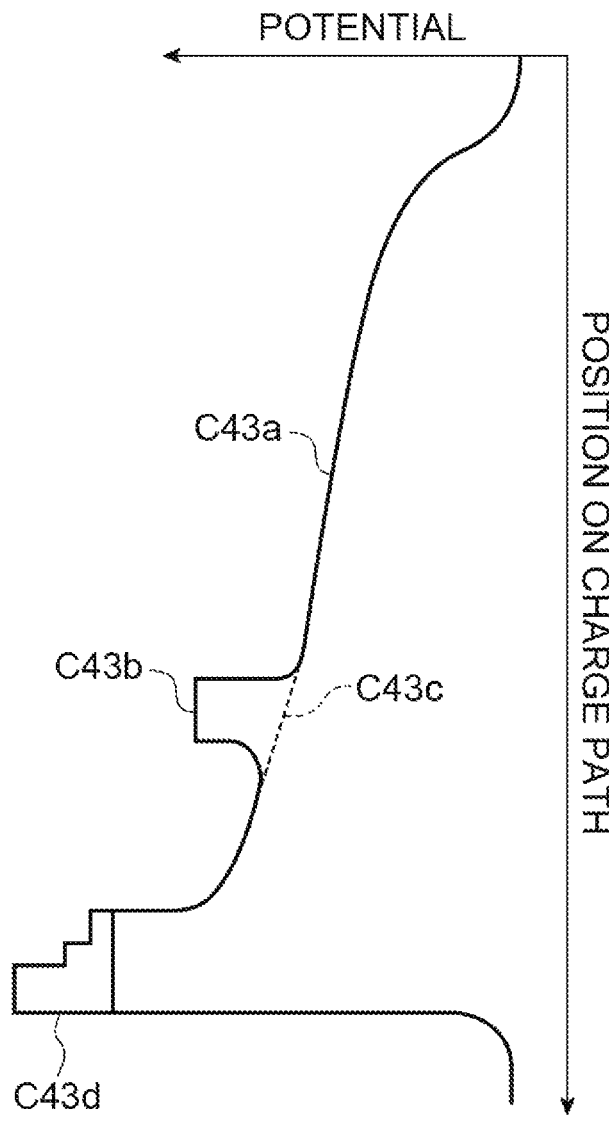
FIG. 43 is a diagram illustrating a potential distribution for the pixel circuit of FIG. 42.

FIG. 43 illustrates a potential distribution along a dashed-dotted line $CL_{43}$ including the charge transfer path 101 illustrated in FIG. 42. The vertical axis indicates positions on the charge transfer path 101. The horizontal axis indicates potentials. Further, a graph C43a corresponds to the region of the photodiode PD in FIG. 42. Graphs C43b and C43c correspond to the region where the control electrode $25_{DS}$ in FIG. 42 is arranged. A Graph C43d corresponds to the control electrode $25_2$.

In the pixel circuit 13G of the eighth embodiment, the transfer control pulse $G_{Dout(j)}$ supplied to the control electrodes $25_{Da}$ and $25_{Db}$ leaks in the lateral direction (for example, the direction from the control electrode $25_{Da}$ to the control electrode $25_{Db}$), so that the potential distribution changes. On the other hand, in the pixel circuit 13K of Modified Example 5, the transfer control pulse $G_{Dout(j)}$ supplied to the control electrode $25_{DS}$ directly changes the potential without leaking in the lateral direction. As a result, compared with potential distribution of the pixel circuit 13K of the eighth embodiment illustrated in FIG. 31, in the potential distribution of the pixel circuit 13K of Modified Example 5 illustrated in FIG. 43, the falling of the potential in the potential depression (graph C43b) is steep. In addition, in the potential distribution illustrated in FIG. 43, the potential depression (graph C43b) is deeper than that in the potential distribution illustrated in FIG. 31. With such a potential distribution, when the photodiode PD is set to be in the insensitive state, the movement of the electric charges from the photodiode PD to the charge reading regions $22S_1$ to $22S_3$ can be more reliably suppressed.

Modified Example 6

Figure 44:
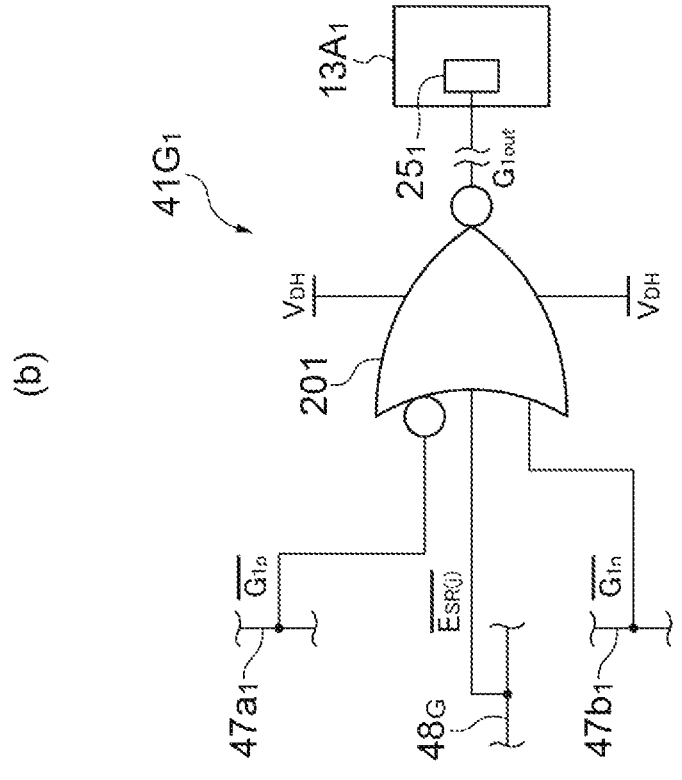
FIG. 44(a) is a diagram illustrating a NOR-type driver circuit according to Modified Example 6.
FIG. 44(b) is a diagram illustrating a NOR-type driver circuit according to Modified Example 7.
Figure 44:
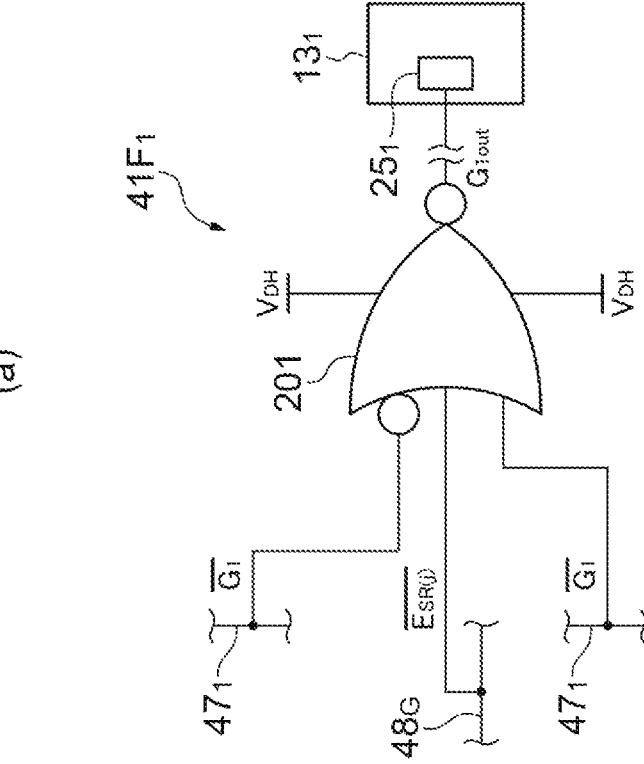

The NOR-type driver circuits $41_1$ to $41_4$ illustrated in FIG. 5 may be indicated by descriptions different from those in FIG. 5. A NOR-type driver circuit $41F_1$ illustrated in FIG. 44(*a*) is another description example of the NOR-type driver circuit $41_1$. The p-type MOS transistor $43_1$, the p-type MOS transistor $44_1$, and the n-type MOS transistor $45_1$ may be indicated by a logic circuit 201 as illustrated in FIG. 44(*a*). The logic circuit 201 has three inputs and one output. A first input is connected to the wiring $47_1$. The first input receives the inverted signal of the control pulse $G_1$. A second input is connected to the wiring $48_G$. The second input receives the inverted signal of the logic pulse $E_{SR(j)}$. A third input is connected to the wiring $47_1$. The third input receives the inverted signal of the control pulse $G_1$. The output is connected to the control electrode $25_1$. The operations of the NOR-type driver circuit $41F_1$ are similar to those of the NOR-type driver circuit $41_1$.

Modified Example 7

The NOR-type driver circuits $41A_1$ to $41A_4$ illustrated in FIG. 11 may be indicated by descriptions different from those in FIG. 11. A NOR-type driver circuit $41G_1$ illustrated in FIG. 44(*b*) is another description example of the NOR-type driver circuit $41A_1$. A first input of the logic circuit 201 is connected to the wiring $47a_1$. The first input receives the inverted signal of the control pulse $G_{1p}$. A second input is connected to the wiring $48_G$. The second input receives the inverted signals of the logic pulse $E_{SR(j)}$. A third input is connected to the wiring $47b_1$. The third input receives the inverted signal of the control pulse $G_{1n}$. The output is connected to the control electrode $25_1$. The operations of the NOR-type driver circuit $41G_1$ are similar to those of the NOR-type driver circuit $41A_1$.

Modified Example 8

Figure 45:
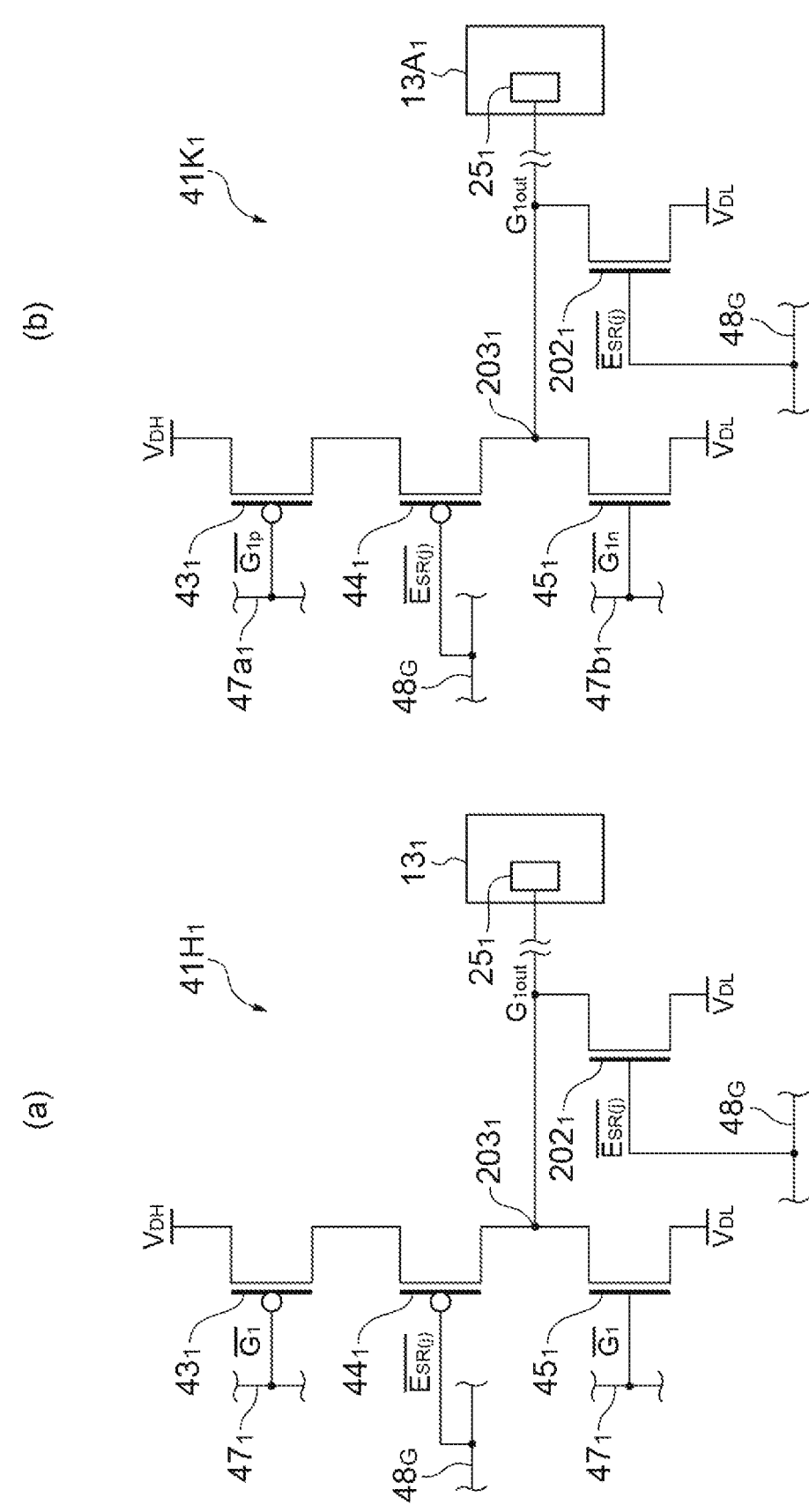
FIG. 45(a) is a diagram illustrating a NOR-type driver circuit according to Modified Example 8.
FIG. 45(b) is a diagram illustrating a NOR-type driver circuit according to Modified Example 9.

The NOR-type driver circuits $41_1$ to $41_4$ illustrated in FIG. 5 may include additional elements. FIG. 45(a) illustrates a NOR-type driver circuit $41H_1$ that is a modified example of the NOR-type driver circuit $41_1$. The NOR-type driver circuit $41H_1$ further includes an n-type MOS transistor $202_1$ in addition to the p-type MOS transistor $43_1$, the p-type MOS transistor $44_1$, and the n-type MOS transistor $45_1$. The n-type MOS transistor $202_1$ is connected between a connection point $73_1$ of the drains of the p-type MOS transistors $44_1$ to $44_4$ and the drains of the n-type MOS transistors $45_1$ to $45_4$ and a control electrode $25_1$. More specifically, the drain of the n-type MOS transistor $202_1$ is connected between the connection point $73_1$ and the control electrode $25_1$. The gate of the n-type MOS transistor $202_1$ is connected to the pixel switching circuit 34 through the wiring $48_G$. The gate of the n-type MOS transistor $202_1$ receives the inverted signal of the logic pulse $E_{SR(j)}$. The source of the n-type MOS transistor $202_1$ is connected to the low potential line $V_{DL}$. The NOR-type driver circuit $41H_1$ can suppress floating of the control electrode $25_1$.

Modified Example 9

Similarly to Modified Example 8, the NOR-type driver circuits $41A_1$ to $41A_4$ illustrated in FIG. 11 may adopt circuit configurations for suppressing floating. That is, FIG. 45(b) illustrates a NOR-type driver circuit $41K_1$ which is a modified example of the NOR-type driver circuit $41A_1$. The NOR-type driver circuit $41K_1$ further includes the n-type MOS transistor $202_1$ in addition to the p-type MOS transistor $43_1$, the p-type MOS transistor $44_1$, and the n-type MOS transistor $45_1$.

Modified Example 10

Figure 46:
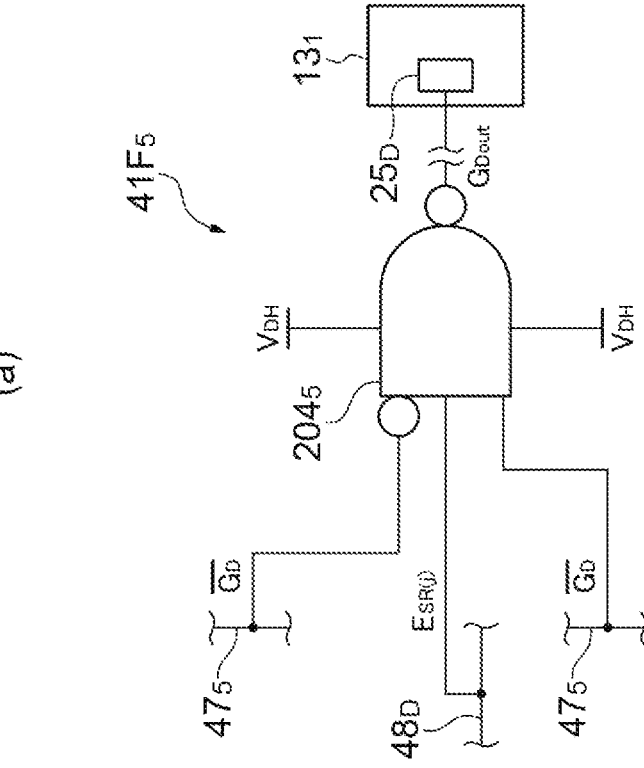
FIG. 46(a) is a diagram illustrating a NAND-type driver circuit according to Modified Example 10.
FIG. 46(b) is a diagram illustrating a NAND-type driver circuit according to Modified Example 11.
Figure 46:
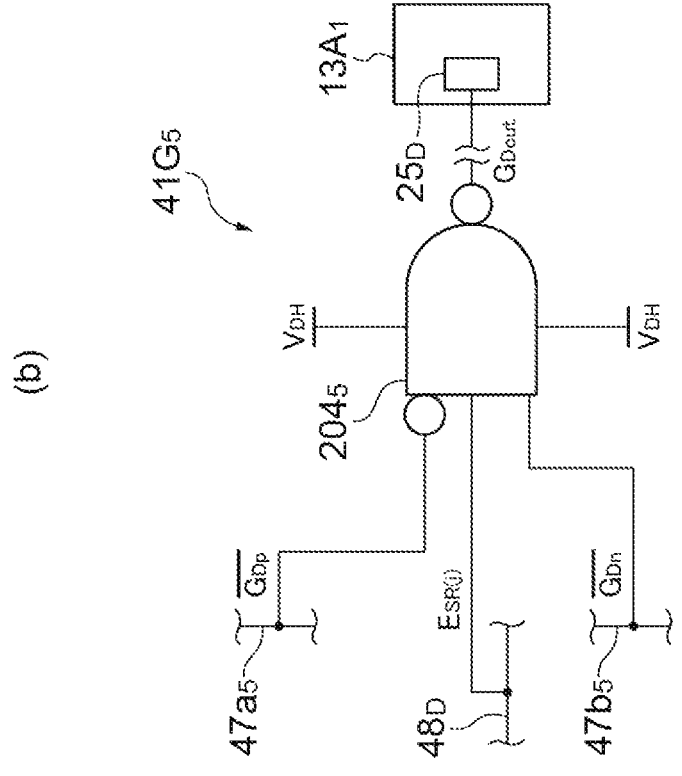

The NAND-type driver circuit $41_5$ illustrated in FIG. 5 may be indicated by descriptions different from those in FIG. 5. A NAND-type driver circuit $41F_5$ illustrated in FIG. 46(a) is another description example of the NAND-type driver circuit $41_5$. The p-type MOS transistor $43_5$, the n-type MOS transistor 46, and the n-type MOS transistor $45_5$ may be indicated by a logic circuit $204_5$ as illustrated in FIG. 46(a). The logic circuit $204_5$ has three inputs and one output. A first input is connected to the wiring $47_5$. The first input receives the inverted signal of the control pulse $G_D$. A second input is connected to the wiring $48_D$. The second input receives the logic pulse $E_{SR(j)}$. A third input is connected to the wiring $47_5$. The third input receives the inverted signal of the control pulse $G_D$. The output is connected to the control electrode $25_D$. The operations of the NAND-type driver circuit $41F_5$ are similar to those of the NAND-type driver circuit $41_5$.

Modified Example 11

The NAND-type driver circuit $41A_5$ illustrated in FIG. 11 may be indicated by descriptions different from those in FIG. 11. A NAND-type driver circuit $41G_5$ illustrated in FIG. 46(b) is another description example of the NAND-type driver circuit $41A_5$. A first input of the logic circuit $204_5$ is connected to the wiring $47a_5$. The first input receives the inverted signal of the control pulse $G_{Dp}$. A second input is connected to the wiring $48_D$. The second input receives the logic pulse $E_{SR(j)}$. A third input is connected to the wiring $47b_5$. The third input receives the inverted signal of the control pulse $G_{Dn}$. The output is connected to the control electrode $25_D$. The operations of the NAND-type driver circuit $41G_5$ are similar to those of the NAND-type driver circuit $41A_5$.

Modified Example 12

Figure 47:
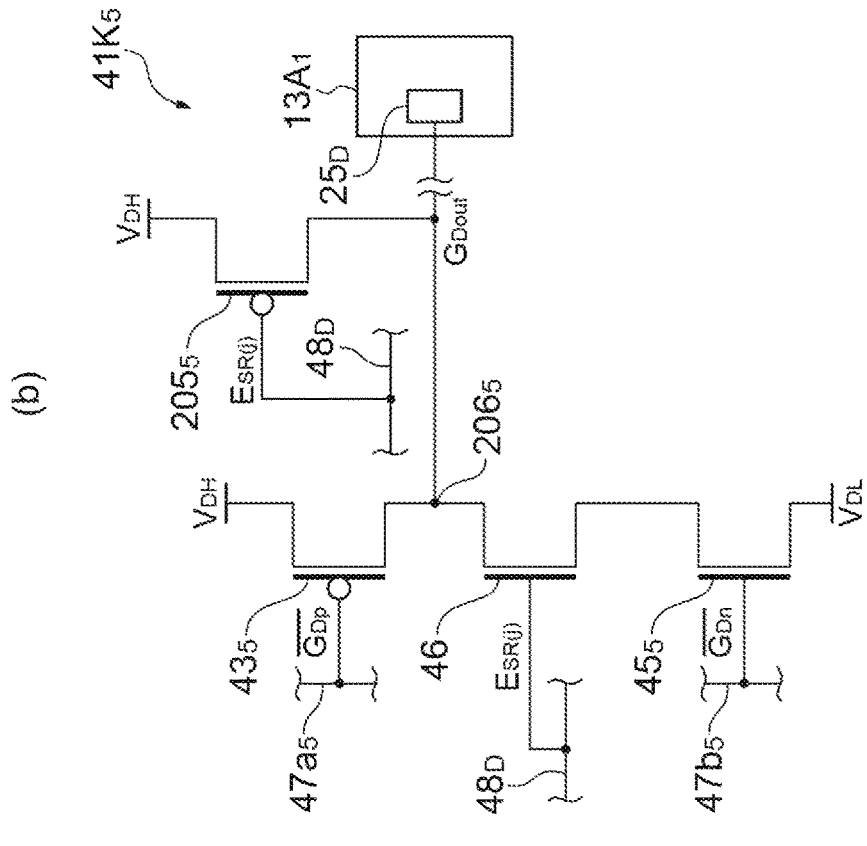
FIG. 47(a) is a diagram illustrating a NAND-type driver circuit according to Modified Example 12.
FIG. 47(b) is a diagram illustrating a NAND-type driver circuit according to Modified Example 13.
Figure 47:
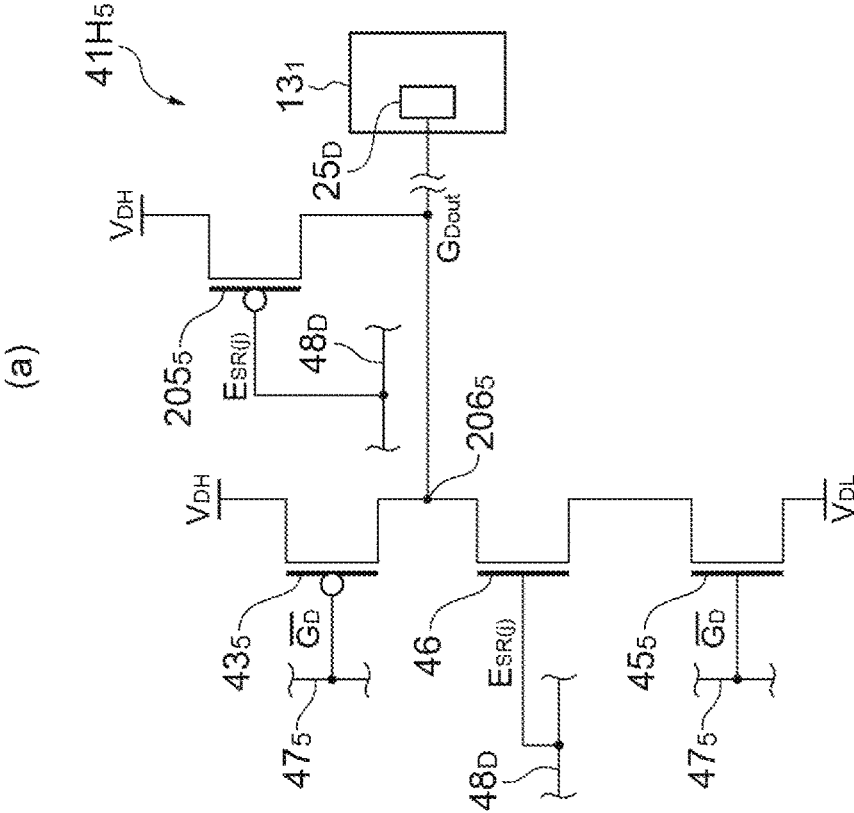

The NOR-type driver circuit $41_5$ illustrated in FIG. 5 may include additional elements. FIG. 47(a) illustrates a NAND-type driver circuit $41H_5$ that is a modified example of the NAND-type driver circuit $41_5$. The NAND-type driver circuit $41H_5$ further includes a p-type MOS transistor $205_5$ in addition to the p-type MOS transistor $43_5$, the n-type MOS transistor 46, and the n-type MOS transistor $45_5$. The p-type MOS transistor $205_5$ is connected between a connection point $206_5$ of the drain of the p-type MOS transistor $43_5$ and the drain of the n-type MOS transistor 46 and the control electrode $25_D$. More specifically, the drain of the p-type MOS transistor $205_5$ is connected between the connection point $206_5$ and the control electrode $25_D$. The gate of the p-type MOS transistor $205_5$ is connected to the pixel switching circuit 34 through the wiring $48_D$. The gate of the p-type MOS transistor $205_5$ receives the logic pulse $E_{SR(j)}$. The source of the p-type MOS transistor $205_5$ is connected to the high potential line $V_{DH}$. The NAND-type driver circuit $41H_5$ can suppress floating of the control electrode $25_D$.

Modified Example 13

Similarly to Modified Example 12, the NAND-type driver circuit $41A_5$ illustrated in FIG. 11 may adopt circuit configurations for suppressing floating. That is, FIG. 47(b) illustrates a NAND-type driver circuit $41K_5$ which is a modified example of the NAND-type driver circuit $41A_5$. The NAND-type driver circuit $41K_5$ includes the p-type MOS transistor $205_5$ in addition to the p-type MOS transistor $43_5$, the n-type MOS transistor 46, and the n-type MOS transistor $45_5$.

Modified Example 14

Figure 48:
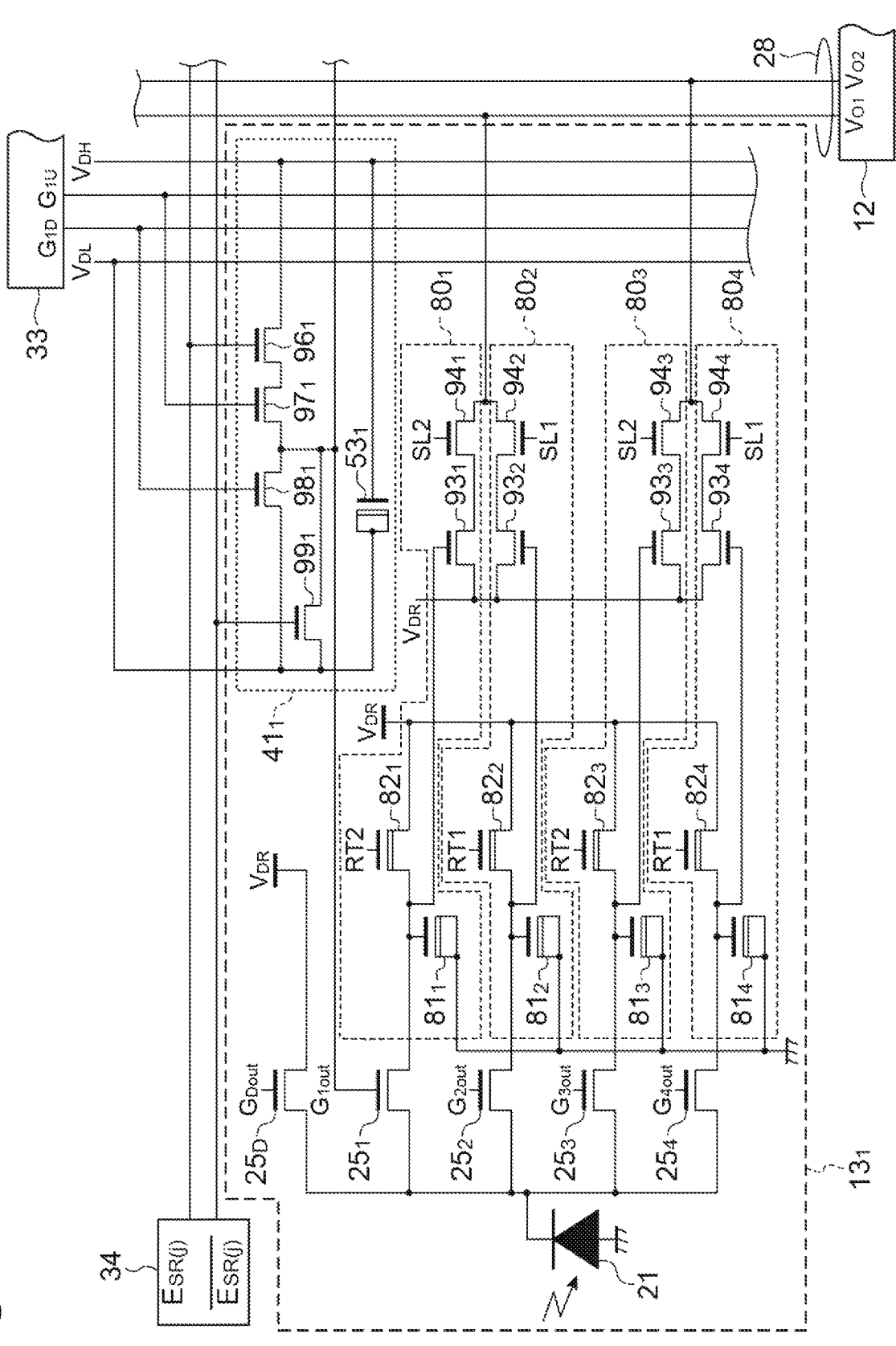
FIG. 48 is a diagram illustrating a pixel circuit included in a range image acquisition device according to Modified Example 14.
Figure 49:
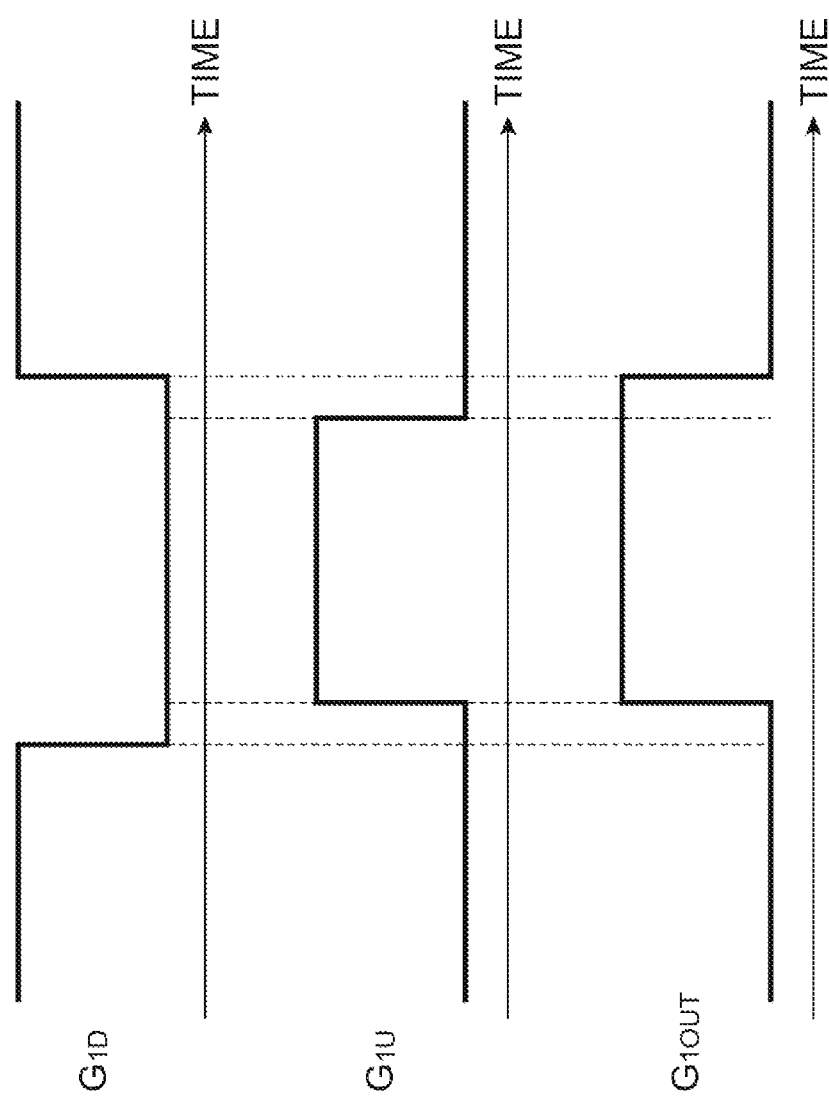
FIG. 49 is a diagram illustrating control pulses input to a pixel circuit 13₁.

FIG. 48 illustrates the pixel circuit $13_1$ included in a range image acquisition device according to Modified Example 14. In addition, FIG. 49 also illustrates control pulses $G_{1D}$, $G_{1U}$, and $G_{1OUT}$ input to the pixel circuit $13_1$. In FIG. 48, only the pixel circuit $13_1$ is extracted, and configurations of the read circuits $80_1$, $80_2$, $80_3$, and $80_4$ and the NOR-type driver circuit $41_1$ included in the pixel circuit $13_1$ are illustrated.

The read circuits $80_1$ to $80_4$ have the capacitance components $81_1$ to $81_4$ and the MOS transistors $82_1$ to $82_4$, $93_1$ to $93_4$, and $94_1$ to $94_4$. The inputs of the read circuits $80_1$ to $80_4$ are connected to the photoelectric conversion region 21, respectively. The outputs of the read circuits $80_1$ to $80_4$ are connected to the calculation circuit 12 through the wiring 28.

The capacitance components $81_1$ to $81_4$ accumulate electric charges generated by photoelectric conversion region 21. The capacitance components $81_1$ to $81_4$ correspond to the charge reading regions $22_1$ to $22_4$ illustrated in FIG. 3. One ends of the capacitance components $81_1$ to $81_4$ are connected to the control electrodes $25_1$ to $25_4$ and the MOS transistors $82_1$ to $82_4$ and $93_1$ to $93_4$. The other ends of the capacitance components $81_1$ to $81_4$ are connected to the reference potential.

The MOS transistors $82_1$ to $82_4$ are for resetting the charge reading regions $22_1$ to $22_4$. The sources of the MOS transistors $82_1$ to $82_4$ are connected to the one ends of the capacitance components $81_1$ to $81_4$. The gates of the MOS transistors $82_1$ to $82_4$ are connected to the read control circuit 27. The gates of the MOS transistors $82_1$ and $82_3$ receive a common reset pulse RT2. The gates of the MOS transistors $82_2$ and $82_4$ receive a common reset pulse RT1. The drains of the MOS transistors $82_1$ to $82_4$ are connected to the reset potential line $V_{DR}$.

The MOS transistors $93_1$ to $93_4$ and $94_1$ to $94_4$ constitute a so-called source follower amplifier. The MOS transistors $93_1$ to $93_4$ and $94_1$ to $94_4$ correspond to the voltage detection units $26_1$ to $26_4$ illustrated in FIG. 3. The MOS transistors $93_1$ to $93_4$ and $94_1$ to $94_4$ generate the voltages $V_{O1}$ and $V_{O2}$ in accordance with electric charges accumulated in the capacitance components $81_1$ to $81_4$ and output the voltages $V_{O1}$ and $V_{O2}$ to the wiring 28.

The sources of the MOS transistors $93_1$ to $93_4$ are connected to the drains of the MOS transistors $94_1$ to $94_4$. The gates of the MOS transistors $93_1$ to $93_4$ are connected to the capacitance components $81_1$ to $81_4$, which are the charge reading regions $22_1$ to $22_4$. The drains of the MOS transistors $93_1$ to $93_4$ are connected to the reset potential line $V_{DR}$. The MOS transistors $94_1$ and $94_3$ switch between supplying and stopping of the MOS voltage to the wiring 28 in accordance with a read control pulse SL2. In addition, the MOS transistors $94_2$ and $94_4$ switch between supplying and stopping of the MOS voltage to the wiring 28 in accordance with a read control pulse SL1. The drains of the MOS transistors $94_1$ to $94_4$ are connected to the wiring 28. The gates of the MOS transistors $94_1$ to $94_4$ are connected to the read control circuit 27. The gates of the MOS transistors $94_1$ and $94_3$ receive the read control pulse SL2. The gates of the MOS transistors $94_2$ and $94_4$ receive the read control pulse SL1. The drains of the MOS transistors $94_1$ to $94_4$ are connected to the sources of the MOS transistors $93_1$ to $93_4$.

According to the MOS transistors $93_1$ to $93_4$ and $94_1$ to $94_4$, the read circuits $80_2$ and $80_4$ are selected in accordance with the read control pulse SL1. The selected read circuit $80_2$ outputs the voltage $V_{O1}$ through the wiring 28. In addition, the selected the read circuit $80_4$ outputs the voltage $V_{O2}$ through the wiring 28. Further, the read circuits $80_1$ and $80_3$ are selected in accordance with the read control pulse SL2 by the MOS transistors $93_1$ to $93_4$ and $94_1$ to $94_4$. The selected the read circuit $80_1$ outputs the voltage $V_{O1}$ through the wiring 28. In addition, the selected the read circuit $80_3$ outputs the voltage $V_{O2}$ through the wiring 28.

The NOR-type driver circuit $41_1$ has a capacitance component $53_1$ and MOS transistors $96_1$, $97_1$, $98_1$, and $99_1$. One end of the capacitance component $53_1$ is connected to the high potential line $V_{DH}$. The other end of the capacitance component $53_1$ is connected to the low potential line $V_{DL}$ and the MOS transistors $98_1$ and $99_1$.

The MOS transistors $96_1$, $97_1$, $98_1$, and $99_1$ are all the n-type MOS transistors. Further, all the MOS transistors $81_1$ to $81_4$, $82_1$ to $82_4$, $93_1$ to $93_4$, and $94_1$ to $94_4$ included in the read circuits $80_1$ to $80_4$ are the n-type MOS transistors. That is, all the MOS transistors constituting the pixel circuit $13_1$ illustrated in FIG. 48 are the n-type MOS transistors. By such a configuration, there is no need to provide a so-called n-well implanted with n-type impurities in the pixel circuit $13_1$. Accordingly, a portion of the electric charges generated in the photoelectric conversion region flows into the n-well and disappear, and thus, the electric charges detected as the signal charges are not reduced.

The drain of the MOS transistor $96_1$ is connected to the high potential line $V_{DH}$. The gate of the MOS transistor $96_1$ is connected to the pixel switching circuit 34 and receives the logic pulse $E_{SR(j)}$ from the pixel switching circuit 34. The source of the MOS transistor $96_1$ is connected to the MOS transistor $97_1$.

The drain of the MOS transistor $97_1$ is connected to the source of the MOS transistor $96_1$. The gate of the MOS transistor $97_1$ is connected to the distribution circuit 33 and receives the control pulse $G_{1U}$ from the distribution circuit 33. The source of the MOS transistor $97_1$ is connected to the MOS transistors $98_1$ and $99_1$ and the control electrode $25_1$. The drain of the MOS transistor $98_1$ is connected to the source of the MOS transistor $97_1$, the drain of the MOS transistor $99_1$, and the control electrode $25_1$. The gate of the MOS transistor $98_1$ is connected to the distribution circuit 33 and receives the control pulse $G_{1D}$ from the distribution circuit 33. The source of the MOS transistor $98_1$ is connected to the low potential line $V_{DL}$, the source of the MOS transistor $99_1$, and the capacitance component $53_1$.

The drain of the MOS transistor $99_1$ is connected to the source of the MOS transistor $97_1$, the drain of the MOS transistor $98_1$, and the control electrode $25_1$. The gate of the MOS transistor $99_1$ is connected to the pixel switching circuit 34 and receives the inverted signal of the logic pulse $E_{SR(j)}$ from the pixel switching circuit 34. The source of the MOS transistor $99_1$ is connected to the low potential line $V_{DL}$, the source of the MOS transistor $98_1$, and the capacitance component $53_1$.

Figure 50:
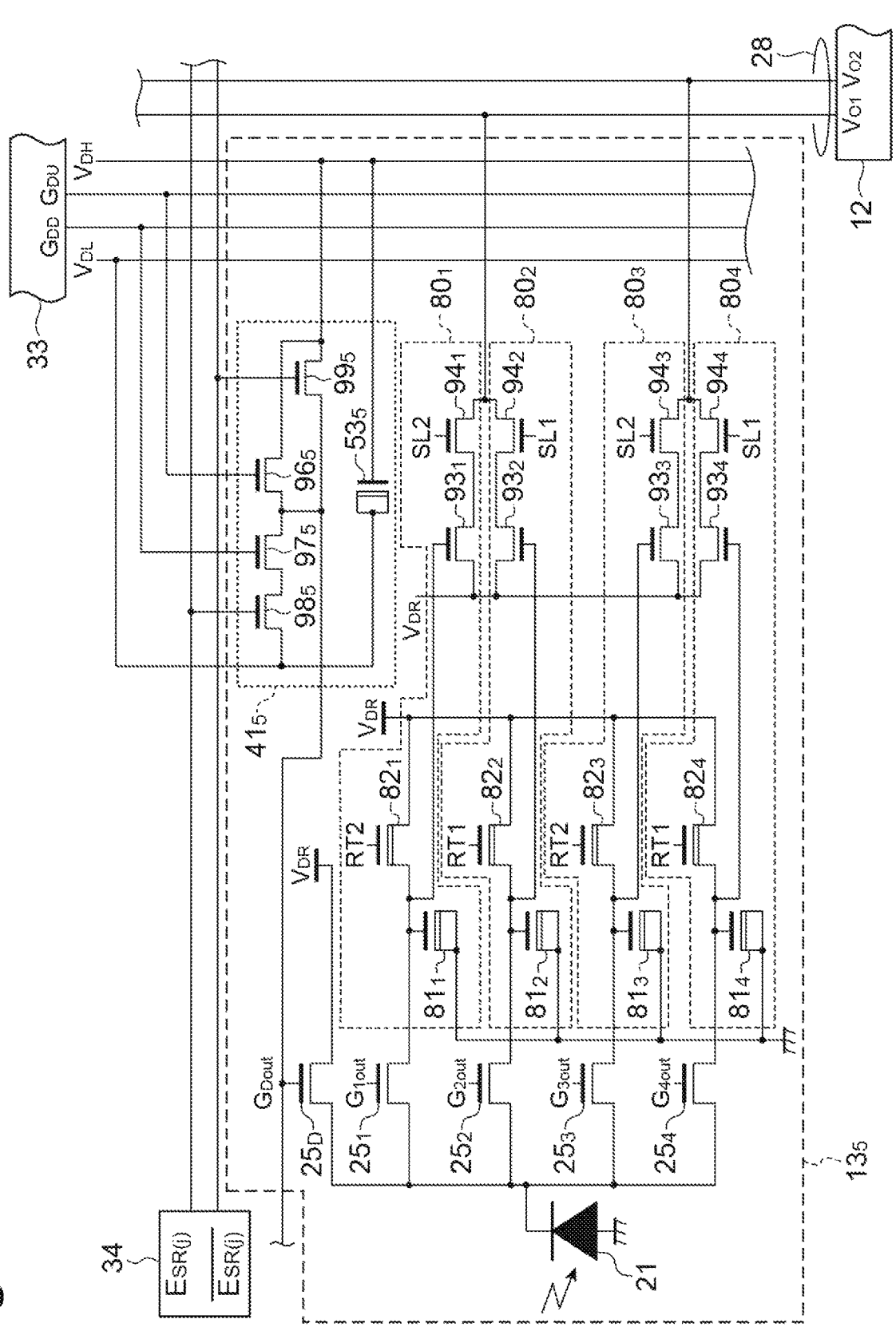
FIG. 50 is a diagram illustrating another pixel circuit included in the range image acquisition device according to Modified Example 14.

FIG. 50 illustrates the pixel circuit $13_5$ included in the range image acquisition device according to Modified Example 14. The configurations of the read circuits $80_1$, $80_2$, $80_3$, $80_4$ and the NAND-type driver circuit $41_5$ included in the pixel circuit $13_5$ are illustrated. The read circuits $80_1$, $80_2$, $80_3$ and $80_4$ are the same as the read circuits $80_1$, $80_2$, $80_3$ and $80_4$ illustrated in FIG. 48, so that detailed description thereof will be omitted.

The NOR-type driver circuit $41_5$ has a capacitance component $53_5$ and MOS transistors $96_5$, $97_5$, $98_5$, and $99_5$. One end of the capacitance component $53_5$ is connected to the high potential line $V_{DH}$. The other end of the capacitance component $53_5$ is connected to the low potential line $V_{DL}$ and a MOS transistor $98_8$.

All the MOS transistors $96_5$, $97_5$, $98_5$, and $99_5$ are the n-type MOS transistors. Further, all the MOS transistors $81_1$ to $81_4$, $82_1$ to $82_4$, $93_1$ to $93_4$, and $94_1$ to $94_4$ included in the read circuits $80_1$ to $80_4$ are the n-type MOS transistors. That is, all the MOS transistors constituting the pixel circuit $13_5$ illustrated in FIG. 50 are of n-type.

The drain of the MOS transistor $96_5$ is connected to the high potential line $V_{DH}$ and the drain of the MOS transistor $99_5$. The gate of the MOS transistor $96_5$ is connected to the distribution circuit 33 and receives a control pulse $G_{DU}$ from the distribution circuit 33. The source of the MOS transistor $96_5$ is connected to the drain of the MOS transistor $97_5$, the source of the MOS transistor $99_5$, and the control electrode $25_D$. The drain of the MOS transistor $97_5$ is connected to the source of the MOS transistor $96_5$, the source of the MOS transistor $99_5$, and the control electrode $25_D$. The gate of the MOS transistor $97_5$ is connected to the distribution circuit 33 and receives a control pulse $G_{DD}$ from the distribution circuit 33. The source of the MOS transistor $97_5$ is connected to the MOS transistor $98_5$.

The drain of the MOS transistor $98_5$ is connected to the source of the MOS transistor $97_5$. The gate of the MOS transistor $98_5$ is connected to the pixel switching circuit 34 and receives the logic pulse $E_{SR(j)}$ from the pixel switching circuit 34. The source of the MOS transistor $98_5$ is connected to the low potential line $V_{DL}$ and the capacitance component $53_5$.

The drain of the MOS transistor $99_5$ is connected to the high potential line $V_{DH}$ and the drain of the MOS transistor $96_5$. The gate of the MOS transistor $99_5$ is connected to the pixel switching circuit 34 and receives the inverted signal of the logic pulse $E_{SR(j)}$ from the pixel switching circuit 34. The source of the MOS transistor $99_5$ is connected to the source of the MOS transistor $96_5$, the drain of the MOS transistor $97_5$, and the control electrode $53_5$.

Modified Example 15

Figure 51:
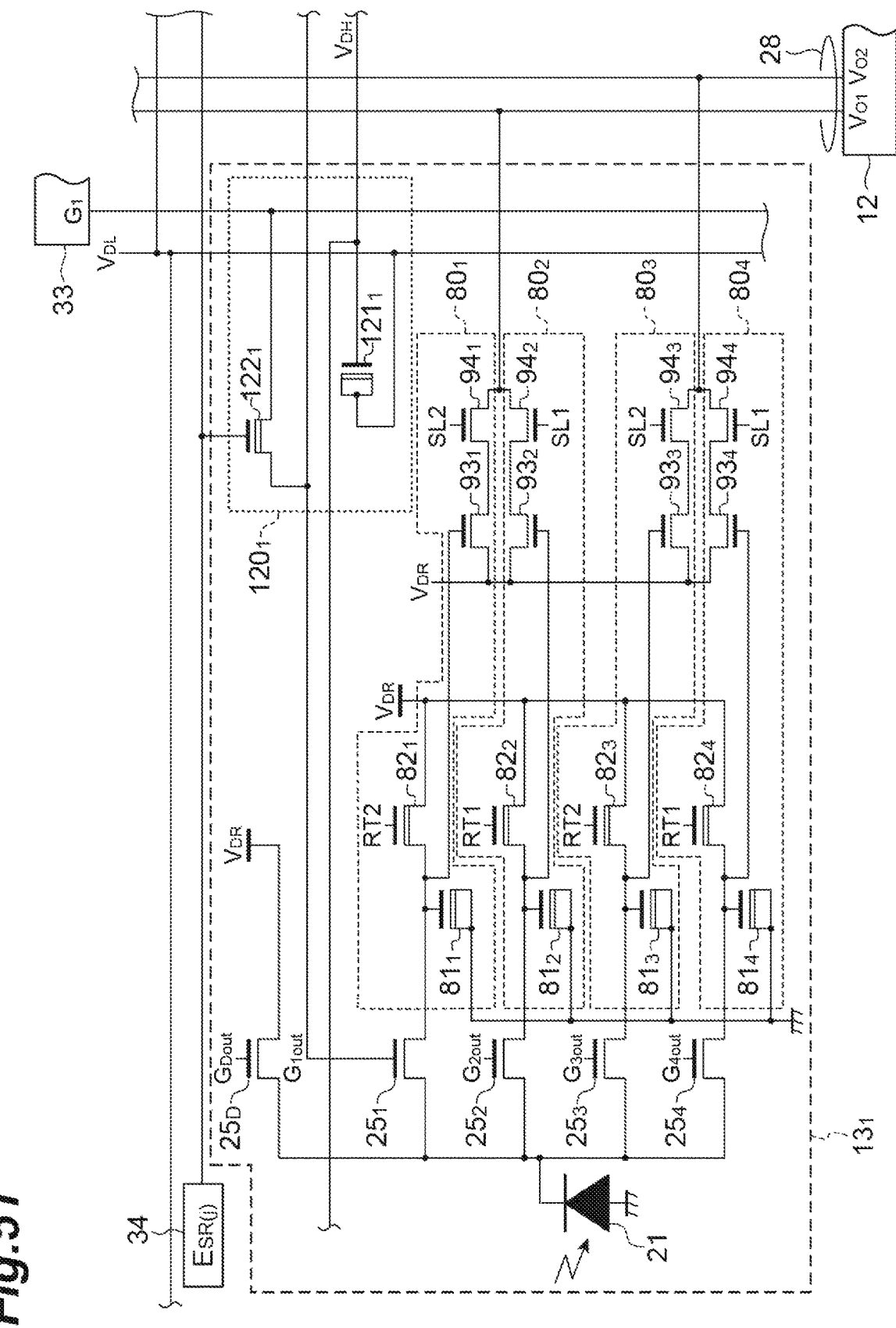
FIG. 51 is a diagram illustrating a pixel circuit included in a range image acquisition device according to Modified Example 15.

FIG. 51 illustrates the pixel circuit $13_1$ included in a range image acquisition device according to Modified Example 15. The pixel circuit $13_1$ of the range image acquisition device according to Modified Example 15 does not include the driver circuit $41_1$. The control electrode $25_1$ of the pixel circuit $13_1$ illustrated in FIG. 51 receives the transfer control pulse $G_{1OUT}$ from the distribution circuit 33 only through a depletion type MOS switch. The pixel circuits $13_2$ to $13_4$ have similar configurations.

Figure 52:
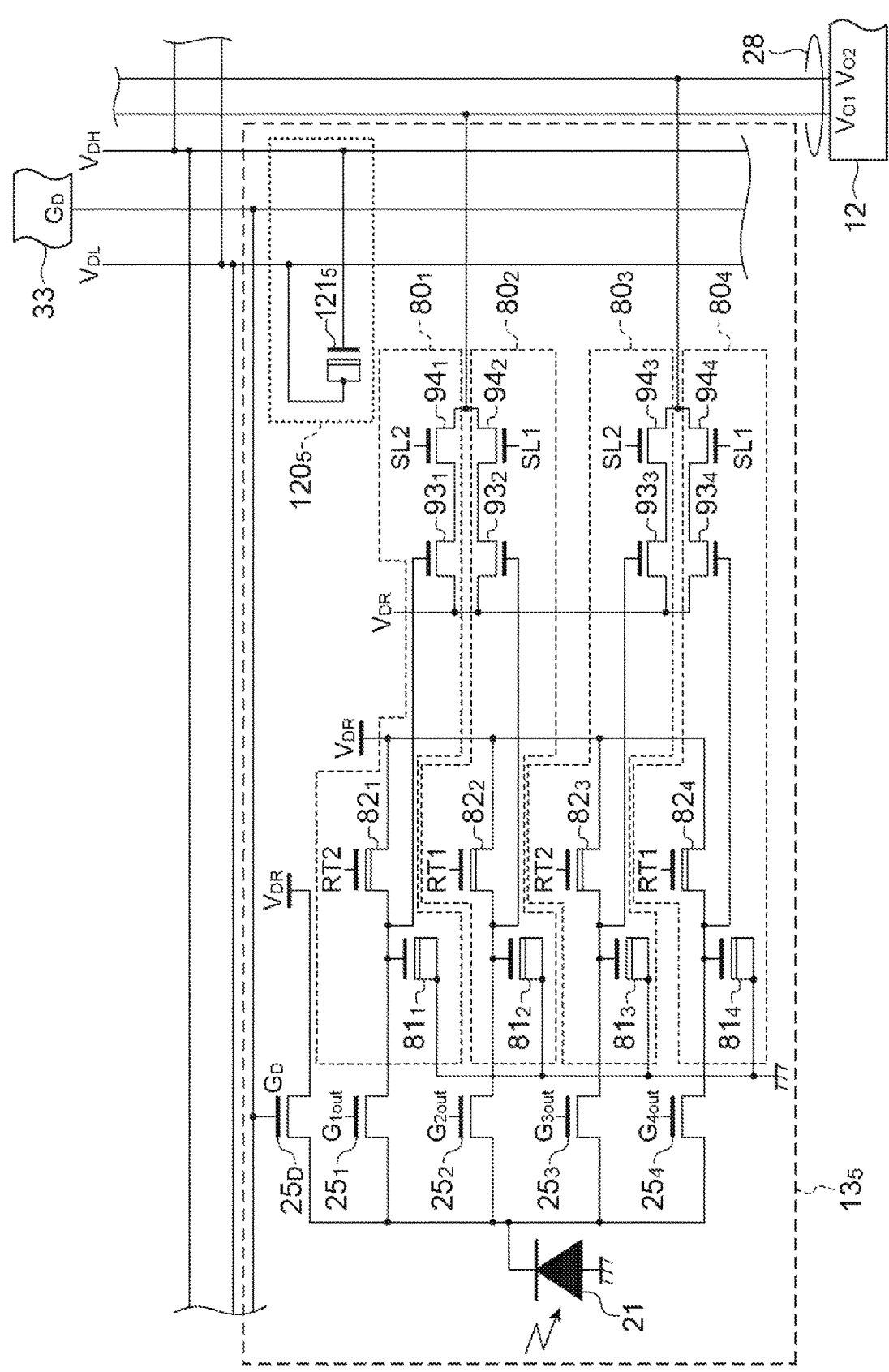
FIG. 52 is a diagram illustrating another pixel circuit included in the range image acquisition device according to Modified Example 15.

The pixel circuits $13_1$ and $13_5$ illustrated in FIGS. 51 and 52 will be described below. It is noted that the read circuits $80_1$ to $80_4$ in the pixel circuits $13_1$ and $13_5$ illustrated in FIGS. 51 and 52 are the same as the read circuits $80_1$ to $80_4$ of the pixel circuit $13_1$ illustrated in FIG. 48. Therefore, the detailed description of the read circuits $80_1$ to $80_4$ is omitted.

As illustrated in FIG. 51, the pixel circuit $13_1$ has a switching circuit $120_1$ instead of the NOR-type driver circuit $41_1$. The switching circuit $120_1$ has a capacitance component $121_1$ and a MOS transistor $122_1$. One end of the capacitance component $121_1$ is connected to the high potential line $V_{DH}$. The other end of the capacitance component $121_1$ is connected to the low potential line $V_{DL}$. The drain of the MOS transistor $122_1$ is connected to the distribution circuit 33 and receives the transfer control pulse $G_1$ from the distribution circuit 33. The gate of the MOS transistor $122_1$ is connected to the pixel switching circuit 34 and receives the logic pulse $E_{SR(j)}$ from the pixel switching circuit 34. The source of the MOS transistor $122_1$ is connected to the gate of the control electrode $25_1$.

According to the pixel circuit $13_1$ illustrated in FIG. 51, as circuit configurations corresponding to application of the transfer control pulse $G_1$, the pixel circuit $13_1$ has only one MOS transistor $122_1$ and one capacitance component $121_1$. As a result, the circuit area of the pixel circuit $13_1$ can be reduced.

FIG. 52 illustrates the pixel circuit $13_5$ included in the range image acquisition device according to Modified Example 15. As illustrated in FIG. 52, the pixel circuit $13_5$ does not include the NAND-type driver circuit $41_5$. The control electrode $25_D$ of the pixel circuit $13_5$ receives the transfer control pulse $G_D$ directly from the distribution circuit 33. The pixel circuit $13_5$ has a capacitance component $121_5$. One end of the capacitance component $121_5$ is connected to the high potential line $V_{DH}$. The other end of the capacitance component $121_5$ is connected to the low potential line $V_{DL}$.

Figure 53:
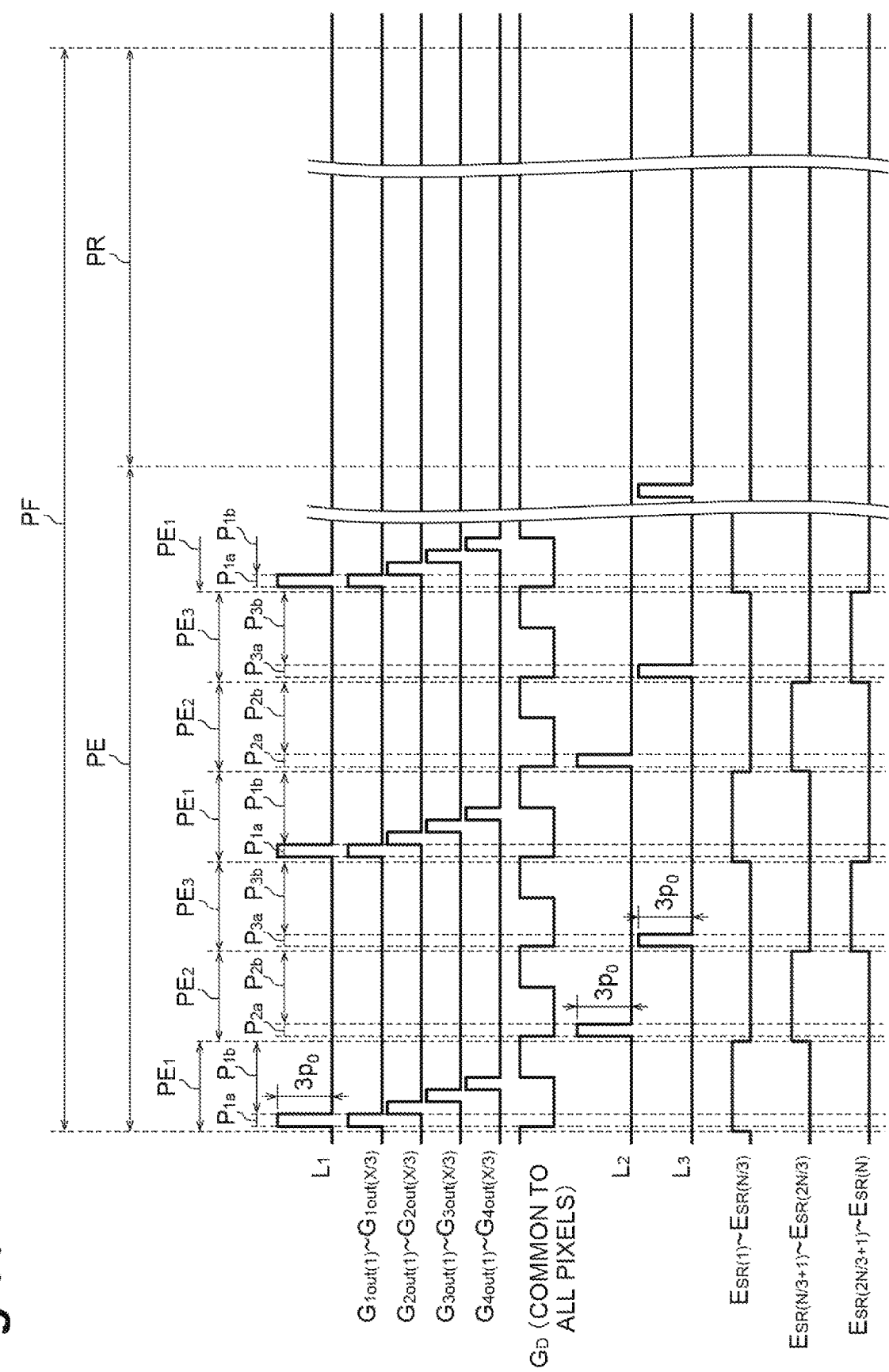
FIG. 53 is a timing chart illustrating operations of the range image acquisition device according to Modified Example 15.

The range image acquisition device according to Modified Example 15 operates according to a timing chart illustrated in FIG. 53. The pixel circuits $13_1$ to $13_5$ apply the control pulse $G_D$ to the control electrode $25_D$ between the last the control pulse $G_4$ among a series of the continuous the control pulses $G_1$ to $G_4$ and the leading the control pulse $G_1$ of the next series of the continuous the control pulses $G_1$ to $G_4$. As a result, when the transfer control pulses $G_{1OUT}$ to $G_{4OUT}$ are not applied to the control electrodes $25_1$ to $25_4$ of the insensitive pixel region AN, the photoelectric charges of the insensitive pixel region AN are discharged to the drain. Therefore, the logic pulse $E_{SR(j)}$ from the pixel switching circuit 34 is not required for the control electrode $25_D$.

Eleventh Embodiment

Next, a range image acquisition device according to an eleventh embodiment will be described. As illustrated in FIG. 2, the range image acquisition device 1 according to the first embodiment irradiates a portion of the measurement target region A in the height direction with pulsed light $L_P$ to cover the entire width of the measurement target region A. On the other hand, the range image acquisition device according to the eleventh embodiment divides the measurement target region in the height direction. Furthermore, in the range image acquisition device according to the eleventh embodiment, by using a DOE (Diffractive Optical Element) and the like, the pulsed light $L_P$ is divided in accordance with number of divisions of the measurement target region to correspond to a portion of all the divided measurement target regions in the height direction. Then, the range image acquisition device according to the eleventh embodiment simultaneously irradiates a portion of all the divided measurement target regions in the height direction with pulsed light $L_P$. In the following description, the operation of dividing the measurement target region only in the vertical direction (height direction) will be described as an example. However, the range image acquisition device can of course also perform the operation of dividing the measurement target region only in the lateral direction (width direction). Furthermore, the range image acquisition device can also perform the operation of dividing the measurement target region in both height direction and the lateral direction.

Figure 54:
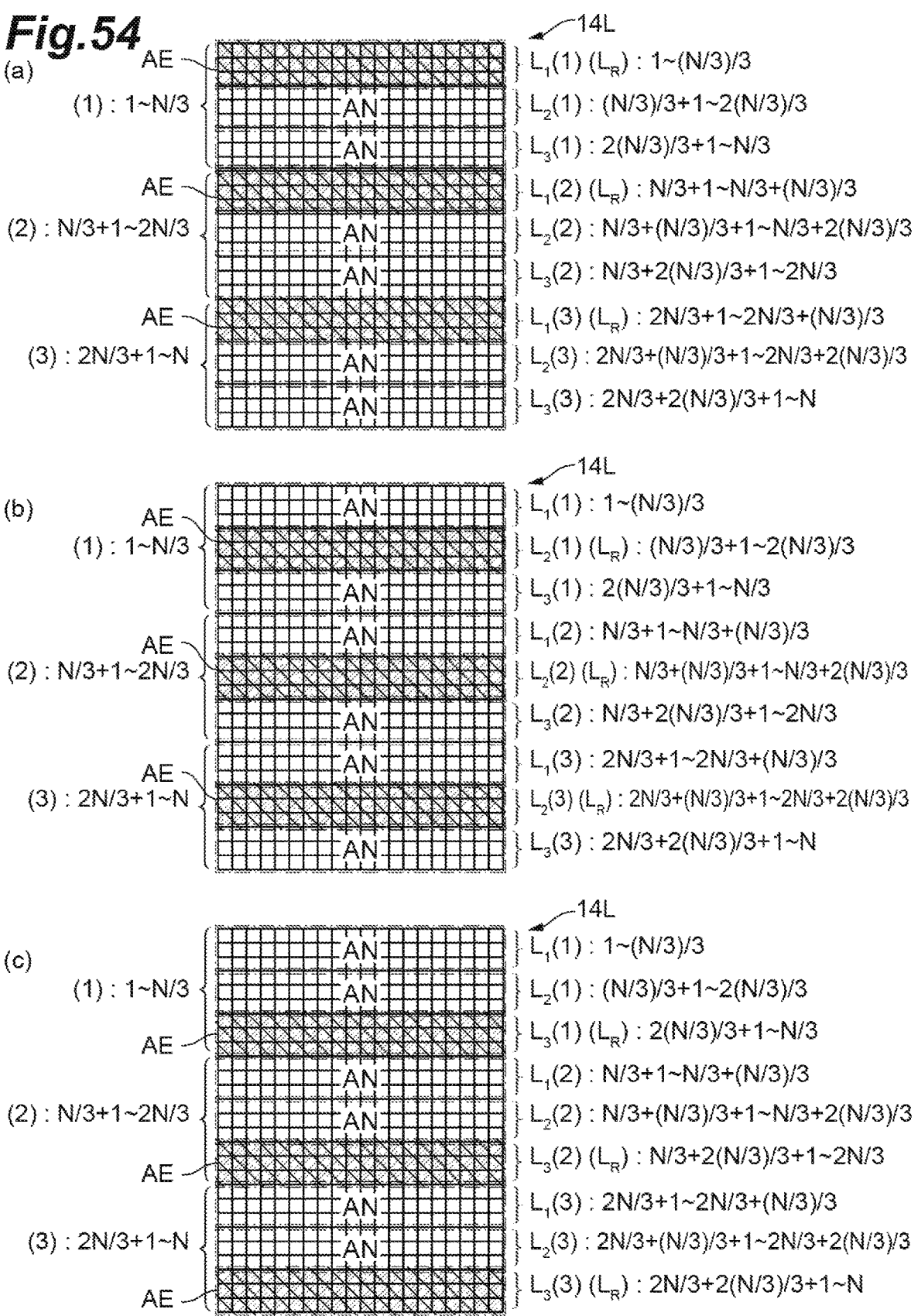
FIG. 54($a$) is a diagram illustrating a sensitive pixel regions and an insensitive pixel region in a first operation mode of an eleventh embodiment.

FIG. 54 schematically illustrates divided pixel array regions corresponding to measurement target regions obtained by vertically dividing a pixel array 14L into three, array division regions $L_1$, $L_2$, and $L_3$ in all the divided pixel array regions, the sensitive pixel region AE, and the insensitive pixel region AN. The array division regions $L_1$ to $L_3$ are regions which the incident pulsed light $L_R$ is expected to be divided into and simultaneously incident on.

Figure 55:
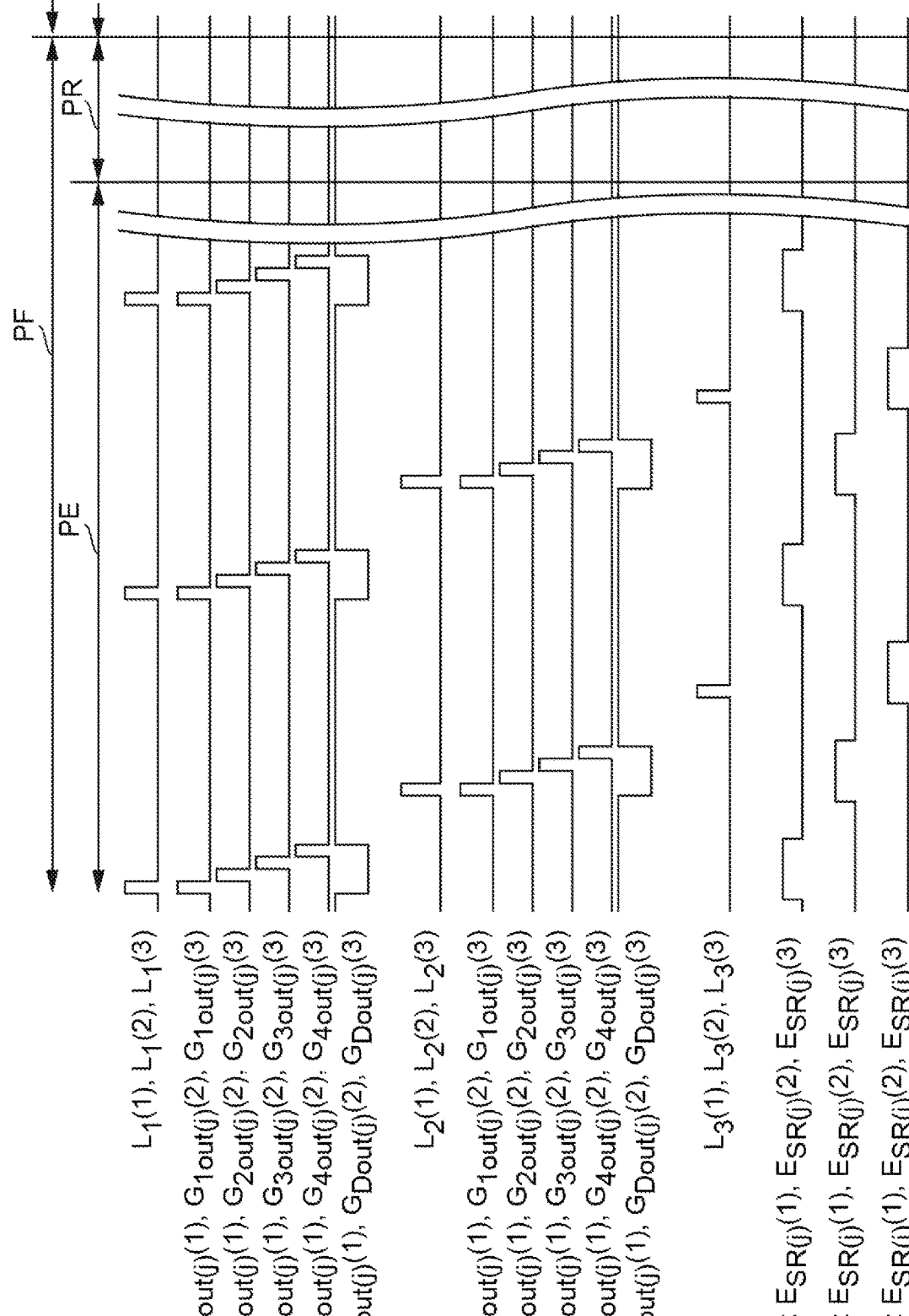
FIG. 55 is a timing chart illustrating operations of a light source and operations of a pixel array of the eleventh embodiment.

FIG. 54(*a*) is a diagram illustrating the sensitive pixel regions and the insensitive pixel region in the first operation mode. FIG. 54(*b*) is a diagram illustrating the sensitive pixel regions and the insensitive pixel region in the second operation mode. FIG. 54(*c*) is a diagram illustrating the sensitive pixel regions and the insensitive pixel region in the third operation mode. FIG. 55 illustrates a timing chart illustrating the operation of the light source 11 provided in the range image acquisition device according to the eleventh embodiment and a timing chart of the transfer control pulses $G_{1out}$ to $G_{4out}$ and $G_{Dout}$ and the logic pulse $E_{SR(j)}$ applied to the control electrodes $25_1$, $25_2$, $25_3$, $25_4$, and $25_6$. The transfer control pulses $G_{1out}$, $G_{2out}$, $G_{3out}$, $G_{4out}$, and $G_{Dout}$ are controlled by a signal setting the pixel circuits to be sensitive and a signal setting the pixel circuits to be insensitive according to the logic pulse $E_{SR(j)}$ and/or the inverted signal of the logic pulse $E_{SR(j)}$.

(1), (2), and (3) of $L_1(1)$, $L_1(2)$, $L_1(3)$, $L_2(1)$, $L_2(2)$, $L_2(3)$, $L_3(1)$, $L_3(2)$, and $L_3(3)$, indicate the divided pixel array regions corresponding to the three divided measurement target regions. $L_1$, $L_2$, and $L_3$ indicate three array division regions (row blocks) $L_1$, $L_2$, and $L_3$ in the three divided pixel array regions vertically divided. $L_1(1)$, $L_1(2)$, and $L_1(3)$ indicate incidence of divided incident pulsed lights $L_R$ on array division regions (row blocks) $L_1(1)$, $L_1(2)$, and $L_1(3)$ simultaneously in the first operation mode. Next, the light source 11 allows the incident pulsed lights $L_R$ to be incident on the array division regions (row blocks) $L_2(1)$, $L_2(2)$, and $L_2(3)$ simultaneously in the second operation mode.

Furthermore, after that, the light source 11 allows the incident pulsed lights $L_R$ to be incident on the array division regions (row blocks) $L_3(1)$, $L_3(2)$, and $L_3(3)$ simultaneously in the third operation mode.

Modified Example 16

Next, a range image acquisition device 1M according to Modified Example 16 of the eleventh embodiment will be described.

The range image acquisition device 1F according to the seventh embodiment further performs the operation of setting the operation of the pixel circuit 13F to be sensitive or insensitive for each column block in addition to the operation of setting the operation of the pixel circuit 13F to be sensitive or insensitive for each row block. According to the operations, as illustrated in FIG. 23, specific regions in the pixel array 14F can be set as the sensitive pixel region AE, and other regions can be set as the insensitive pixel region AN. The sensitive pixel region AE can move from left to right in FIG. 23 for each column block and then move to the next row block.

Figure 56:
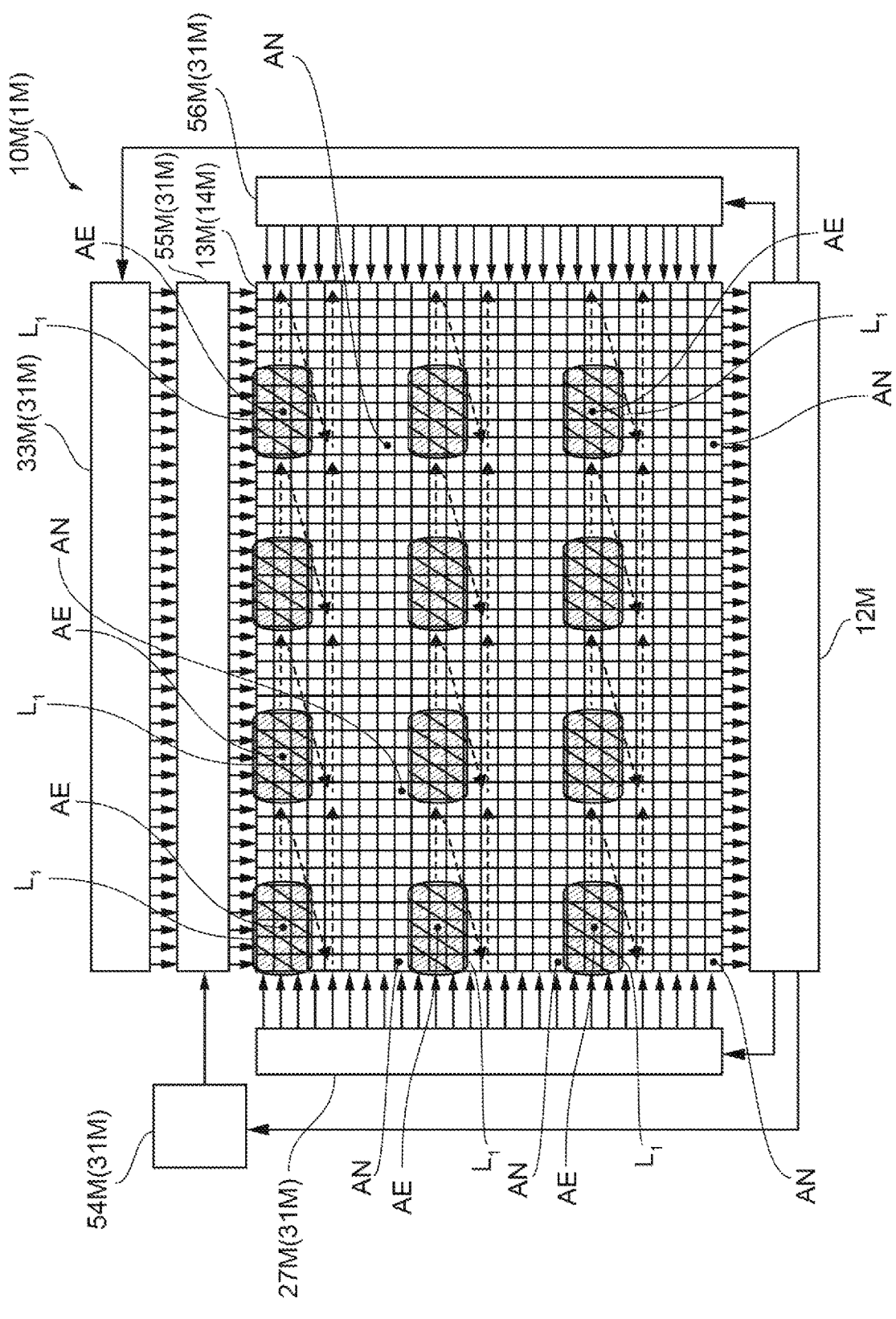
FIG. 56 is a diagram illustrating a connection configuration between a pixel array and a peripheral circuit of Modified Example 16.

On the other hand, as illustrated in FIG. 56, in the range image acquisition device 1M according to Modified Example 16, a pixel array 14M is divided into 3×4 regions in the vertical direction and the lateral direction corresponding to the height and width directions of the measurement target region. These regions are divided pixel array regions corresponding to the divided measurement target regions. The range image acquisition device 1M performs the operation of setting an operation of pixel circuits 13M to be sensitive or insensitive for each row block and the operation of setting an operation of the pixel circuit 13M to be sensitive or insensitive for each column block in all the divided pixel array regions. According to the operations, as illustrated in FIG. 56, in all the divided pixel array regions of the pixel array 14M, specific regions can be set as the sensitive pixel region AE and the other regions can be set as the insensitive pixel region AN. The sensitive pixel region AE can move to the next row block after sequentially moving from left to right in FIG. 56 for each column block in all the divided pixel array regions. In FIG. 56, all the divided pixel array regions have three row blocks in the vertical direction and two column blocks in the lateral direction.

A range image sensor 10M has a pixel array 14M, a calculation circuit 12M, and a peripheral circuit 31M. The peripheral circuit 31M has a read control circuit 27M, a distribution circuit 33M, a pixel switching circuit (column) 54M, a logic calculation circuit 55M, and a pixel switching circuit (row) 56M.

In the case of the light source that illuminates a wide surface, multipath lights from many places are incident on a certain minute measurement point. As a result, the accuracy of range measurement is limited by influence of the multipath lights. By using the DOE, the light source capable of scanning a narrow irradiation region, and the range image acquisition device 1M capable of performing sensitive control and insensitive control in synchronization with light source, the range measurement with a high accuracy can be performed only by the influence of the minute multipath components from the narrow irradiation region away from the reflected light of only the measurement point.

REFERENCE SIGNS LIST

1: range image acquisition device, 11: light source, 31: peripheral circuit, 12a: light source control unit, 13: pixel circuit (pixel circuit unit), 14: pixel array, 21: photoelectric conversion region, 22: charge reading region, 23: charge discharging region, 27: read control circuit, 33: distribution circuit, 34: pixel switching circuit, A: measurement target region, AE: sensitive pixel region, AN: insensitive pixel region, $25_1$ to $25_4$, $25_D$: control electrode, $L_P$: pulsed light, $L_R$: incident pulsed light, R: irradiation region, S: target.

The invention claimed is:

1. A range image acquisition device comprising:

a light source generating a pulsed light;

a light source control unit controlling the light source to repeatedly generate the pulsed light within a periodic frame period;

a pixel array including a plurality of pixel circuit units arranged in N rows and M columns (N and M are integers of 2 or more) and generating electric charges corresponding to a received light; and a peripheral circuit arranged in a peripheral portion of the pixel array and supplying a control signal controlling an operation of the pixel array to the pixel array, wherein the pixel circuit unit has: a photoelectric conversion region converting a light into electric charges; first to X-th (X is an integer of 2 or more) charge reading regions provided to be close to the photoelectric conversion region and separated from each other and having a capacitance component for accumulating the electric charges generated in the photoelectric conversion region; a charge discharging region provided to be close to the photoelectric conversion region and for discharging the electric charges generated in the photoelectric conversion region without passing through the charge reading regions; first to X-th control electrodes provided corresponding to the photoelectric conversion region and the first to X-th charge reading regions, respectively, and for applying a transfer control pulse for transfer of the electric charges between the photoelectric conversion region and the first to X-th charge reading regions; and an (X+1)-th control electrode for applying the transfer control pulse for direct transfer of the electric charges between the photoelectric conversion region and the charge discharging region, wherein the light source control unit repeatedly performs an operation of generating the pulsed light so that a returned light based on the pulsed light is incident on a sensitive region in the pixel array while moving in the sensitive region, wherein the peripheral circuit supplies the control signal to the pixel array so that the transfer control pulse is applied, wherein the transfer control pulse transfers the electric charges generated in the photoelectric conversion region in the pixel circuit units constituting the sensitive region to the charge reading region and transfers the electric charges generated in the photoelectric conversion region in the pixel circuit units constituting the insensitive region not included in the sensitive region to the charge discharging region, wherein the peripheral circuit includes a distribution circuit distributing a control pulse and a pixel switching circuit outputting a logic pulse for setting the pixel circuit unit to be sensitive or insensitive, and wherein the pixel circuit unit includes first to (X+1)-th driver circuits that perform a logic operation on the control pulse and the logic pulse to generate the transfer control pulse applied to each of the first to (X+1)-th control electrodes.

2. The range image acquisition device according to claim 1, wherein the light source control unit performs an operation of emitting the pulsed light from the light source so as to expose the sensitive regions of all the pixel circuit units included in a j-th row (j is an integer of 1 or more and N or less), and wherein the peripheral circuit performs:

an operation of supplying the control signal to the pixel array so that the transfer control pulse permitting the movement of the electric charges from the photoelectric conversion region to the charge reading regions is applied to the first to X-th control electrodes of all the pixel circuit units included in the j-th row; and an operation of supplying the control signal to the pixel array so that the transfer control pulse permitting the movement of the electric charges from the photoelectric conversion region to the charge discharging region is applied to the (X+1)-th control electrodes of all the pixel circuit units included in the insensitive region.

3. The range image acquisition device according to claim 1, wherein the light source control unit performs an operation of emitting the pulsed light from the light source so as to expose the sensitive region of a portion of the pixel circuit units included in a j-th row (j is an integer of 1 or more and N or less), and wherein the peripheral circuit performs:

an operation of supplying the control signal to the pixel array so that the transfer control pulse permitting the movement of the electric charges from the photoelectric conversion region to the charge reading regions is applied to the first to X-th control electrodes included in a portion of the pixel circuit units included in the j-th row; and an operation of supplying the control signal to the pixel array so that the transfer control pulse permitting the movement of the electric charges from the photoelectric conversion region to the charge discharging region is applied to all the (X+1)-th control electrodes of the pixel circuit units included in the insensitive region.

4. The range image acquisition device according to claim 1 wherein the peripheral circuit and the light source control unit perform a read operation of outputting a voltage based on the electric charges accumulated in the charge reading regions after performing an exposure operation on the plurality of sensitive regions several times.

5. The range image acquisition device according to claim 1, wherein the peripheral circuit and the light source control unit repeatedly perform an exposure operation on the selected sensitive region and a read operation outputting a voltage based on the electric charges accumulated in the charge reading regions for the pixel circuit units constituting the selected sensitive region while changing the sensitive region to be selected.

6. The range image acquisition device according to claim 1, wherein the peripheral circuit and the light source control unit concurrently perform the exposure operation for the sensitive region and the read operation for outputting the voltage based on the electric charges accumulated in the charge reading regions.

7. The range image acquisition device according to claim 4, wherein, in the exposure operation, the light source control unit generates the pulsed light only once for the sensitive region.

8. The range image acquisition device according to claim 4, wherein, in the exposure operation, the light source control unit generates the pulsed light several times for the sensitive region.

9. The range image acquisition device according to claim 1, wherein the pixel circuit unit has:

the photoelectric conversion region having a function of converting an incident pulsed light into the electric charges; and a read circuit receiving the electric charges from the photoelectric conversion region and outputting a voltage based on the electric charges, wherein the pixel circuit unit is configured to include a plurality of n-type MOS transistors, and wherein the pixel circuit unit does not include a p-type MOS transistor.

10. The range image acquisition device according to claim 3, wherein the light source control unit performs an operation of emitting the pulsed light from the light source so as to expose the sensitive region of a portion of the pixel circuit units included in the j-th row (j is an integer of 1 or more and N/R or less (R is the array division number in the row direction)) in the divided pixel array regions obtained by dividing the pixel array into the plurality of regions, wherein the light source is divided in illumination so as to simultaneously expose the sensitive regions included in all the divided pixel array regions, and wherein the peripheral circuit performs:

an operation of supplying the control signal to the pixel array so that the transfer control pulse permitting the movement of the electric charges from the photoelectric conversion region to the charge reading regions is applied to the first to X-th control electrodes included in a portion of the pixel circuit units included in the j-th row of all the divided pixel array regions; and an operation of supplying the control signal to the pixel array so that the transfer control pulse permitting the movement of the electric charges from the photoelectric conversion region to the charge discharging region is applied to all the (X+1)-th control electrodes of the pixel circuit units included in the insensitive regions of all the divided pixel array regions.

* * * * *